United States Patent
DeNeui et al.

(10) Patent No.: US 12,288,024 B2
(45) Date of Patent: Apr. 29, 2025

(54) SYSTEM, METHOD, AND APPARATUS FOR A UNIFIED DOCUMENT SURFACE

(71) Applicant: Coda Project, Inc., Mountain View, CA (US)

(72) Inventors: Alexander W. DeNeui, Sandpoint, ID (US); Glenn Jaume, San Francisco, CA (US); Hariharan Sivaramakrishnan, Bellevue, WA (US); Helena G. Jaramillo, Syracuse, NY (US); John Z. Li, San Francisco, CA (US); Jonathan L. Goldman, San Francisco, CA (US); Martin Charles, Austin, TX (US); W. Michael Varney, Truckee, CA (US); Timothy Andrew James, Seattle, WA (US); Adam Ginzberg, San Francisco, CA (US); Nathan Penner, Redmond, WA (US); Evan Brooks, San Francisco, CA (US); Michael Hewitt, Moscow, ID (US); Punit Shah, San Francisco, CA (US); Patrick Barry, San Francisco, CA (US); Huayang Guo, Fremont, CA (US); Jason Peter Stowe, Seattle, WA (US); Christopher Leland Eck, Sammamish, WA (US); Alicia Salvino, Philadelphia, PA (US); Alan Fang, New York, NY (US); Spencer Chang, San Francisco, CA (US); Elizabeth Huang, Great Falls, VA (US); Oleg Vaskevich, San Francisco, CA (US)

(73) Assignee: Grammarly, Inc., San Francisco, CA (US)

( * ) Notice: Subject to any disclaimer, the term of this patent is extended or adjusted under 35 U.S.C. 154(b) by 0 days.

(21) Appl. No.: 18/195,109

(22) Filed: May 9, 2023

(65) Prior Publication Data
US 2023/0274080 A1     Aug. 31, 2023

Related U.S. Application Data

(63) Continuation of application No. 17/679,006, filed on Feb. 23, 2022.
(Continued)

(51) Int. Cl.
G06F 40/166     (2020.01)
G06F 3/0484    (2022.01)
G06F 21/62     (2013.01)

(52) U.S. Cl.
CPC ......... *G06F 40/166* (2020.01); *G06F 3/0484* (2013.01); *G06F 21/6218* (2013.01)

(58) Field of Classification Search
None
See application file for complete search history.

(56) References Cited

U.S. PATENT DOCUMENTS

| | | |
|---|---|---|
| 5,581,760 A | 12/1996 | Atkinson et al. |
| 5,745,910 A | 4/1998 | Piersol et al. |

(Continued)

FOREIGN PATENT DOCUMENTS

| | | |
|---|---|---|
| WO | 2017189933 A1 | 11/2017 |
| WO | 2022182796 A1 | 9/2022 |

OTHER PUBLICATIONS www.keepproductive.com et. al. (https://www.youtube.com/watch?v=1ys0KRKnqkE) , published Aug. 13, 2019.*
(Continued)

*Primary Examiner* — Tuyetlien T Tran
(74) *Attorney, Agent, or Firm* — GTC Law Group PC & Affiliates

(57) ABSTRACT

Systems and methods for publication and external interfacing for a unified document surface are disclosed. An
(Continued)

example system may include a document serving circuit structured to access a document data, the document data comprising data for a unified document surface, and provide at least a portion of the document data to a client serving circuit. The client serving circuit may be structured to implement a unified document surface interface in response to the at least a portion of the document data, implement an extension creation interface, provide a pack implementation value to the document serving circuit in response to user interactions with the extension creation interface, and determine an executable object in response to the pack implementation value.

25 Claims, 64 Drawing Sheets

Related U.S. Application Data

(60) Provisional application No. 63/230,398, filed on Aug. 6, 2021, provisional application No. 63/225,835, filed on Jul. 26, 2021, provisional application No. 63/152,541, filed on Feb. 23, 2021.

(56) References Cited

U.S. PATENT DOCUMENTS

| | | | |
|---|---|---|---|
| 5,974,413 | A | 10/1999 | Beauregard et al. |
| 7,117,435 | B1 | 10/2006 | Kotler et al. |
| 7,424,668 | B2 | 9/2008 | DeSpain |
| 7,617,229 | B2 | 11/2009 | Bishop et al. |
| 7,769,810 | B1 | 8/2010 | Kaufman |
| 7,805,674 | B2 | 9/2010 | Chen et al. |
| 7,877,680 | B2 | 1/2011 | Arun et al. |
| 8,099,392 | B2 | 1/2012 | Paterson et al. |
| 8,176,321 | B1 | 5/2012 | Perry et al. |
| 8,200,962 | B1 | 6/2012 | Boodman et al. |
| 8,250,459 | B2 | 8/2012 | Ho et al. |
| 8,429,521 | B2 | 4/2013 | Lloyd et al. |
| 8,453,112 | B1 | 5/2013 | Flynn et al. |
| 8,510,645 | B2 | 8/2013 | Beach et al. |
| 8,612,380 | B2 | 12/2013 | Kleppner et al. |
| 8,635,251 | B1 | 1/2014 | Chan |
| 8,640,022 | B2 | 1/2014 | Waldman et al. |
| 8,682,973 | B2 | 3/2014 | Kikin-Gil et al. |
| 8,694,988 | B2 | 4/2014 | Goldman |
| 8,745,515 | B2 | 6/2014 | Makela |
| 8,984,414 | B2 | 3/2015 | Stevens |
| 9,015,572 | B2 | 4/2015 | Lanza et al. |
| 9,026,897 | B2 | 5/2015 | Zarras |
| 9,037,959 | B2 | 5/2015 | Rapp et al. |
| 9,176,933 | B2 | 11/2015 | Kotler et al. |
| 9,189,480 | B2 | 11/2015 | Thiruvidan et al. |
| 9,201,854 | B1 | 12/2015 | Kloiber et al. |
| 9,285,977 | B1 | 3/2016 | Greenberg et al. |
| 9,310,981 | B2 | 4/2016 | Lynch et al. |
| 9,436,927 | B2 | 9/2016 | Saliba et al. |
| 9,558,171 | B2 | 1/2017 | Christoph et al. |
| 9,619,454 | B2 | 4/2017 | Wang et al. |
| 9,639,511 | B2 | 5/2017 | Hariharan et al. |
| 9,652,446 | B2 | 5/2017 | Creason et al. |
| 9,690,785 | B1 | 6/2017 | Vagell |
| 9,727,543 | B2 | 8/2017 | Kloiber et al. |
| 9,734,139 | B2 | 8/2017 | Reeves et al. |
| 9,747,270 | B2 | 8/2017 | Campbell et al. |
| 9,785,637 | B2 | 10/2017 | Ayyar et al. |
| 9,805,011 | B2 | 10/2017 | Fulton et al. |
| 9,805,134 | B2 | 10/2017 | Goldstein et al. |
| 9,864,736 | B2 | 1/2018 | Mihara |
| 9,898,520 | B2 | 2/2018 | Hawa et al. |
| 9,910,837 | B2 | 3/2018 | Kumarasamy Mani et al. |
| 9,928,241 | B2 | 3/2018 | Frei et al. |
| 9,933,931 | B2 | 4/2018 | Svinth et al. |
| 9,972,000 | B2 | 5/2018 | Brown |
| 10,031,905 | B2 | 7/2018 | Fu et al. |
| 10,033,774 | B2 | 7/2018 | Kotler et al. |
| 10,051,020 | B2 | 8/2018 | Keslin et al. |
| 10,088,990 | B2 | 10/2018 | Lynch et al. |
| 10,102,184 | B1 | 10/2018 | Adamson |
| 10,114,531 | B2 | 10/2018 | Kotler et al. |
| 10,133,716 | B2 | 11/2018 | Konnola et al. |
| 10,216,714 | B2 | 2/2019 | Kraisler et al. |
| 10,229,178 | B2 | 3/2019 | Pasupathy et al. |
| 10,249,068 | B2 | 4/2019 | Brunn et al. |
| 10,275,510 | B2 | 4/2019 | Hawa et al. |
| 10,296,575 | B2 | 5/2019 | Theodore et al. |
| 10,303,564 | B1 | 5/2019 | Gupta et al. |
| 10,366,114 | B2 | 7/2019 | Bendig et al. |
| 10,466,867 | B2 | 11/2019 | Boucher et al. |
| 10,466,868 | B2 | 11/2019 | Boucher et al. |
| 10,489,018 | B2 | 11/2019 | Boucher et al. |
| 10,491,658 | B2 | 11/2019 | Hurwitz et al. |
| 10,503,822 | B1 | 12/2019 | Spencer et al. |
| 10,521,135 | B2 | 12/2019 | Kusters et al. |
| 10,528,932 | B2 | 1/2020 | Brown |
| 10,540,419 | B2 | 1/2020 | Goldstein et al. |
| 10,552,234 | B2 | 2/2020 | Chandra et al. |
| 10,552,439 | B2 | 2/2020 | Jiang et al. |
| 10,599,526 | B2 | 3/2020 | Milvaney et al. |
| 10,614,263 | B2 | 4/2020 | Mei |
| 10,719,485 | B2 | 7/2020 | Bell et al. |
| 10,732,825 | B2 | 8/2020 | Campbell et al. |
| 10,740,535 | B2 | 8/2020 | Talati |
| 10,769,365 | B2 | 9/2020 | Fern et al. |
| 10,877,633 | B2 | 12/2020 | Boucher et al. |
| 10,891,020 | B2 | 1/2021 | Hart et al. |
| 10,908,784 | B2 | 2/2021 | Boucher et al. |
| 10,915,700 | B2 | 2/2021 | Theodore et al. |
| 10,983,670 | B2 | 4/2021 | Boucher et al. |
| 11,010,064 | B2 | 5/2021 | Kusters et al. |
| 11,106,332 | B2 | 8/2021 | Boucher et al. |
| 11,188,353 | B2 | 11/2021 | Byard et al. |
| 11,281,732 | B2 | 3/2022 | Rao |
| 11,314,779 | B1 | 4/2022 | Jain |
| 11,392,556 | B1 | 7/2022 | Mann et al. |
| 11,435,874 | B2 | 9/2022 | Boucher et al. |
| 11,514,037 | B2 | 11/2022 | Kent et al. |
| 11,514,129 | B1 | 11/2022 | Pillsbury et al. |
| 11,726,635 | B2 | 8/2023 | Boucher et al. |
| 11,775,136 | B2 | 10/2023 | Boucher et al. |
| 11,836,817 | B2 | 12/2023 | Hunn et al. |
| 12,106,039 | B2 | 10/2024 | Deneui et al. |
| 2001/0016857 | A1 | 8/2001 | Sorihashi |
| 2002/0015064 | A1 | 2/2002 | Robotham et al. |
| 2003/0014421 | A1 | 1/2003 | Jung |
| 2003/0014442 | A1 | 1/2003 | Shiigi et al. |
| 2003/0225937 | A1 | 12/2003 | Reiss et al. |
| 2003/0226136 | A1* | 12/2003 | Calahan ............ G06F 9/44521 717/162 |
| 2004/0108943 | A1 | 6/2004 | Aoyama |
| 2004/0111675 | A1 | 6/2004 | Mori et al. |
| 2004/0148576 | A1 | 7/2004 | Matveyenko et al. |
| 2004/0210822 | A1 | 10/2004 | Kotler et al. |
| 2005/0044496 | A1 | 2/2005 | Kotler et al. |
| 2005/0044497 | A1 | 2/2005 | Kotler et al. |
| 2005/0049843 | A1 | 3/2005 | Hewitt et al. |
| 2005/0050088 | A1 | 3/2005 | Kotler et al. |
| 2005/0066265 | A1 | 3/2005 | Kotler et al. |
| 2005/0102308 | A1 | 5/2005 | Sykes et al. |
| 2005/0262194 | A1 | 11/2005 | Mamou et al. |
| 2006/0015804 | A1 | 1/2006 | Barton et al. |
| 2006/0036448 | A1 | 2/2006 | Haynie et al. |
| 2006/0069696 | A1 | 3/2006 | Becker et al. |
| 2006/0101321 | A1 | 5/2006 | Friedrichowitz et al. |
| 2006/0117253 | A1 | 6/2006 | Polash |
| 2006/0129885 | A1 | 6/2006 | Bozak et al. |
| 2006/0235944 | A1 | 10/2006 | Haslam |
| 2006/0271574 | A1 | 11/2006 | Villaron et al. |
| 2006/0288267 | A1 | 12/2006 | DeSpain |
| 2007/0011211 | A1 | 1/2007 | Reeves et al. |
| 2007/0016850 | A1 | 1/2007 | Chen et al. |
| 2007/0028159 | A1 | 2/2007 | Ying et al. |
| 2007/0219956 | A1 | 9/2007 | Milton |

(56) References Cited

U.S. PATENT DOCUMENTS

| | | |
|---|---|---|
| 2007/0220415 A1 | 9/2007 | Cheng et al. |
| 2007/0233811 A1 | 10/2007 | Rochelle et al. |
| 2007/0277109 A1 | 11/2007 | Chen et al. |
| 2008/0046809 A1 | 2/2008 | Oshima et al. |
| 2008/0148166 A1 | 6/2008 | Brunswig et al. |
| 2008/0222510 A1 | 9/2008 | Nguyen et al. |
| 2008/0229207 A1 | 9/2008 | Kataoka |
| 2008/0235569 A1 | 9/2008 | Arun et al. |
| 2008/0256113 A1 | 10/2008 | Rasmussen et al. |
| 2008/0256114 A1 | 10/2008 | Rasmussen et al. |
| 2008/0275910 A1 | 11/2008 | Molina-Moreno et al. |
| 2008/0307000 A1 | 12/2008 | Paterson et al. |
| 2009/0064030 A1 | 3/2009 | Grandhi |
| 2009/0083614 A1 | 3/2009 | Wedekind |
| 2009/0106310 A1 | 4/2009 | Lanza et al. |
| 2009/0119302 A1 | 5/2009 | Palmer et al. |
| 2009/0192845 A1 | 7/2009 | Gudipaty et al. |
| 2009/0235181 A1 | 9/2009 | Saliba et al. |
| 2009/0319880 A1 | 12/2009 | Collie et al. |
| 2010/0083079 A1 | 4/2010 | Rapp et al. |
| 2010/0180233 A1 | 7/2010 | Kruzeniski et al. |
| 2010/0257451 A1 | 10/2010 | Halevi et al. |
| 2010/0318982 A1 | 12/2010 | Lumley et al. |
| 2010/0325166 A1 | 12/2010 | Rubin et al. |
| 2010/0332973 A1 | 12/2010 | Kloiber et al. |
| 2011/0004820 A1 | 1/2011 | Kloiber et al. |
| 2011/0066704 A1 | 3/2011 | Nakamura |
| 2011/0093770 A1 | 4/2011 | Kamimura |
| 2011/0099187 A1 | 4/2011 | Hansen |
| 2011/0202555 A1 | 8/2011 | Cordover et al. |
| 2011/0246549 A1 | 10/2011 | Katzenberger et al. |
| 2011/0276868 A1 | 11/2011 | Hoke et al. |
| 2011/0289397 A1 | 11/2011 | Eastmond et al. |
| 2012/0151317 A1 | 6/2012 | Ho et al. |
| 2012/0151378 A1 | 6/2012 | Parish et al. |
| 2012/0180002 A1 | 7/2012 | Campbell et al. |
| 2012/0204250 A1 | 8/2012 | Anderson et al. |
| 2012/0290926 A1 | 11/2012 | Kapadia et al. |
| 2012/0317112 A1 | 12/2012 | Naito |
| 2012/0330995 A1 | 12/2012 | Muenkel et al. |
| 2013/0007648 A1 | 1/2013 | Gamon et al. |
| 2013/0014000 A1 | 1/2013 | Popov et al. |
| 2013/0050756 A1 | 2/2013 | Hosotsubo et al. |
| 2013/0066869 A1 | 3/2013 | Kusaka et al. |
| 2013/0091205 A1 | 4/2013 | Kotler et al. |
| 2013/0097484 A1 | 4/2013 | Nakamura |
| 2013/0097490 A1 | 4/2013 | Kotler et al. |
| 2013/0103741 A1 | 4/2013 | Palop et al. |
| 2013/0124700 A1* | 5/2013 | Miller ............... G06F 9/44526 709/220 |
| 2013/0125143 A1 | 5/2013 | Kikuchi et al. |
| 2013/0145244 A1 | 6/2013 | Rothschiller et al. |
| 2013/0151938 A1 | 6/2013 | Waldman et al. |
| 2013/0151942 A1 | 6/2013 | Ouliankine et al. |
| 2013/0179480 A1 | 7/2013 | Agarwal et al. |
| 2013/0179764 A1 | 7/2013 | Battagin et al. |
| 2013/0185252 A1 | 7/2013 | Palmucci |
| 2013/0198647 A1 | 8/2013 | Claux et al. |
| 2013/0198733 A1* | 8/2013 | Farrell ............... G06F 9/44526 717/173 |
| 2013/0218845 A1 | 8/2013 | Kleppner et al. |
| 2013/0232424 A1 | 9/2013 | Nakagoe et al. |
| 2013/0263156 A1 | 10/2013 | Nakagawa et al. |
| 2013/0290470 A1 | 10/2013 | Caradonna et al. |
| 2014/0033232 A1 | 1/2014 | Walter et al. |
| 2014/0075004 A1 | 3/2014 | Van Dusen et al. |
| 2014/0075301 A1 | 3/2014 | Mihara |
| 2014/0075408 A1 | 3/2014 | Korat |
| 2014/0082470 A1 | 3/2014 | Trebas et al. |
| 2014/0101122 A1 | 4/2014 | Oren |
| 2014/0109012 A1 | 4/2014 | Choudhary et al. |
| 2014/0207867 A1 | 7/2014 | Kotler et al. |
| 2014/0214399 A1 | 7/2014 | Gulwani et al. |
| 2014/0279876 A1 | 9/2014 | Prasanna et al. |
| 2014/0279920 A1 | 9/2014 | Madhavarapu et al. |
| 2014/0289601 A1 | 9/2014 | Wang et al. |
| 2014/0331124 A1 | 11/2014 | Downs et al. |
| 2015/0019946 A1 | 1/2015 | Zarras |
| 2015/0039387 A1 | 2/2015 | Akahoshi et al. |
| 2015/0081727 A1 | 3/2015 | Zarras |
| 2015/0113377 A1 | 4/2015 | Fu et al. |
| 2015/0120656 A1 | 4/2015 | Ramnarayanan et al. |
| 2015/0177919 A1 | 6/2015 | Lee et al. |
| 2015/0193492 A1 | 7/2015 | Gunaratne et al. |
| 2015/0193734 A1 | 7/2015 | Karve et al. |
| 2015/0199316 A1 | 7/2015 | Cairns et al. |
| 2015/0205770 A1 | 7/2015 | Shershevsky et al. |
| 2015/0227533 A1 | 8/2015 | Goldstein et al. |
| 2015/0269146 A1 | 9/2015 | Ayyar et al. |
| 2015/0278330 A1 | 10/2015 | Hawa et al. |
| 2015/0288747 A1 | 10/2015 | Olenick et al. |
| 2015/0324437 A1 | 11/2015 | Jiang et al. |
| 2015/0341212 A1 | 11/2015 | Hsiao et al. |
| 2015/0370911 A1 | 12/2015 | Hanawa et al. |
| 2015/0378742 A1 | 12/2015 | Harrington |
| 2016/0054898 A1 | 2/2016 | Kotler et al. |
| 2016/0055139 A1 | 2/2016 | Creason et al. |
| 2016/0063840 A1 | 3/2016 | Kumarasamy Mani et al. |
| 2016/0077694 A1 | 3/2016 | Christoph et al. |
| 2016/0092418 A1 | 3/2016 | Kraisler et al. |
| 2016/0092422 A1 | 3/2016 | Maglieri et al. |
| 2016/0147722 A1 | 5/2016 | Hariharan et al. |
| 2016/0148180 A1 | 5/2016 | Brown |
| 2016/0210181 A1 | 7/2016 | Kikuchi et al. |
| 2016/0246458 A1 | 8/2016 | Hart et al. |
| 2016/0320945 A1 | 11/2016 | Brunn et al. |
| 2016/0357787 A1 | 12/2016 | Kolata et al. |
| 2016/0378326 A1 | 12/2016 | Svinth et al. |
| 2016/0378734 A1 | 12/2016 | Mullins et al. |
| 2016/0381099 A1 | 12/2016 | Keslin et al. |
| 2017/0052931 A1 | 2/2017 | Yount et al. |
| 2017/0054736 A1 | 2/2017 | Krishnamurthy |
| 2017/0060945 A1 | 3/2017 | Bastide et al. |
| 2017/0061360 A1 | 3/2017 | Rucker et al. |
| 2017/0124055 A1 | 5/2017 | Radakovitz et al. |
| 2017/0124167 A1 | 5/2017 | Pasupathy et al. |
| 2017/0139893 A1 | 5/2017 | Rucker et al. |
| 2017/0139927 A1 | 5/2017 | Bendig et al. |
| 2017/0140047 A1 | 5/2017 | Bendig et al. |
| 2017/0168878 A1 | 6/2017 | Chandra et al. |
| 2017/0185574 A1 | 6/2017 | Fern et al. |
| 2017/0185592 A1 | 6/2017 | Frei et al. |
| 2017/0192945 A1 | 7/2017 | Fulton et al. |
| 2017/0199789 A1 | 7/2017 | Milvaney et al. |
| 2017/0220543 A1 | 8/2017 | Canton et al. |
| 2017/0220546 A1 | 8/2017 | Codrington et al. |
| 2017/0287090 A1 | 10/2017 | Hunn et al. |
| 2017/0300222 A1 | 10/2017 | Campbell et al. |
| 2017/0315683 A1 | 11/2017 | Boucher et al. |
| 2017/0315967 A1 | 11/2017 | Boucher et al. |
| 2017/0315968 A1 | 11/2017 | Boucher et al. |
| 2017/0315978 A1 | 11/2017 | Boucher et al. |
| 2017/0315979 A1* | 11/2017 | Boucher ............... G06F 40/18 |
| 2017/0337194 A1 | 11/2017 | Gilchrist et al. |
| 2017/0344227 A1 | 11/2017 | Stoicov et al. |
| 2017/0357646 A1 | 12/2017 | Ayyar et al. |
| 2017/0358051 A1 | 12/2017 | Heynen et al. |
| 2018/0025013 A1 | 1/2018 | Goldstein et al. |
| 2018/0025084 A1 | 1/2018 | Conlan et al. |
| 2018/0129642 A1 | 5/2018 | Rucker et al. |
| 2018/0144039 A1 | 5/2018 | Hawa et al. |
| 2018/0165254 A1 | 6/2018 | Talati |
| 2018/0174255 A1 | 6/2018 | Hunn et al. |
| 2018/0181552 A1 | 6/2018 | Konnola et al. |
| 2018/0191805 A1 | 7/2018 | Hurwitz et al. |
| 2018/0197162 A1 | 7/2018 | Brown |
| 2018/0232165 A1 | 8/2018 | Kusters et al. |
| 2018/0232308 A1 | 8/2018 | Kusters et al. |
| 2018/0260377 A1 | 9/2018 | Theodore et al. |
| 2018/0260378 A1 | 9/2018 | Theodore et al. |
| 2018/0276189 A1 | 9/2018 | Bache et al. |
| 2018/0276269 A1 | 9/2018 | Rasscevskis et al. |
| 2018/0288192 A1 | 10/2018 | Kent et al. |
| 2018/0321889 A1 | 11/2018 | Harris et al. |

(56) References Cited

U.S. PATENT DOCUMENTS

| | | |
|---|---|---|
| 2018/0349333 A1 | 12/2018 | Mei |
| 2018/0375788 A1 | 12/2018 | Ionita et al. |
| 2019/0102386 A1 | 4/2019 | Bell et al. |
| 2019/0188278 A1 | 6/2019 | Liszka et al. |
| 2019/0363929 A1* | 11/2019 | Andreoli ............... H04L 67/563 |
| 2019/0392006 A1 | 12/2019 | Horowitz et al. |
| 2020/0019414 A1 | 1/2020 | Byard et al. |
| 2020/0042143 A1 | 2/2020 | Boucher et al. |
| 2020/0073518 A1 | 3/2020 | Boucher et al. |
| 2020/0081586 A1 | 3/2020 | Boucher et al. |
| 2020/0228534 A1 | 7/2020 | Chen et al. |
| 2020/0250316 A1 | 8/2020 | Rickerd et al. |
| 2020/0334034 A1* | 10/2020 | Bestfleisch ......... G06F 9/44526 |
| 2021/0103437 A1 | 4/2021 | Kim et al. |
| 2021/0149656 A1* | 5/2021 | Tung .................... G06F 40/166 |
| 2021/0263658 A1 | 8/2021 | Kusters et al. |
| 2021/0286479 A1 | 9/2021 | Boucher et al. |
| 2021/0286481 A1 | 9/2021 | Boucher et al. |
| 2021/0294599 A1 | 9/2021 | Fitzpatrick |
| 2021/0311595 A1 | 10/2021 | Boucher et al. |
| 2021/0400093 A1* | 12/2021 | Ashkenazi ............. H04N 7/147 |
| 2022/0222625 A1 | 7/2022 | Haramati et al. |
| 2022/0247784 A1* | 8/2022 | Satish ................. H04L 63/0281 |
| 2022/0253404 A1 | 8/2022 | Wang et al. |
| 2022/0269805 A1 | 8/2022 | Moschella |
| 2022/0269851 A1 | 8/2022 | Deneui et al. |
| 2023/0297768 A1 | 9/2023 | Deneui et al. |
| 2023/0342003 A1 | 10/2023 | Boucher et al. |
| 2023/0342166 A1 | 10/2023 | Deneui et al. |
| 2024/0053865 A1 | 2/2024 | Boucher et al. |

OTHER PUBLICATIONS

"Getting Started with Excel 2010", Author/Publisher: University of Michigan Library Instructional Technology, Date: Aug. 3, 2011, Aug. 3, 2011, pp. 1-17.

"Overview of Excel Tables", Microsoft, https://support.office.com/en-us/article/overview-of-excel-tables-7ab0bb7d-3a9e-4b56-a3c9-6c94334e492c, accessed May 25, 2018, 6 pages.

"Structured References", Author/Publisher: Microsoft Excel, Date: 2010-2018, 2010-2018, pp. 1-4.

17790487.7, "European Application Serial No. 17790487.7, Extended European Search Report mailed Nov. 29, 2019", 11 pages.

Anonymous, "Excel 2010: Filtering Data", XP093044661, Retrieved from the Internet: URL:https://edu.gcfglobal.org/en/excel2010/filtering-data/1/[retrieved on May 5, 2023], Sep. 15, 2010, 10 pages.

Anonymous, "Minimize date entry errors by using a calendar drop down list", Retrieved from the Internet: URL: https://www.sageintelligence.com/tips-and-tricks/excel-tips-tricks/2013/10/minimize-date-entry-error-using-calendar-drop-list/ [retrieved on Nov. 20, 2019], Oct. 17, 2013, 6 pages.

Frandsen, Torben Lage, "Microsoft Office Excel", Author: Torben Lage Frandsen, Date: 2010, http://web.mef.hr/web/images/pdf/ms_o_exc.pdf. (Year: 2010), 2010, pp. 1-135.

Fuller, David A., et al., "The design of an object-oriented collaborative spreadsheet with version control and history management", SAC '93: Proceedings of the 1993 ACM/SIGAPP symposium on Applied computing: states of the art and practice, 1993, pp. 416-423.

Microsoft Support, "Set rounding precision", https://support.microsoft.com/en-us/office/Set-rounding-precision-e5d707e3-07a8-4df2-810c-218c531eb06a, 2021, 3 pages.

Oppenheimer, Diego, "Microsoft Support Understanding Floating Point Precision, aka "Why does Excel Give Me Seemingly Wrong Answers?"", https://www.microsoft.com/en-us/microsoft-365/blog/2008/04/10/ understanding-floating-point-precision-aka-why-does-excel-give-me seemingly-wrong-answers/, 2021, 7 pages.

O'Reilly, Dennis, "Your options for placing Excel data in Word", XP055834888, Retrieved from the Internet: URL: https://www.cnet.com/tech/services-and-software/your-optionsfor-placing-excel-data-in-word/ [retrieved on Aug. 25, 2021], Feb. 14, 2008, 7 pages.

PCT/US2017/029983, "Application Serial No. PCT/US2017/029983, International Search Report and the Written Opinion mailed Sep. 6, 2017", 17 pages.

PCT/US2017/029983, "International Application Serial No. PCT/US2017/029983, International Preliminary Report on Patentability and Written Opinion mailed Nov. 8, 2018", Coda Project, Inc., 10 Pages.

PCT/US2022/017576, "International Application Serial No. PCT/US2022/017576, International Preliminary Report on Patentability mailed Sep. 7, 2023", Coda Project, Inc., 13 pages.

PCT/US2022/017576, "International Application Serial No. PCT/US2022/017576, International Search Report and Written Opinion mailed Aug. 2, 2022", Coda Project, Inc., 20 pages.

PCT/US2022/017576, "International Application Serial No. PCT/US2022/017576, Invitation to Pay Additional Fees and, Where Applicable, Protest Fee mailed Jun. 3, 2022", Coda Project, Inc., 2 pages.

videostudio.com, et al., "User Guide, Basic Editing, Extension Marketplace, Version control", https://web.archive.org/web/20200902093330/https://code.visualstudio.com/docs/editor, extracted Dec. 1, 2023, Sep. 2, 2020, 41 pages.

www.keepproductive.com, et al., "Coda in 45 minutes", https://www.youtube.com/watch?v=1ysOKRKnqkE, Aug. 13, 2019, 19 pages.

Wyatt, Allen, "Modifying Default Year for Dates", Retrieved from the Internet: URL:https://web.archive.org/web/20151217124547/https://excel.tips.net/T003360_Modifying_Default_Year_for_Dates.html [retrieved on Nov. 20, 2019], May 26, 2015, 5 pages.

Wyatt, Allen, "Setting a Default Date Format", Retrieved from the Internet: URL:https://excelribbon.tips.net/T011575_Setting_a_Default_Date_Format.html [retrieved on Nov. 20, 2019], Oct. 24, 2015, 4 pages.

* cited by examiner

Example pre-render command considerations — 2902

- Doclet location of interest (main page, user focus location)
- Linked location with the doclet (external link, other document links within UDS ecosphere, links determined according to observed linking access)
- Search return value (portion of the doclet responsive to an executed search)
- Target display description(s)
- Usage history of doclet (e.g., frequently accessed locations or calculations, number of users accessing doclet)
- Deep links (e.g., links commonly accessed, and/or links closely associated with or visible from other doclet locations of interest)
- User base value (number of subscribed users, number and/or distribution of target display descriptions and/or user access configurations within user base)

FIG. 29

| Shard Strategy Descriptions 3502 | | |
|---|---|---|
| Shard Description A | Shards in Group | Shard Delivery Scheme | Strategy Implementation Criteria |
| Shard Description B | Shards in Group | Shard Delivery Scheme | Strategy Implementation Criteria |
| Shard Description C | Shards in Group | Shard Delivery Scheme | Strategy Implementation Criteria |
| Shard Description D | Shards in Group | Shard Delivery Scheme | Strategy Implementation Criteria |

| Name | Home | Color | UserID | Access Time | Submit Time | Error Log | IP Address |
|---|---|---|---|---|---|---|---|
| | | | | | | | |
| | | | | | | | |
| | | | | | | | |
| | | | | | | | |

| ID | Price | Location | Contact | Model Year | Projected Purchase Date | Net Present Value |
|---|---|---|---|---|---|---|
| | ▨ | | | | | |
| | | | | | | |
| | | | | | | |
| | | | | | | |

FIG. 40

| ID | Price | Location | Contact | Model Year | Projected Purchase Date | Net Present Value |
|----|-------|----------|---------|------------|-------------------------|-------------------|
| | ////// | | | | ////////////////// 4104 | |
| | ////// | | | | ////////////////// | |
| | ////// | | | | ////////////////// | |
| | ////// | | | | ////////////////// | |

Purchase Return Projections

| ID | Price | Location | Contact | Model Year | Projected Purchase Date | Net Present Value |
|---|---|---|---|---|---|---|
|  |  |  |  |  |  |  |
|  |  |  |  |  |  |  |
|  |  |  |  |  |  |  |
|  |  |  |  |  |  |  |

▷ FIG. 43

△ Purchase Return Projections (7 cols., 131 rows, SUM = $1.35 MM)

FIG. 44

SYSTEM, METHOD, AND APPARATUS FOR A UNIFIED DOCUMENT SURFACE

CLAIM TO PRIORITY

This application is a continuation of U.S. patent application Ser. No. 17/679,006, filed on Feb. 23, 2022, now published on Aug. 25, 2022 as US 2022/0269851 A1, and entitled "SYSTEM, METHOD, AND APPARATUS FOR PUBLICATION AND EXTERNAL INTERFACING FOR A UNIFIED DOCUMENT SURFACE".

U.S. patent application Ser. No. 17/679,006 claims the benefit of and priority to U.S. Provisional Patent Application No. 63/152,541, filed on Feb. 23, 2021, entitled "SYSTEM, METHOD, AND APPARATUS FOR PUBLICATION AND EXTERNAL INTERFACING FOR A UNIFIED DOCUMENT SURFACE"; U.S. Provisional Patent application No. 63/230,398, filed on Aug. 6, 2021, entitled "SNAPSHOT SHARDING"; and U.S. Provisional Patent application No. 63/225,835, filed on Jul. 26, 2021, entitled "UNIFIED DOCUMENT SURFACE PACKS".

Each of the foregoing patent applications is incorporated herein by reference in the entirety for all purposes.

BACKGROUND

Previously known systems for document creation and collaboration of documents suffer from a number of drawbacks. For example, users of previously known systems have difficulty sharing and finding useful documents created by other users in a secure environment. In another example, previously known systems have limited extension capability, and/or extension capability that requires users to be experts in extension tools, and where shared documents having extensions introduce risks that are difficult to resolve, and result in many users and organizations that simply block or do not utilize extensions to the main document creation system. In another example, previously known systems require users to install significant applications to operate the document creation system, and further create multiple copies of large files on individual devices, or cause users to experience significant delays to access and edit large documents, resulting in difficulty implementing a collaborative workflow. Additionally, dedicated applications for many previously known systems require different versions for different client device types, resulting in conflicting document issues such as formatting, and requiring maintenance of a large number of applications and versions of those applications for administrators of entities having a large user base. In another example, previously known systems operate a number of document creation applications, each tailored to specific types of content, with mixed content documents requiring sophisticated interfacing protocols to get the mixed content to function, and limited capability for certain types of content within a given document creation application.

SUMMARY

Embodiments herein include systems and methods to provide for operation of a document creation, sharing, and collaboration system that can function across a large number of client device types, seamlessly for different device types, and with capability tailored for particular devices. Embodiments herein support convenient sharing of documents to selected users. Embodiments herein support creation of powerful extensions for the document creation system that are accessible to users having a moderate level of expertise in coding and computing environments. Embodiments herein support convenient sharing of extensions to selected users. Embodiments herein support the creation and utilization of extensions in a protected environment, making extensions convenient to create and utilize with low risk to the user systems. Embodiments herein support convenient discovery of useful documents and extensions, and provide a convenient platform for resource exchange to support creators of useful documents and extensions.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 29 is a schematic diagram of an example of certain considerations for determining a pre-render command.

FIG. 35 is a schematic depiction of example shard strategy descriptions.

FIG. 36 is a schematic depiction of example aspects of a form.

FIG. 37 is a schematic depiction of example aspects of a table.

FIG. 40 is a schematic depiction of an example table having a canvas.

FIG. 41 is a schematic depiction of an example canvas embedded in a table.

FIG. 43 is a schematic depiction of an example document with a collapse interface.

FIG. 44 is a schematic depiction of aspects of an example collapse interface.

DETAILED DESCRIPTION

Figure 30:
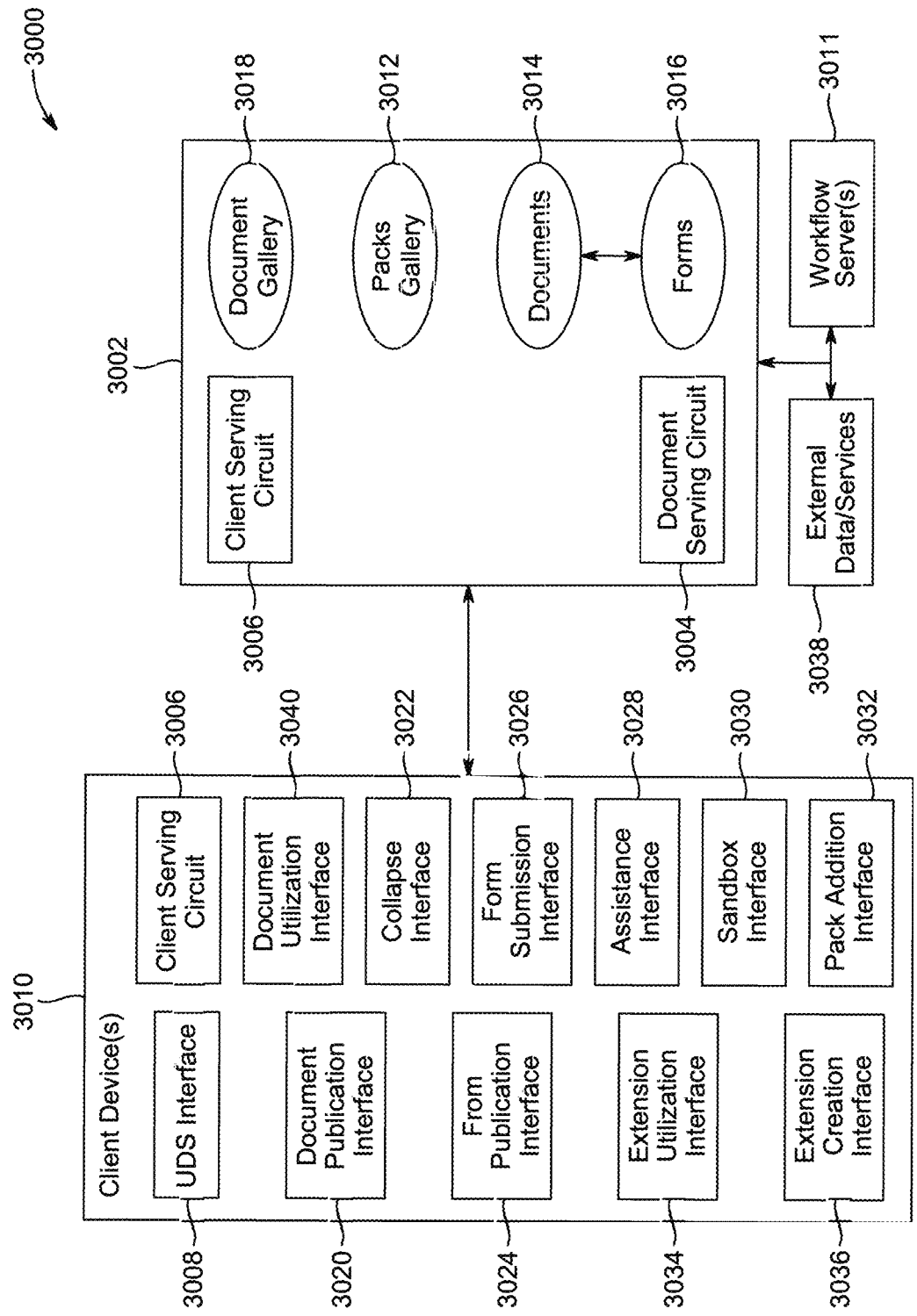
FIG. 30 is a schematic diagram of an example unified document surface platform.

Referencing FIG. 30, an example UDS platform 3000 is schematically depicted. The example UDS platform 3000 is configured to, without limitation, allow users to: prepare documents 3014 that each comprise a unified document surface (UDS); collaborate on documents; publish documents to a selected scope (e.g., a document gallery 3018 of the UDS platform 3000, fully public publication such as a URL that is exposed to search engines or other internet navigation services, publish to a workspace, publish to selected users, etc.); provide scheduled access to published documents in whole or part, and according to numerous criteria; create capable extensions to the UDS interface 3008, including extensions with arbitrary coding capability with managed risks to keep users, client devices, and the UDS platform 3000 secure; publish extensions to a selected scope (e.g., a packs gallery 3012 of the UDS platform 3000); and/or create forms 3016 to solicit data entry from anyone, whether a user of the UDS platform 3000 or otherwise, and to integrate submitted data into a document. The example of FIG. 30 is a non-limiting and schematic depiction, showing an example arrangement of components of the UDS platform 3000, and client devices 3010 accessing the UDS platform 3000.

The example UDS platform 3000 includes a document serving circuit 3004 that coordinates data flows between the client device(s) 3010 and stored document data 3014, and coordinates support for calculations related to the UDS platform 3000. Example calculations related to the UDS platform 3000 include calculations to execute formulas and/or code (e.g., embodied in packs or otherwise) within documents 3014, operate authorization interfaces (e.g., logins to the UDS platform 3000, access to external data and/or services, and/or access for users to published documents, packs, etc.), to maintain documents in a collaborative environment (e.g., developing dependency graphs and/or invalidation graphs, to perform conflict resolution, to generate snapshots and/or implement sharding strategies, to expose API interfaces to the UDS platform 3000, to exercise API interfaces with external services and/or external data providers, etc.), and/or to determine which sharding strategies should be supported and/or utilized, etc. In the example of FIG. 30, the document serving circuit 3004 may outsource calculations to one or more workflow servers 3008, which may be affiliated with the UDS platform 3000 and/or external (e.g., utilizing a third party computing resource, such as Amazon Web Services, Microsoft Azure, etc.), and which may include the utilization of virtual machines and/or on demand allocated computing resources (e.g., a "serverless computing" implementation). In certain embodiments, the utilization of workflow servers 3008 allows for execution of arbitrary code, published documents having external data and/or external service access, and the like, to be performed while minimizing the risk of malicious code damaging a client device and/or the UDS platform 3000, accidental exposure of unintended data (e.g., by being provided within source code and/or cached memory that might be accessible to a sophisticated user where code execution, external data access, and/or API interactions are performed from the client device).

The example UDS platform 3000 includes a client serving circuit 3006 that implements communications between the UDS platform 3000 and client device(s) 3010, and may be distributed between the UDS platform 3000 and the client device 3010, or positioned on one or the other. In certain embodiments, the user interacts with the UDS platform 3000 using a client device 3010 of any type, primarily interacting with a UDS interface 3008 that provides menus, document rendering, formula entry, publication, and any other functionality as set forth throughout the present disclosure. In certain embodiments, the UDS interface 3008, and/or any other interfaces implemented on the client device 3010, may be implemented as a dedicated application (e.g., an application installed on the client device), as a web portal, and/or as an in-browser application (e.g., utilizing JavaScript or another implementing programming language). In certain embodiments, the UDS interface 3008, and/or other interfaces, may be installed as a part of interactions to access the UDS platform 3000, and/or may additionally or alternatively be installed on a more persistent basis, stored in a cache of the client device 3010, or the like. In certain embodiments, the interfaces may be provided as a shard upon accessing the UDS platform 3000, in a manner similar to document shards and other shards described throughout the present disclosure. In certain embodiments, certain interfaces may be provided in separate shards, which may be delivered to the client device 3010 upon initial access, during low usage periods while the user is interacting with one or more interfaces, and/or as needed (e.g., loading an extension utilization interface 3034 in response to the user accessing a pack creation interface within the UDS interface 3008).

The example client device 3010 depicts three primary types of interfaces positioned thereon, which are divided into three types for clarity of the present description, but the types of interfaces are not limiting. Additionally or alternatively, the interfaces depicted are depicted individually for clarity of the description, but the interfaces may be combined in whole or part. For example, the document publication interface 3020 may be contained within the UDS interface 3008. The example client device 3010 depicts document related interfaces, such as the UDS interface 3008 implementing primary document access and control, a document utilization interface 3040 allowing users to access and utilize published documents, a document publication interface 3020 allowing users to publish documents, and a collapse interface 3022 that allows the user to controllably collapse document elements such as a table, a canvas, a section, or the like, and/or to control collapsing operations for other users of a document. The example client device 3010 depicts form related interfaces, such as a form publication interface 3024 allowing users to create and publish forms that accept data from other users, including users that do not utilize the UDS platform 3000, and a form submission interface 3026 allowing users to access forms and submit data using the form, where the data can be stored into a selected document (e.g., as a row of a table of a document). The form submission interface 3026, in certain embodiments, may be provided independently of other interfaces on the client device 3010, for example allowing form submissions by users that do not access and/or are not familiar with (or possibly even aware of) the UDS platform 3000. The example client device 3010 depicts extension (or pack) related interfaces, such as an extension utilization interface 3034 allowing users to incorporate and/or utilize packs within their own documents; an extension creation interface 3036 allowing users to create sophisticated extensions that do not require extensive coding capability, but that support full coding capability in selected languages and/or within any language (depending upon the configuration of the UDS platform 3000); a pack addition interface 3032 allowing users to browse a pack gallery 3012 to find packs that implement desired functionality and/or access selected resources; an assistance interface 3028 that guides users in creating extensions; and/or a sandbox interface 3030 that allows users to test extension aspects, formulas, authorization operations related to a pack, code elements, and/or utilization of external data and/or external services.

The arrangement depicted in FIG. 30 is a non-limiting arrangement illustrating certain aspects of the present disclosure. Any systems, apparatuses, components, devices, circuits, controllers, assemblies, or other elements of the present disclosure may be utilized with all or a portion of the UDS platform 3000 and/or client device 3010, and/or elements of the UDS platform 3000 and/or client device 3010 may be included with, in whole or part, any such systems, apparatuses, components, devices, circuits, assemblies, or other elements of the present disclosure.

The example UDS platform 3000 is scalable, and can function with multiple users (e.g., dozens, hundreds, thousands, and/or millions of users), including users simultaneously working with documents, and/or performing any other operations on the UDS platform 3000. Without limitation to any other aspect of the present disclosure, aspects of the present disclosure may be implemented by any systems, apparatuses, components, devices, circuits, assemblies, procedures, methods, or other elements as set forth in U.S. Pat. No. 10,466,867, entitled "FORMULAS", filed on 27 Apr. 2017, which issued on 5 Nov. 2019, and which is incorporated herein by reference in the entirety for all purposes.

A unified document surface (UDS), as used herein, should be understood broadly. In certain embodiments, a UDS is a rendering of a document, doclet, and/or portion of a document on a UDS interface, for example as the document is visible to a user of the UDS platform. A UDS includes a capable document surface where a user can seamlessly include tables, figures, pictures, text flows, etc., where each element is fully capable to engage a formula engine and document model as supplied by the UDS platform. The UDS eliminates the need for distinct file types and/or interfacing between different document applications that are utilized by previously known document creation and editing applications. As used herein, a UDS may be a synonym with the underlying document in certain contexts, and/or the UDS may be the surface where a user creates, edits, views, or performs other operations in relation to a document.

A UDS interface, as used herein, should be understood broadly. The UDS interface is the view of the user to the underlying application for creating a UDS, a document, a pack, an extension, or the like. In certain embodiments, other interfaces utilized herein (e.g., reference FIG. 30) may be provided on the UDS interface—for example through menu selections, command lines from formulas that call up other interfaces, or the like. In certain embodiments, one or more other interfaces are provided separately from the UDS interface, for example a sandbox interface and/or an assistance interface for pack and/or extension creation and publication.

A document, as used herein, should be understood broadly. An example document is a corpus of information embodied as a snapshot, a snapshot plus an operation log, and/or among a group of shards. In certain embodiments, the entire corpus of the snapshot, shards, and/or operation log forms the document. In certain embodiments, one or more of these forms the document, and other ones of these are supporting information that may be redundant, where the document does not include the redundant information, and/or where the document is, in a certain sense, "overspecified" by the entire corpus of information, but all of the information is considered to be a part of the document. In certain examples and descriptions set forth herein, a "document" is referenced as accessed by a user, shared with other users, or the like, which may be only a view of the document or portions thereof as provided by the UDS interface, but referenced as a document for clarity of the present description. The set of information that physically embodies the "document", and the notional logic of which informational aspects are the "document" and/or where the document exists, depends upon the context and conventions of the particular system, which will be understood by one of skill in the art having the benefit of the present disclosure. For example, the set of information that physically embodies the document, and/or the notional logic of where the document exists, may depend upon which elements of the total sum of information are considered to be primary information. Further, when multiple users are editing a document at the same time, multiple operation logs for the document may be created, for example with an operation log for each user. Those operation logs may be considered to provisionally form a part of the document, for example all or a portion of these operation logs may be rejected during de-confliction operations. In certain embodiments, a user may work with a document locally (e.g., where the user does not have connectivity to the UDS platform), where the document exists in a canon version on the server, and in a provisional local version for that user. Upon reconnection to the UDS platform, the local operation log of that user may be incorporated into the document (e.g., by recording on the server side operation log, and/or capturing in a snapshot operation). For some purposes, the local version of the document may be considered to be the "document", and for other purposes (e.g., if those local changes are never sent to the server, and/or end up being rejected by the server), the local version of the document may be considered to have never been a part of the document. For example, if a snapshot is determined to be inconsistent with a shard—then if disambiguation or conflict resolution operations, for example by the document serving circuit, utilize the snapshot to determine the actual document content, then the snapshot could be considered to be the "document" for that embodiment. By contrast, if disambiguation or conflict resolution operations utilize the shard(s) to determine the actual document content, then the shard(s) could be considered to be the "document" for that embodiment. In certain descriptions, "document" is utilized to reference content that a user would casually consider to be the document, which may be a view of the document as provided on the UDS interface, and which may not include all available content based upon the permissions of that user, preferences of that user, display options of that user, and the like. In certain embodiments, "document data" is referenced herein, where the document data may be considered to be the document for certain purposes. These variations in the usage of document, document data, shard documents, and the like, are utilized for clarity of the present description, which deals with a complex utilization environment where documents are provided in different views to multiple users having multiple purposes and permission schemes, across multiple devices, and which can be changing rapidly due to publication events, collaborative editing by many users, and the like.

A circuit, as used herein, should be understood broadly. In certain embodiments, components having terminology such as a controller, a processor, or the like may be utilized instead of, and/or in conjunction with, a circuit, and accordingly those terms should be understood broadly with similar considerations to those presented with regard to circuits. Circuits, as used herein, include correlated aspects of the system configured to perform selected operations thereof, and can include logic gates, programmable logic circuits, interface devices (e.g., network communication devices and/or connecting hardware), I/O devices (e.g., user input devices such as a mouse, keyboard, touch screen, voice input, displays, etc.), any sensor utilized by the system, any actuator utilized by the system, processors or processing resources, computer readable memory, data stored in computer readable memory, or the like. In certain embodiments, aspects of a circuit may be embodied as instructions stored on a computer readable memory configured such that a processor executing the instructions thereby performs one or more operations of the circuit. In certain embodiments, as will be understood in the context of particular descriptions herein, a circuit includes any one or more of these, and/or is in communication with any one or more of these. The present disclosure depicts each controller, circuit, memory element, data structure, or the like, as a single device for clarity of the present description. A given controller, circuit, memory element, data structure, or the like, may additionally or alternatively be distributed, in whole or part. For example, the client serving circuit 2208 may be present, in whole or part, on any one or more of the controller 2238, a client device 2224, a workflow server 3011 (e.g., reference FIG. 30). In certain embodiments, the client serving circuit 2208 may have a distinct location at different times (e.g., operations with a first client device where the client serving circuit is partially positioned on the first client device during UDS interface operations by the first client device, and operations with a second client device where the client serving circuit is not included in any part on the second client device during UDS interface operations by the second client device—for example where the first client device has greater memory resources than the second client device, where the second client device has greater connectivity resources than the first client device, and/or where the document serving circuit 2206 determines that at least partial inclusion of the client serving circuit on the first client device will improve the first user experience). In another example, the controller 2238 may have elements (e.g., circuits, stored data, etc.) distributed across a number of servers, for example with supporting servers, workflow servers, or the like, performing at least some operations performed by the controller 2238. In certain embodiments, the distribution of a given controller, circuit, or other functional device may be changed at different times or different operating conditions, for example where a substantial calculation performed by the document sharding circuit is offloaded to a workflow server, where calculations supporting the document are sent to a workflow server and/or virtual machine, or the like. The utilization of circuit language emphasizes the coordination of aspects of the circuit to perform described functions.

Certain descriptions herein include an administrator, a document administrator, a caretaker for a UDS platform, or similar terms. The term administrator, as used herein, should be understood broadly. An administrator is any entity having a specified role with respect to the document, the document server, the client device, and/or an organization associated with the document. Non-limiting examples of an administrator include a specified person, a specific login or login type, a person having a specified role (in association to the document server; a client device; a computer system associated with the document server, document, and/or client device; the document; a project associated with the document; and/or a workflow associated with the document), and/or an entity with any of the preceding characteristics. In certain embodiments, an administrator is a person creating the document, creating a new version of an existing document, a person in a position of authority, and/or a person specified to have the administrator role for a given project, period of time, project deliverable, or the like. In certain embodiments, a user may be an administrator for certain operations, document sections, or the like, and not an administrator for other operations, document sections, or the like. In certain embodiments, and administrator is a "super-user." The described examples of an administrator are non-limiting examples, and any operations or criteria to determine an administrator are contemplated herein.

Certain operations herein are described as being based upon and/or in response to a context, a contextual determination, a contextual indication, and/or determined or interpreted contextually. All of these and similar terms ("context parameters" in the present paragraph) should be understood broadly. Context parameters include, without limitation, a user, a user title, a user role, a user location, user permissions for the document, a time of day, an editing time for the user (e.g. time accessing the document, and/or time actively interacting with the document), whether the user created the document, whether the user is an administrator, the current operations being performed by the user (e.g. providing input, selecting a value, responding to a prompt, dragging a selected object, inserting an object, deleting an object, etc.), the time of day, a calendar date, relations of any of these to outside parameters (e.g. an end-of-month, end-of-year, outside of normal business hours, a change in regulatory jurisdiction due to location, or other determination), a data type being accessed by the user, an object type being accessed by the user, a time since the document has been synchronized or updated, a client device capability (e.g. memory, processor power, operating system, communication bandwidth, and/or currently available resources for any of these), an output type (e.g. screen size, color capability, printer type, available storage, and/or web page availability and configuration), a data source for one or more aspects of the document or document portion currently accessed by the user (e.g. size, age, and/or availability of linked or referenced data), a number and/or characteristics of users currently accessing the document, parameters from the document defined at creation or updated, rules for the document, default parameters for the document, a location within the document being accessed by the user, a total size of the document, a size of the document portion accessed by the user, and/or rules associated with the document (e.g. selected by the user and/or an administrator). As will be understood to one of skill in the art having the benefit of the disclosures herein, certain ones of the illustrative context parameters may be utilized for certain operations, and certain ones of the illustrative context parameters may not be applicable for certain operations. The illustrative context parameters are non-limiting, and further do not limit any descriptions herein utilizing context parameters.

A document view as described herein should be understood broadly. An example document view may be a portion of the document being accessed by the user. In certain embodiments, a document view includes information derived from, calculated from, and/or processed for viewing by the user, and accordingly a document view in certain embodiments is based upon, but is not a part of the document and/or the data element. A data element as described herein, when referencing a portion of the document (for example, a portion of the document communicated from a document server to a client computing device), should be understood broadly. A data element may be information derived from the document, a portion of the document, and/or all of the document. A data element may include data aspects that are not a part of the document, but that are associated with, linked by, and/or referenced by the document. For example, a data element may include aspects of source data that is not present within the document, but is passed from the document server to the client computing device.

An example system is described for implementing an extension capability for a unified document surface operating system. Any one or more aspects of the example system may be utilized with, provided as a part of, and/or incorporated with any systems, operations, and/or procedures herein. Additionally or alternatively, aspects of other systems set forth herein may perform one or more operations of a system for implementing an extension capability, for example with a document server 106 performing one or more operations of a document serving circuit, or other circuits, controllers, processors, or the like as set forth herein.

Figure 1:
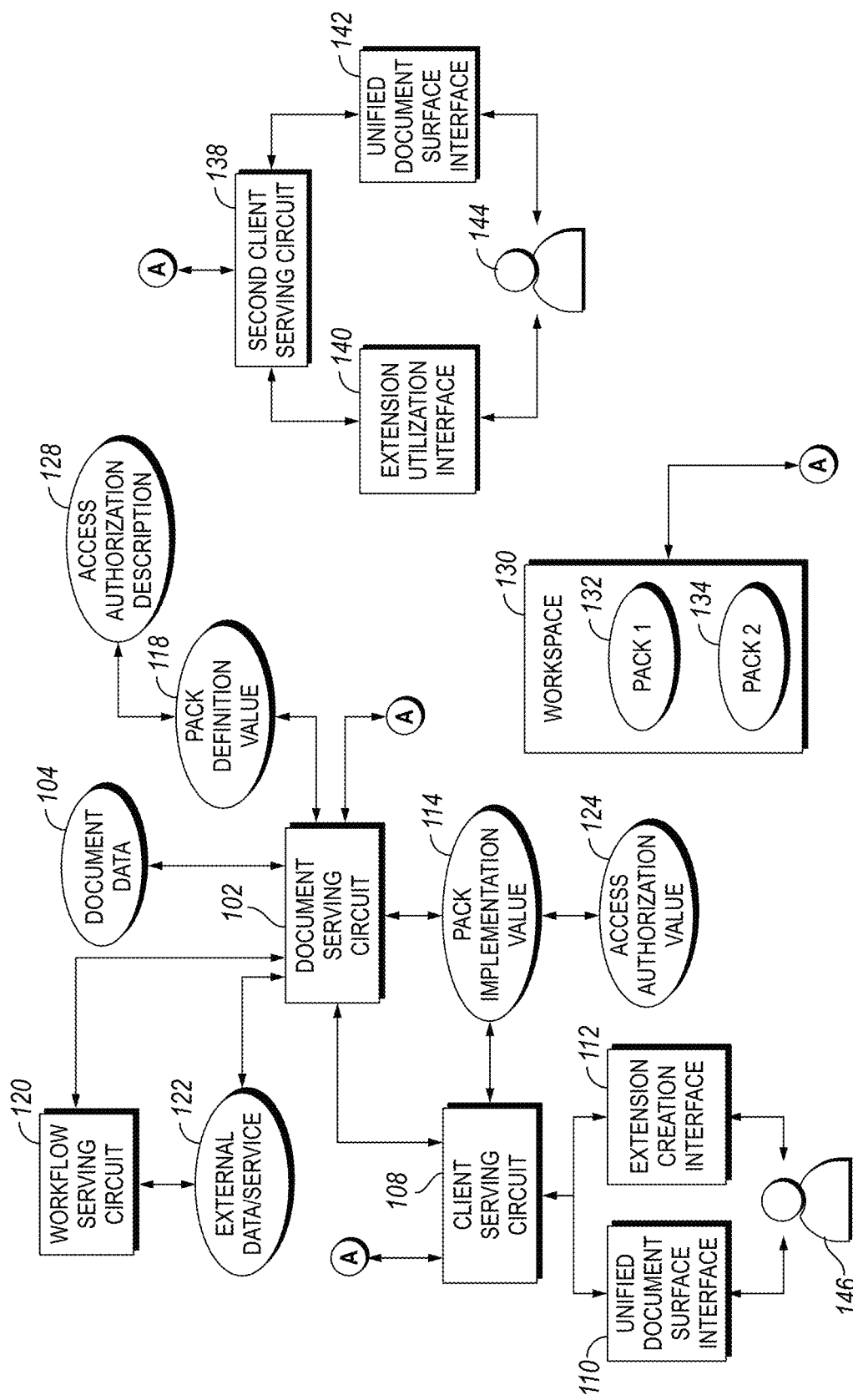
FIG. 1 is a schematic depiction of a system for implementing an extension capability for a unified document surface operating system.

Referencing FIG. 1, an example system includes a document serving circuit 102 that accesses a document data 104. The example document data 104 includes data for a unified document surface, and the document serving circuit 102 provides at least a portion of the document data 104 to a client serving circuit 108. An example client serving circuit 108 implements a unified document surface interface 110 in response to the portion of the document data 104. For example, the document data 104 may be data utilized to create a document (e.g., tables, text flows, graphs, visualizations, formulas, etc.), where the unified document surface interface 110 provides a user 146 with a view of the unified document surface according to the context of the user 146 (e.g., permissions, portions of the document being accessed, preferences selected by the user, aspects defined by an administrator, etc.). The example client serving circuit 108 further implements an extension creation interface 112, and provides a pack implementation value 114 to the document serving circuit 102 in response to user interactions with the extension creation interface 112. An example extension creation interface 112 includes a dedicated interface allowing for a user to rapidly and conveniently produce an extension, for example using a software development kit (SDK), providing for menus, text entry, and other interface elements to utilize code, formulas, text entry, and/or any other aspect of a unified document surface as set forth herein. In certain embodiments, the pack implementation value 114 is converted into a pack definition value 118, by the document serving circuit 102 (and/or by a workflow serving circuit 120, for example as instructed by the document serving circuit 102). The pack definition value 118 provides the resulting aspects to be implemented by a unified document surface (e.g., a document) utilizing the extension created by the user 146. In certain embodiments, the pack definition value 118 may be the same as the pack implementation value 114, for example where elements of the extension may be utilized in a later document without any changes (e.g., a pack or extension including dedicated text, an inline formula operating using a formula engine native to the unified document surface environment, or the like). In certain embodiments, the pack definition value 118 may be determined from the pack implementation value 114, for example including code elements, data, formulas, or the like, that implement the aspects set forth in the pack implementation value 114. In certain embodiments, the pack definition value 118 includes referential information, relative information, automated code (e.g., efficient equivalent code), look-up data, external data, or the like, including references and/or pointers to these that may be stored elsewhere in the system (e.g., in the cloud, accessible to the document serving circuit, stored on the document serving circuit, stored and/or accessible using an external data source and/or external service, or the like).

An example system further includes the pack implementation value 114 including an access authorization value 124, where the pack definition value 118 includes an access authorization description 128. In certain embodiments, the access authorization value 124 includes authorization information to be utilized to implement the extension (or pack 132, 134). For example, the access authorization value 124 may include a username and/or password, for example to access external data 122, an external service 122, or to access protected elements of a document. In certain embodiments, depending upon the data or service utilized, according to selections from the author user, and/or according to permissions of the author user, an author user may implement an extension that allows other customer users 144 (e.g., interacting with a second client serving circuit 138) to utilize the authorization provided by the author user 146. For example, depending upon the permissions, subscription rules, or the like, of an external data or service 122 to be utilized, the author user creating the extension may allow other uses utilizing the extension (e.g., "customer users") to utilize the authorization of the author user, allowing the customer user to utilize the data or service without entering or having separate authorization information. In certain embodiments, the access authorization value 124 may include identifying information for the external data or service 122, with the customer user having a separate authorization. For example, an external data element may be included in the extension, where customer users 144 would need separate login information to access those portions of the extension. In certain embodiments, the access authorization value 124 may include authorization information, allowing incorporation of the data and/or service 122 into the extension, without further authorization utilized during utilization of the extension or pack—for example where flat data, unlinked data, data at a fixed point in time, and/or periodically updated data, is included with the extension, and where utilization of the extension does not require additional access to the external data 122 or service 122 initially providing the data, at the time of utilizing an extension within a subsequent document. The access authorization description 128 includes the implementing information, including what authorization information is required from customer users, how often data and/or services are required to be updated, how often authorization information is to be updated, and/or other authorization criteria such as temporary and/or introductory access criteria, authorization requirements (e.g., password criteria, two-factor authentication requirements, etc.). In certain embodiments, the access authorization value 124 and the access authorization description 128 may contain the same elements, or may contain distinct elements.

An example document serving circuit 102 further exposes a pack 132, 134, for example as constructed from the pack implementation value 114, access authorization description 128, and/or any other data, links, references, formatting, incorporated data, etc. An example operation to expose a pack includes publishing the pack to a selected workspace 130—for example a work group of defined users, within a defined category (e.g., productivity, accounting, legal, document authoring assistance, calendar management, etc.). In certain embodiments, publication of the pack 132, 134 is provided to all users (e.g., all users having access to the unified document surface environment). In certain embodiments, publication of the pack 132, 134 is organized among a number of packs in a gallery or similar implementation, for example to highlight groups of similar packs, packs from selected authors, packs that are popular among customer users, packs listed according to selected categories, or the like. In certain embodiments, publication of a pack includes differential implementation of pack visibility vs. usability (e.g., showing only packs that can be used by a customer user, showing packs that are available but may require a subscription for the pack, installation of additional supporting features, subscription to external data and/or services, etc.).

A pack, an extension, or similar terminology, as utilized herein, should be understood broadly, and includes a functional element created by an author user, and available for incorporation into subsequent documents, such as documents created using a unified document surface environment. Without limitation to any other aspect of the present disclosure, a pack may include any one or more of flat text flows (e.g., configured text that appears with the pack as entered by the author user); referential text flows (e.g., configured text that appears using contextual information such as a username, current data, path locations, etc.); formulas (e.g., inline formulas native to the unified document surface environment); executable code (e.g., code implemented in any language, such as JavaScript, Python, C++, etc.); tables (e.g., configured and/or formatted tables, and/or criteria to configure selected tables, which configuration may be determined according to aspects of a document using the pack; aspects of a customer user such as permissions, roles, etc.; according to data brought in with the table and/or entered into the table, etc.); action values (e.g., sending of messages, making calendar entries, providing notifications, interacting with a $3^{rd}$ party service, etc.); formatting operations (e.g., setting conditional formatting for the document or portions thereof; and/or determining formatting relative to best practices and/or defined norms such as entered by the author user and/or provided by a $3^{rd}$ party service, etc.). Example and non-limiting formulas include one or more of a unified document surface interface formula; a code based formula; a third party formula; or a column formula. Without limitation to any other aspect of the present disclosure, a pack may be utilized to: implement a document template; provide for a library of useful functions (e.g., math operations, accounting operations, workflow operations such as time entry, data access, project updates, industry-specific calculations and/or operations, etc.); execute complex algorithms or code; access and/or update external data; access and/or integrate external service(s); ensure that selected language is included and/or properly provided in a document (e.g., implementing terms of service, disclaimers, legal language, human resources language, etc.); and/or ensure consistency of appearance of selected elements (e.g., tables, reports, visualizations, etc.). In certain embodiments, a pack may be incorporated into a specific document, for example where a customer user implements the pack for utilization in a second document. In certain embodiments, a pack may be incorporated into a unified document surface interface—for example where a customer user implements a pack to be available within the native unified document surface environment (e.g., creating an enhanced environment for all documents of the customer user, similar to an add-on or extension for the entire document creation and/or editing environment for the customer user). Descriptions herein reference incorporation of a pack into a second document for clarity of the describing embodiments herein, but all embodiments, descriptions, and operations herein should be understood to contemplate incorporation of a pack into a document and/or into a unified document surface interface.

An example system includes a second client serving circuit 138 that accesses the pack 132, 134 (e.g., through interaction of the customer user with the extension utilization interface 140, for example selecting the pack from a selected workspace 130 or other organizing construct for packs available to the customer user), and incorporates at least a portion of the pack 132, 134 into a second document in response to customer user interactions with the extension utilization interface 140. In certain embodiments, the second user 144 accesses the second document utilizing a second UDS interface 142. An example pack 132, 134 may include a number of features that can be selected—for example selection of certain tables, formulas, code elements, data elements, or the like from a menu of options available with the pack and exposed to the customer user via the extension utilization interface. In certain embodiments, incorporation of the pack 132, 134 may include exposing formula libraries, available data, or the like, to the customer user, without direct appearance of pack elements in the document. For example, a pack including a formula library (e.g., selected math functions) may be incorporated in a document by providing the extended formula set (e.g., the formulas available in the formula library) to be available to the customer user. In the example, the pack is incorporated into the document, even if the document content has not changed due to incorporation of the pack (e.g., before the customer user includes a formula from the extended formula set into the document body).

An example system includes the document serving circuit 102 isolating the access authorization description 128, or portions thereof, from the second client serving circuit 138. For example, authorization information may be required for a pack to access a particular element of the pack, such as external data 122, an external service 122, and/or to confirm that the author user has proper permissions to implement aspects of the pack. In certain embodiments, the document serving circuit 102 accesses the particular element of the pack utilizing the access authorization description 128, and inserts the resulting information into the document (and/or into the pack menu, and/or into any other element of the extension utilization interface and/or unified document surface interface implemented by the second client serving circuit), without the authorization information (e.g., usernames, passwords, hash values, tokens, etc.) being communicated to the second client serving circuit 138. In the example, the isolation of the access authorization description 128 prevents either inadvertent or malicious exposure of the authorization information to the customer user 144 (e.g., which could be accessed via memory cache inspection, source code inspection, network communication spying, or the like). Additionally or alternatively, authorization information may be passed to and/or utilized by the second client serving circuit 138 in an encrypted form, and/or may be utilized directly (e.g., for a low risk activity, according to selections made by the author user, according to a role and/or permissions of the customer user, etc.). In certain embodiments, one or more aspects of the access authorization description 128 may be isolated, and other aspects may be communicated to the second client serving circuit 138.

An example pack definition value 118 includes an external data access value. External data may be any type of external data as set forth throughout the present disclosure. Example and non-limiting external data includes one or more of: an authorized data access; a $3^{rd}$ party data access; an external data value determined at a time of creating the pack implementation value; an external data value determined at a time of determining the pack definition value (e.g., while parsing the pack implementation value); an external data value determined at a time of incorporating the pack into a second document; an external data value provided as live data (e.g., updated continuously, and/or on a short time frame such as hourly, daily, etc.); and/or an external data value provided as selectively updated data (e.g., updated periodically; updated according to specific events such as changes to the document, project milestones, event-driven updates, according to determined changes in the external data, etc.).

An example system supports implementation of an arbitrary code component within the pack implementation value (and/or pack definition value). In certain embodiments, execution of arbitrary code, for example from a code element provided in a coding language that is not native to the unified document surface environment, and/or a code element provided where implementation makes validation and/or security confirmation of the code element prohibitive prior to utilization of the code element impractical, introduces risks to the system (e.g., the document serving circuit and/or the second client serving circuit). In certain embodiments, operations of the document serving circuit protect the system from malicious and/or defective code elements included in a pack, allowing for inclusion of arbitrary code components within a pack while providing for an acceptable risk environment for the system and customer users. An example operation to protect the system includes operating a virtual machine for the code element. In certain embodiments, the virtual machine may be operated on the document serving circuit, and/or sourced externally, for example operating the arbitrary code component on a workflow server and/or cloud server (not shown) separate from the document serving circuit. In certain embodiments, certain operations of the arbitrary code component (e.g., accesses to external information or services, accesses and/or commands to hardware components or devices, and/or system commands such as to the second client serving circuit, to an operating system, and/or any other command that may have an element extending access outside of the native unified document surface environment) may be operated using a virtual machine, where the code component to be performed on the virtual machine could include an individual command of the arbitrary code component, a selected portion of the arbitrary code component, and/or an entirety of the arbitrary code component. In certain embodiments, virtual machine operations may be performed utilizing a serverless compute service (e.g., AWS Lambda, Kubeless, Google Cloud Functions, etc.). In certain embodiments, the outputs of the virtual machine execution are provided to the second client serving circuit after operation of the virtual machine, isolating operations of the arbitrary code component from the second client serving circuit and the native unified document surface environment, and intercepting malicious and/or defective code operations before devices within the native unified document surface environment are affected. In certain embodiments, code components may be operated at the time of creating the pack definition value—for example code components that access external data to be included in the pack. In certain embodiments, code components may be operated at the time of incorporating the pack into a second document—for example when a customer user selects the pack for utilization into the second document. In certain embodiments, code components may be operated at various times during the life cycle of the second document and/or unified document surface interface, for example and without limitation: during periodic updates of external data; during updates and/or installation of the unified document surface interface (e.g., where the customer user installs the unified document surface interface onto a new device, updates the unified document interface, and/or reinstalls the unified document surface interface); and/or while editing the second document. Operations to isolate arbitrary code components may be performed during any operations where the arbitrary code components may be performed.

An example document serving circuit 102 determines whether an update to the pack implementation value includes an incompatibility risk, which may be referenced as a "breaking change" herein. A breaking change, in certain embodiments, may be determined to be present any time that a pack is updated (e.g., where an author user makes any change to a pack, and re-publishes the pack as an updated version). In certain embodiments, the document serving circuit may determine that certain changes are a potential breaking change (e.g., changing a link, reference value, updating the access authorization value, adding a capability or access type that was not present for a previous version, etc.), and that other changes are not a potential breaking change (e.g., changes to flat text data, changes to comments, changes in formatting, etc.). It can be seen that, in certain embodiments, a change may be considered a breaking change for one user, system, or set of priorities (e.g., adding a table column may be considered a breaking change for one system), but may not be considered a breaking change for another user, system, or set of priorities (e.g., adding the table column may not be considered a breaking change for another system). In certain embodiments, aspects of the pack may be utilized to determine whether a breaking change is present (e.g., if calculations are directed to a column, and columns are moved, the movement of the columns may be considered a breaking change).

The example document serving circuit 102 may perform certain operations to manage changes in response to a breaking change (and/or a potentially breaking change). An example document serving circuit provides an incompatibility warning to the client device (e.g., the client serving circuit and/or second client serving circuit), for example letting the author user know that the pack update may break user functionality, and/or letting the customer user know that an update to the pack may break the functionality of the pack. An example document serving circuit provides an update option value to the second client serving circuit accessing a document (and/or using the unified document surface interface) utilizing the pack. In a further example, updates to packs may be pushed (e.g., updates to the pack are enforced) in the nominal case, where an update to the pack that includes a breaking change may be operated to allow the customer user to delay (e.g., for a day, a week, and/or to a selectable time period) updating of the pack, and/or allow the customer user to avoid the update altogether (where applicable, for example where a customer user is allowed to arbitrarily extend an update period and/or continue using an old version of a pack). In certain embodiments, the author user may be able to indicate update behavior, for example allowing or preventing customer users to delay updates and/or use older versions. In certain embodiments, update behavior of packs may be determined in response to role(s) of the applicable user(s), an entity related to the applicable user(s) (e.g., entities having a special relationship to the unified document surface environment, such as subscribers, owners, controller, etc., may have differential permissions), subscription values and/or versions of the unified document surface environment related to user(s), and/or permissions of the user(s) in relation to associated packs, environment(s), and/or documents.

Certain further aspects of extensions and/or packs for a unified document surface environment are described following, any one or more of which may be utilized with and/or incorporated in any systems, circuits, procedures, and/or other aspects set forth throughout the present disclosure.

Figure 2:
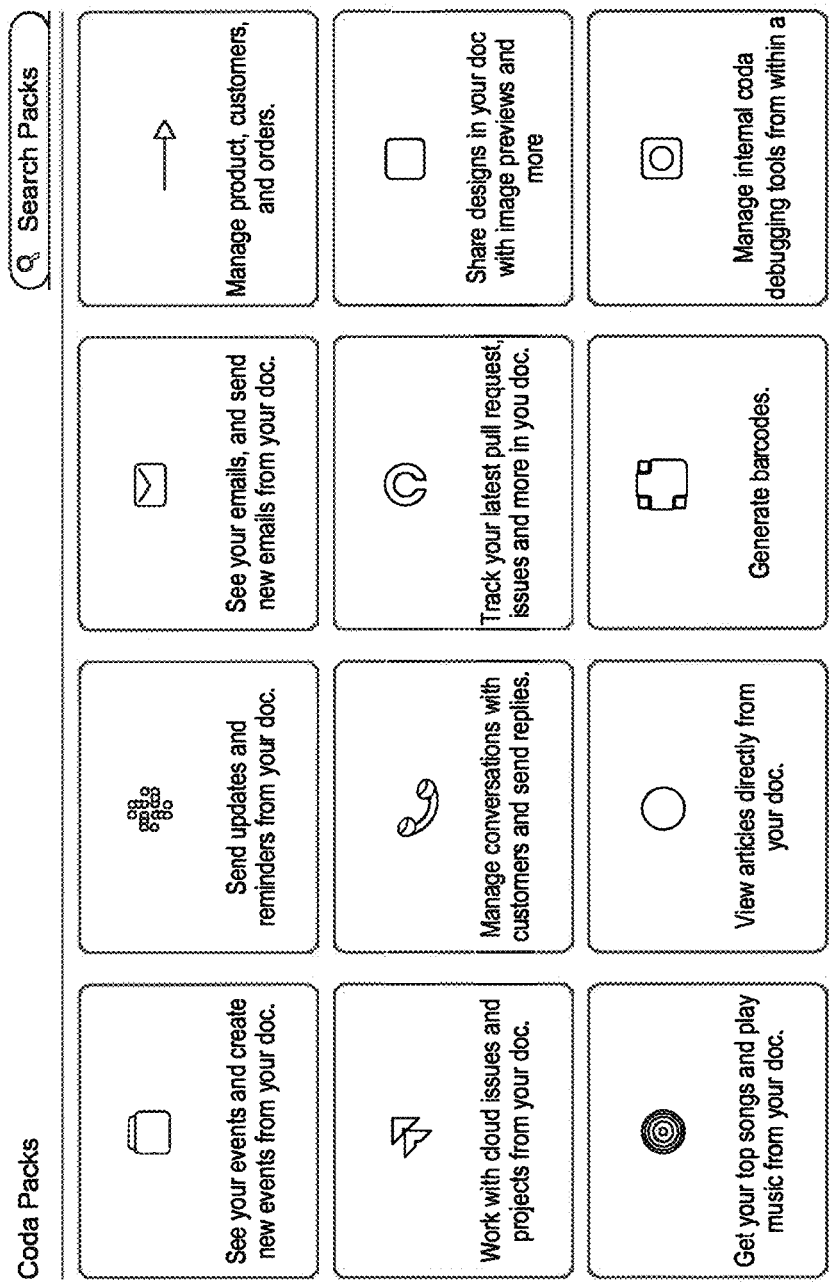
FIG. 2 is a depiction of an example pack gallery.

Referencing FIG. 2, an example pack gallery (or a portion thereof) is depicted. The example pack gallery depicts a view of available packs that may be presented to a customer user, including a searching feature that may be used—for example to search pack titles, keywords, descriptions, categories, authors, or the like. The example pack gallery is a non-limiting example. In certain embodiments, selection of a pack (e.g., on the extension utilization interface) may provide further details about a pack, provide installation and/or incorporation options for the pack, or the like.

Figure 3:
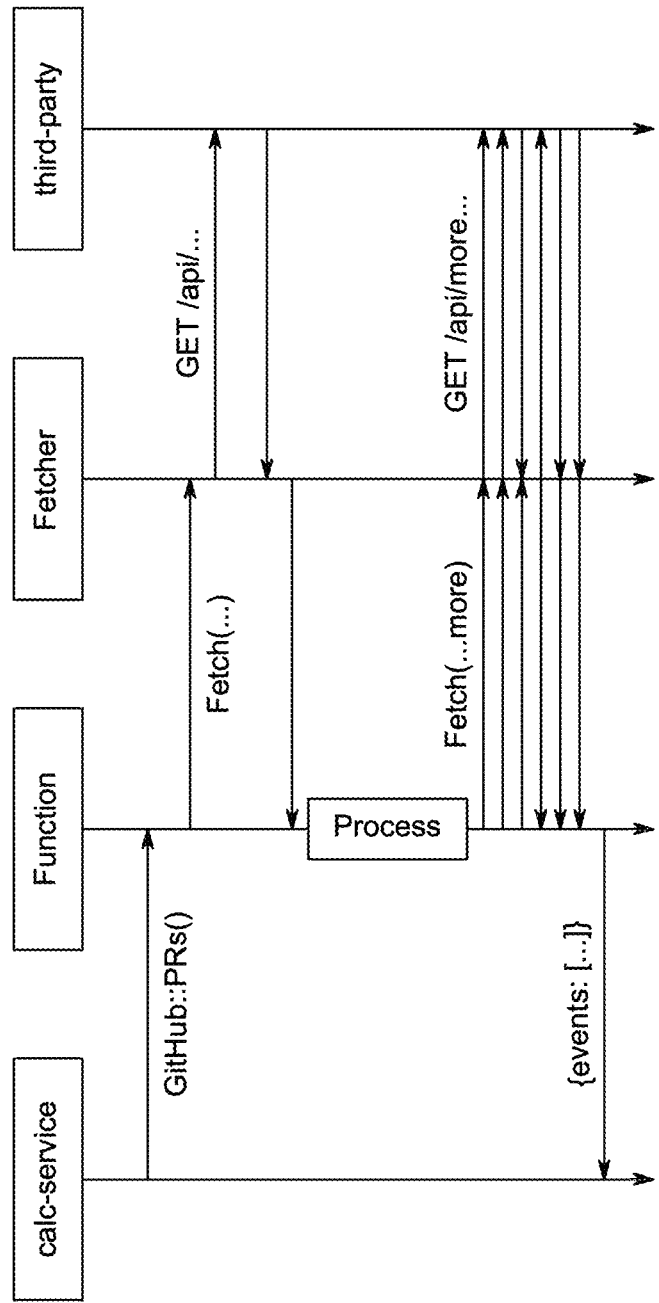
FIG. 3 is a schematic depiction of a workflow for operating the formula snippet.

A schematic workflow for operating the formula snippet is depicted in FIG. 3. The example formula snippet includes access to external data using a fetcher component (e.g., operated on the document serving circuit, workflow serving circuit, and/or sourced to a serverless compute service, utilizes metadata related to the time and document, utilizes temporary storage, and isolates authorization credentials from being passed between devices. The example operation of FIG. 3 includes a rate limiting aspect, preserving resources and preventing certain malicious attacks or excessive resource utilization from poorly implemented code, while providing sufficient responsiveness for users (e.g., authors and customers) of the pack.

An example system controls flow of calculations and data, allowing for raw rate limiting, access sequencing control (e.g., FIFO, LIFO, etc.), and/or response to external signals (e.g., response time and/or outage of external data and/or service providers). In certain embodiments, statistical data about calculations and data flows, such as resource utilization, time or event-based graphs, cache utilization (e.g., access counts and/or size), and/or logged fault or error values, are stored and/or able to be accessed—for example by author users (e.g., depending upon authorization), administrators, or the like. In certain embodiments, error values are determined in response to one or more of: incorrect data (e.g., in a table, formula, etc., which may be determined based on specified ranges, calculated outputs, data types, etc.), authorization failure (e.g., expired or bad token, failed access, etc.), a bug in a formula (e.g., overflow, bad output, failed execution, mixed data types, etc.), and/or rate errors (e.g., slow-downs, rate limits, system outages, etc.). In certain embodiments, the extension creation interface provides error information related to a pack, for example categorizing and displaying errors during build and/or execution operations of the pack. In certain embodiments, statistics related to the pack may be made available to the author user, such as a number of installations, utilizations, unique accesses, subscription data, or the like.

An example system provides for a simple implementation to build a pack (e.g., converting the pack implementation value to the pack definition value) and/or to publish a pack (e.g., expose the pack to a workspace). In certain embodiments, the author user can access, visualize, and/or retrieve statistics and/or log data related to previous versions of a pack. In certain embodiments, the author user can revert a pack to a previous version, control the timing of an update, and the like.

An example system allows for sync tables—for example providing a table with a selected schema, retrieving the data for the table, controlling calculations related to the table, and building the table into a unified document surface, including providing the space and layout for the table, imposing editing restrictions, limiting data sizes (e.g., max columns or rows). In certain embodiments, calculation operations for a sync table are performed in a separate workflow—for example workload distribution between servers and/or serverless components—relative to a workflow for other document elements within the unified document surface environment.

An example system supports dynamic sync tables—for example by providing for parameterization of the target (e.g., document location responsive to the pack), and fully dynamic schema for sync tables. Example operations include providing a schema function, a function to determine the name for the target, and/or a function to retrieve a user-visible URL for the sync table.

In embodiments, a snapshot of a document may be a single file. In some applications, a snapshot comprising a single file may be inefficient and/or impractical. For example, for a large document, loading or transferring a snapshot file may take several seconds or even minutes for the whole file to be transferred and/or loaded on a client or user device. In some cases, a delay or a wait of several seconds or minutes for transferring and/or loading a snapshot file may be unacceptable for some users and/or applications.

In some embodiments, a snapshot of a document may be a plurality of files. A snapshot comprising a plurality of files may provide, in some instances and applications, improved performance in loading and/or transferring of snapshots, storage optimization, improved performance (speed, CPU time, memory requirements, and the liked) for updating of snapshots, and the like. For example, a snapshot may include a plurality of files, and the files may be created and/or prioritized. In some cases, user experience for transferring and/or loading snapshot documents may be improved by transferring and/or loading critical elements of the document first. In embodiments, critical elements may be elements that allow or are necessary for the partial rendering of the document, provide for at least a partial view of the data of a document, provide for basic interactivity or navigation of the document, and/or the like.

In embodiments, a snapshot of a document may include a plurality of files wherein each file includes partial information of a snapshot. As used herein, a shard is to be understood as a file that captures partial or incomplete information of a snapshot. The process of generating a plurality of files wherein each file captures partial or incomplete information of a snapshot is referred to herein as sharding of a snapshot. Sharding of a snapshot creates a plurality of shards. In certain embodiments, one or more shards may include information not found within a separate snapshot file, for example: metadata related to the shard (e.g., time stamps; relevant user information; resources that have access to, links to, and/or have accessed the shard (e.g., users, documents, services, devices, etc.); sharding recipes supported by the shard; update times and/or status values for the shard, or the like. In certain embodiments, a snapshot includes separate information that is complete for creation of the document, and each associated shard includes at least a portion of the snapshot. In certain embodiments, a shard includes separate information related to the document, where the snapshot and shards together include complete information for the document, with or without redundancy of any information within the document between the shards and/or the snapshot. In certain embodiments, the snapshot comprises a superset of information present within associated shards of the document. The snapshot may exist as a physical file or stored information, and/or may exist as a logical grouping of information from the associated shards. In certain embodiments, a common shard may be shared between more than one snapshot, for example a shard directed to basic functionality, a shared data set, a template for a document or object for a document, or the like.

In embodiments, sharding may be used to create shards for an existing snapshot file. In some embodiments, sharding may include splitting a file into a plurality of shards. In some embodiments, sharding may include processing, compressing, expanding, dividing, rearranging, and/or transforming elements of a file. Shard may include redundant or duplicate information such that multiple shards may include the same information for a snapshot. In embodiments, sharding may be used to create shards during a snapshot creation process from the operations log. In embodiments, sharding may be used to create new shards from existing shards. In embodiments, sharding may be initiated each time a new snapshot is generated. In some embodiments, sharding may be initiated when a document is requested and/or at specified intervals.

In embodiments, sharding may be performed according to different strategies or sharding recipes. Sharding recipes may specify aspects of each shard, such as how many shards should be generated, the size of each shard, the maximum size of each shard, the minimum size of each shard, elements associated with each shard, and the like. Sharding recipes may specify how to group elements into shards (such as grouping all table elements into one shard, or generating a different shard for each table, etc.), types of data transformations to be performed (binary encoding, compression, etc.), data, and the like. Sharding recipes may include ranking or prioritization for each shard that specify the order the shards may be transmitted or loaded when requested. Sharding recipes may be optimized, iteratively improved, or specific to different applications, device resources (client device and/or server capabilities), network characteristics (speed, cost, latency or network between client and server), document types, size of documents, frequency of access by users, number of users accessing a document, location of the document, and the like. In embodiments, multiple sharding recipes may be applied to one snapshot to generate multiple sets of shards. A shard set from the multiple sets of shards may be selected according to which set is most appropriate for a request.

In one example, sharding may generate a set of shards that includes at least two shards. The two shards may include a schema shard and a data shard. A schema shard may include schema data that may indicate the look and feel of a document and may aspects of the size of a table (number of columns, rows, width, name of table, name of columns, data types, etc.), aspects of the text (font, size, color, etc.), system tables, invalidation graphs, and the like. A data shard may include data that is used to populate the cells of the tables, text, and the like. In some embodiments, a set of shards may include a form shard that includes elements associated with a form of a document.

In another example, sharding may generate a set of shards that includes different shards for different elements of a document. The set of shards may include a canvas shard, table shard, page shard, grid shard, form shard, text shard, metatable shard, people shard, and the like.

In another example, sharding may generate a set of shards that facilitate faster-perceived loading of a document. The set of shards may include a critical shard that includes data necessary to render a user interface of the document. A critical shard may be designated as high priority and may be designated as the first or one of a first shard to be transmitted or loaded when a document is requested to give provide a basic view of a document while other shards are loaded in the background. The set of shards may include a canvas shard and grid or table shards for each page or table in the document. The canvas shard and grid or table shards may be prioritized based on the page or canvas of the document that is requested.

Figure 4:
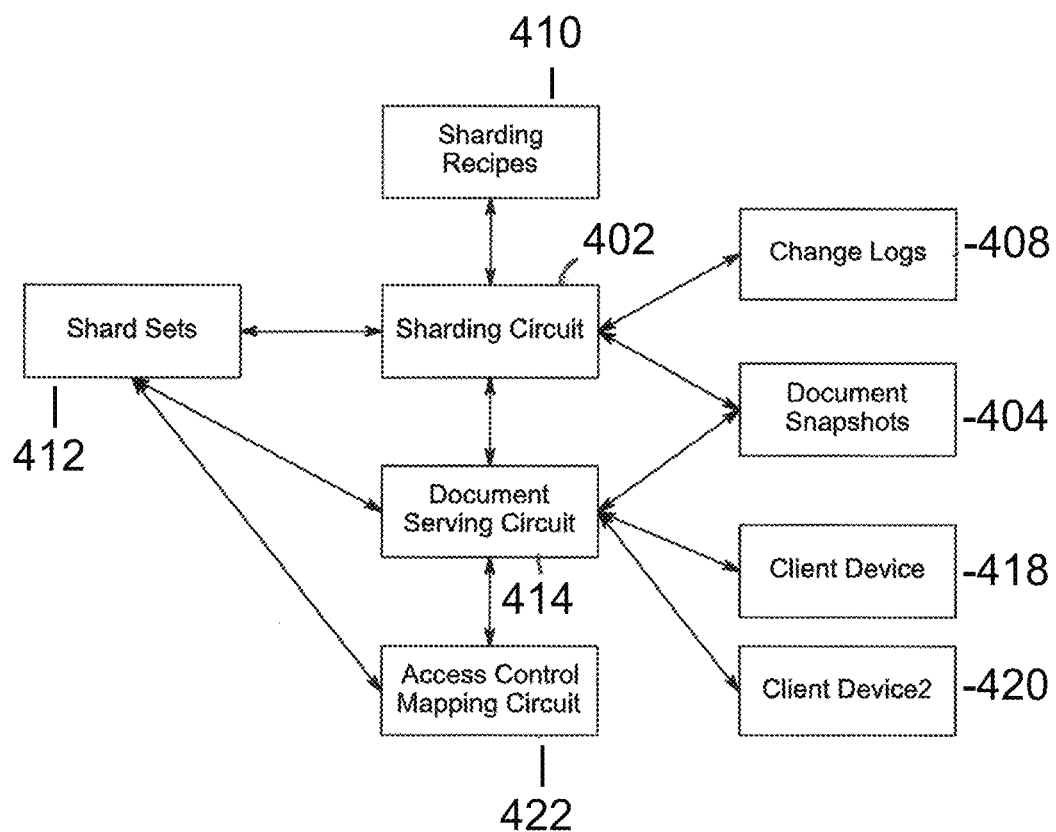
FIG. 4 is a schematic depiction of a sharding circuit.

Referencing FIG. 4, an example system includes a sharding circuit 402. The sharding circuit 402 may access one or more document snapshots 404 or document change logs 408 and create shard sets 412 according to sharding recipes 410. In one example, the sharding recipes 410 may indicate when each recipe should be used. In one example, some recipes may be specified to be used with existing document snapshots 404, while other recipes may be specified to be used with change logs 408 of a document. Some recipes may be specified to be used to specific types of documents (such as read-only, editable, sharable, etc.), snapshots, locations of data, client devices, network conditions, document access history, and the like. The sharding circuit 402 may generate one or more shard sets 412. In some cases, not all sharding recipes 410 may be applicable, and only a subset of the recipes may be used for a snapshot 404.

The sharding circuit 402 may be activated in response to new or changed logs 408 and/or document snapshots 404. New elements in change logs 408 and/or updates to document snapshots 404 may trigger the sharding circuit 402 to generate a shard set 412 using one or more sharding recipes 410.

The sharding circuit 402 may be activated in response to a client device 418, 420 requesting a document. The system may include a document serving circuit 414 that may receive document requests from a client device 418, 420. The document serving circuit 414 may determine properties of the document (size, number of elements, etc.), properties of the client device 418, 420 (capabilities, memory, processing power, etc.), network conditions (bandwidth, latency, etc.), and/or the like. The document serving circuit 414 may include logic to determine if a document snapshot 404 should be provided to the client device 418, 420. The document serving circuit 414 may include logic to determine if a shard set 412 should be provided to the client device 418, 420. The document serving circuit 414 may include logic to determine if a shard set 412 may improve the responsiveness or the appearance of responsiveness of the document on the client device based on the capabilities of the device, network conditions, properties/content of the document, etc. The document serving circuit 414 may identify a particular shard set 412 from the shard sets that is most appropriate for the client device 418, 420 based on the capabilities of the device and other factors.

The document serving circuit 414 may determine the prioritization of the shards of a shard set 412 and transmit the shards to the client device 418, 420 according to the prioritization. In some cases, each shard set 412 may be associated with a table or metadata that identifies the prioritization or order for transmitting the shard. In some cases, the prioritization of the shards may be, at least partially, dynamically determined. In one example, the prioritization of the shards may be dynamically determined based on the request from the client device 418, 420. In one example, the prioritization may be determined based on the page or canvas requested by the client device. In response to a request for a specific page or canvas of a document, the document serving circuit 414 may identify critical shards and shards that include data related to the requested page or canvas. The shards that include data related to the requested page or canvas may be transmitted with higher priority (such as before) shards related to non-requested pages.

In another example, the document serving circuit 414 may trigger the sharding circuit 402 to generate a shard set 412. The document serving circuit 414 may provide the sharding circuit 402 aspects and properties of a client device 418, 420 generating a request for a document, and the sharding circuit 402 may generate one or more shard sets 412. In another example, the document serving circuit 414 may monitor requests from multiple clients and may identify access patterns for the documents. Access patterns may include the frequency of requests for certain documents, the locations within the documents that are accessed, the size of data transfers, the number of client devices 418, 420 requesting the documents, and the like.

In embodiments, access patterns may be used by the sharding circuit 402 to determine sharding strategies and/or recipes 410 for sharding. In one example, access patterns may indicate frequent access to one or more tables or canvases of a document and infrequent access to other elements. The sharding circuit 402 may generate a shard that includes the frequently accessed tables and canvases and identify the shard as a high-priority shard. In embodiments, the document serving circuit 414 may identify changes in access patterns and trigger the sharding circuit 402 to generate new shards based on the changes in the access patterns.

In embodiments, document serving circuit 414 may maintain a record of accessed shards and changes in shard to predict shards that may be cached on a client device 418, 420 and do not require retransmission.

The system may further include an access control mapping circuit 422. In some cases, documents may include sensitive information, and some users may be restricted or may not have permission to view or edits one or more parts of a document. In some embodiments, an access control mapping circuit 422 may identify elements of a document that are subject to access restrictions for one or more users. In one instance, sharding of restricted elements may depend on the size of the restricted elements, the location of the size of the restricted elements, the frequency of access of the restricted elements, and the like. For example, if the size of the restricted elements is large, all the restricted elements may be grouped together into one shard. In another example, if the restricted elements cannot be grouped into one shared group of different shards, the document may be created for different users based on their access authorization. In embodiments, the access control mapping circuit 422 may identify users' permissions and identify appropriate shards for the user that include or exclude restricted elements based on the user's permissions.

In embodiments, the system may generate or maintain user-specific shards. The user-specific shards may identify user-specific data, such as document preferences, user scratch data related to personal notes, edits, and the like.

In embodiments, shard sets generated by the sharding circuit 402 corresponding to different sharding recipes 410 may be independent of one another such that shards from one shard set cannot be used with shards from another shard set. In some cases, shards from different shard sets may be interchangeable or may be mixed. For example, one shard set may be generated based on a sharding recipe 410 for course sharding that generates a few large shards. Another shard set may be generated based on a sharding recipe 410 for fine-grained sharding that generates many small shards. In one example, course shards and fine-grained shards may be generated to be interchangeable. For example, one course shard may be equivalent to two or more fine-grained shards, and the shards may be mixed or interchanged based on current network conditions. For example, the loading of shards for one client may begin with the loading of course shards. However, as network conditions change (such as a decrease in network latency), fine-grained shards may be sent to improve performance over the faster network conditions.

In embodiments, shards 412 and sharding recipes 410 may be generated and/or modified via one more graphical user interfaces (GUI). In embodiments, the performance of each shard set, sharding recipe 410 may be tracked and the performance identified in the GUI. Performance may indicate loading or transmission times for specific network conditions or speeds. Performance may include user satisfaction ratings associated with each sharding method. Users may be asked to indicate if they are happy or satisfied with the performance of the document. Ratings from users may be associated with sharding recipes 410.

Figure 5:
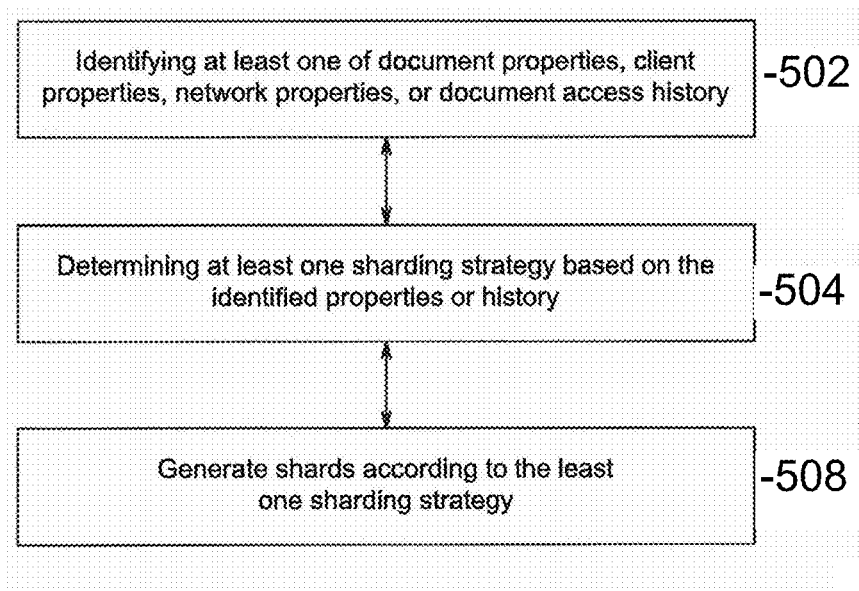
FIG. 5 is a schematic flow diagram of a procedure for generating shards.

Referencing FIG. 5, an example method for generating shards includes identifying 502 at least one of a document property, client property or capability, network property, and/or document access history. The method may further include determining 504 at least one sharding strategy or recipe based on the identified properties of histories. The strategy may determine aspects of the shards such as the number of shards, size of shards, and the like, and the shards may be generated 508 according to at least one sharding strategy.

Figure 6:
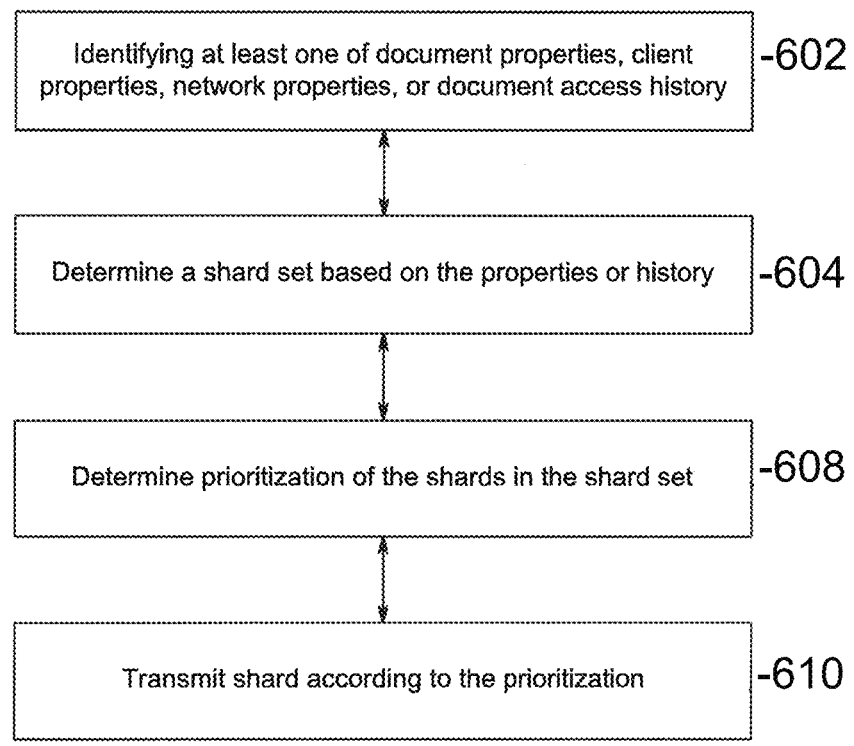
FIG. 6 is a schematic flow diagram of a procedure for transmitting shards.

Referencing FIG. 6, an example method for transmitting shards includes identifying 602 at least one of a document property, client property or capability, network property, and/or document access history. A shard set may be identified 604 based on the properties or history. The shards in the shard set may be further prioritized. Prioritization 608 of the shards may be based on an objective such as user satisfaction, minimum time until the first element is rendered, minimum time until the first document is interactive, and the like. The shards may be transmitted 610 according to the prioritization.

Figure 7:
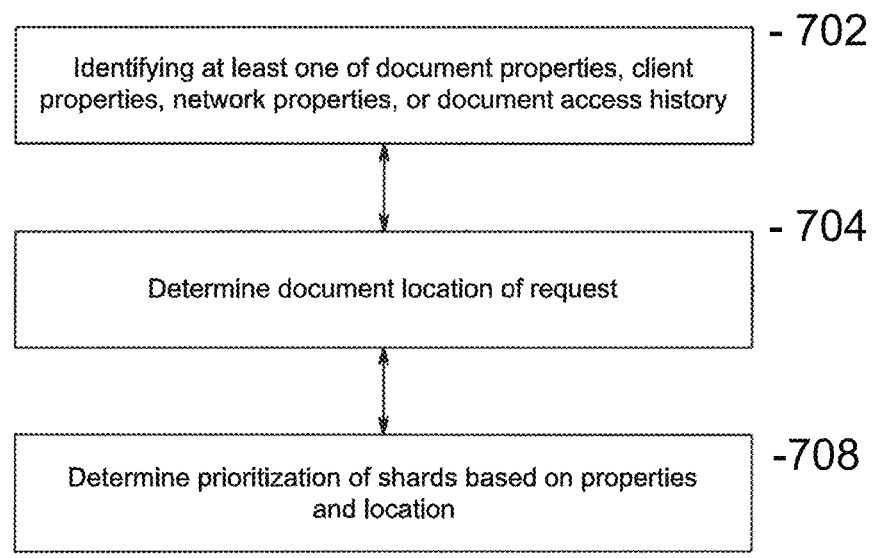
FIG. 7 is a schematic flow diagram of a procedure for prioritizing shards.

Referencing FIG. 7, an example method for prioritizing shards includes identifying 702 at least one of a document property, client property or capability, network property, and/or document access history. The method may further include determining 704 a location within a document that is requested by a client and determining 708 a prioritization of shards based on the properties and requested location. Prioritization of the shards may be based on an objective such as the minimum time until the first element is rendered, minimum time until the first document is interactive, and the like.

An embodiment of the present disclosure related to systems, procedures, and apparatus for performing operations to publish, organize, and perform group collaboration and review of documents is set forth herein. The system, procedures, and apparatus for publishing, organizing, and performing group collaboration and review of documents may be performed with, and/or incorporated with, in whole or part, any embodiments herein including, without limitation, systems, apparatus, circuits, controllers, devices, and/or procedures for executing a unified document surface, interfacing with external data, performing conditional formatting operations, interfacing with workflow servers, providing selected document access, interfacing with forms associated with a document, and the like.

Figure 8:
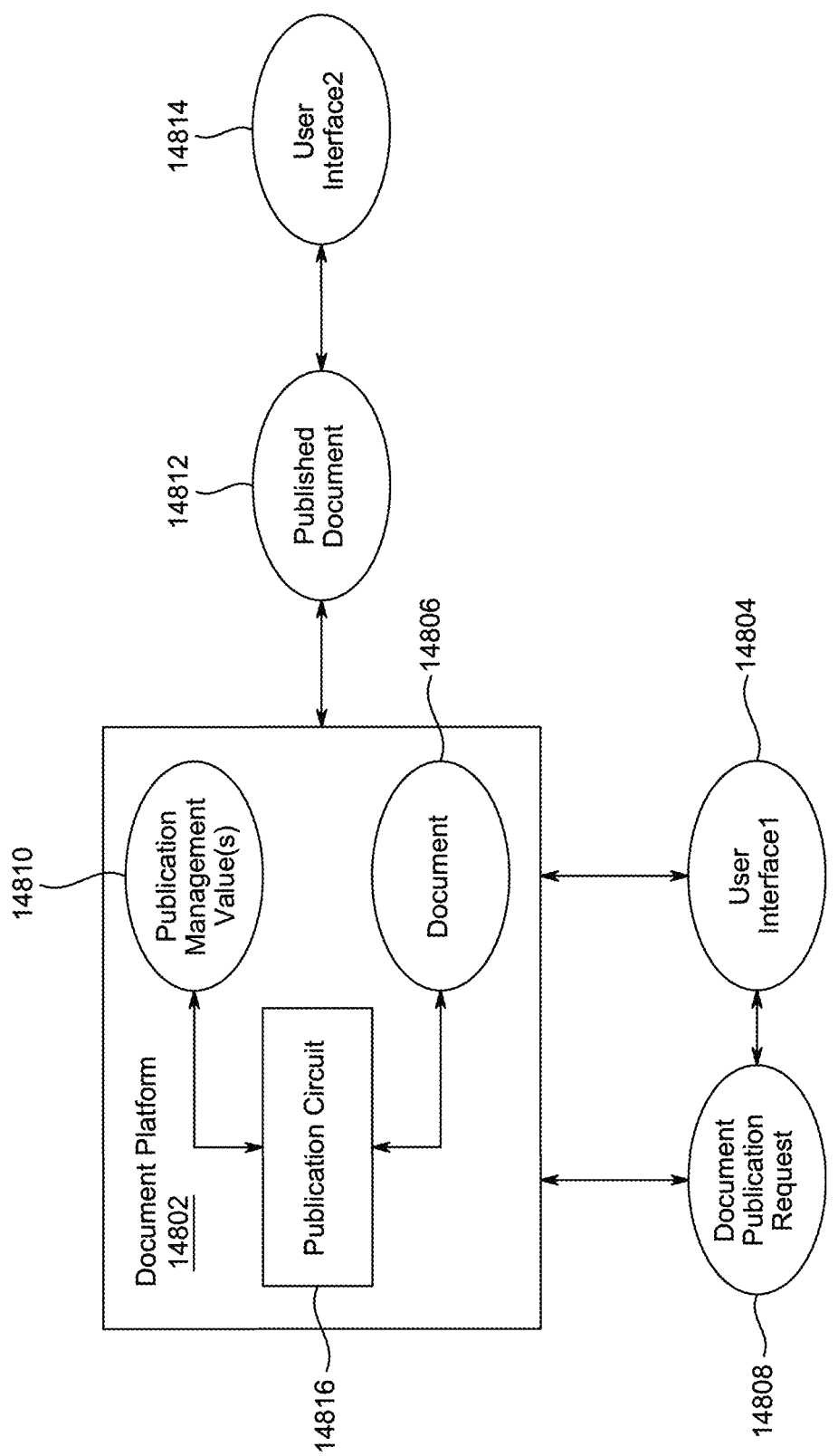
FIG. 8 is a schematic depiction of a system for group collaboration.

Referencing FIG. 8, an example system includes a document platform 14802, which may include a document server, workflow server, and/or any other computing device as set forth throughout the present disclosure. The example system includes a document 14806, which may be a unified document surface, that is created (in the example) by a first user interacting with a user interface 14804 to create, edit, and/or perform other operations with regard to the document 14806. The example document platform 14802 includes a publication circuit 14816 that performs operations to manage publication of the document 14806. The example publication circuit 14816 interprets a document publication request 14808, and determines publication management value(s) 14810 in response to the document publication request 14808. As will be understood with reference to the present disclosure, the publication management value(s) 14810 may be determined iteratively (e.g., with a number of interactions between the document platform 14802 and the user interface 14804), by providing prompts and/or menus to the user interface 14804, and/or may be defined by the user, for example executing operations to interact with an API of the document platform 14802 or the like. The example of FIG. 8 describes a single published document for clarity of the description, but a given document may have multiple published documents produced therefrom.

In the example of FIG. 8, a second user operating a second user interface 14814 accesses a published document 14812 provided by the publication circuit 14816 based on the document 14806 and the publication management value(s) 14810. The published document 14812 may be the same document (e.g., the second user can access the document directly, potentially with permission and display differences relative to the first user), a version of the document created for publication (e.g., stored separately from the document 14806 and/or created at the time of access by the second user, and which may be linked or unlinked from the document 14806), and/or a portion of the document (e.g., selected page(s), sections, tables, etc.).

The example of FIG. 8 depicting the document platform 14802 and user interfaces 14804, 14814 is an example for purposes of illustration. A given user may interact with the document platform 14802 using any device, and more than one user may interact with the document platform 14802 using a same device. Additionally or alternatively, the document platform 14802 may be a single device or a distributed device, and may be included in whole or part on a user device (e.g., a device executing a user interface).

In certain embodiments, the publication management value(s) 14810 include a unique address for the published document 14812, for example a URL that is specific to the published document 14812. In certain embodiments, a document 14806 may be published more than once, for example with separate unique addresses for each publication based on the document. In certain embodiments, the publication circuit 14816 provides a suggested unique address, for example based on a user name of the user providing the document publication request 14808, and/or other values that provide information about the document source (e.g., an entity related to the document, tag or header within the document, etc.) and/or that support uniqueness of the name (e.g., a system time value, managed key list from the document platform 14802, etc.) and/or narrow the span of comparable names to support ease of providing a unique value. In certain embodiments, the publication circuit 14816 allows the user to determine the unique address for the published document 14812, whether providing an initial suggestion to the user or otherwise. After publication, in one example, a second user can access the published document 14812 using the unique address. In certain embodiments, the published document 14812 may be available through a share environment (e.g., reference FIG. 9), a direct address entry, and/or a link. The access of the second user may be subject to authentication and/or limitations as described herein.

An example publication circuit 14816 determines one or more suggested changes to the document, for example providing for margin suggestions, column widths, font selections, spacing selections, or the like, and provide the publication management value(s) 14810 in response to the suggested changes (and/or a user response to the suggested changes). The suggested changes may be applied directly to the document 14806, and/or may be applied only to the published document 14812. In certain embodiments, the publication circuit 14816 provides a user interface allowing the application of the suggested changes (and/or modifications to the suggested changes) to the document 14806 and/or published document 14812. In certain embodiments, suggested changes may be determined from standards (e.g., best practices, formatting and layout defined by experts, utilized by a given set of documents, utilized by exemplary documents and/or highly rated documents, etc.) and/or templates (e.g., defined by an administrator, by the user, by a person having a specified role, associated with a user or entity, etc.), and/or may be configured according to a context related to the published document 14812, such as a type of access of the published document (e.g., a web browser, dedicated proprietary program or viewer, etc.) and/or a type of device for access of the published document (e.g., a mobile device, tablet, laptop, desktop, media device, etc.). In certain embodiments, the published document 14812 may be provided with a different appearance and/or responsive to a different set of suggested changes based on the context related to the published document 14812, for example a context of the second user at a time of accessing the published document 14812.

In certain embodiments, the publication management value(s) 14810 allow for access control of the published document 14812, for example allowing an accessing user to only read the published document (e.g., view access), to edit the published document 14812 (e.g., edit access), and/or to interact with the published document 14812 in a more limited manner (e.g., play access). For example, a user having play access may be able to enter values (e.g., to run scenarios, check data, and/or create a limited local version of the published document) and/or see changes in response to entered values, but the entered values may not be saved back on the document 14806. Access control of the document may be provided for the entire published document, and/or for selected portions (e.g., a table, executable object, text flow, chart, etc.) of the document. The user can provide a single access type (e.g., all accessing users have a same set of permissions), and/or provide variable access types according to a list of users, user roles, entities associated with a user, and/or a user access type (e.g., users logged in to the document platform 14802 have a first type of access, and users accessing the document without a login, or anonymously, have a second type of access). In certain embodiments, blocked features (e.g., buttons or other executable objects, tables, text flows, charts, etc.) may be hidden from the view of the second user, and/or may be depicted for the view of the second user but not accessible. In certain embodiments, some blocked features may be hidden, and other blocked features may be depicted. In certain embodiments, access may be limited to certain operations, for example a table in the document may have permissions that allow the user to enter data (e.g., add a row) and/or edit existing data, but do not allow operations to add or delete a table, add or delete a column, change formatting, etc.

In certain embodiments, the published document 14812 may be exposed to external resources, entities, servers, controllers, or the like. The exposure of the published document 14812 may be determined by the user, and/or determined according to permissions given to other users (e.g., a fully public document may be exposed fully, where a limited document may not be exposed, exposed to only certain external resources, and/or portions of the document may be exposed where other portions are not). Example and non-limiting external resources include web crawlers, search engines, indexing resources, a share environment, or the like. For example, an operation to expose the published document may include an operation to allow indexing of the document by a search engine company. Another example operation to expose the published document may include an operation to provide the published document to a share environment, and/or to index the document for searching and/or other operations in the share environment.

In certain embodiments, the published document 14812 includes calculated and/or dependent data aspects, for example live values that are calculated based on data within the document 14806 and/or external data. An example publication circuit 14816 performs a pre-rendering operation, which may be stored as a data subset of the published document, providing for rapid access to portions of the published document such as static data values or text, etc. The pre-rendered portion of the published document may be conceptualized as a light content version of the published document that allows the second user to have immediate access to the published document, while hydration or other operations to prepare the full document can be performed separately, for example in parallel while the second user accesses the document. The pre-rendered portion of the document may be refreshed, for example periodically, based on detection of a change in the document, or the like. The pre-rendered portion of the document may include an associated context of the second user and/or can include versions based on the range of supported access types for the published document. Accordingly, the publication circuit 14816 may prepare and/or store multiple versions of pre-rendered portions of the published document.

An example pre-rendered document portion is prepared for a portion of the document, for example a first page, initial access position, a given section, etc. An example pre-rendered document portion is prepared for deeper portions of the document, such as successive pages, additional sections, etc. An example pre-rendered document portion is prepared for deeper portions of the document or related documents, such as linked documents (and/or sections of the document), related documents, or the like.

In certain embodiments, the second user may interact with the published document in a visible manner (e.g., using an identifiable user name), an invisible manner (e.g., anonymous access), and/or a mixed manner (e.g., using a pseudonym, unique identifier that is not visibly linked to the second user, etc.). In certain embodiments, the second user may access the document with freely selected visibility (e.g., anonymous, then identifiable, then anonymous), and/or may access the document with a lower visibility, but once the second user accesses the document in a visible manner the second user cannot revert to a lower visibility access. The visibility of access by second users may be set using the document publication request 14808 and/or by the publication circuit 14816. An example mixed visibility operation includes the second user accessing the published document utilizing a pseudonym (e.g., system generated, and/or editable by the second user).

An example publication circuit 14816 tracks and/or provides analytics, for example to the user interface 14804 and/or to another user (not shown). Without limitation, analytics may include views of the document, edits of the document, copy operations of the document, links to the document, and/or unique counts of these. In certain embodiments, the analytics may include user associations with any one or more of the elements (e.g., which user provided an edit, etc.) In certain embodiments, the analytics include document portion associations (e.g., related sections, tables, etc.) with any one or more of the elements. The example publication circuit 14816 provides at least a portion of the analytics to a selected user (e.g., the first user, or another user), for example as a standard report, summarized information, or the like. The example publication circuit 14816 may provide a more complete version of the analytics, for example the raw data and/or portions thereof, which may be provided as a separate document accessible to the selected user, as a table (e.g., in the document and/or associated with the document) accessible to the selected user, and/or exposed to selected users with an API that provides for accessing the analytics.

Figure 9:
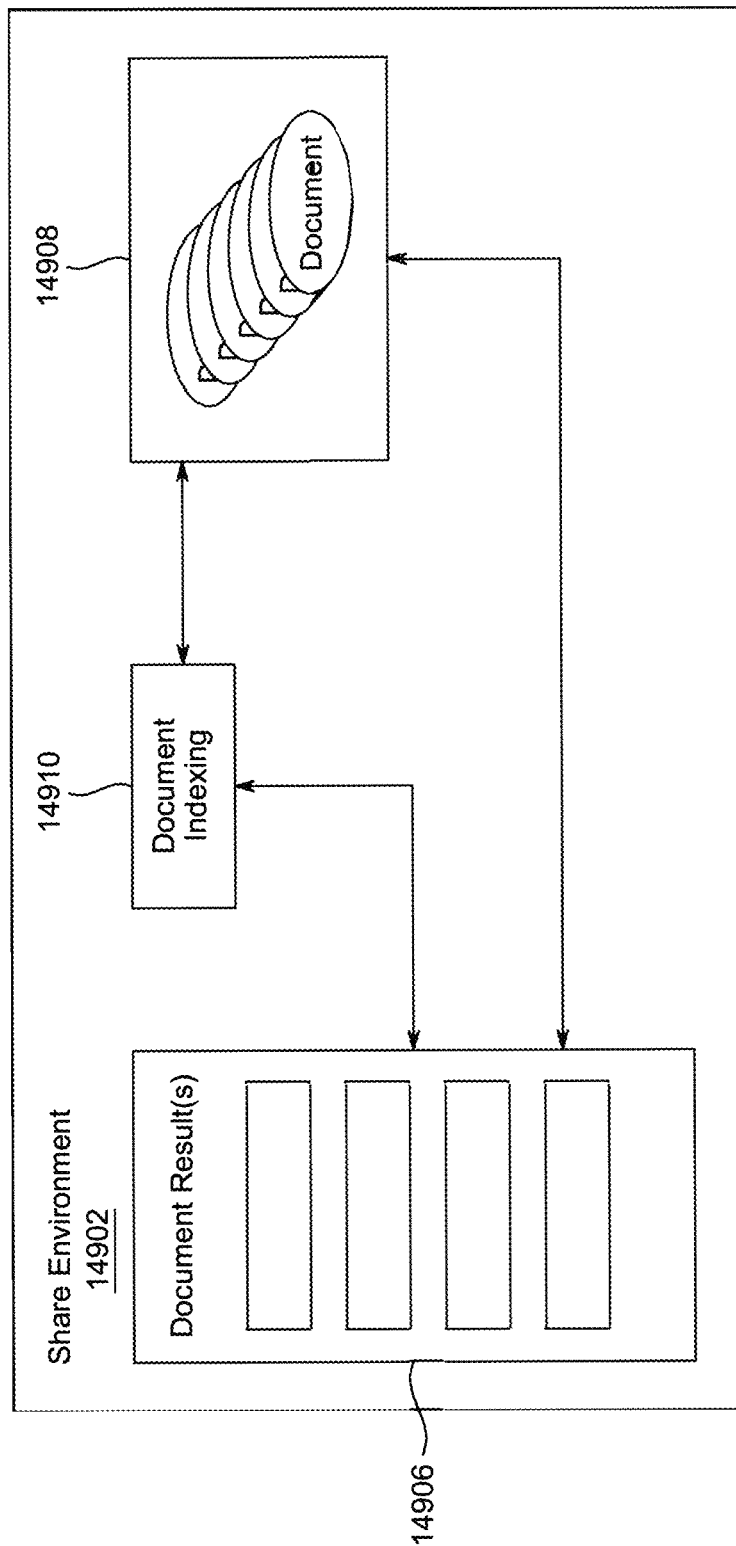
FIG. 9 is a schematic depiction of a system with a share environment.

Referencing FIG. 9, an example share environment 14902 associated with a corpus of documents 14908 is schematically depicted. In certain embodiments, the corpus of documents 14908 is a related group of documents, such as all documents which a user has access to, all documents related to a particular entity, all documents having a selected metadata value, or the like. In certain embodiments, the corpus of documents 14908 includes published documents 14812 having a given access level (e.g., open to the public, limited to logged in users, etc.), and/or documents associated with the document platform 14802, etc. The example share environment 14902 includes a document results component 14906, which may be provided to a user interface. The example document results component 14906 is provided to selected users (e.g., as determined from the corpus of documents 14908, user preferences, or the like), and may be provided based on default settings and/or user interactions. An example document results component 14906 provides top-ranked documents from the document corpus, which may be determined according to a number of access events for each document, links to each document, and/or user ratings for documents. An example document results component 14906 may additionally or alternatively determine document results in response to search operations, filtering, selections (e.g., selected tags, categories, etc.), and/or other document aspects (e.g., utilizing certain types of formulas, document size, using certain object types such as buttons, charts, pictures, videos, etc.). In certain embodiments, user interactions can search the corpus of documents (e.g., searching for text, titles, authors, etc.), and/or select criteria utilized to rank documents within the corpus of documents (e.g., selecting categories, ranking criteria such as links vs. views, etc.). In certain embodiments, the document results are presented as links, cards (e.g., depicting the title, text or other feature causing a hit on the search, author, a subheading for a portion of the document, analytics related to the document, etc.), and/or previews of a portion of the document. A tag for a document may be a category (e.g., based on a documents content and/or intended purpose), and/or a metadata element allowing for relationship between documents utilizing any selected criteria. In certain embodiments, each document has a single tag that is utilized to determine the document results 14906. In certain embodiments, a document may have multiple tags, ranked tags, and/or weighted tags, for example allowing for a more granular and/or multi-dimensional determination of rankings and/or relationships between documents.

In certain embodiments, the share environment 14902 determines an index 14910 of the corpus of documents, for example to provide for efficient searching of the corpus of documents. The index 14910 may be updated periodically and/or in response to an event (e.g., upon a user request, in response to a change in the corpus of documents of a certain type, in response to a change in top ranked documents of the corpus of documents, etc.). In certain embodiments, the index 14910 may be specific to a user, to a group of users, to a selected corpus or portion thereof, and/or to a selected entity (e.g., for users associated with the entity and/or a corpus of documents associated with the entity).

An embodiment of the present disclosure related to systems, procedures, and apparatus for performing operations to provide selected document access and/or interface with forms associated with a document is set forth herein. The system, procedures, and apparats for performing operations to provide selected document access and/or interface with forms associated with a document may be performed with, and/or incorporated with, in whole or part, any embodiments herein including, without limitation, systems, apparatus, circuits, controllers, devices, and/or procedures for executing a unified document surface, interfacing with external data, performing conditional formatting operations, interfacing with workflow servers, publishing, organizing, performing group collaboration and review of documents, and the like.

Figure 10:
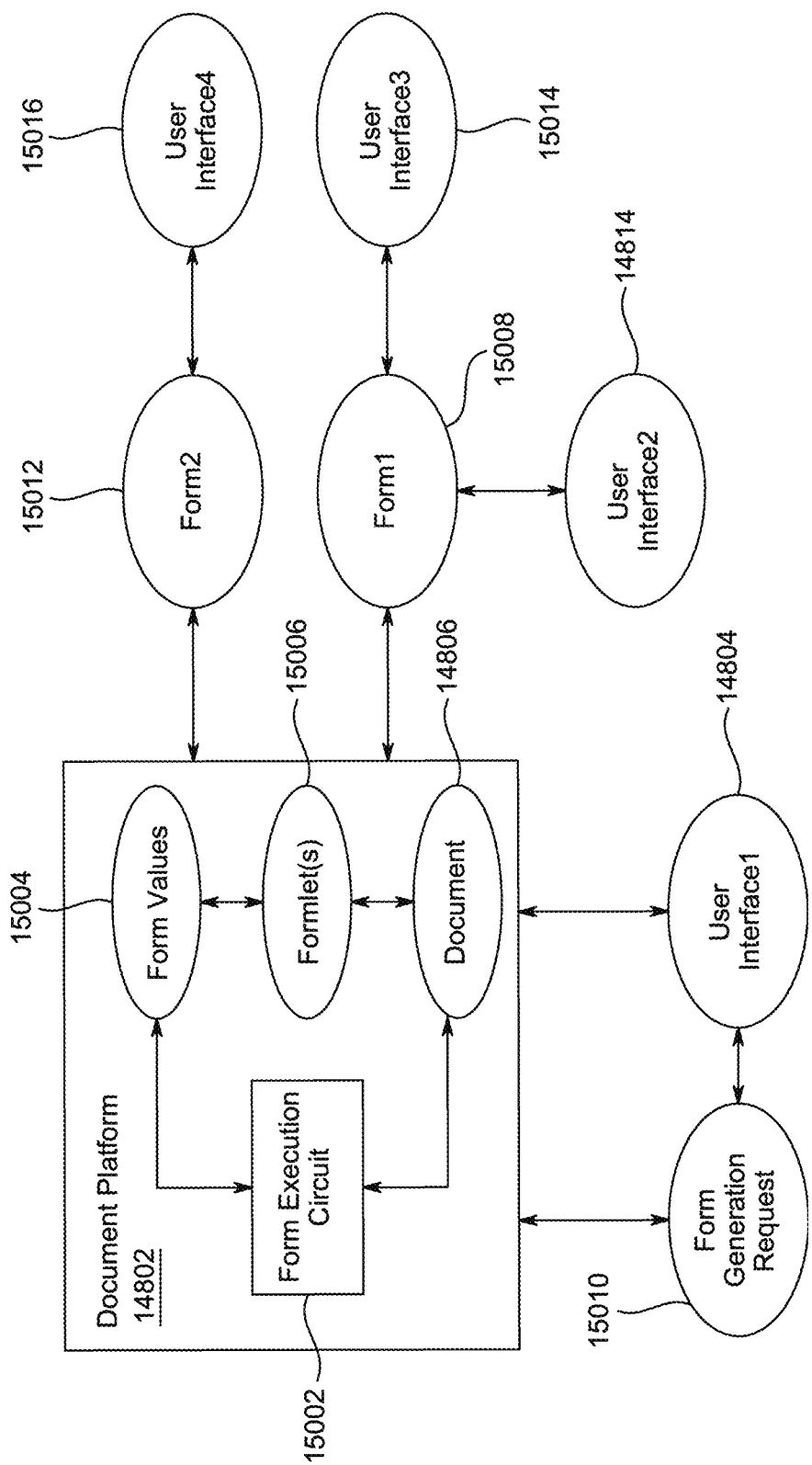
FIG. 10 is a schematic depiction of a system with for implementing forms capability.

Referencing FIG. 10, an example includes a document platform 14802 having a form execution circuit 15002 that performs operations to provide forms 15008, 15012 relating to a document to user interfaces (e.g., 14814, 15014, 15016). A form, as utilized herein, should be understood broadly, and includes an accessible portion of the document 14806, where the user interface accessing the form does not have direct access to the document 14806. For example, a form may be utilized to collect information from users, to survey or get feedback from users, to allow users to request information, goods, or services, or the like. In certain embodiments, the form execution circuit 15002 exercises a user interface 14804, allowing a user to prepare a form for a document 14806. In certain embodiments, operations to prepare a form are limited to a document author, authorized user, administrator, or the like. In certain embodiments, the user provides a form generation request 15010 to the form execution circuit 15002 to prepare the form. Operations to provide the form generation request 15010 may be iterative, based on menus or prompts, form templates, or the like. In certain embodiments, the form generation request 15010 is captured as form values 15004, which may include the form generation request 15010 or aspects thereof, and/or may be generated in whole or part in response to the form generation request 15010. In certain embodiments, the form execution circuit 15002 prepares a formlet 15006 in response to the form values 15004. After the preparation of the formlet 15006, the form values 15004 may be deleted or retained (e.g., to provide information for the user interface if the user creates a new form, wants to load an old form, etc.). The formlet 15006 includes information from the document 14806 and/or other sources sufficient to prepare a form 15008 upon request by a user. In certain embodiments, the formlet 15006 includes pointers or sufficiently unique identifiers to be able to pull information from the document 14806 when creating a particular instance of a form. In certain embodiments, the formlet 15006 includes data from the document, for example text flows, form headings, table and/or column titles, or the like, and/or may further include table data (e.g., a list of parameters, for example to support a drop down menu to be utilized by a user interface interacting with the form). The selection of utilizing data stored in the formlet 15006 or data accessed from the document 14806 may be made by any criteria, including determinations of a size of the formlet, user experience interacting with the form, the size of the associated data, selections by the user creating the form, workload balancing between a user device and the document platform, or the like. In certain embodiments, a formlet 15006 can be conceptualized as a child document, where the document 14806 is a parent document, and where the child document is configured to provide only selected elements of the document 14806 to users of the form, and to allow for limited and controlled editing of the document 14806, for example in response to a submission of the form, without providing access to the document 14806 to those users. In certain embodiments, the formlet 15006 is not identifiable or usable as a document apart from the existence of the document 14806.

In certain embodiments, a form is present within a document 14806—for example a form in one section of the document may include information from another portion of the document (e.g., text, headers, a table display, etc.), and/or may be utilized to add information to another portion of the document (e.g., data input into the form is entered into a table in another portion of the document). The underlying document 14806 may be visible to the user in whole, for example where a form is utilized for the convenience of the user, not visible to the user (e.g., the form section is the only section visible to the user), or visible to the user in part (e.g., some portions of the document are visible to the user and some are not). In certain embodiments, a form is external to the document 14806, and acts in some ways similarly to a published document 14812 (e.g., reference FIGS. 8-9 and the related descriptions).

In certain embodiments, a form is published to selected users, to a selected corpus of documents, to the public generally (e.g., available to anyone having the address of the form), and/or only to users of a document platform 14802 (e.g., associated with a particular entity, service, server, application, or the like). In certain embodiments, a form may be created, but a user selection can determine whether the form is published or hidden. For example, the user creating the form may remove the form from publication (e.g., interfacing an object responsive to an "accept submissions" toggle or other selection by the user), such as during creation and/or verification of the form, during periods when further data submissions from users of the form are not needed or desired, and/or to edit or update the form, and then place the form into publication (or back into publication) to allow users to utilize the form.

An example form execution circuit 15002 provides a form to a user, accepts a submission of the form from the user (e.g., the user enters selected data and hits a "submit" button or exercises a similar executable object), and performs selected actions in response to the submission. In certain embodiments, the form information is submitted as entries in one or more tables of the document 14806, and/or a target document (e.g., a first document may be utilized to develop and/or generate the form, and a second document is utilized to capture data submitted by the resulting form). The information captured from the form may go beyond the submitted data, for example including user information about the submitting user, time stamps, versions of interface tools (e.g., web browser, proprietary software, etc.) utilized, time spent accessing the form or fields thereof, and/or any other data or metadata associated with the interaction of the user with the form. In certain embodiments, the activities performed in response to the submission, including information captured, is determined by the form execution circuit 15002 in response to the interactions related to the form generation request 15010. An example form execution circuit 15002 performs a rationality check on submissions, for example detecting inadvertently repeated submissions or the like.

An example form execution circuit 15002 operates a form creation tool, where the user creating the form can utilize menus and/or selections to create and/or configure a form. For example, the user may select the document or a portion thereof (e.g., a table, text flow, or the like), and generate a form therefrom. In certain embodiments, the user may select a form from a template of forms to begin creation of the form. In certain embodiments, the form creation tool allows for permission setting (e.g., a user list, login requirement, associated information allowing access to the form, etc.) and/or a publication setting (e.g., scope or visibility of the form, how the form or existence of the form gets communicated to users, etc.) for the form. An example form creation tool creates a unique address for the form, for example including a suggestion and/or allowing the user to edit the suggested address.

In certain embodiments, data fields of the form may be validated data fields, for example where the data field has a selected format, and/or a selected format is supplied after the user enters data into the field. In certain embodiments, a formula engine is provided that allows for complex validation criteria, for example requiring that data fall within selected ranges, a comparison of entered data to other parameters (e.g., time values, external data, minimum or maximum values, expected values, etc.). The example embodiment supports multiple validation criteria for a data field, and the form execution circuit 15002 (e.g., as stored operations in the formlet and/or as a runtime operation by the form execution circuit) to provide a selected validation message, for example when the user enters invalid data, leaves a data field with invalid data present, and/or attempts to submit the form. The validation message may be configured for each data field, for each validation test, as a general indication of which fields are not valid, or the like. In certain embodiments, the lack of data in a given data field may be invalid (e.g., a required data field). In certain embodiments, the validation message is provided by a formula, for example allowing the recitation of the invalid data in the message (e.g., "You entered 145. Please enter a value between 0-99."), utilization of the user's name, the inclusion of external data, or the like.

An example form creation tool allows for hidden data to be provided in the form—for example to sort a table on a column that is not depicted on the user interface. In certain embodiments, hidden data may be provided for the convenience of the user, but present in the form data such that a sophisticated user (e.g., accessing communications between the user device and the document platform, metadata related to the form, cached information related to the form, etc.) could access the information. In certain embodiments, hidden data may be provided for security purposes—for example hiding the names of persons, data fields present in an underlying table of the document where a displayed column was sourced (e.g., a listing of names on a form generated from a table of the document that also includes salary information), or for any reason where the data is not intended to be accessible to the user. Where the data is not intended to be accessible to the user, the data may be removed (e.g., the table is sorted using the hidden data on the document platform, and then only the redacted table is sent as the form), and/or encrypted in place (e.g., present on the user device, but only as encrypted). In certain embodiments, the form creation tool provides a convenient user interface element to block utilization of certain types of data (e.g., people, health information, financial information, etc.) to prevent inadvertent access of those types of data to a user of the form. In certain embodiments, the form creation tool provides a convenient user interface element to remove hidden data, such as lookup table data (e.g., a column used as a lookup but not intended for display) and/or sorting table data (e.g., a column used to sort data, but not intended for display), to prevent inadvertent access of those columns to a user of the form. In certain embodiments, hidden data can be utilized in providing the form to the user interface, for example hiding some fields from some users (e.g., allowing for a form to provide different fields to different portions of a group—such as an invitation providing distinct selected information to the bridal party vs. the groom party).

An example form creation tool allows for the user to select tables from the document, and/or to filter, search, and/or hide columns from selected tables for utilization in the form. An example form creation tool allows the user to include table data, text flows, charts, or the like as a flat data element (e.g., utilizing data as available at the time of the creation of the form), and/or to utilize active data elements from the document or external data. In certain embodiments, if the user edits the form, then the published form is updated automatically—for example a next user accessing the form will see the update to the form. In certain embodiments, editing of the form is restricted while the form is published, and resumed if the form is withdrawn from publication (e.g., status changed to "not accepting submissions").

An example form execution circuit 15002 operates the user interface to display form results, for example determined from submission events of the form. In certain embodiments, the form results may be provided as data entries on a table of the document, and/or stored in another document associated with the document and/or the form. An example form execution circuit 15002 provides information such as a view of the data, filtering options for the data, selection options for the data (e.g., time ranges, data entered since a last check, lifetime data entered, etc.), aggregated data, summarized data, statistical descriptions of the data, etc. In certain embodiments, one or more aspects of information captured with the submission may be included with the data, either to be utilized for selection criteria, to summarize and/or process selected portions of the submitted data, to determine data by user, or the like.

The example of FIG. 10 depicts a first form 15008 and a second form 15012. The example forms 15008, 15012 are associated with the same document 14806. In certain embodiments, the forms 15008, 15012 may related to the same or distinct data—for example submissions of the first form 15008 may be added to a first table of the document, and submissions of the second form 15012 may be added to a second table of the document, or the submissions from each form 15008, 15012 may both be applied to a same table of the document (e.g., where the forms 15008, 15012 are created for distinct user types, configured for specific types of user devices, etc.). The submitted data from a form may be provided to any portion of the document (e.g., a table, text flow, section, etc.) and/or may be provided in whole or part to another location (e.g., a separate document).

In embodiments, elements, such as packs, may be used to extend document functionality and integration with other applications, services, and/or programs. A pack may be created to perform calculations, generate unique displays and graphics, manipulate data, query external data sources, and/or the like.

In embodiments, packs may be authored using a packs creation interface that may be part of the unified document surface of a document. Pack authoring may include an interface for specifying one or more of code, scripts, modules, and the like. Packs may be authored in one or more programming languages and may leverage one or more code libraries and functions available for the programming language. Packs may include access to functions and capabilities of a document surface of a document. Packs may be authored using one or more authoring tools and may be authored by writing code, with a drag and drop interface for selecting and arranging code elements, graphical code builders, and the like. Packs may be authored using one more browser based code editors, software developer kits (SDK), integrated development environments (IDE), code editors, and the like. Authoring tools may include one or more of contextual tools to identify, validate, and/or populate code and functions of the pack and may include tool tip functions, side bar help panels, code examples, and the like. A pack may be authored to import data from a source outside of a document and convert the data such that it can be represented and manipulated using formulas, functions, visualizations, and methods available to the document surface.

Authoring tools may include one or more test and debugging tools such as tools for sandbox, command tools to test data connections, authentication management, and the like. Authoring tools may include an option to run a pack in sandbox environment that isolates the pack from deployed documents during testing. In embodiments, authoring tools may include error detection/validation at build time.

An authored pack may be published using one more publishing interface. Publishing a pack may store the pack in a pack repository. The pack repository may be unique to one or more users, may be public to all users, and the like. An author that publishes a pack may select publications options as to the destination, permissions, and the like. A pack may be published to a pack marketplace allowing users to buy, sell, and/or trade packs.

A pack publishing interface may include version tracking and management. Publishing a pack may generate a record of the version, date of publishing, description of the pack and the like. A new version of a published pack may be automatically pushed to users and the pack may be updated to the new version of the pack in a document. In some embodiments, updating of the pack may be configured according to one or more author settings, document settings, user settings, system settings, and the like. The setting may be governed by a hierarchy, permissions, and the like. In one example, author settings may take precedence over user or document settings. In another example, author settings may take precedence over document settings based on the relative permission or status of the author of the pack and the document owner. In one example, settings associated with a higher rated user may take precedence over settings of a lower level user. In embodiments, settings may include one or more of automatic updates (where packs may be updated whenever new versions are available, notifications based updates (new version notifications may be provided to users and new versions are installed based on user selections), grace period updates (users may be given a time period to defer updating to new version after which the update may be installed automatically, developer control updates, and the like. Updates may depend on the type of updates. Security updates may be required while other updates may be deployed as a notification upgrade or a grace period update.

A pack may be installed into a document by associating the pack with the document. An association may be generated by dragging and dropping the pack into a document from a library of packs, from a marketplace of packs, and the like. Associating a pack with a document may initiate a configuration stage for the pack. Configuration may include at least one of defining options for the pack, defining or selecting a behavior of the pack, defining or selecting the appearance of the pack, defining or selecting data connections, defining or selecting account information, and the like.

In embodiments, defining a configuration of a pack may include defining access authorization. In some embodiments, access to the functionality of the pack, data associated with a pack, and the like may be defined by access authorization. Access authorization may be defined for each pack during configuration. Access authorization may indicate users, groups, types of users, and the like that are allowed to access a pack in a document and/or which set of features in the pack are accessible to the users. In some embodiments, pack authorization may be inherited or based on the authorizations associated with the document in which the pack is installed. In some cases, access authorization of a pack may limit the authorization to a subset of the users and/or groups that are associated with the document. A pack that is installed in a document may be configured to evaluate the credentials of a user viewing the document and determine if the user has access authorization to the document. In the case of unauthorized users, a pack may be hidden in the document, inoperable, and/or shown as a placeholder to the user.

In embodiments, the display of the data, visualizations, source of data, and the like associated with a pack may depend on access authorization of the user viewing or accessing the document. In some embodiments, access authorization of a pack may be propagated from the credentials used to access the document. In one example, an installed pack may be configured to access a calendar of a user and provide a summary of appointments in a document. The access authorization of the pack may change based on the user viewing the document and the pack may retrieve and display different data for different users viewing a document in which the pack is installed.

Configuration of a pack may be defined using a graphical user interface and may include graphical elements for making selections (such as text boxes, drop-down menus, calendars, and the like).

Associating a pack with a document may include providing specifications for the inputs and/or outputs to the pack. A pack may take as input one or more data that is in a document or is associated with a document. Providing input data specification may include defining a range of data, location of data, preprocessing steps for data, and the like. Providing output data specification may include selecting a range of output data, selecting post processing steps, and the like.

Packs installed into a document may be executed according to a pack execution configuration. A pack execution configuration may be defined on various levels of hierarchy such as per pack, per user, per document, per workspace, per enterprise, and the like. In some embodiments, the execution configuration may inherit configurations based on a defined hierarchy. In some embodiments, a pack may be configured to execute when a document in which the pack is installed is accessed. In embodiments, a pack may be configured to execute according to the pack execution configuration of the user accessing the document. In some embodiments, a pack may be configured to execute according to user input. A user may initiate execution of a pack by selecting the pack in a document, requesting data from the pack, providing data for the pack, and the like. In some embodiments, a pack may be configured to execute in response to push notifications from external data sources when data in the external source is updated. In some embodiments, a pack may be configured to execute in according to a schedule, timer, number of accesses, the freshness of data, and the like.

In embodiments, packs may execute at a client device used to view a document. In some embodiments, packs may execute server-side. In some cases, parts of a pack may execute on a client and some parts of the pack may execute server-side. Selection of parts of a pack for the location of execution may be in response to properties of elements of the pack such as the author of the elements, types of operations in each element, and the like. For example, elements authored by trusted parties or elements that include formula operations may be enabled to execute on a client device while other operations relating to authentication, accessing external data, and the like may be configured or required to execute server-side.

In one embodiment, packs may be stored and executed server-side. In embodiments, document users may be provided with an option to install a pack into a document from a selection of packs that are stored on a server. An authored pack may be available for installation into a document only once the pack is released by the user and transferred to a server. In some embodiments, elements such as code, logic, input and outputs, and the like of the pack may be evaluated after the pack is transferred to the server and before the pack is available for installation into a document. Evaluation of the pack may include scanning of the code of the pack for malicious code. Evaluation of the pack may include comparing the description of the pack provided by the author with the function of the pack during execution. Packs that are detected to include malicious code or appear to have different functionality to what was described may be flagged by the server and the packs may not be provided for installation.

Packs that are stored on the server may be installed in a document. When needed (such as when a document is accessed by a user) the pack may be triggered for execution on the server. Triggering a pack for execution may include providing, from the document where the pack is installed, input data for the execution of the pack. The server may execute the pack using the input data from the document if any. The server may be configured to transfer data requests from the pack to third-party data sources. The pack may be configured to receive data from third-party sources, perform additional post-processing and/or calculations to generate output data for the document. The server may transfer the output data for display in the document.

The server-side execution environment for executing the packs may include protection against malicious or faulty code and/or malicious adversaries. Protection may include multi-tier protection which may include executing packs in a sandbox environment that is associated with a different account than document data whereby if the account of the sandbox environment was to be compromised, the document data would not be available to the compromised account and server. Multi-tier protection may include implementing the execution environment in a serverless infrastructure that uses cloud-based services. The cloud-based services may distribute execution among many different servers thereby eliminating dedicated servers that may fail or be exploited. Multi-tier protection may a virtual environment implementation for the execution environment. A virtual machine may be used to instantiate a copy of the execution environment that executes the pack. In some embodiments, a separate virtual machine may be instantiated for every pack execution. The server-side execution environment may isolate each pack from one another via one more virtual machine. In embodiments, two or more packs may be designed to interact with one another and may be configured to execute in the same virtual machine.

In embodiments, aspects of the installation and execution of a pack may be recorded and tracked. A pack execution log may include aspects of the operations related to the pack, number of installations of the pack, number of executions, number of executions of the components of the pack, number of data accesses, and the like. The pack execution log may maintain a log of access and executions for each user or identification number associated with a workspace or user. In some cases, pack executions logs may include data related to each pack with respect to the pack author, pack administrator, user, and the like. Pack execution logs may be provided to users for review and may limit the access to a pack (for example, in response to a threshold number of errors associated with a pack).

Services, operations, and/or data for a pack may require user authentication and/or authorization. Formulas in a document or pack may require account information for a user, team, workspace, or the like. Formulas may be invoked with account identifiers. The account identifiers may be provided to a server and the server may use the account identifier to determine secret identifying information for the account identifier (such as cryptographic tokens, login information, etc.). A server may be used to manipulate user credentials and authorization information on behalf of a user thereby ensuring that sensitive credential and authorization information is not exposed on a client device.

Figure 11:
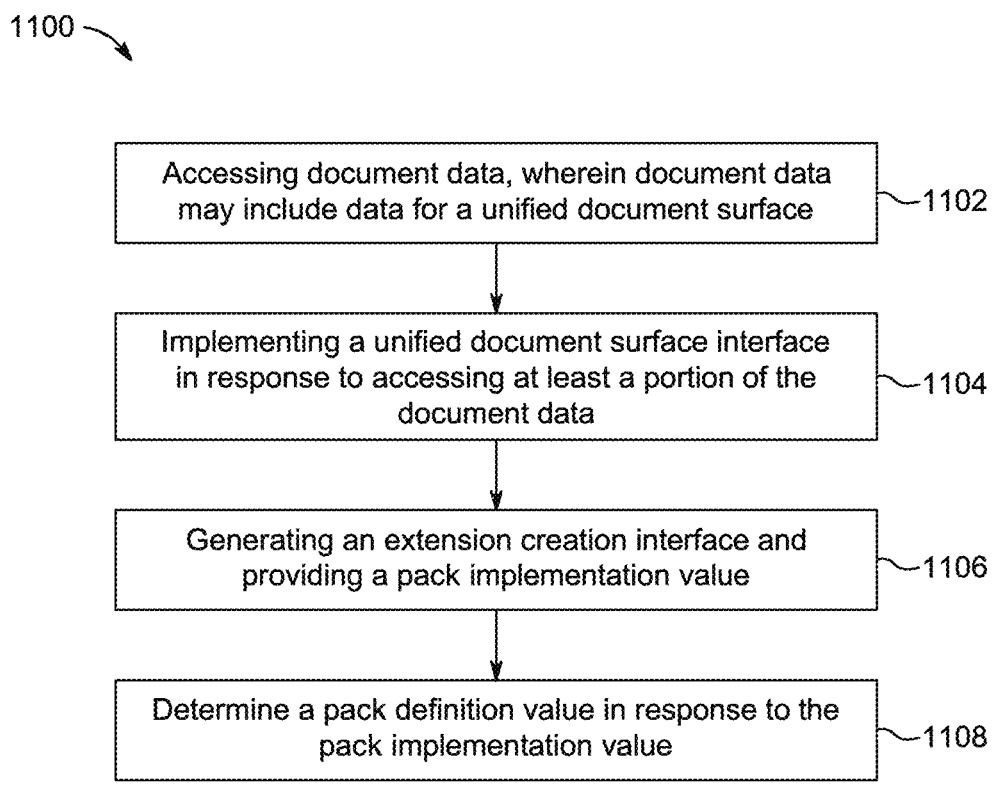
FIG. 11 is a schematic flow diagram of a procedure for implementing a pack.

FIG. 11 is a schematic flow diagram of a procedure for implementing a pack. In embodiments, a method 1100 may include accessing document data 1102. The document data may include data for a unified document surface. Accessing document data may include accessing the whole document or at least a portion of the document. The method may further include implementing a unified document surface interface in response to accessing at least a portion of the document data 1104. The method may further include generating an extension creation interface and providing a pack implementation value 1106. The pack implementation value may be provided in response to user interactions with the extension creation interface. In embodiments, the method may include determining a pack definition value in response to the pack implementation value 1108. In embodiments, the pack implementation value may include an access authorization value, and the pack definition value may include an access authorization description. The method may further include exposing a pack to a workspace in response to the pack definition value. A pack may be accessed by other clients or client serving circuits for implementing an extension utilization interface. The method may include incorporating at least a portion of the pack into a second document in response to user interactions with the extension utilization interface. In embodiments, the second document may be associated with the workspace.

In embodiments, the method may include exposing a pack to a workspace in response to the pack definition value. In some cases, the method may include accessing the pack by a second client or a second client-serving circuit, implementing an extension utilization interface, and incorporating at least a portion of the pack into a second document in response to user interactions with the extension utilization interface. In some cases, the second document may be associated with the workspace. In some embodiments, the method may further include isolating the access authorization description from the second client serving circuit. In some cases, the pack may include at least one of a service or an external data value and the access authorization description may include authorization information for access to the at least one of the service or the external data value. In some cases, the pack definition value may include a formula and the formula may include at least one of: a unified document surface interface formula; a code based formula; a third party formula; or a column formula. In some cases, the pack definition value may include an external data access value and the external data access value may include at least one of: an authorized data access; a third party data access; an external data value determined at a time of creating the pack implementation value; or an external data value determined at a time of accessing the pack definition value. In some cases, the pack definition value may include at least one of: a formula; an action; a format; or a table. The extension creation interface may include a software development kit (SDK) layer. The pack implementation value may include an arbitrary code component.

In embodiments, the method may include determining the pack definition value by isolating operations of the arbitrary code component from at least one of the client serving circuit or the document serving circuit. The method may further include determining the pack implementation value by operating a virtual machine to execute the arbitrary code component. The method may further include determining the pack definition value by operating the virtual machine on a workflow serving circuit. In some embodiments, the method may further include creating a dedicated instance of the virtual machine for the arbitrary code component.

In embodiments, the method may include performing, in response to determining an update to the pack implementation value comprises an incompatibility risk, at least one operation selected from the operations consisting of: providing an incompatibility warning value to the client device; providing an update option value to a second client serving circuit accessing a document utilizing a pack exposed to a workspace in response to the pack definition value; or providing an update delay value to a second client serving circuit accessing a document utilizing a pack exposed to a workspace in response to the pack definition value. In some embodiments, the method may further include implementing a sandbox interface as a part of the extension creation interface, and to provide a calculated output value to the client device in response to user interactions with the sandbox interface. In some embodiments, the method may include operating an external data access authorization in response to an access credential supplied by the user to the sandbox interface.

The method may further include storing the access credential in a local hidden file of the client device. The access authorization description may include an authorization type for each one of a service or an external data access of the pack. The method may include requiring authorization information for the service or the external data access from a second user of a second document utilizing the pack in response to the authorization type comprising a user authorization type. The method may further include accessing the service or the external data access using separate credentials from the required authorization information. In embodiments, the method may further include providing access to the service or the external data access to the second user of the second document utilizing the pack in response to the authorization type comprising a system authorization type. The method may include performing a validation of the pack definition value and creating a pack in response to the pack definition value and the validation. The method may include performing a validation of the pack definition value and providing a notification to the extension creation interface in response to the validation indicating a pack error. In some cases, the pack error may include at least one error selected from the errors consisting of: a formula error, an authorization error, or a code operation error. The extension creation interface may include an assistance interface. The assistance interface may include at least one of: a tooltip associated with at least one of: a component of the extension creation interface, a formula command, or a text value; a description value associated with at least one of: a component of the extension creation interface, a formula command, or a text value; or a code example associated with at least one of: a component of the extension creation interface, a formula command, or a text value. The extension creation interface may be configured to limit access to the external data access value to a defined external data component of the extension creation interface.

Figure 12:
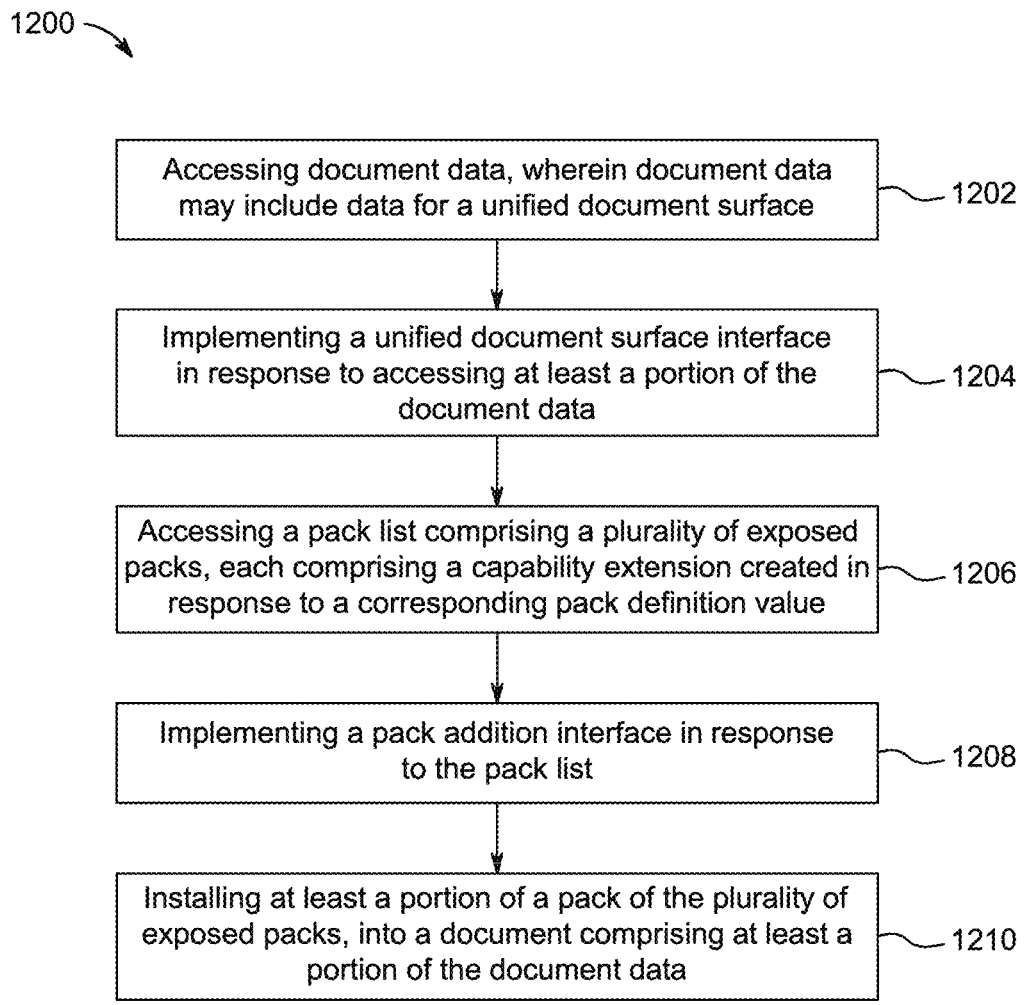
FIG. 12 is a schematic flow diagram of a procedure for installing a pack.

FIG. 12 is a schematic flow diagram of a procedure for installing a pack. In embodiments, a method 1200 may include accessing document data 1202, the document data may include data for a unified document surface. In embodiments, at least a portion of the document data may be provided to a client serving circuit. The method may include implementing a unified document surface interface in response to the at least a portion of the document data 1204. The method may further include accessing a pack list comprising a plurality of exposed packs, each comprising a capability extension created in response to a corresponding pack definition value 1206, implementing a pack addition interface in response to the pack list 1208, and installing at least a portion of a pack of the plurality of exposed packs, into a document comprising at least a portion of the document data, in response to user interactions with the pack addition interface 1210. In embodiments, the user interactions comprise a drag and drop operation of the pack to the document. The pack may include at least one of: a formula; an action; a format; a table; a unified document surface interface formula; a code based formula; a third party formula; a column formula; a text flow; an arbitrary code component; or a template. The pack may include one of a service or an external data access value. The one of the service or the external data access value may include an authorized service or external data access value. The authorized service or external data access value may include a system authorized service or external data access value. In embodiments, the method may further include providing access to the service or external data access value without further authorization operations from a user of the unified document surface interface. The method may include isolating authorization information for the authorized service or external data access value from a client device displaying the document.

In embodiments, the authorized service or external data access value may include a user authorized service or external data access value. The method may include providing access to the service or eternal data access value in response to authorization credentials supplied by a user of the unified document surface interface. The method may further include accessing the authorized service or external data access value using distinct credentials from the authorization credentials supplied by the user of the unified document surface interface. In some embodiments, the method may include commanding execution of operations of the pack on at least one of a separate workflow server or a virtual machine. In embodiments, the corresponding pack definition value may include an update implementation value. In embodiments, the method may include updating the document in response to an update of the pack and the update implementation value. The update implementation value may include at least one value selected from the values consisting of: an immediate update value; a timed update value; or an update notification value.

The method may further include determining an update type value, and to update the document further in response to the update type value. The pack may include a versioned object. In embodiments, the method may include updating the document further in response to a version of the exposed pack and a version of the installed pack in the document. The method may include determining a pack execution log in response to operations of the document using the pack and exposing at least a portion of the pack execution log to an author of the pack. The pack execution log may include at least one log information element selected from: a number of documents having the pack installed; a number of execution events of components of the pack; an execution time of execution events of components of the pack; a number of service or data access events of components of the pack.

Figure 13:
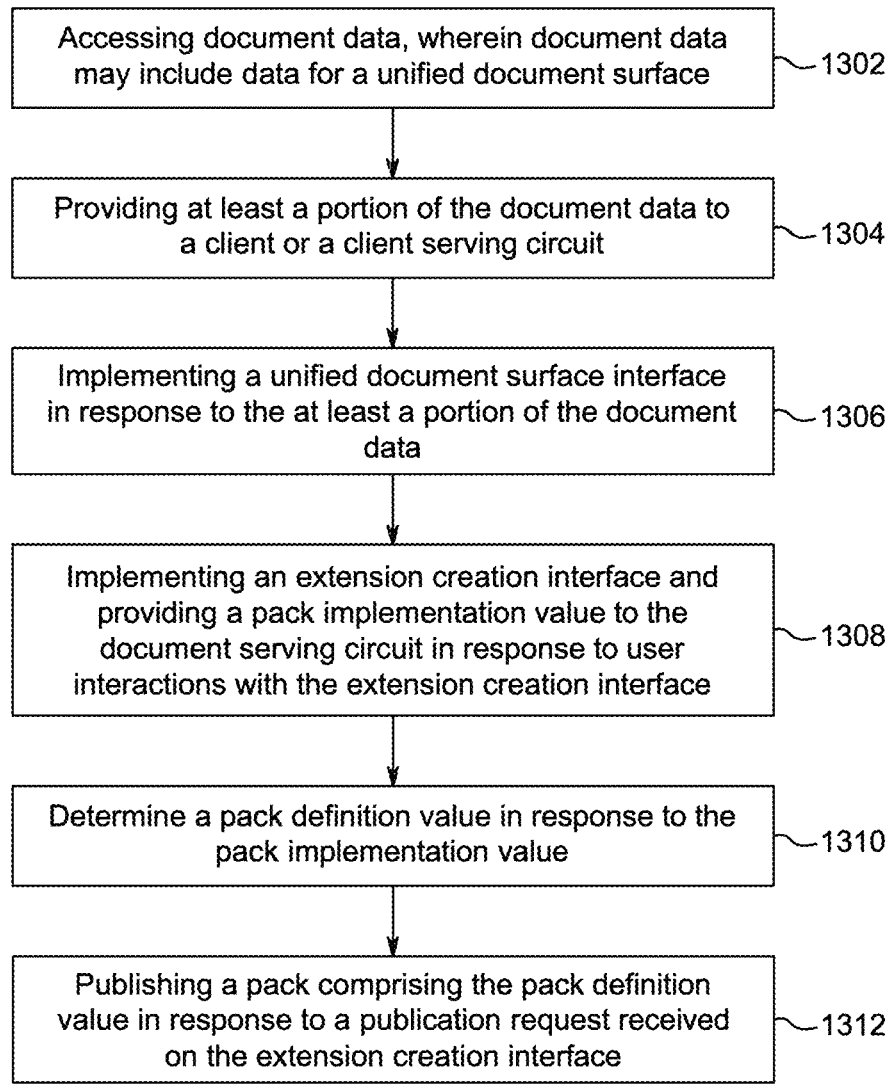
FIG. 13 is a schematic flow diagram of a procedure for publishing a pack.

FIG. 13 is a schematic flow diagram of a procedure for publishing a pack. In embodiments, a method 1300 may include accessing a document data 1302. The document data may include data for a unified document surface. The method may include providing at least a portion of the document data to a client or a client serving circuit 1304. The method may include implementing a unified document surface interface in response to the at least a portion of the document data 1306. The method may include implementing an extension creation interface and providing a pack implementation value to the document serving circuit in response to user interactions with the extension creation interface 1308. In embodiments, the method may include determining a pack definition value in response to the pack implementation value 1310 and publishing a pack comprising the pack definition value in response to a publication request received on the extension creation interface 1312. The pack definition value may include a publication scope value. The method may further include and wherein publishing the pack in response to the publication scope value. The publication scope value may include at least one value selected from the values consisting of: a public scope; a workspace scope; a user inclusion scope; or a user exclusion scope. The pack definition value may include a category tag. In embodiments, the method may further include publishing the pack in response to the category tag. The method may include accessing a pack list comprising a plurality of published packs including the pack, and to display selected ones of the pack list to a client device in response to category tags corresponding to each one of the plurality of published packs. In some embodiments, the method may include selecting the ones of the pack list in response to the category tags. The method may further include ordering the selected ones of the pack list in response to the category tags. The pack definition value may include an access cost description. The method may include publishing the pack in response to the access cost description. The access cost description may include at least one of: a subscription cost value; an installation cost value; a trial period value; a pack usage document example value; or a usage based cost value.

The method may include publishing a pack description card in response to the pack definition value. The pack description card may include at least one value selected from the values consisting of: a pack icon; a pack picture; a pack text description; a pack title; a pack author name; a pack author entity; a pack author contact; a utilizing documents list; a pack building block description; or a pack dependency description. The pack definition value may include a unique address for the pack.

Figure 14:
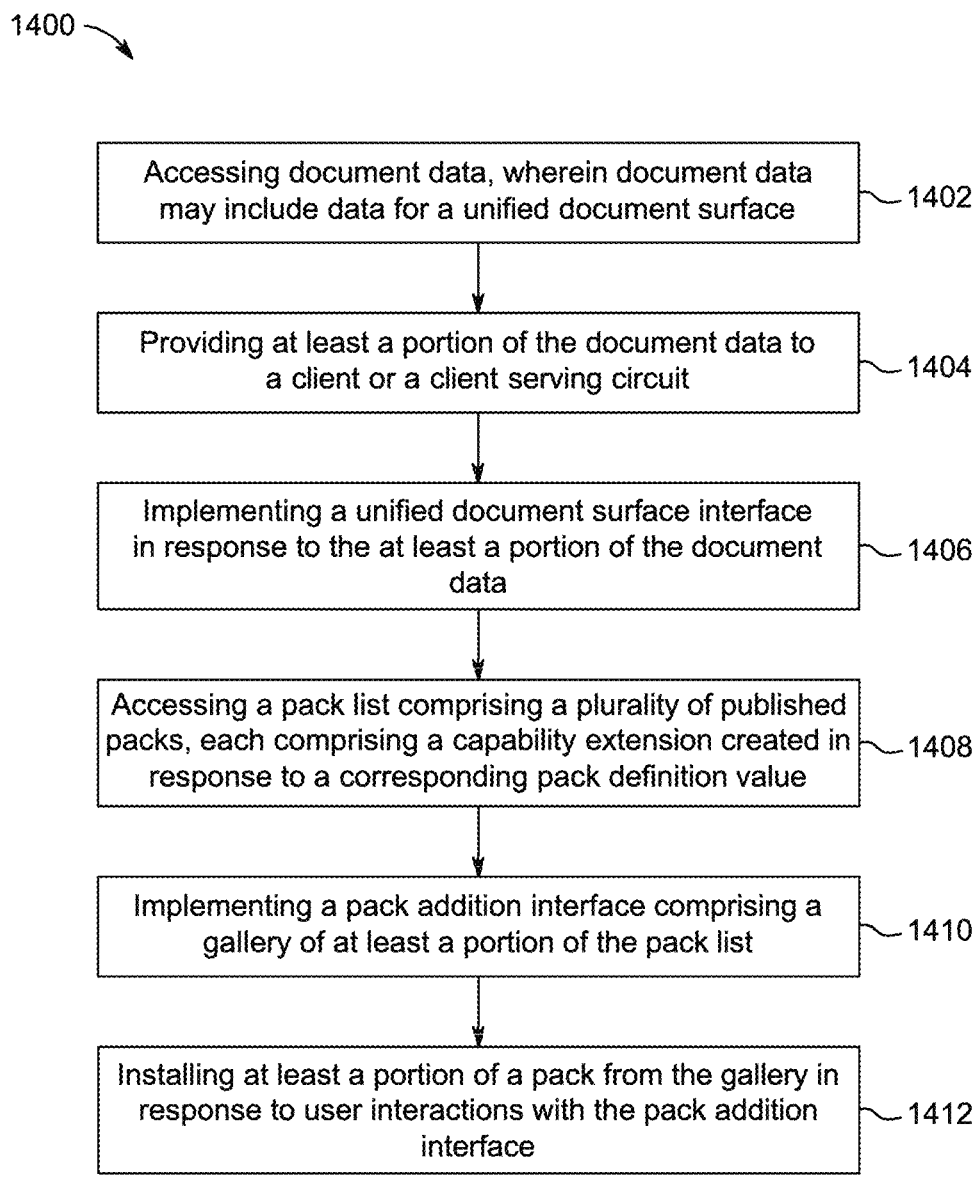
FIG. 14 is a schematic flow diagram of a procedure for installing a pack.

FIG. 14 is a schematic flow diagram of a procedure for installing a pack. In embodiments, a method 1400 may include accessing document data, the document data may include data for a unified document surface 1402. The method may include providing at least a portion of the document data to a client or a client serving circuit 1404. The method may further include implementing a unified document surface interface in response to the at least a portion of the document data 1406 and accessing a pack list comprising a plurality of published packs, each comprising a capability extension created in response to a corresponding pack definition value 1408. The method may further include implementing a pack addition interface comprising a gallery of at least a portion of the pack list 1410 and installing at least a portion of a pack from the gallery in response to user interactions with the pack addition interface 1412. The method may include selecting the gallery from the pack list in response to a publication scope value corresponding to each of the plurality of published packs. The method may include selecting the gallery from the pack list in response to a user search term provided on the pack addition interface. The method may include selecting the gallery from the pack list in response to a category tag corresponding to each of the plurality of published packs. The method may include selecting the gallery from the pack list in response to an installation volume description corresponding to each of the plurality of published packs. The method may include selecting the gallery from the pack list in response to an installation trend value corresponding to each of the plurality of published packs. The method may include selecting the gallery from the pack list in response to an administrative permissions value corresponding to at least one of the plurality of published packs. The administrative permissions value may include at least one value selected from the value consisting of: a cost permissions value; a building block value; a pack inclusion value; a pack exclusion value; or a pack certification value. In embodiments, the method may include providing an administrator notification in response to the user interactions with the pack addition interface and installing the at least a portion of the pack in response to an administrator response authorizing the installation.

Figure 15:
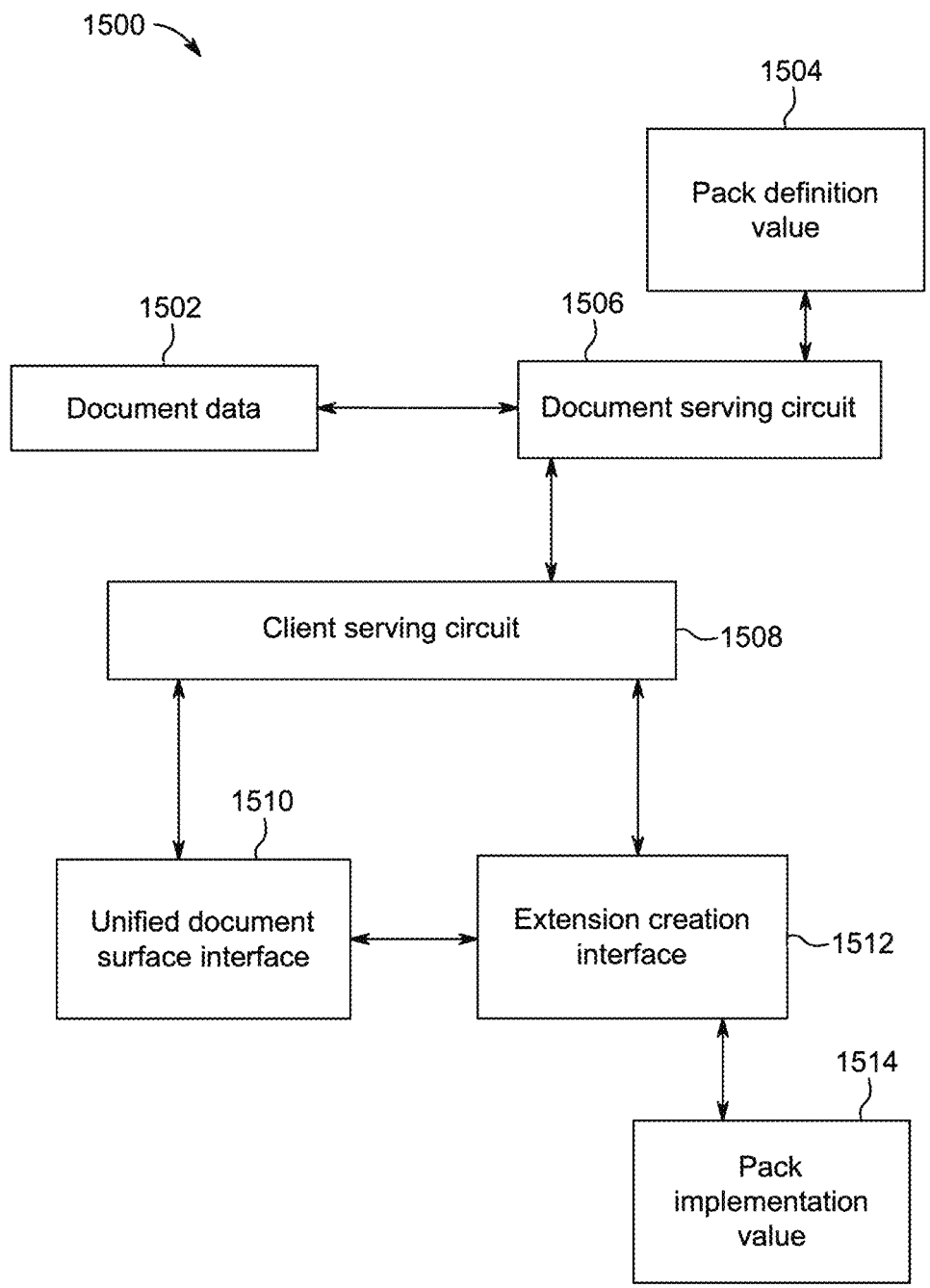
FIG. 15 is a schematic diagram of a system for pack implementation.

Referencing FIG. 15, an example system 1500 includes a document serving circuit 1506 structured to access a document data 1502. The document data may include data for a unified document surface. The document serving circuit 1506 may provide at least a portion of the document data 1502 to a client serving circuit 1508. The client serving circuit 1508 may be structured to implement a unified document surface interface 1510 in response to the at least a portion of the document data 1502. The client serving circuit 1508 may be further structured to implement an extension creation interface 1512, and to provide a pack implementation value 1514 to the document serving circuit 1506 in response to user interactions with the extension creation interface 1512. In embodiments, the document serving circuit 1506 may be further structured to determine a pack definition value 1504 in response to the pack implementation value 1514. In some embodiments, the pack implementation value 1514 may include an access authorization value and the pack definition value 1504 may include an access authorization description. In embodiments, the document serving circuit 1506 may be further structured to expose a pack to a workspace in response to the pack definition value 1504.

In embodiments, the system may include a plurality of client serving circuits 1508 that may be structured to access the pack, to implement a plurality of extension utilization interfaces 1512, and to incorporate at least a portion of the pack into a plurality of other document in response to user interactions with the extension utilization interface. the second document is associated with the workspace. A document serving circuit 1506 may be further structured to expose a pack to a workspace in response to the pack definition value 1504.

Figure 16:
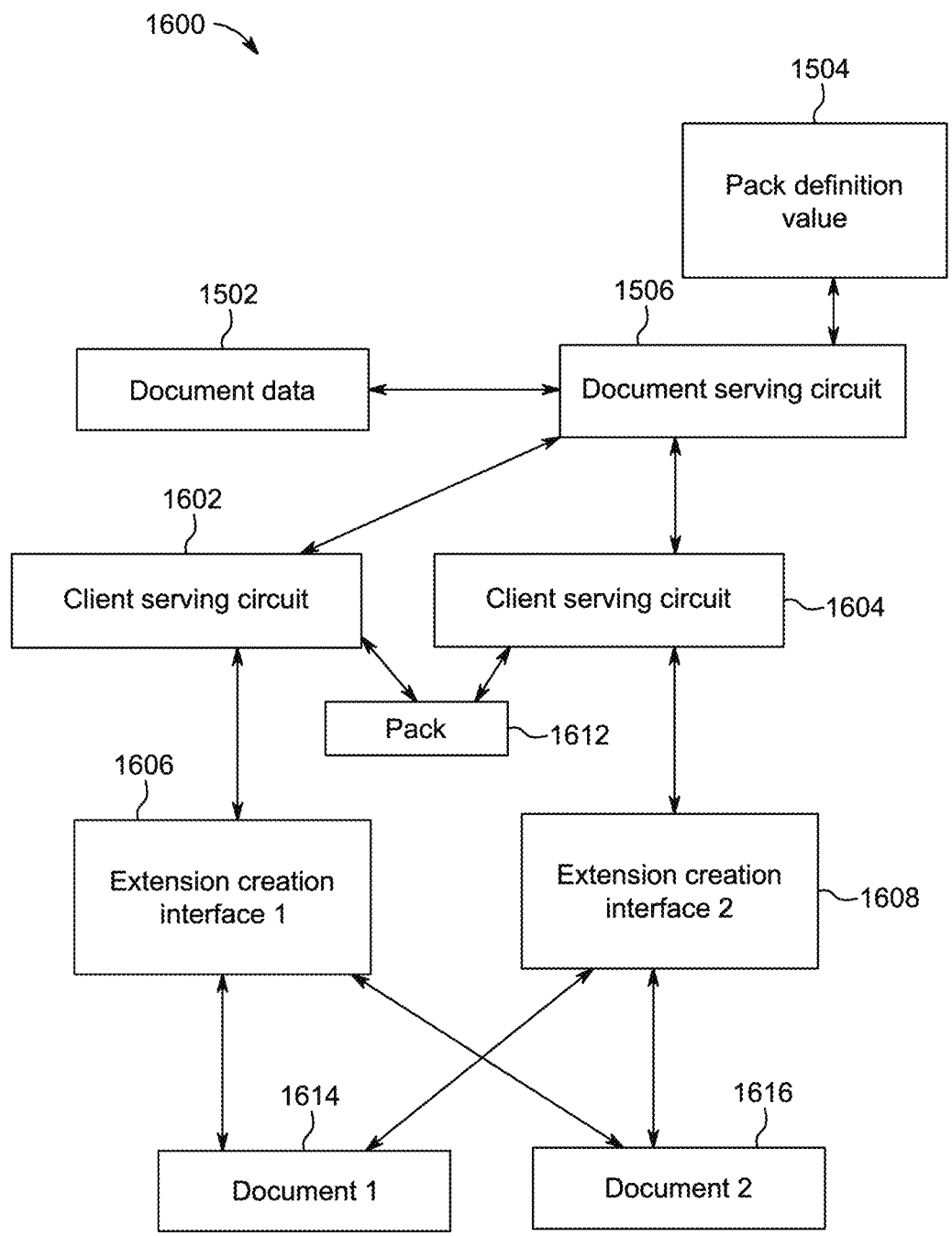
FIG. 16 is a schematic diagram of a system for pack implementation.

Referencing FIG. 16, an example system 1600 may include a plurality of client serving circuits such as a first client serving circuit 1602 and a second client serving circuit 1604 structured to access a pack 1612. Each client serving circuit 1602, 1604 may be structured to implement an extension utilization interface 1606, 1608, and to incorporate at least a portion of the pack 1612 into a first document 1614 and a second document 1616 in response to user interactions with the extension utilization interface. The documents 1614, 1616 may be associated with the workspace. In embodiments, the document serving circuit 1506 may be further structured to isolate the access authorization description from the second client serving circuit 1604 and the first client serving circuit 1602.

Figure 17:
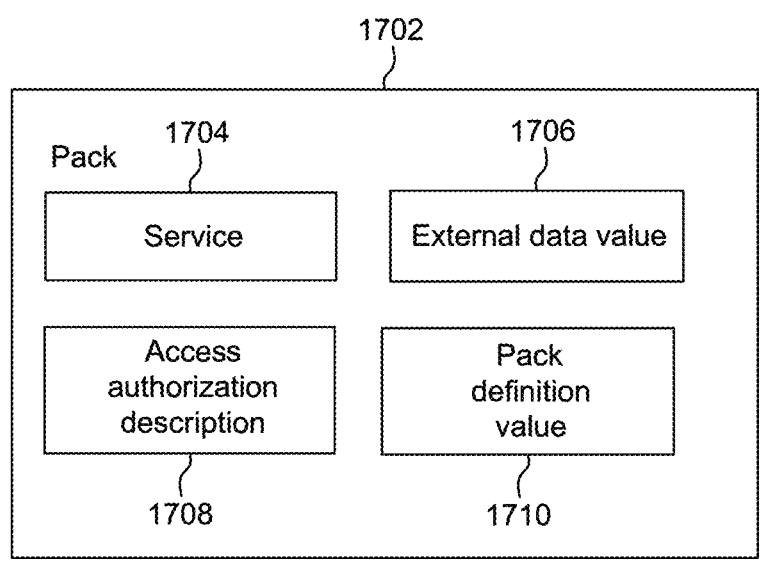
FIG. 17 is a schematic diagram of a pack.

Referencing FIG. 17, an example pack 1702 may include at least one of a service 1704 or an external data value 1706. The pack 1702 may include and wherein the access authorization description 1708 that may include authorization information for access to the at least one of the service 1704 or the external data value 1706. The pack may include a pack definition value 1710 comprises a formula. The formula may include at least one of: a unified document surface interface formula; a code based formula; a third party formula; or a column formula. The pack definition value may include an external data access value. The external data access value may include at least one of: an authorized data access; a third party data access; an external data value determined at a time of creating the pack implementation value; or an external data value determined at a time of accessing the pack definition value. In embodiments, the pack definition value 1710 may include at least one of: a formula; an action; a format; or a table.

In embodiments, the extension creation interface 1512 may include a software development kit (SDK) layer. The pack implementation value may include an arbitrary code component. In embodiments, the document serving circuit 1506 may be structured to determine the pack definition value 1504 by isolating operations of the arbitrary code component from at least one of the client serving circuit 1508 or the document serving circuit 1506. In embodiments, the document serving circuit 1506 may be further structured to determine the pack implementation value 1514 by operating a virtual machine to execute the arbitrary code component. The document serving circuit 1506 may be further structured to determine the pack definition value 1504 by operating the virtual machine on a workflow serving circuit.

In embodiments, the document serving circuit 1506 may be further structured to perform, in response to determining an update to the pack implementation value comprises an incompatibility risk, at least one operation selected from the operations consisting of providing an incompatibility warning value to the client device; providing an update option value to a second client serving circuit accessing a document utilizing a pack exposed to a workspace in response to the pack definition value; or providing an update delay value to a second client serving circuit accessing a document utilizing a pack exposed to a workspace in response to the pack definition value.

The document serving circuit 1506 may be structured to implement a sandbox interface 1516 as a part of the extension creation interface 1512, and to provide a calculated output value to the client device in response to user interactions with the sandbox interface 1516. The document serving circuit 1506 may be further structured to operate an external data access authorization in response an access credential supplied by the user to the sandbox interface 1516. The document serving circuit 1506 may be further structured to store the access credential in a local hidden file of the client device. The access authorization description may include an authorization type for each one of a service or an external data access of the pack. The document serving circuit 1506 may be further structured to require authorization information for the service or the external data access from a second user of a second document utilizing the pack in response to the authorization type comprising a user authorization type. The document serving circuit 1506 may be further structured to access the service or the external data access using separate credentials from the required authorization information. The document serving circuit 1506 may be further structured to provide access to the service or the external data access to the second user of the second document utilizing the pack in response to the authorization type comprising a system authorization type.

In embodiments, the document serving circuit 1506 may be further structured to perform a validation of the pack definition value 1504, and to create a pack in response to the pack definition value and the validation. The document serving circuit may be further structured to perform a validation of the pack definition value 1504, and to provide a notification to the extension creation interface 1512 in response to the validation indicating a pack error. The pack error may include at least one error selected from the errors consisting of: a formula error, an authorization error, or a code operation error.

The extension creation interface 1512 may include an assistance interface 1518. The assistance interface 1518 further may include at least one of: a tooltip associated with at least one of: a component of the extension creation interface, a formula command, or a text value; a description value associated with at least one of: a component of the extension creation interface, a formula command, or a text value; or a code example associated with at least one of: a component of the extension creation interface, a formula command, or a text value. The extension creation interface 1512 may be configured to limit access to the external data access value to a defined external data component of the extension creation interface 1512.

Figure 18:
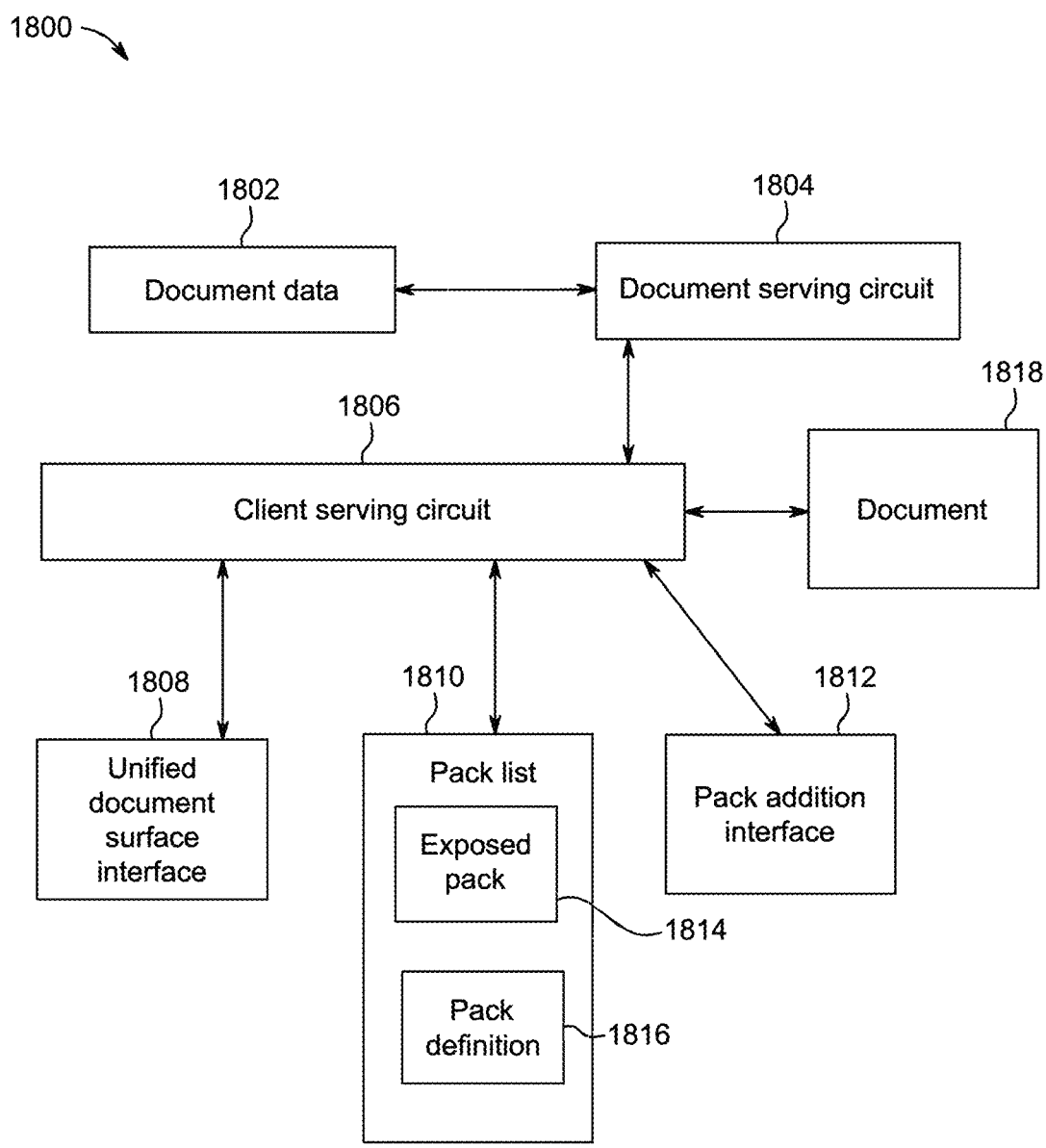
FIG. 18 is a schematic diagram of a system for pack execution.

Referencing FIG. 18, an example system 1800 includes a document serving circuit 1804 structured to access a document data 1802. The document data may include data for a unified document surface, and to provide at least a portion of the document data 1802 to a client serving circuit 1806. The client serving circuit 1806 may be structured to: implement a unified document surface interface 1808 in response to the at least a portion of the document data 1802. The client serving circuit 1806 may be further structured to access a pack list 1810, the pack list may include a plurality of exposed packs 1814. Each exposed pack may include a capability extension created in response to a corresponding pack definition value 1816. The client serving circuit 1806 may be further structured to implement a pack addition interface 1812 in response to the pack list 1810 and install at least a portion of a pack of the plurality of exposed packs 1814 into a document 1818. The document 1818 may include at least a portion of the document data 1802, in response to user interactions with the pack addition interface 1812. In embodiments, the user interactions may include a drag and drop operation of the pack to the document 1818.

In embodiments, the pack may include at least one of: a formula; an action; a format; a table; a unified document surface interface formula; a code based formula; a third party formula; a column formula; a text flow; an arbitrary code component; or a template.

The pack may include one of a service or an external data access value. The one of the service or the external data access value may include an authorized service or external data access value. The authorized service or external data access value may include a system authorized service or external data access value. The document serving circuit 1804 may provide access to the service or external data access value without further authorization operations from a user of the unified document surface interface 1808. The document serving circuit 1804 may isolate authorization information for the authorized service or external data access value from a client device displaying the document.

In embodiments, an authorized service or external data access value may include a user authorized service or external data access value. The document serving circuit 1804 may provide access to the service or eternal data access value in response to authorization credentials supplied by a user of the unified document surface interface 1808. The document serving circuit 1804 may access the authorized service or external data access value using distinct credentials from the authorization credentials supplied by the user of the unified document surface interface 1808.

Figure 19:
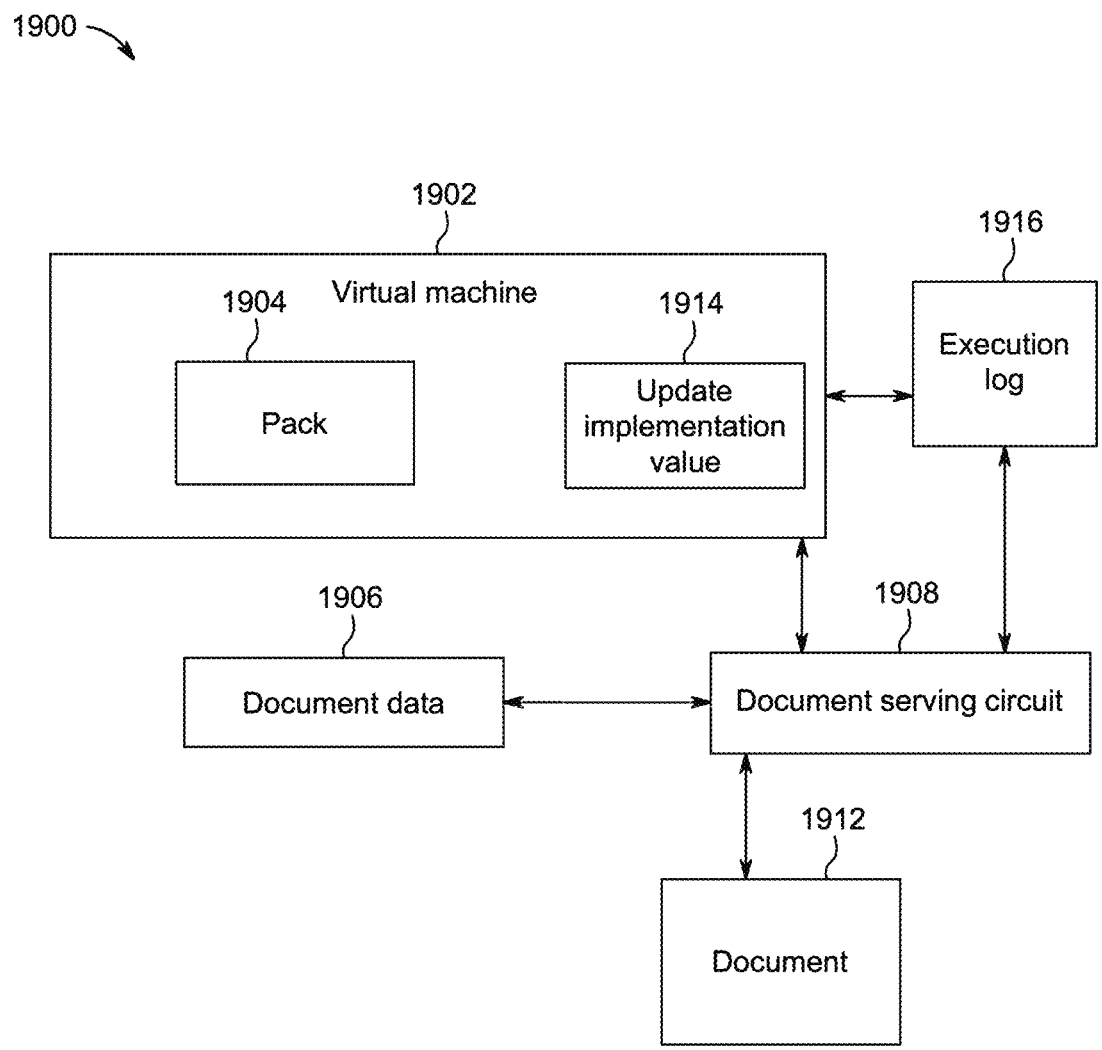
FIG. 19 is a schematic diagram of a system for pack execution.

Referencing FIG. 19, an example system 1900 includes a document serving circuit 1908 that may be configured to command execution of operations of the pack 1904 on at least one of a separate workflow server or a virtual machine 1902. A corresponding pack definition value may include an update implementation value 1914. The document serving circuit KJJK908 may update the document 1912 in response to an update of the pack 1904 and the update implementation value. The update implementation value 1914 may include at least one value selected from the values consisting of: an immediate update value; a timed update value; or an update notification value. The document serving circuit may be further structured to determine an update type value, and to update the document further in response to the update type value. In embodiments, the pack 1904 may include a versioned object, and wherein the document serving circuit 1908 may update the document further in response to a version of the exposed pack and a version of the installed pack in the document 1912. The document serving circuit 1908 may further structured to determine a pack execution log 1916 in response to operations of the document 1912 using the pack 1904, and to expose at least a portion of the pack execution log to an author of the pack. The pack execution log 1916 may include at least one log information element selected from: a number of documents having the pack installed; a number of execution events of components of the pack; an execution time of execution events of components of the pack; a number of service or data access events of components of the pack.

Figure 20:
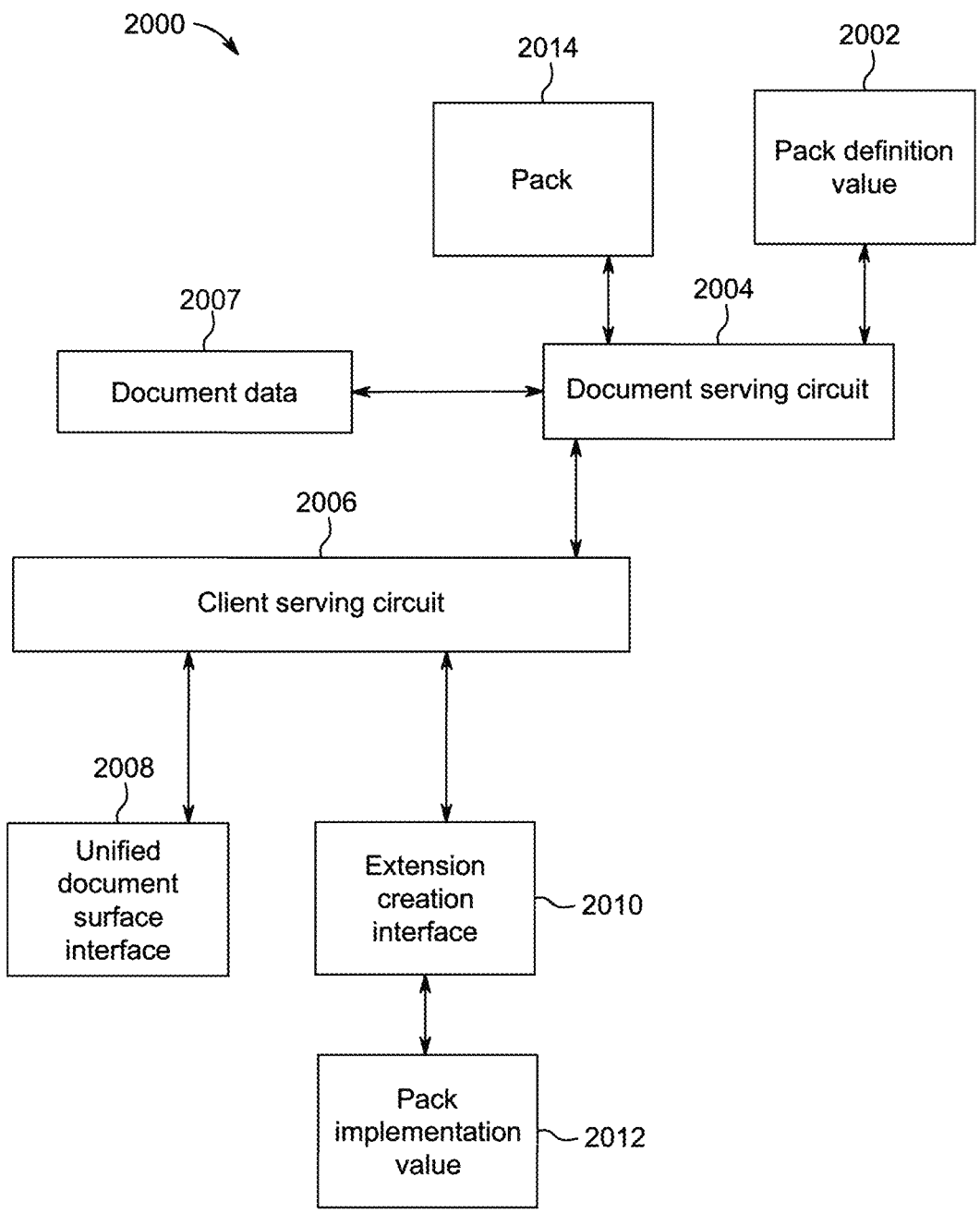
FIG. 20 is a schematic diagram of a system for pack publishing.

Referencing FIG. 20, an example system 2000 includes a document serving circuit 2004 structured to access a document data 2007, the document data comprising data for a unified document surface. The serving circuit may provide least a portion of the document data to a client serving circuit 2006. The client serving circuit 2006 may be structured to implement a unified document surface interface 2008 in response to the at least a portion of the document data. The client serving circuit 2006 may be further structured to implement an extension creation interface 2010 and to provide a pack implementation value 2012 to the document serving circuit 2004 in response to user interactions with the extension creation interface 2010. The document serving circuit 2004 may be further structured to determine a pack definition value 2002 in response to the pack implementation value 2012. The document serving circuit 2004 may be further structured to publish a pack 2014 comprising the pack definition value 2002 in response to a publication request received on the extension creation interface 2010. The definition value may include a publication scope value. The document serving circuit 2004 may be structured to publish the pack 2014 in response to the publication scope value. The publication scope value may include at least one value selected from the values consisting of: a public scope; a workspace scope; a user inclusion scope; or a user exclusion scope. The pack definition value may include a category tag and the document serving circuit 2004 may be structured to publish the pack in response to the category tag.

In embodiments, the client serving circuit 2006 may be structured to access a pack list comprising a plurality of published packs including the pack, and to display selected ones of the pack list to a client device in response to category tags corresponding to each one of the plurality of published packs. The client serving circuit 2006 may be further structured to select the ones of the pack list in response to the category tags. The client serving circuit may be further structured to order the selected ones of the pack list in response to the category tags.

In embodiments, the pack definition value 2002 may include an access cost description and the document serving circuit 2004 may be structured to publish the pack in response to the access cost description. The access cost description may include at least one of: a subscription cost value; an installation cost value; a trial period value; a pack usage document example value; or a usage based cost value. The document serving circuit may be further structured to publish a pack description card in response to the pack definition value. The pack description card may include at least one value selected from the values consisting of: a pack icon; a pack picture; a pack text description; a pack title; a pack author name; a pack author entity; a pack author contact; a utilizing documents list; a pack building block description; or a pack dependency description. The pack definition value may include a unique address for the pack.

Figure 21:
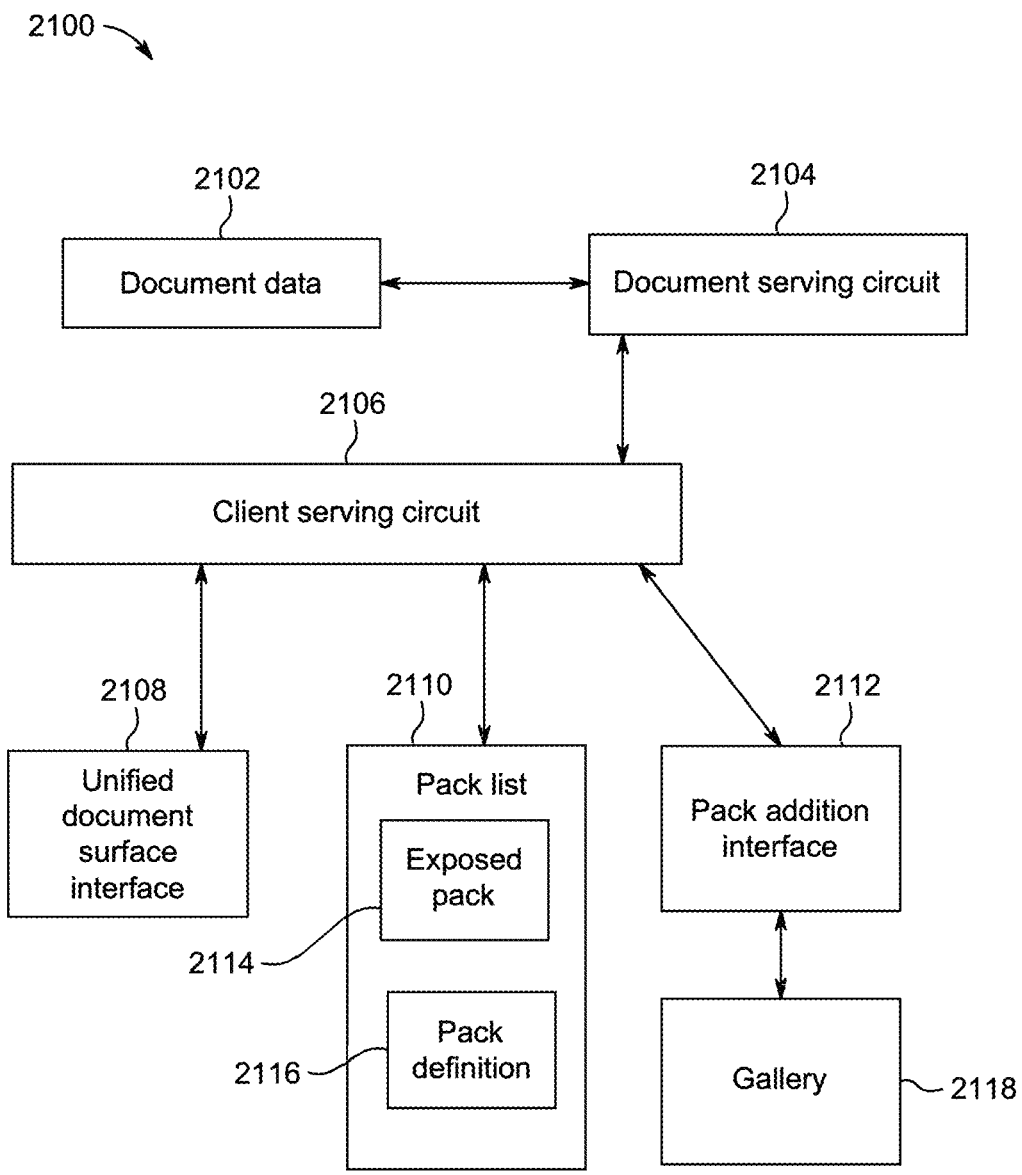
FIG. 21 is a schematic diagram of a system for pack publishing.

Referencing FIG. 21, an example system 2100 includes a document serving circuit 2104 structured to access a document data 2102, the document data comprising data for a unified document surface. The serving circuit may provide least a portion of the document data to a client serving circuit 2106. The client serving circuit 2106 may be structured to implement a unified document surface interface 2108 in response to the at least a portion of the document data, access a pack list 2110 comprising a plurality of published packs 2114, each comprising a capability extension created in response to a corresponding pack definition value 2116. The client serving circuit 2106 may be structured to implement a pack addition interface 2112 comprising a gallery 2118 of at least a portion of the pack list and install at least a portion of a pack from the gallery 2118 in response to user interactions with the pack addition interface. The client serving circuit 2106 may be further structured to select the gallery 2118 from the pack list 2110 in response to a publication scope value corresponding to each of the plurality of published packs 2114. The client serving circuit may be structured to select the gallery 2118 from the pack list 2110 in response to a user search term provided on the pack addition interface 2112. The client serving circuit may be further structured to select the gallery 2118 from the pack list 2110 in response to a category tag corresponding to each of the plurality of published packs 2114. The client serving circuit may be structured to select the gallery 2118 from the pack list 2110 in response to an installation volume description corresponding to each of the plurality of published packs 2114. The client serving circuit may be further structured to select the gallery 2118 from the pack list 2110 in response to an installation trend value corresponding to each of the plurality of published packs 2114. The client serving circuit 2106 maybe further structured to select the gallery 2118 from the pack list 2110 in response to an administrative permissions value corresponding to at least one of the plurality of published packs 2114. The administrative permissions value may include at least one value selected from the value consisting of: a cost permissions value; a building block value; a pack inclusion value; a pack exclusion value; or a pack certification value. The client serving circuit 2106 may be further structured to: provide an administrator notification in response to the user interactions with the pack addition interface; and install the at least a portion of the pack in response to an administrator response authorizing the installation.

Figure 22:
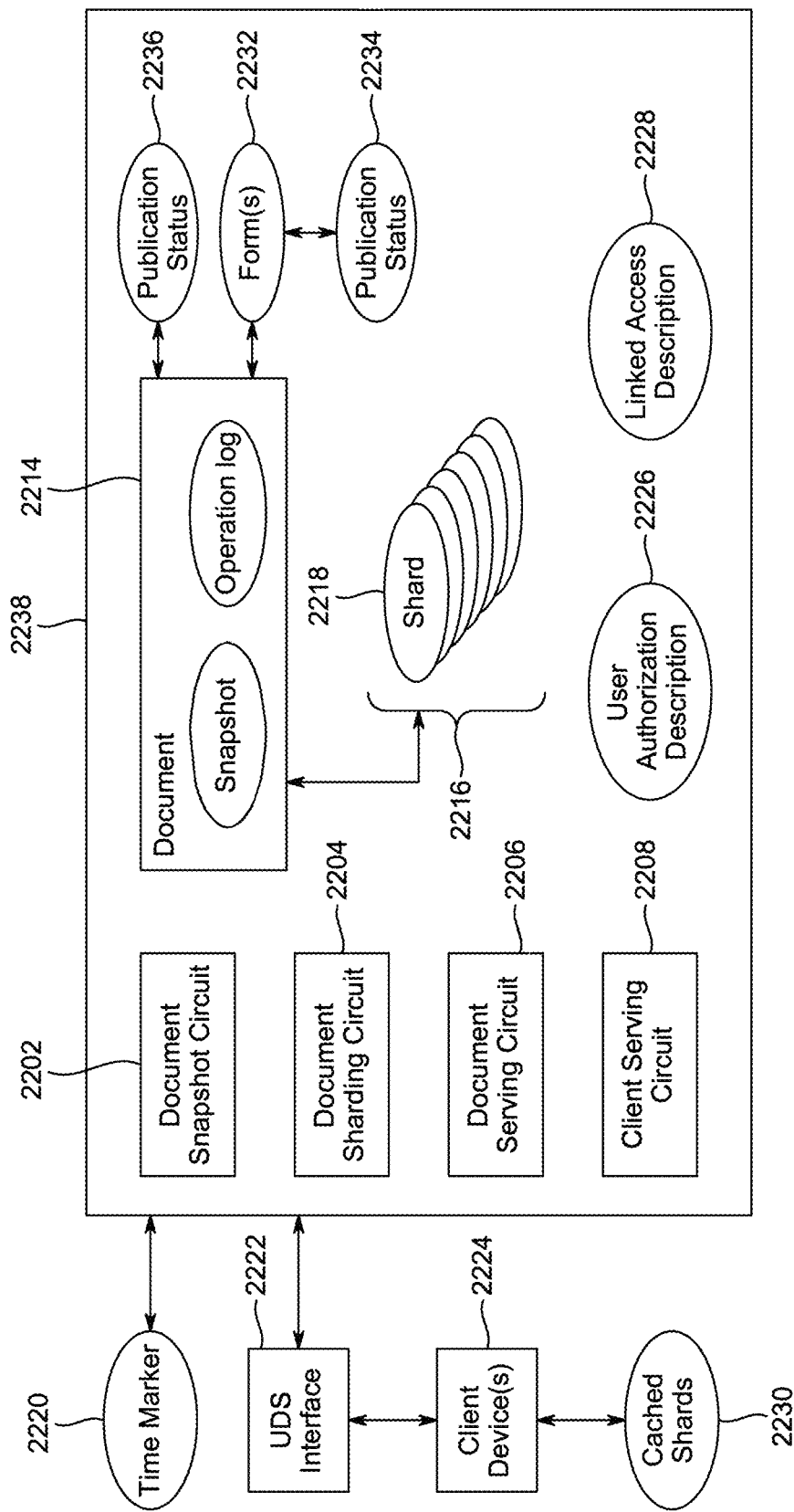
FIG. 22 is a schematic diagram of a controller for providing granular shard support.

Referencing FIG. 22, an example controller 2238 is depicted for providing granular shard support for a unified document surface (UDS). The example controller 2238 includes a document snapshot circuit 2202 structured to generate a document snapshot 2210 configured to capture a state of a document 2214 at a time marker. The time marker may be an actual time value—for example 12 PM on 1 January 202x, or determined in response to an event indicating a snapshot 2210 is to be taken. For example, the snapshot 2210 may be captured in response to a number of edits made to the document, performed according to a periodic schedule (e.g., daily, weekly, hourly, etc.), performed according to a utilization of the document (e.g., increasing snapshot frequency for a heavily used document to reduce a size of the operations log 2212, decreasing snapshot frequency for a heavily used document to reduce interruption of user editing, etc.), performed in response to selected events (e.g., a command to perform the snapshot 2210 by the document serving circuit 2206, by an administrator, in response to the document being published, and/or in response to a form of the document being published). In certain embodiments, for example where no edits have been performed on the document since a last snapshot event, the document snapshot circuit 2202 may omit creating a new snapshot 2210, where operations to generate the snapshot 2210 are considered to be omitted, or considered to be completed by a confirmation operation that the snapshot 2210 is not needed.

The example controller 2238 further includes a document sharding circuit 2204 that analyzes the document snapshot 2210, and generates a first plurality of shard documents (e.g., shard group 2216 of shards 2218), where the shard group 2216 captures the state of the document at the time marker. The example operation updates the shard group 2216 at the same time as the snapshot 2210, and/or updates the shard group 2216 after the snapshot 2210, using the snapshot 2210 and/or further considering any operations that may be present on the operations log 2212 in the lapsed time since the snapshot 2210 was created. It will be noted that the snapshot 2210 captures the state of the document, for example creating a store of operations that, if performed, would create the document as it existed at the time marker. However, for example where a user is actively editing the document during the operations of the document snapshot circuit 2202 to capture the snapshot 2210, the operations log 2212 may include operations that are not reflected in the snapshot 2210, even at the time the snapshot 2210 is completed. Accordingly, it can be considered that the snapshot 2210 having all operations except those on the operations log 2212 has captured the state of the document, and/or it can be considered that the operations log 2212 is a part of the snapshot 2210. The specific terminology in this regard is not limiting. Further, the shards 2218 may be generated directly from the snapshot 2210, or generated from the snapshot 2210 combined with the operations log 2212. Accordingly, it can be considered that the shard group 2216 having all operations except those on the operations log 2212 has captured the state of the document, and/or it can be considered that the operations log 2212 is a part of the shard group 2216. The description of the shard group 2216 in the example of FIG. 22 is not limiting. For example, the shard group 2216, in certain embodiments, does not fully capture the state of the document, but instead may be configured to support a specific shard scheme. In another example, the shard group 2216 is depicted as separate from the snapshot 2210, but the snapshot 2210 may be embodied as a shard group 2216 instead of as a separate, complete data structure.

The example controller 2238 includes a document serving circuit 2206 structured to access the first plurality of shard documents 2216, and provides at least a subset of the first plurality of shard documents 2216 to a client serving circuit 2208. For example, a shard scheme may indicate that one or more of the shards 2218 should be provided first when a user accesses the document, for example a critical shard and/or a schema shard, with other shards 2218 provided later, or withheld unless and/or until user interactions with the document 2214 indicate that those shards 2218 should also be communicated. The provision of shards 2218 to the client serving circuit 2208, including the rate, order, and/or priority of the shards 2218, will be regulated by the relevant shard scheme, operations of the user on the document 2214, and/or as limited by available system resources such as communication bandwidth, intermediate memory storage, or the like.

The example controller 2238 includes a client serving circuit 2208 that implements a UDS interface 2222 in response to at least a subset of the first plurality of shard document 2216. For example, the UDS interface 2222 may embodied, in whole or part, as an application operating on a client device 2224, which may be a dedicated application (e.g., a proprietary program operating on the client device 2224), a mobile application (e.g., an application on a phone or tablet), as a web portal (e.g., as a terminal-like interface with the client device operating as a client), and/or as an application running within a generalized application (e.g., as executable instructions such as Javascript running in a web browser). The distribution of the support elements to operate the UDS interface 2222 may thus be distributed between the client device 2224 (e.g., the client side) and the controller 2238 (e.g., the server side). The document 2214 is provided as data from the controller 2238 to the UDS interface 2222, and thus the document data is stored on the server, and provided in whole or part (e.g., at least the displayed elements on the UDS interface 2222 must be present on the client device 2224), but the supporting operations to determine user inputs and edits, to display menus, to execute formulas, to provide referencing and/or look-up information, and the like may be distributed between the client device 2224 and the controller 2238, and/or present only on either the client device 2224 or the controller 2238. In certain embodiments, the UDS interface 2222 is the document surface where the user can view and/or edit documents 2214, and further is the surface where interactive elements such as menus, command buttons, formula entries, data fields, and the like can be operated and/or executed by the user.

An example controller 2238 includes the subset of the shard group 2216 being selected based on properties of the document 2214, properties of a client device 2224 displaying the UDS interface 2222 to a user, and/or properties of a communication network (not shown) between the client device 2224 and the document serving circuit 2206. Without limitation to any other aspect of the present disclosure, document properties that may be considered to select a subset of the shard group 2216 include the overall size (e.g., amount of data) within the document, access locations that are typically viewed and/or edited by users within the document, the dependency of portions of the document on other portions of the document (e.g., from referencing data, formula dependencies, etc.). Without limitation to any other aspect of the present disclosure, client device properties that may be considered to select a subset of the shard group 2216 include display characteristics of the client device (e.g., screen size, resolution, color palette, display type, etc.), memory availability of the client device (e.g., buffers, total RAM, cache availability, paged memory availability, etc., which may be limited by the physical memory of the client device, quotas on the client device for the user, and/or constraints imposed by applications and/or an operating system (OS) of the client device), processing resources on the client device, I/O availability of the client device (e.g., mouse, keyboard, touch screen, voice activation, etc.), and/or an access configuration of the client device (e.g., browser type and version, UDS application version, etc.). Without limitation to any other aspect of the present disclosure, communication network properties that may be considered to select a subset of the shard group 2216 include a bandwidth availability of communications, a latency of communications, data rate limitations of communications (e.g., imposed data rates from a service provider, network resource such as a router, etc.), data amount limitations of communications (e.g., data caps).

An example controller 2238 includes the subset of the shard group 2216 being selected based on a history of requests for the document by a user interacting with the UDS interface 2222, or a frequency of requests for the document by the user. For example, if the user accesses certain portions of the document, edits some portions of the document but only views other portions of the document, tends to view the document during certain time periods and tends to edit the document during other time periods, those aspects can be considered in determining which shards 2218 of the shard group 2216 should be provided, and/or in which order they should be provided. In certain embodiments, a history of requests for the document and/or a frequency of requests for the document may be considered according to the client device 2224 (e.g., where a single device such as a retail support device may be utilized by more than one user), and/or according to a related group of users (e.g., users within a workspace, users associated with a particular entity, and/or users subscribing to and/or utilizing a particular document), for example to provide users with a consistent experience, to improve utilization of controller 2238 resources, and/or to improve performance with the document by utilizing information from multiple users—for example where an occasional user receives the benefit of shard generation, grouping, and delivery operations that have been tuned using the experiences of frequent users and/or a pool of users.

An example controller 2238 includes the document serving circuit 2206 providing the subset of the shard group 2216 in an order determined at least in part based on a history of requests for the document by a client device 2224 displaying the UDS interface 2222, or a frequency of requests for the document by the client device 2224. An example document serving circuit 2206 determines the order for providing the subset of the shard group 2216 based on a last accessed location of the document—for example prioritizing a shard for a user that provides the data for the last accessed location of the document by the user, thereby prioritizing information that the user is likely to utilize soon after accessing the document. In certain embodiments, the document serving circuit 2206 determines the order for providing the subset of the shard group 2216 based on the client device 2224 utilized by the user, for example the document serving circuit 2206 may determine that the user is likely to access LOCATION A within the document when using a first device (e.g., a desktop computer), and to access LOCATION B within the document when using a second device (e.g., a mobile phone), thereby providing the shard most likely to improve the user experience based on the user device. In certain embodiments, the document serving circuit 2206 further determines the order of providing shards of the shard group 2216 in response to a statistical analysis of access locations (e.g., determining a frequency of access locations, a change over time of access locations, a number of access locations that cover most access events, with a single purpose-built shard to support these being provided, and/or a group of shards to support these being provided). The statistical analysis may include the user, the client device, and/or associated users or client devices. The statistical analysis may include operations to smooth the sharding provision operations and/or improve the user experience, for example filtering the high access locations (e.g., moving toward a new high access location that is detected incrementally instead of in a single step, in a low-pass filter fashion, and/or moving quickly to a new high access location, for example where the location has changed rapidly and with high confidence, in a high-pass filter fashion), implementing a hysteresis (e.g., to confirm a significant change in access locations has occurred before changing the sharding scheme and/or shard provision order), predicting access locations (e.g., if an access location has been changing over a period of time, for example as a table grows, a project moves to a next phase, etc., where the trajectory for future access locations can be reliably predicted).

An example shard group 2216 includes a schema shard, a critical shard, and/or a data shard. Without limitation to any other aspect of the present disclosure, a schema shard includes display and/or organizing information for a document object, such as a canvas, table, sheet, text flow, or the like. Example schema information includes one or more of: titles and/or headings associated with the object, column names associated with the object, object reference names (e.g., for utilization in a formula language associated with the UDS interface 2222), column widths, row heights, layout information (e.g., margins, spacing, alignment, etc.), and/or referenced objects (e.g., formulas utilized, linked tables or other information, external data and/or services utilized, etc.). In certain embodiments, a schema shard may be provided for the whole document, for a single object (e.g., a canvas or a table), for a group of objects (e.g., a single canvas shard for all canvases), and/or combinations of these. In certain embodiments, the utilization of a schema shard supports pre-rendering of the document (e.g., displaying important information and displaying the document to the user that gives the user a stable sense of how the document, table, canvas, etc. is laid out, and reducing undesirable behavior like shifting of buttons, table locations, or other interface elements after initial display), reduces computing resources required to support the document (e.g., checks for authorization of the user to objects of the document, checking dependencies within the document between document sections, objects, and/or between shards), and/or provides for additional options in developing shard strategies that result in improved performance for the user and/or the controller 2238. Without limitation to any other aspect of the present disclosure, a critical shard includes minimal information about the document to begin the process of rendering the document and orienting the user to the document within the UDS interface 2222. Example critical information includes one or more of: high level document information such as a title, page count, canvas count, permissions required to access the document and/or objects within the document, document sizing information (e.g., width, margins, alignment, etc.). In certain embodiments, the critical shard may include schema information for important document objects, such as canvases, a page one schema (e.g., a schema for the first location within the document that the user will see, and/or that users are likely to access), or the like. In certain embodiments, the critical shard and a schema shard may be the same shard, and/or may include some of the same information. Example data information includes one or more of: text within a text flow, row data for a table, chart depictions and/or chart data, or the like. In certain embodiments, the data shard may additionally or alternatively include the schema information, and/or the data shard may include information associating the data shard with one or more critical shards and/or schema shards. In certain embodiments, the shard group 2216 includes a number of data shards, for example with a data shard for each table, for each canvas, or the like. In certain embodiments, the shard group 2216 includes a data shard with all data for the document. In certain embodiments, the shard group 2216 includes data shards provided to have a consistent size, for example breaking up data for a large table into several data shards, and/or combining data for a number of smaller tables into a single data shard. The example including shard types of a critical shard, schema shard, and/or data shard is non-limiting, and other shard types may be present in addition to, or as an alternative to, the example.

An example document sharding circuit 2204 analyzes the document snapshot and determines a second plurality of shard documents (e.g., a second shard group 2216—not shown independently), where the second shard group 2216 capture at least a portion of the state of the document 2214 at the time marker, where the second plurality of shard documents is different from the first plurality of shard documents. For example, the second shard group 2216 may implement a distinct sharding scheme relative to the first shard group 2216. In certain embodiments, the scope of document coverage of the first shard group and the second shard group may be distinct—for example where the first shard group includes data for a table of the document that is not present in the second shard group. In certain embodiments, even where the scope of document coverage of the first shard group and the second shard group is the same (e.g., where both shard groups include all of the data for the document), the shard groups may be distinct—for example with different distribution of document information between shards, a greater redundancy of document data present in one shard group relative to the other shard group, and/or where the shards of each shard group are provided to the client serving circuit 2208 in a different order or priority for each shard group. An example document serving circuit 2206 accesses both (or all) of the shard groups, and provides at least a subset of the shards from a selected shard group to the client serving circuit 2208. An example document serving circuit 2206 provides at least a subset of shards from the selected shard group based on determined properties of the client device 2224, based on the user, based on an entity of the user, based on an access configuration, and/or based on any considerations set forth throughout the present disclosure, for example in relation to a shard scheme, shard strategy, or shard recipe.

Example and non-limiting shards 2218 for the shard group 2216, for example generated by the document sharding circuit 2204 or the document serving circuit 2206 (e.g., by commanding the document sharding circuit 2204), include one or more of: a shard for each canvas in the document, a shard for each table in the document, a critical shard, a schema shard, a data shard, combinations of these, and/or multiples of one or more of these.

An example document serving circuit 2206 identifies a critical shard, and prioritizes providing the critical shard to the client serving circuit 2208, for example to initiate (and/or expedite) rendering of the document on the client device 2224. An example document serving circuit 2206 identifies cached shard documents on the client device 2224 (and/or on the client serving circuit 2208, for example where at least a portion of the client serving circuit 2208 is positioned on the client device 2224, and/or where the client serving circuit 2208 determines the cached shards 2230 and provides a list of the cached shards 2230 to the document serving circuit 2206).

An example document sharding circuit 2204 generates the shard group 2216 in response to a user authorization description 2226 for the document 2214, for example identifying portions of the document that are not accessible to the user and accordingly do not need shard support for that user, and/or to segregate document portions that require some further authorization (e.g., a login for external data access), which may provide extra time for the client serving circuit 2208 before the relevant document portions would need rendering, even if accessed by the user. An example document sharding circuit 2204 further generates the shard group 2216 in response to a linked access description 2228 for the document 2214, for example a link access from a website, another document accessible to the UDS platform and/or controller 2238, and/or a link access that is determined in response to linking events for users accessing the document (e.g., where a linking source can be determined when a user accesses the document from such links). Example benefits of the shard group 2216 generated in response to a linked access description 2228 allow for operations such as: prioritizing common locations within the document that are likely to be accessed (e.g., due to users exercising the link); creating a dedicated shard for the linked-to portions of the document and/or for related portions (e.g., a table that is visible from the linked-to location, and/or a deep link location in the document, such as another location in the document that is linked to from the original linked-to location determined from the linked access description 2228). In certain embodiments, the number of linking documents, the number of authorized users for a document or relevant portions of the document, and/or the number of link events actually observed may be utilized to determine and generate the shard group 2216.

An example document 2214 includes a form 2232 (e.g., reference FIGS. 32-33 and the related descriptions), where the document sharding circuit 2204 generates the shard group 2216 in response to the form 2232—for example ensuring that a shard supporting and/or implementing the form 2232 is present in the shard group 2216, and/or generating a dedicated shard 2218 that supports and/or implements the form. In certain embodiments, the form 2232 may be an inline form, for example appearing within the document on a table, canvas, or other document object, where another user can interact directly with the form 2232 within the document 2214. In certain embodiments, an inline form may be utilized for documents 2214 that are shared internally within a workspace (e.g., where it does not matter if users interacting with the form and/or submitting data on the form have access to the rest of the document 2214), for documents 2214 with strong partial document access control (e.g., where an address to the form directs a user to the document section or object(s) implementing the form, but the remainder of the document 2214 can be protected from viewing and/or editing for those users), and/or where the form 2232 is not published, allowing the user in control of the document 2214 (e.g., the author, and/or an authorized user) to preview the form without creating a published version of the form. In certain embodiments, the form 2232 is a segregated form, for example a form 2232 that is rendered as a standalone object from the document 2214, which may be considered as a separate document, a child document, and/or a subsidiary document. For example, and without limitation to any other aspect of the present disclosure, publication of a form 2232 for the document 2214 may create a separate address (e.g., a URL) dedicated to the form 2232, where a user accessing that separate address can enter data onto the form and submit the form, but does not otherwise see the document 2214 and may not even be aware of the existence of the document 2214. In certain embodiments, the document sharding circuit 2204 generates the shard group 2216 in response to a publication status 2234 of the form 2232, for example creating a dedicated form shard if the form 2232 is published, and/or changing a priority among the shard group 2216 depending upon whether the form is published or unpublished. In certain embodiments, whether a form 2232 is an inline form or a segregated form, the publication status 2234 of the form may be considered a type of linked access description 2228, for example where the publication status 2234 indicates that other users can access and submit the form 2232, the form 2232 becomes a likely landing location within the document 2214 for other users (potentially for many other users, depending upon the scope of publication of the form), providing a lever for efficiency development for shard activity (e.g., shard generation, shard scope, shard priority, and/or distribution of document data among shards) to improve the operations of the controller 2238 (e.g., resource utilization and/or response time) and/or to improve the experience of users of the form 2232, the document 2214, and the UDS platform generally.

A shard, as utilized herein, should be understood broadly. Without limitation to any other aspect of the present disclosure, certain aspects of a shard are described following. In certain descriptions, a shard may be referenced as a shard document or similar terminology. A shard includes a subset of an entire snapshot, where the snapshot provides the information to reproduce a document at a specific time, or at a time marker (e.g., where the time marker is selected to be performed periodically, in response to certain events such as a specific request or command to update the snapshot, and/or in response to edits of the document, access events by users of the document, before document publication, or the like). In certain embodiments, a shard may be created to support a specific object (e.g., a shard supporting an object, such as a table, canvas, text flow, or the like), to support a specific operation (e.g., a shard created to support pre-rendering and/or rapid display of a document, to support certain types of access to the document, such as access by linking documents, access to specific portions of the document, or the like), and/or according to an overall scheme that supports efficient operation of the document, execution of particular features of the document (e.g., support for forms, specific calculation types, and/or dividing up large data sets into manageable elements), and/or overall efficient operation of a platform operating a UDS interface for a large number of users and/or a large corpus of documents.

Each shard is individually a subset of the snapshot, and/or may further include an associated operation log (e.g., to store changes to the document between snapshot events). Each shard may include redundant information with other shards, for example where a first shard captures a table, and a second shard captures a schema for the table (e.g., column counts, column labels and/or reference indicators, size information about the table, rows of the table, and/or columns of the table, etc.). In the example, the first shard and the second shard have redundant information (e.g., the schema information), but the utilization of both shards allows for efficient operation of the document (in terms of utilization of computing resources such as memory, network communications, and/or processing, and/or in terms of user time where the schema shard allows for rapid display of important aspects of the document so the user can begin working with the document before the document is fully populated), while incurring a minimal cost to support these efficiencies. In certain embodiments, shards may be associated in groups to support certain operations related to the document, and/or to create different views of the document available to be used on distinct devices, with distinct users, and/or to support distinct types of operations and/or access related to the document. For example, a group of shards may be created to support user experiences in the context of limited resources, where resource limitations may relate to device hardware (e.g., display sizes and/or types, I/O limitations such as the presence or lack of a keyboard, mouse, or other I/O hardware associated with the device), computing resources (e.g., available memory, connectivity include data rate and/or data caps associated with the device or user), user limitations (e.g., authorization of the user to access or perform certain operations, limited subscriptions to underlying documents, packs, external data or services, etc., that may be utilized by the document), and/or to support inferred or explicit user preferences (e.g., supporting rapid access to certain document features, objects, or locations, prioritizing document responsiveness over resource utilization, or vice versa, etc.).

The utilization of a particular sharding scheme, which may additionally or alternatively be referenced as a group of shards, a shard strategy, or a shard recipe, allows for customized support for users based upon the resource limitations for that user, according to a document experience that is desired by an author of the document and/or a custodian of the UDS interface management (e.g., an operator and/or administrator of the document serving circuit, a controller such as depicted throughout the present disclosure (e.g., controller 2238 of FIG. 22). The sharding scheme includes the shards and sharding logic (e.g., how the document data is divided up and/or supported by shards), the timing to prepare and/or update shards, and/or how the shards are to be delivered to a client device accessing the logic (e.g., the order and timing of shard delivery, which shards are to be delivered every time and which shards may be held until relevant portions of the document are accessed and/or appear likely to be accessed, etc.). In certain embodiments, a distinct sharding scheme may be provided for a first user experience (e.g., the user experience including a user, a particular client device, a particular access configuration, an access location, and/or an access time, etc.), and a second sharding scheme may be provided for a second user experience (e.g., a different user, device, access configuration, access location, and/or access time), where the selection of which sharding scheme is to be utilized for a given user experience may be a part of the overall sharding strategy. In certain embodiments, multiple sharding schemes may be supported at any given time, with appropriate shards created (e.g., by a document sharding circuit) to support all of the sharding schemes contemplated for the document. In certain embodiments, a sharding scheme may be dropped from support (e.g., where user experiences, document characteristics, and/or other factors in the system indicate that a particular sharding scheme is no longer being utilized, is being utilized only at a low frequency, and/or is not providing or no longer providing efficient operations), and/or added for support (e.g., where user experiences, document characteristics, and/or other factors in the system indicate that a new sharding scheme may be indicated, and/or as a part of an iterative improvement process to test sharding schemes for efficiency improvements and/or user experience improvements).

In certain embodiments, a particular group of shards to support a particular sharding scheme may include all document data (e.g., where the group of shards contains all information about the document between the shards), and/or may include a subset of the document data (e.g., where some document data is not within the shards, which may be utilized where the user is not authorized to access certain parts of the document that do not then require support within the group of shards, and/or where the snapshot or shards from a different group of shards can be utilized if the user accesses portions of the document that are not supported within the group of shards). In certain embodiments, at least one shard group may be included that has all of the document data, the snapshot and/or operations log may be kept as the repository of all document data, and/or the entire shard corpus may embody the document data, without any particular group of shards having all of the document data therein. In certain embodiments, certain document data may be provided within multiple shard groups—for example where efficiencies to support the multiple shard groups exceed the cost of storing and managing redundant document data, and/or within multiple independent shards as noted preceding.

In certain embodiments, the snapshot may be embodied as a group of shards, for example a group of shards that define all of the document data (e.g., except operations stored on the operations log), where the snapshot is not stored as a single data element (e.g., a single file or data structure). In certain embodiments, the group of shards embodying the snapshot may not relate to any particular sharding scheme, for example where multiple sharding schemes are present that, between them, include a group of shards having all of the document data, but the group of shards having all of the document data are not associated as a particular sharding scheme. In certain embodiments, a shard may be stored that is not associated with a sharding scheme, for example a shard storing a portion of data for completeness of the snapshot, but where that shard is not utilized in any active sharding scheme. In certain embodiments, for example where the snapshot is embodied as a group of shards, the removal of support for a sharding scheme having a shard that is being utilized as a part of the snapshot, the controller 2238 may preserve the shard when support for the sharding scheme is removed to protect the integrity of the document data. In certain embodiments, the snapshot or another support element for the document, may store a shard management table or other data structure that associates shards to sharding schemes, that notes dependencies between shards (e.g., shard A must be loaded before shard B, for example where shard A includes a table schema and shard B includes data for rows of the table, and/or where shard A includes references or calculations that shard B depends upon), and/or indicates the corpus of shards that embody all of the document data. In certain embodiments, the shard management table or other data structure is updated when sharding schemes are changed, when shard dependencies are changed, and/or when the corpus of shards defining the document data is changed.

Figure 23:
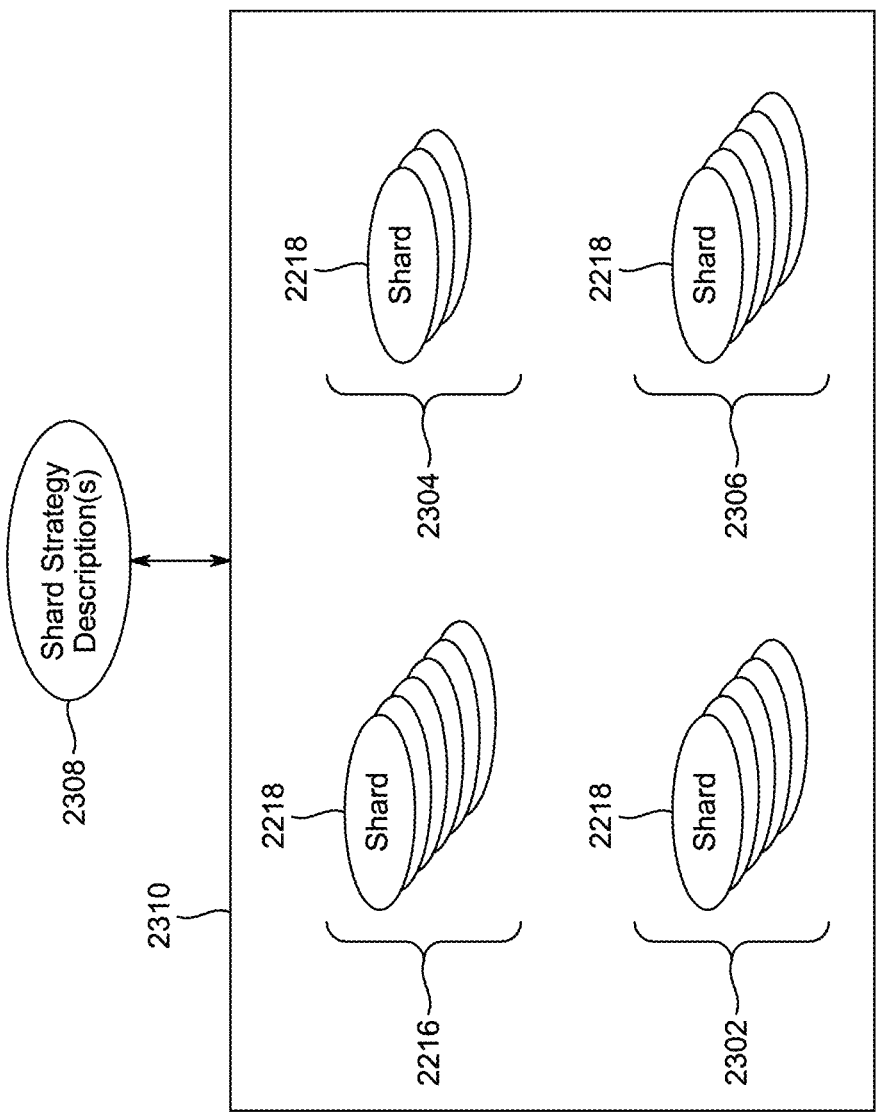
FIG. 23 is a schematic diagram of an example of multiple shard groups.

Referencing FIG. 23, an example of multiple shard groups 2216, 2302, 2304, 2306 is schematically depicted. The example group 2310 of shard groups 2216, 2302, 2304, 2306 may be utilized with any system, controller, platform, or circuit as set forth throughout the present disclosure. In the embodiment of FIG. 23, each of the shard groups 2216, 2302, 2304, 2306 is associated with at least one of a number of shard strategy descriptions 2308. In certain embodiments, the shards 2218 of the shard groups 2216, 2302, 2304, 2306 are generated by a document sharding circuit 2204. The shards 2218 within each group may be unique (e.g., shards 2218 between a first group 2216 and a second group 2304 are distinct files or data elements), and/or shards 2218 may be shared between groups. For example, for a document 2214 where a table shard is created for each table, the shard groups 2216, 2302, 2304, 2306 may include one or more of the table shards, which may be references or pointers to the relevant table shards. In certain embodiments, each shard group 2216, 2302, 2304, 2306 supports a different shard strategy, and a given shard group 2216, 2302, 2304, 2306 may support more than one shard strategy (e.g., where two shard strategies—such as "mobile phone shard strategy" and "tablet shard strategy" result in a same grouping and organization of shards). In certain embodiments, two or more of the shard groups 2216, 2302, 2304, 2306 may include the same shards, but have distinct parameters, such as for shard delivery order and/or shard prioritization. In certain embodiments, even where two shard groups 2216, 2302, 2304, 2306 have the same shards 2218 and the same parameters, it may be useful to keep the two separate shard groups 2216, 2302, 2304, 2306. For example, two shard strategies may result in the same shard implementation (e.g., shard mix, shard content, shard delivery, shard prioritization, etc.) for some document types (e.g., small documents, unpublished documents, and/or documents with a low utilization by users), but drive distinct shard implementations for other document types (e.g., large documents, published documents, and/or highly utilized documents). As the document 2214 can evolve over time, for example growing in size, user base, become published (or withdrawn from publication), and/or external documents, web pages, or the like can link to the document 2214 well after the document 2214 is created, embodiments keeping multiple shard strategies and/or shard groups, even with identical resulting implementations during at least certain portions of the document life cycle, may result in more efficient overall implementations of the UDS platform, controller 2238, document serving circuit 2206, document sharding circuit 2204, or the like. In certain embodiments, technically redundant shard groups 2216, 2302, 2304, 2306 and/or sharding strategies may be removed. In certain embodiments, shard strategies and/or shard groups 2216, 2302, 2304, 2306 may be added as indicated throughout the life cycle of the document 2214, and/or as determined according to periodic analysis of sharding strategies and performance, through the operations of iterative improvement operations of the controller 2238, as determined according to criteria related to the document 2214 that may change overtime, or the like.

In certain embodiments, the document serving circuit 2206 (and/or the document sharding circuit 2204) selects one of the shard strategy descriptions 2308, and provides selected shards from the shard group 2216 (and/or from a corresponding group of shards 2216, 2302, 2304, 2306 for that strategy) to the client serving circuit 2208 in response to the selected shard strategy description 2308. In certain embodiments, the document sharding circuit 2204 generates shards 2218 to support a selected shard strategy description 2308, and/or generates shards 2218 to support multiple, or all, of the shard strategy description(s) 2308. Accordingly, where multiple shard strategy descriptions 2308 are available, they may not all be supported all of the time, for example allowing unused shard strategy descriptions to be unsupported, only supporting a primary shard strategy description, and/or only supporting a few targeted shard strategy descriptions. In certain embodiments, the number of supported shard strategy descriptions 2308 can be adjusted according to the document 2214, events related to the document 2214 (e.g., slow response times, a publication event, a document size threshold, a subscribed or accessing user threshold, etc.).

In certain embodiments, the document serving circuit 2206 (and/or the document sharding circuit 2204) selects one of the shard strategy descriptions 2308 in response to a size of the document, a last accessed location of the document (e.g., for a user, a client device, a recent user, etc.), and/or a selected location of the document (e.g., determined from usage, data density in the document, linking access to the document, landing pages and/or a "page one" for the document, etc.). Accordingly, it can be seen that the supported shard strategy descriptions 2308, and/or the implemented shard strategy descriptions 2308, can be adjusted in real time, and can be tailored to the specific user, specific client device, and/or specific access configuration of the user. In certain embodiments, the document serving circuit 2206 (and/or the document sharding circuit 2204) selects a shard strategy description 2308 in response to a characteristic of a client device 2224 displaying the UDS interface 2222, for example allowing for the selection of a specific strategy that best fits the particular device, including resources available, I/O for the device, and/or resources of the device. In certain embodiments, the document serving circuit 2206 (and/or the document sharding circuit 2204) selects a shard strategy description 2308 in response to one or more of: a user authorization description 2226 for the document 2214, a linked access description 2228 for the document 2214, and/or a publication status of the document (publication status 2236) and/or of a form (publication status 2234).

Figure 24:
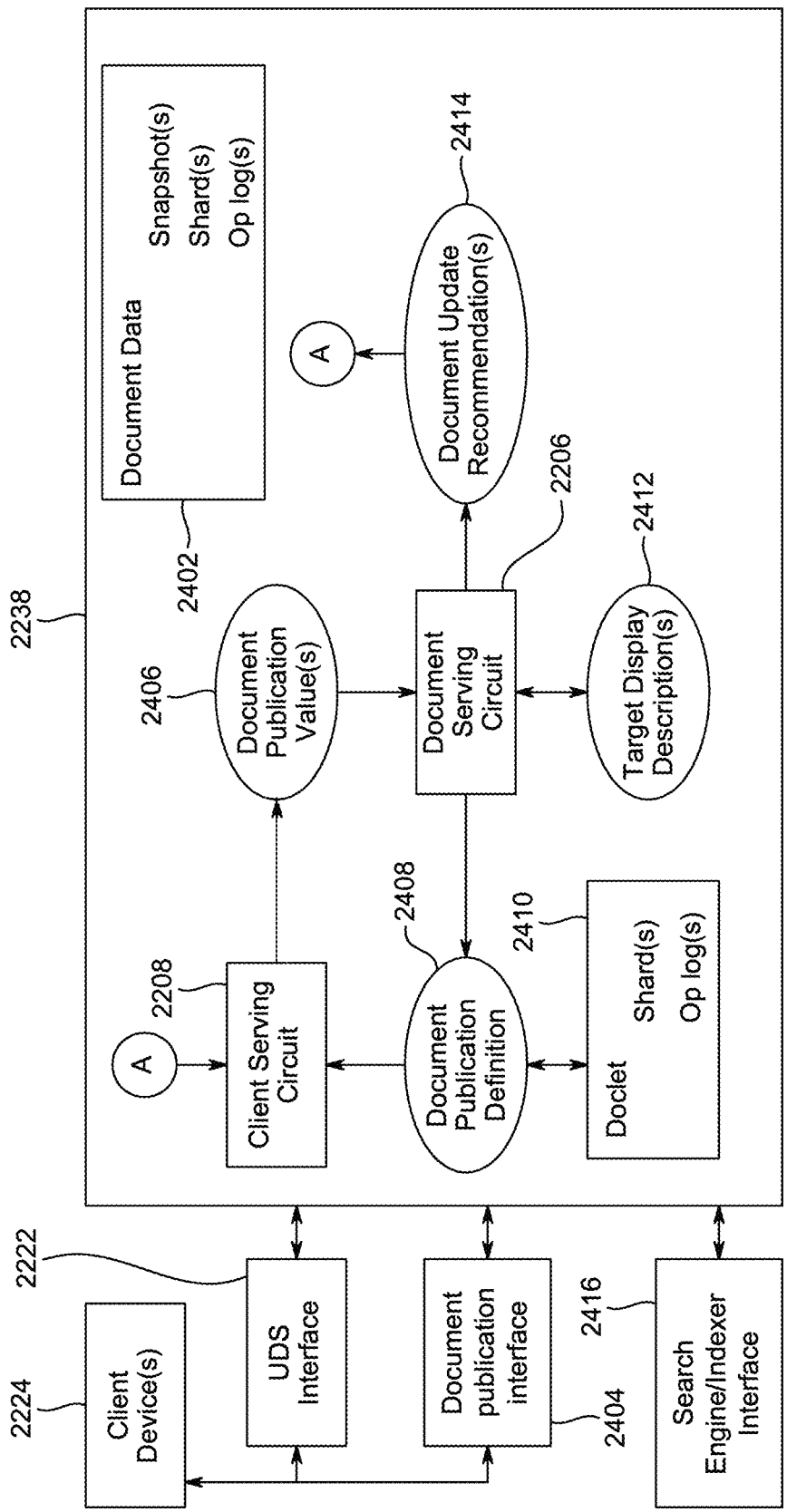
FIG. 24 is a schematic diagram of a controller for providing publication support for a unified document surface.

Referencing FIG. 24, an example controller 2238 is depicted for providing publication support for a unified document surface (UDS). The example controller 2238 includes a document serving circuit 2206 that accesses a document data 2402, which may include snapshot(s), operation log(s), shard(s), and/or other data that, together, defines a document that is accessed by users on a UDS interface 2222 for reading, editing, performing calculations, managing workflows, providing notifications to users, and/or for collaborative editing among a group of users. The example document serving circuit 2206 provides at least a portion of the document data 2402 to a client serving circuit 2208, where the client serving circuit 2208 implements a UDS interface 2222 in response to the provided document data 2402. The example client serving circuit 2208 implements a document publication interface 2404, which may be an overlay onto the UDS interface 2222, an inherent feature of the UDS interface 2222 that is available in relevant circumstances (e.g., through a menu selection, publication button, or other interface that is available when the user is able to publish the document, for example if the user has sufficient permissions, a compliant version of a UDS implementing application, etc.), and/or may be a separate interface from the UDS interface 2222 (e.g., appearing in a separate window). The example client serving circuit 2208 provides a document publication value 2406 in response to user interactions with the document publication interface 2404. Example user interactions with the document publication interface 2404 include option selections (e.g., a publication scope, permissions to access the published document, permissions to edit the published document, selections related to data sharing from a main document that is being published, etc.) and/or data entry values (e.g., a title, description, category tag, accessing address, author information, etc.). In certain embodiments, user interactions with the document publication interface 2404 may include allowing the user to import pictures, identify portions of the document that may be of interest to other operations set forth throughout the present disclosure, and the like. In certain embodiments, the document publication interface 2404 includes a publication execution control, for example a toggle switch (e.g., indicating "published" or "not published"), a button or other control to execute publication, or the like.

In the example, the document publication value 2406 captures relevant information from the user for the publication, including information provided through the user interactions, and which may include default information (e.g., for settings that the user did not specify), automatically generated information (e.g., category tags, external data access implementation for the published document, authorization implementations for the published document, etc.).

The example document serving circuit 2206 determines a document publication definition 2408 in response to the document publication value 2406. In certain embodiments, depending upon the format of the document publication value(s) 2406 and processing of user interactions with the document publication interface 2404 by the client serving circuit 2208, the document publication definition 2408 may be identical to the document publication value 2406, and/or the document publication value 2406 may be used as the document publication definition 2408. In certain embodiments, the document publication value 2406 captures one or more elements of the raw inputs of the user interactions, and the document publication definition 2408 is utilized to implement those elements into actionable code elements for execution of the document publication. The example document publication definition 2408 defines a doclet 2410 determined in response to the document data 2402 and the document publication value 2406. In the example of FIG. 24, a doclet 2410 is an embodiment of the document defined by the document data 2402 for publication, which may not be identical to the main document. For example, the doclet 2410 may have omitted portions of the document, have distinct permissions for access and/or editing (e.g., for the entire document, and/or for portions, objects, or sections thereof), and the like. Accordingly, in certain embodiments, for example where publication of the document merely provides full access to the main document for all purposes, the content of the doclet 2410 and the main document may be the same, and the actual data stored may be identical (e.g., the same data at the same memory locations). In certain embodiments, the doclet 2410 is a distinct, dependent document from the main document, where edits to the main document are reflected in the doclet 2410, and where edits in the doclet 2410 may be unavailable, ignored, and/or may be reflected in the main document, depending upon the permissions applied by the author user (e.g., the user that controls the main document and executed the publication) and/or available to accessing users. In certain embodiments, the doclet 2410 may have a separate shard group and/or operation log relative to the main document. In certain embodiments, the doclet 2410 may share one or more shards and/or operation log with the main document. The term doclet 2410 is used herein for clarity of the description, to reference the as-published document embodied in the document data 2402, but all implementations of the doclet 2410, including where the doclet 2410 and the main document are a same document (and/or effectively a same document), are contemplated herein.

The example document serving circuit 2206 publishes the doclet 2410 in response to a publication request received on the document publication interface 2404 (e.g., an in-line formula command, a publication control and/or button, and/or a setting such as a toggle switch indicating a publication status). Operations to publish the doclet 2410 include, without limitation, making the doclet 2410 available for access to users (e.g., by entering a URL for the doclet 2410), exposing the doclet 2410 to a selected gallery (e.g., a gallery created for a workspace, a gallery created for public access on a website, and/or a gallery created through the UDS platform that is accessed by and/or operated by the controller 2238).

In certain embodiments, the document publication definition 2408 includes a unique address to access the doclet 2410. An example unique address is a URL generated that is specific to the doclet 2410, which may be edited or selected by the publishing user. Any type of address is contemplated herein, for example a unique address on a network (e.g., where the publication is to a workspace or other group of users having access to the network). In certain embodiments, the document publication value 2406 includes at least a portion of the document data 2402 to be included in the doclet 2410, for example with selected tables, text flows, canvases, or other objects selected. In certain embodiments, the doclet 2410 includes all of the document data 2402.

Figure 25:
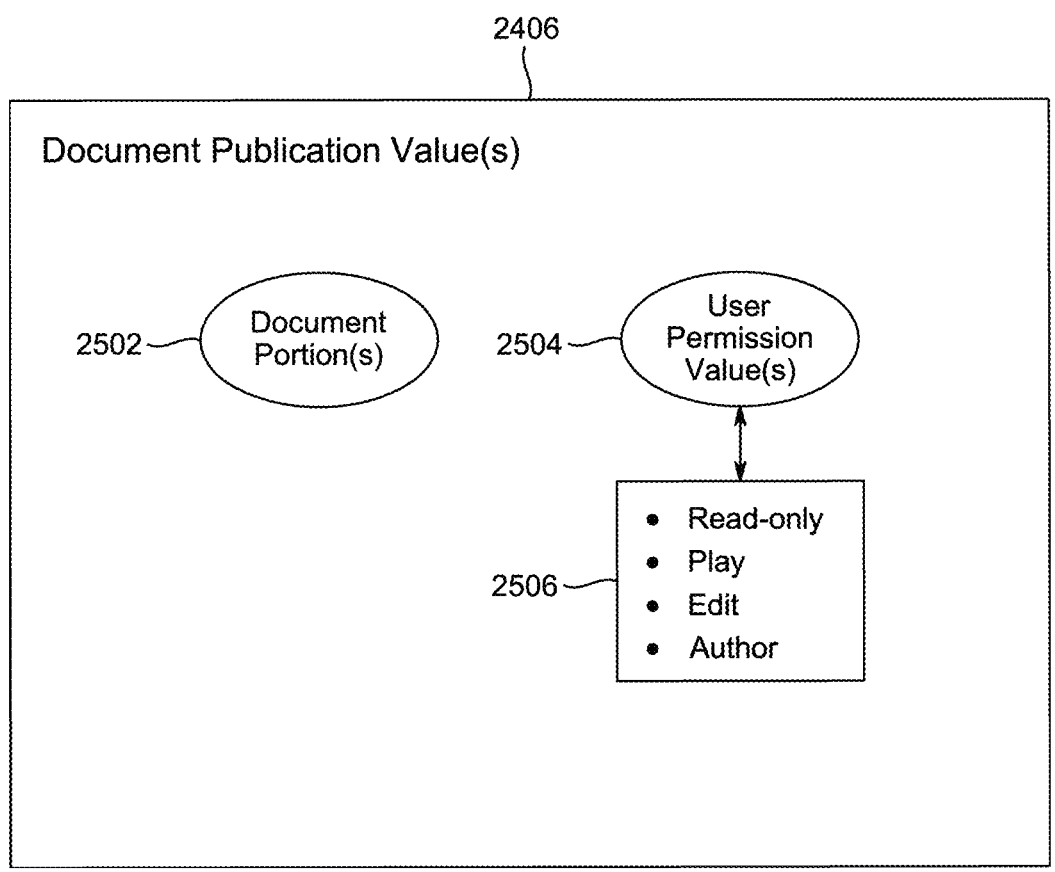
FIG. 25 is a schematic depiction of an example document publication value.

Referencing FIG. 25, an example document publication value 2406 includes a user permissions value 2504, for example defining what operations are available to users of the doclet 2410. The user permissions value 2504 may be specific to users (e.g., a first user has more permissions than a second user), and/or may be specific to portions of the doclet 2410 (e.g., opening a first table up for viewing, but allowing editing for a second table). Additionally or alternatively, the user permissions value 2504 may further include device-specific permissions (e.g., changing access based on a device used to access the document), location specific permissions (e.g., changing access based on a location of the user and/or a client device), and/or other permissions such as subscription permissions (e.g., allowing subscribed users a distinct access from other users), UDS platform permissions (e.g., a user have one version of an interfacing application for the UDS platform having distinct access from another user having a different version—for example to control document access for features of the doclet 2410 that may not be supported in all versions of the interfacing application).

Example and non-limiting access permissions 2506 include read-only access (e.g., allowing the user to view or read the doclet 2410 or relevant portions thereof), play access (e.g., allowing the user to edit the doclet 2410 in a non-persistent manner, for example that is not stored on a doclet 2410 shard or operation log, and not visible to other users), edit access (e.g., allowing the user to make selected edits, such as adding a row to a table, editing selected text flows, etc., but limiting other edit types such as the addition of objects, formulas, tables, and/or editing columns of a table that is present), and/or author access (e.g., allowing author-like editing, such as the addition or deletion of tables, columns, etc., but which may be unlimited, or somewhat limited, for example not allowing edits to protected areas, metadata, disallowing access to analytics or author log information related to the document, etc.). The described permissions 2506 are non-limiting examples to illustrate aspects of the present disclosure.

Referencing FIG. 25, an example user permissions value 2504 includes selective limitations for user interactions with the doclet 2410 based on a user characteristic, such as a user subscription value (e.g., whether the user has paid for specific types of access), a user role (e.g., administrator, super-user, etc.), and/or a user entity (e.g., a user employed at a specific company, that is a member of a specific group, etc.). In certain embodiments, the document publication value 2406 includes a document portion 2502, for example identifying portions of the document (defined by the document data 2402) that are relevant to the publication, such as portions that will be accessible, portions that have associated permissions, and the like.

Figure 26:
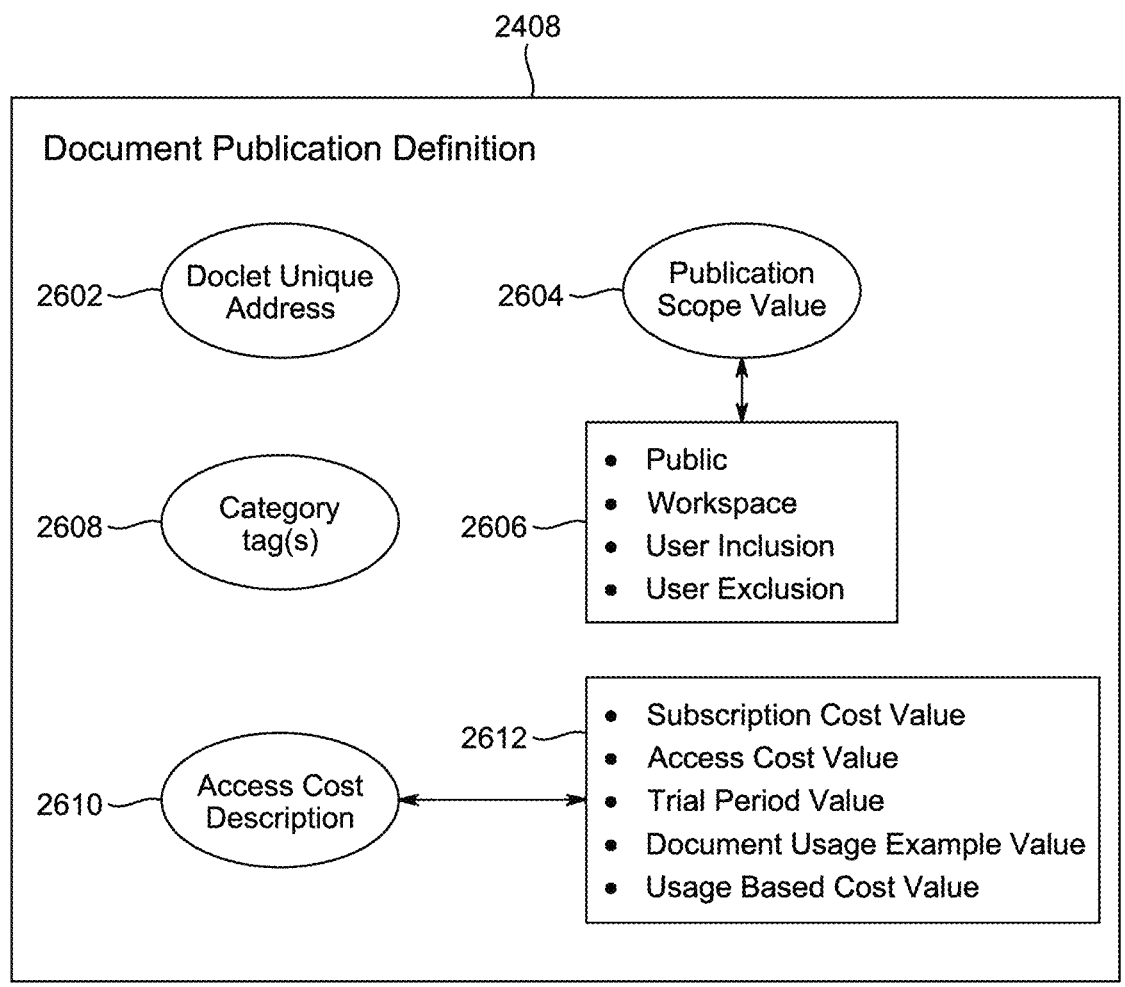
FIG. 26 is a schematic depiction of an example document publication definition.

Referencing FIG. 26, an example document publication definition 2408 includes a publication scope value 2604, for example defining a scope of exposure for the doclet 2410 as published. Example and non-limiting publication scope values 2604 include: a public scope (e.g., the document will be visible and/or accessible to all users of the UDS platform, and/or positioned in publicly available location such as a URL accessible to anyone); a workspace scope (e.g., the document will be visible and/or accessible to a group of related users, for example all users associated with a particular entity, all users associated with a particular department, all users having a specific job title, etc., where the group of related users is a "workspace"); a user inclusion scope (e.g., a list of users that can see and/or access the document); and/or a user exclusion scope (e.g., a list of users that cannot see and/or access the document, regardless of the other scope of the document, at least for user access events under the control of the UDS platform or other implementing platform for the doclet 2410).

An example document publication definition 2408 includes a category tag 2608. In certain embodiments, the category tag 2608 is utilized to find published documents (e.g., allowing a user to search and/or filter documents according to a category tag of the document), provided on a document description (e.g., a document description card and/or description associated with the doclet 2410, for example allowing a user to determine the relevance of the doclet 2410 to what they are looking for), and/or utilized to group relevant documents (e.g., ranking "productivity" documents separately from a global ranking of documents). In certain embodiments, the category tag 2608 may be entered by the publishing user, selected from a list by the publishing user (e.g., to enforce consistent terminology for category tags), and/or applied automatically by the document serving circuit 2206 (e.g., determined at the time of creating the document publication definition 2408, and/or updated periodically). In certain embodiments, category tags may be automatically determined by keyword classification of the document, by category tags of similar documents (e.g., other documents having the same author user, documents using similar terminology, similar title words, and/or similar headings within the document). In certain embodiments, category tags may be applied and/or adjusted by a caretaker of the UDS platform, applied or adjusted in response to user feedback (e.g., through an interface for accessing published documents by users of the doclet 2410). In certain embodiments, category tags may be periodically (e.g., once per month) or episodically (e.g., when a new version of the doclet 2410 is published, in response to edits on the doclet 2410, and/or based on subscriptions of users that are out of sync with the category tags of the doclet 2410, for example where subscribers of the doclet 2410 overwhelmingly subscribe to other documents having different category tags, which may indicate that the category tag for the doclet 2410 may not be informative). In certain embodiments, the document publication definition 2408 includes a single category tag 2608, more than one category tag 2608, and/or weighted category tags (e.g., a primary and multiple secondaries, numerically weighted category tags, and/or categorically weighted category tags).

An example client serving circuit 2208 accesses a document list including a number of published doclets (e.g., all doclets in a gallery implemented by the UDS platform, all doclets associated with a workspace, and/or all doclets available to the user), and displays selected ones of the document list to the client device. An example client serving circuit 2208 selects documents for display based on the category tags 2608, and/or orders the selected ones of the document list based on the category tags 2608.

An example document publication definition 2408 includes an access cost description 2610, for example setting criteria for a cost to access the published doclet 2410. Example access cost descriptions 2610 include members 2612 such as a subscription cost value (e.g., defining a periodic cost for access), an access cost value (e.g., a one-time cost to purchase access), a trial period value (e.g., a period of time where access can be reduced cost or free), a document usage example value (e.g., usage examples of the document, or other documents using the document, that may be made available for a reduced cost, free, for a limited time, and/or with limited functionality, for example to allow users to evaluate the fit of the document to their intended need), and/or a usage based cost value (e.g., a cost per user, a cost per access, a cost per execution event—for example to allow for modeling scenarios using the document, etc.). In certain embodiments, the usage based cost value may include a cost function, for example a per-user cost that can scale or otherwise change based on the number of users. In certain embodiments, access to the document and/or access costs can be controlled at a group level, for example with an administrator of a workspace providing and/or purchasing access to the doclet 2410 for the entire group.

An example document serving circuit 2206 performs a document style check in response to the document publication value 2406. In response to the document style check determining that a change to the doclet 2410 is recommended, the client serving circuit 2208 provides a document update recommendation to the document publication interface 2404. For example, the document serving circuit 2206 may check whether the document follows a best practice (e.g., formatting, header information, chart types, etc., which may be determined from similar popular documents, defined best practices by an entity or administrator associated with the publishing user, and/or defined best practices by a caretaker of the UDS platform), requirements for the document (e.g., disclaimers, word usage, formatting, etc., that may be defined in any manner similar to the best practices), column width or organization values, screen width and/or organization values, and/or types of access provided (e.g., when it appears that sensitive document areas are editable and/or visible, which may be implemented on particular types of formulas, data elements such as personally identifiable information, or the like). In certain embodiments, the document update recommendation may include any one or more of: flagging identified areas without a specific recommendation; making a display size recommendation; making a usage recommendation (e.g., suggesting to hide or protect certain areas of the document); making a formula recommendation (e.g., flagging certain formulas and/or suggesting more robust alternatives); language recommendations (e.g., avoiding or utilizing jargon or specific keywords, and/or adjusting the language literacy level); and/or context-related recommendations (e.g., a setting incongruous with other documents published by the user, public access to a document labeled "confidential", a cost collision such as a free document that utilizes an expensive pack, external data, or external service, etc.).

Figure 27:
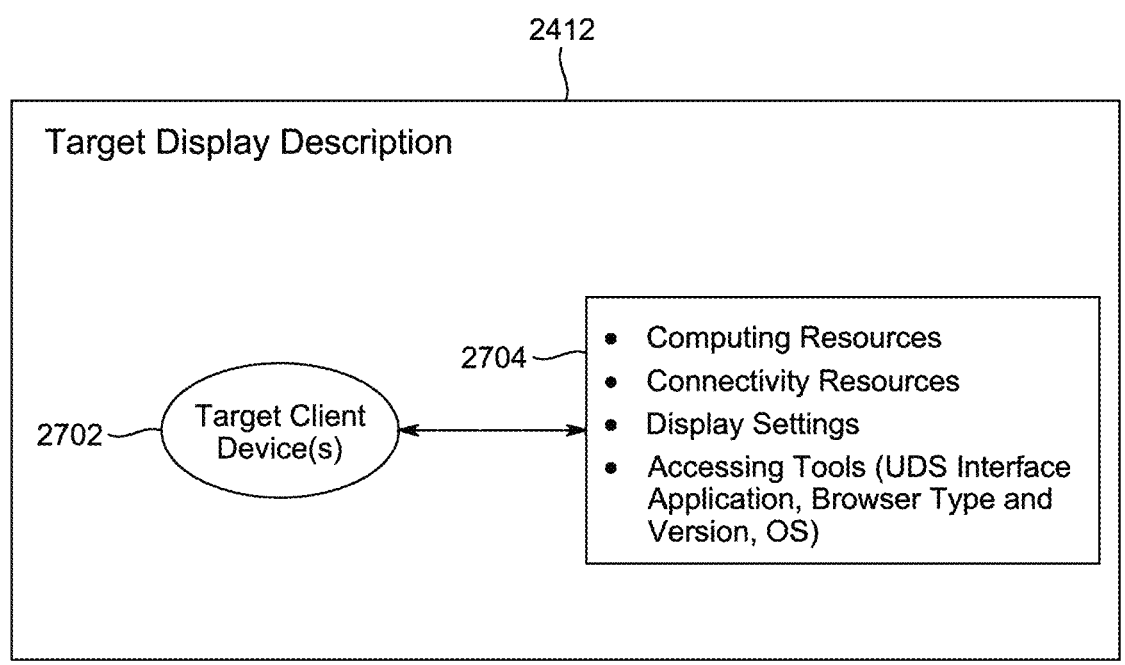
FIG. 27 is a schematic depiction of an example target display description.

An example document serving circuit 2206 performs the document style check in response to a target display description 2412. Referencing FIG. 27, an example target display description 2412 includes one or more target client devices 2702, with associated resources 2704, such as computing resources, connectivity resources, display settings, and/or accessing tools (e.g., a UDS interface application, a browser type, an operating system, and/or versions of these). In certain embodiments, the target display description 2412 may be entered by the publishing user (e.g., to ensure compatibility and/or a good document experience with the selected devices), included as a default list by a caretaker of the UDS platform, and/or defined by an administrator associated with the user. The utilization of the target client devices 2702 allows the document serving circuit 2206 to ensure compatibility and/or a good document experience with a range of client devices, including the implementing applications to access documents on the UDS platform. In certain embodiments, some formulas or other operations may be incompatible with certain operating systems, browsers, applications, and/or versions of these (including at least newly released versions and/or older versions). In certain embodiments, the document serving circuit 2206 flags aspects of the doclet 2410 that are potentially issues, and/or suggests adjustments to the doclet 2410 that result in similar looking document and/or similar functionality.

An example document serving circuit 2206 performs a document prominence check in response to the document publication value 2406, where the client serving circuit 2208 provides a document update recommendation to the document publication interface 2404 in response to the document prominence check indicating that aspects of the doclet 2410 may detract from the doclet 2410 being listed as high as it could be within a gallery, search engine results, or the like. Example operations of the document serving circuit 2206 to perform the document prominence check include, without limitation: keyword selection; document terminology selection; usage a headers in-document; and/or usage of standardized HTML representations for the document (e.g., header terminology and/or arrangement). In certain embodiments, the document update recommendation can include one or more of: recommended category tags, recommended word changes, recommended header changes, and/or recommended chart types or other visualization types. In certain embodiments, the document serving circuit 2206 may include best practices or other expert defined sources, comparisons to other documents that are ranked highly in a gallery and/or search engine results, or the like.

An example document serving circuit 2206 exposes the doclet 2410 to a search engine and/or an indexer (e.g., Google) in response to the publication request. In certain embodiments, the search engine and/or indexer may operate within the scope of a UDS platform (e.g., dedicated to a corpus of documents associated with the UDS platform), and/or external to the UDS platform (e.g., generally available to the internet).

Figure 28:
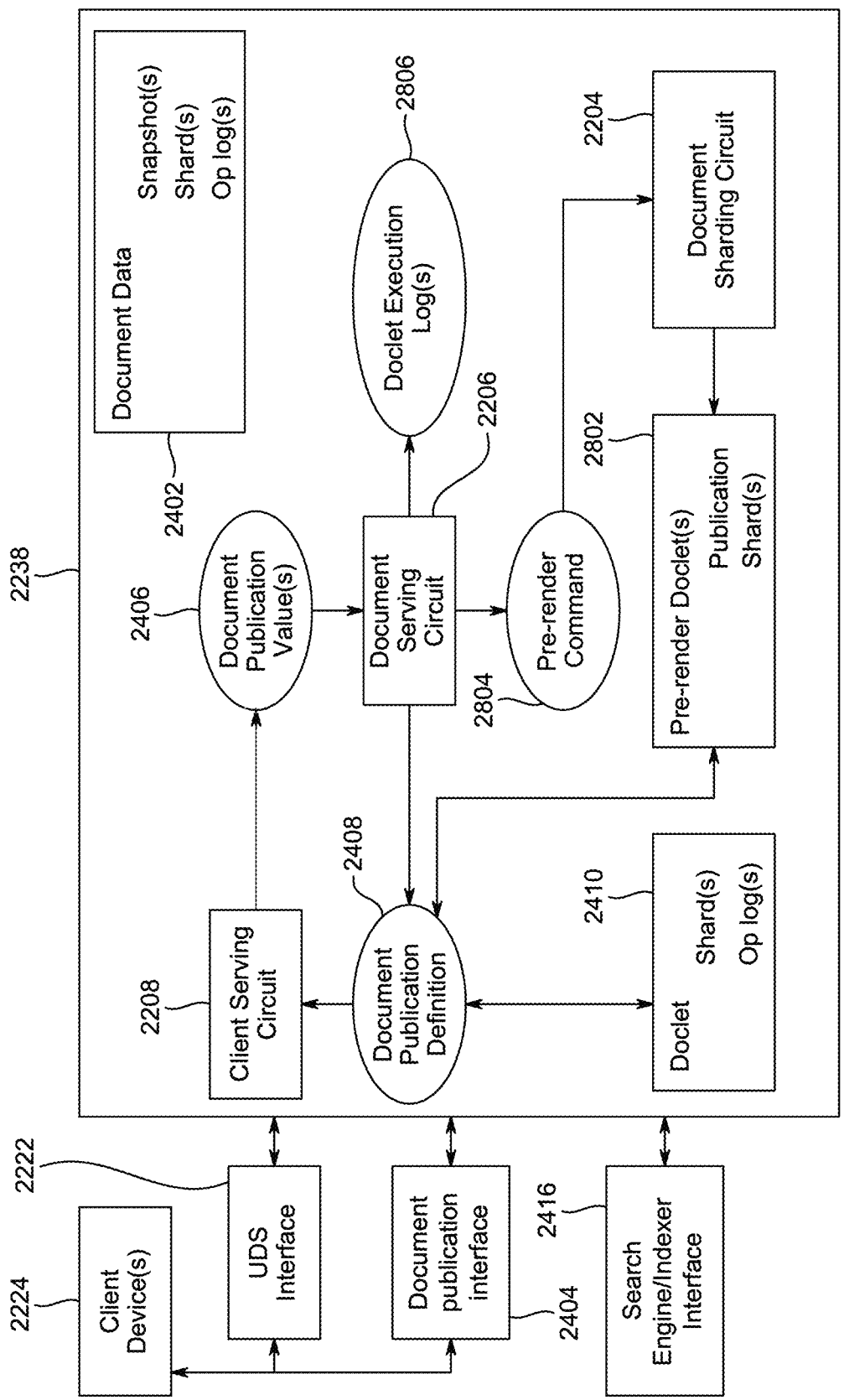
FIG. 28 is a schematic diagram of an example system for document serving.

Referencing FIG. 28, an example document serving circuit 2206 prepares at least one pre-render doclet 2802 in response to the publication request. In certain embodiments, the document serving circuit 2206 prepares the pre-render doclet(s) by providing a pre-render command 2804 to a document sharding circuit 2204, where the document sharding circuit 2204 generates at least one publication shard in response to the pre-render command 2804. The example publication shard captures a state of at least a selected portion of the doclet 2410. Descriptions throughout the present disclosure to prepare shards that support rapid document rendering and access for users are applicable to the publication shard. An example client serving circuit 2208 provides the publication shard(s) to a second document publication interface accessing the doclet 2410 (e.g., a second user accessing the published document using a gallery, address link, search engine return result, etc.), and in certain embodiments provides the publication shard before providing one or more other shards of the doclet 2410—for example to allow for rapid rendering and/or access to the user accessing the published document.

Without limitation to any other aspect of the present disclosure, certain considerations to prepare the publication shard include one or more of: a selected location within the doclet; a linked location within the doclet; a search return value identifying a location within the doclet (e.g., search terms that tend to surface the doclet within a gallery or search engine, which may be highlighted within the gallery or search engine results, making the user more likely to access those sections of the doclet); a usage history of users interacting with the doclet; an initial view of the doclet (e.g., a default position of the doclet based on access from a gallery, etc.); a deep link of the doclet (e.g., a linked or referenced location within the doclet that is accessible by a link or reference within, or in close proximity to, any other identified location for the doclet); a user base value for the doclet; a number of users having a selected access (e.g., read-only, play, edit, etc.) to the doclet; a number of user access configurations for users having access to the doclet (e.g., a high percentage of phone users for the doclet, etc.); and/or a distribution of user access configurations for users having access to the doclet. An example document serving circuit 2206 monitors parameters utilized to determine the publication shard, such as a user base value, and updates the publication shard(s) in response to the monitored values. For example, if user access operations change the relevant locations within the doclet, the distribution of user access configurations, and/or the total number of user changes, the document serving circuit 2206 may command an update to the publication shard(s) to support continued efficient operations of the doclet 2410. Without limitation to any other aspect of the present disclosure, a non-limiting example of certain considerations 2902 to determine the pre-render command 2804 is depicted at FIG. 29.

An example document serving circuit 2206 interprets a doclet access value for the doclet 2410, and performs a document credit action in response to the doclet access value. In certain embodiments, the doclet access value determines a number of users subscribing to, accessing, utilizing, or otherwise interfacing with the doclet 2410, and/or determines one or more of these according to a user type (e.g., new users, users having published documents, etc.). In certain embodiments, the document credit action includes one or more of: providing a credit to an account of the user on a UDS platform, featuring a document of the user, sending a congratulatory message to the user, or the like. In certain embodiments, credited activities for the doclet access value include one or more of: achieving a threshold number of accessing, editing, and/or subscribing users; bringing new users into the UDS platform by access to the doclet 2410; and/or receiving positive reviews or similar feedback from other users of a UDS platform.

An example document serving circuit 2206 determines a doclet execution log in response to operations of users accessing the doclet 2410, and exposes at least a portion of the doclet execution log to an author of the document data (e.g., the publishing user). In certain embodiments, the doclet execution log and/or aspects thereof may be exposed to other users, such as a caretaker of the UDS platform, an administrator associated with the user, and/or subscribing users of the doclet 2410. Example and non-limiting information in the doclet execution log includes one or more of: a number of documents referencing the doclet; a number of execution events of components of the doclet (e.g., certain formulas, external data access events, external service access events; editing of text flows; and/or execution of buttons or control objects); an execution time of execution events of components of the doclet; a number of users accessing the doclet; a number of users editing the doclet; an interface time of users with the doclet; a number of users performing non-persistent editing of the doclet (e.g., "play" access); a user description of users accessing the doclet (e.g., user identifiers, a distribution of access configurations, location of users, etc.); an accessing source of users accessing the doclet (e.g., a gallery, search engine, external link, and/or search terms, category tags, or other aspects of these related to the access event); and/or a display description of users accessing the doclet (e.g., display size, resolution, available color palette, etc.).

Figure 39:
FIG. 39 is a schematic depiction of an example document description card is illustrated.

An example document serving circuit 2206 publishes a document description card 3900 in response to the document publication definition. For example, referencing FIG. 39, an example document description card is illustrated. The example document description card includes: a document icon (e.g., the scroll in the upper left, where the user can select or import any desired icon); a title of the document; a text description and/or resulting text from a gallery and/or search engine that caused the document description card to be displayed; author information for the document (e.g., author name, related entity, contact information, and/or a website for the author and/or an entity of the author); a document picture (e.g., a picture from the document, and/or any picture selected by the author that may enhance understanding of the goal of the document); a utilizing document list (e.g., other documents that link to and/or utilize the doclet in whole or part); a utilizing packs list (e.g., packs that utilize the doclet, for example by linking to the doclet and/or calling the doclet through an interface); a document building block description (e.g., formulas, packs, and/or external data or services utilized by the document, for example to help users find doclets of interest based on the building blocks, and/or to determine if they have sufficient access to the building blocks of the doclet to make utilization of the doclet worthwhile); a document dependency description (e.g., formulas, packs, browsers, access configurations, system requirements, and/or other information that can help the user ensure they will have full use of the doclet); and/or a document pricing description. In the example of FIG. 39, some aspects of the document description card 3900 are accessible through a menu interface (e.g., "Used by", "Pricing", etc., where the illustration of FIG. 39 shows "Pricing"

currently selected). The actual layout and context of the document description card 3900 is non-limiting, and any information considered useful by the author, other users, and/or a caretaker of the UDS platform may be provided on the document description card 3900. In certain embodiments, the content of the document description card 3900 may be adjusted according to the context—for example display in a featured document list may vary from display in a main document list (e.g., reference FIG. 38), and display after a specific user focus (e.g., clicking the document description card 3900 when displayed on a list) may be varied further. In the example of FIG. 39, a "Log" option is depicted on the document description card 3900, which may be present only in certain circumstances (e.g., to the author user, an administrator, a caretaker of the UDS platform, subscribing users, etc.). In addition to the Log option varying in availability by user, the content of the Log option may additionally or alternatively be varied by user. Any one or more of the depicted aspects of the document description card 3900 may be omitted or adjusted, and/or other elements throughout the present disclosure that may be of value to a user determining whether a doclet is useful for that user may be included on the document description card 3900.

Figure 31:
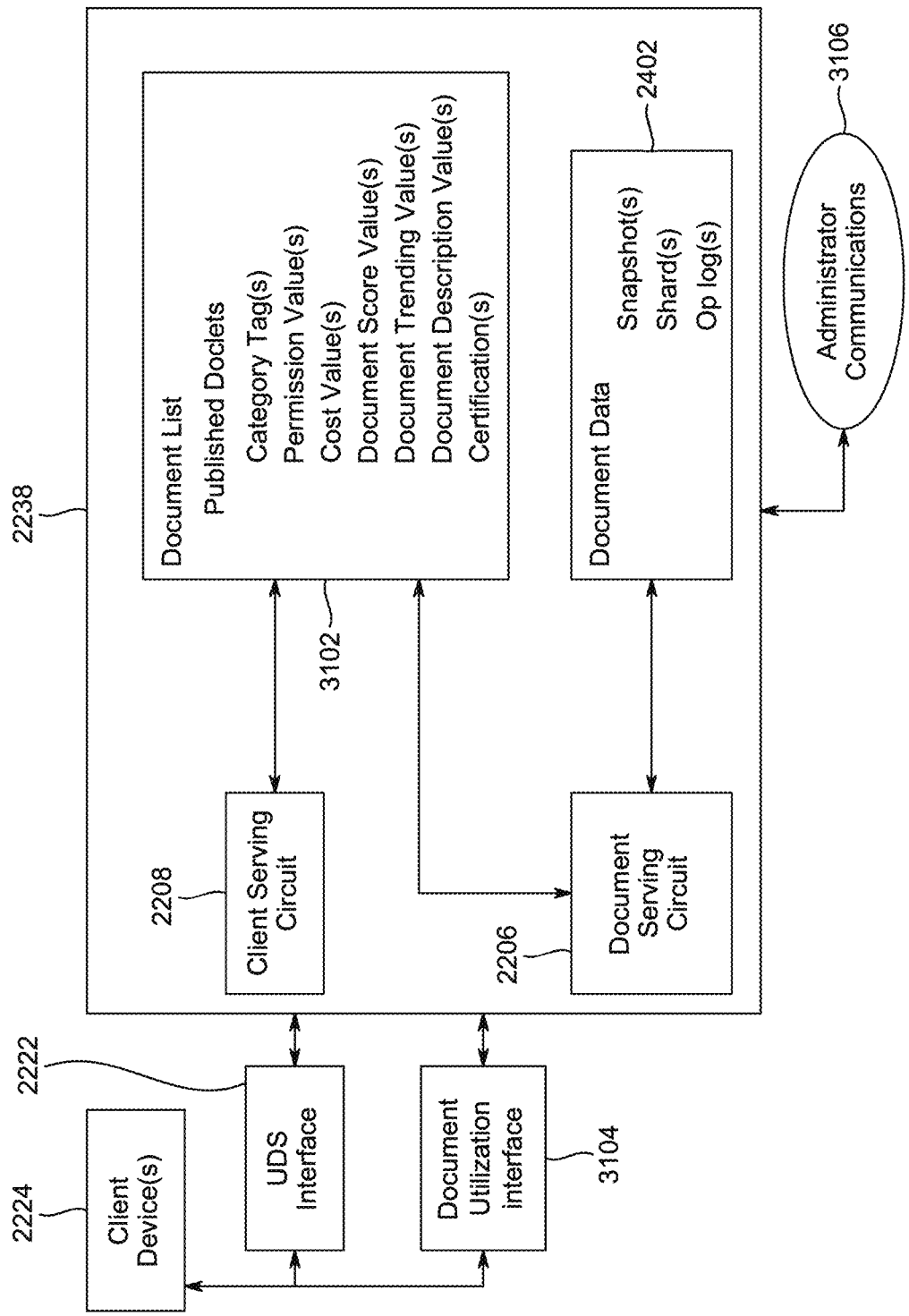
FIG. 31 is a schematic diagram of an example controller for use with a unified document surface.

Referencing FIG. 31, an example controller 2238 includes a client serving circuit 2208 that implements a UDS interface 2222, accesses a document list 3102 including a number of published doclets, that implements a document utilization interface 3104 including a gallery of at least a portion of the document list 3102. The example client serving circuit 2208 provides selected access to a selected doclet from the gallery in response to user interactions with the document utilization interface 3104. In certain embodiments, the client serving circuit 2208 interprets a user category tag (e.g., as text entered by the user and/or as a selection by the user from a list of category tags), and determines the at least a portion of the document list 3102 in response to the user category tag, and further in response to doclet category tags for each of the published doclets. In certain embodiments, the at least a portion of the document list 3102 includes only doclets having the category tag, having a similar category tag (e.g., alternate spellings, similar meanings, etc.), and/or doclets that have sufficient relevancy to the user (e.g., according to prior user documents accessed, similarity to documents the user has created or accessed, and/or having a match to other elements of a user search beyond the category tag, such as a word search term) despite lacking the category tag match. An example client serving circuit 2208 interprets a user search value (e.g., text entered on the document utilization interface, and/or suggested text selected by the user from a suggested value or list), and determines the at least a portion of the document list 3102 in response to the user search value.

An example client serving circuit 2208 determines the document list in response to a permissions value corresponding to the user, for example filtering a corpus of doclets that are potentially available to doclets that the user has permission to see, permission to access, permission to edit, and/or where the user may not have permissions but could potentially get permissions (e.g., through approval of an administrator related to the user, and/or by purchasing access to a given doclet). In certain embodiments, the permissions value may correspond to related permissions, for example permissions for the user related to building blocks of the doclet (e.g., a pack utilized by the doclet, an external service or external data accessed by the doclet, and/or a subscription level with the UDS platform 3000 required to utilize certain formulas and/or other elements of the doclet). In certain embodiments, permissions based operations of the client serving circuit 2208 include selecting the at least a portion of the document list 3102 in response to the permissions value corresponding to the user—for example instead of, or in addition to, the filtering of the corpus of doclets. For example, filtering operations of the corpus of doclets may be more permissive (e.g., only filtering doclets where the user could not readily get permission to fully utilize the doclet), and operations to select the at least a portion of the document list 3102 may be more stringent, performed according to user preferences, and/or performed as a part of an ordering and/or scoring scheme to determine the portion of the document list 3102 (e.g., scoring a doclet with permissions issues for the user relatively lower, but not excluding them from consideration).

An example client serving circuit 2208 further determines the at least a portion of the document list 3102 in response to a document score value for each of the doclets from the document list 3102. In certain embodiments, the document score value may be determined in response to a match of an aspect of the doclet to a user search value, a similarity of the doclet other doclets the user has accessed and/or documents the user has created, according to a trending value for each doclet (e.g., recent usage history, subscription history, editing history, etc.), and/or according to a fit of the category tag(s) of each doclet with a user category tag. As noted preceding, a cost to the user to access the doclet (e.g., including a cost of the doclet, and/or an incremental cost to the user to obtain building blocks within the doclet) may be utilized to determine the document score value(s). In certain embodiments, the document score value(s) may be utilized to filter the document list 3102, to select the at least a portion of the document list 3102, to sort the selected doclets (e.g., for positioning depictions of the doclet on the document utilization interface 3104, to determine how prominently to display the doclet, and/or to determine what information to present about the doclet—for example emphasizing information tending to improve or degrade the document score value, which may allow the user to more readily determine whether the doclet is, or is not, likely to be of interest), and/or to order the selected doclets for display on the document utilization interface 3104. In certain embodiments, operations of the client serving circuit 2208 to sort and/or order doclets on the document utilization interface 3104 may be performed in response to the doclet category tag. In certain embodiments, the client serving circuit 2208 interprets a user preference value in response to user interactions with the document utilization interface 3104, and performs operations in response to the user preference value, including operations such as: determining the document score value(s), sorting the selected doclets, and/or ordering the selected doclets. For example, the user preference value may indicate that some criteria (e.g., presence or absence of building blocks, search term matching, category tag matching, pricing information, and/or permissions information) are more important than other criteria, are dispositive (e.g., determinations should be made solely on the dispositive criteria), and/or should not be considered (e.g., an indication to ignore pricing considerations and find the best doclets without such considerations).

Figure 38:
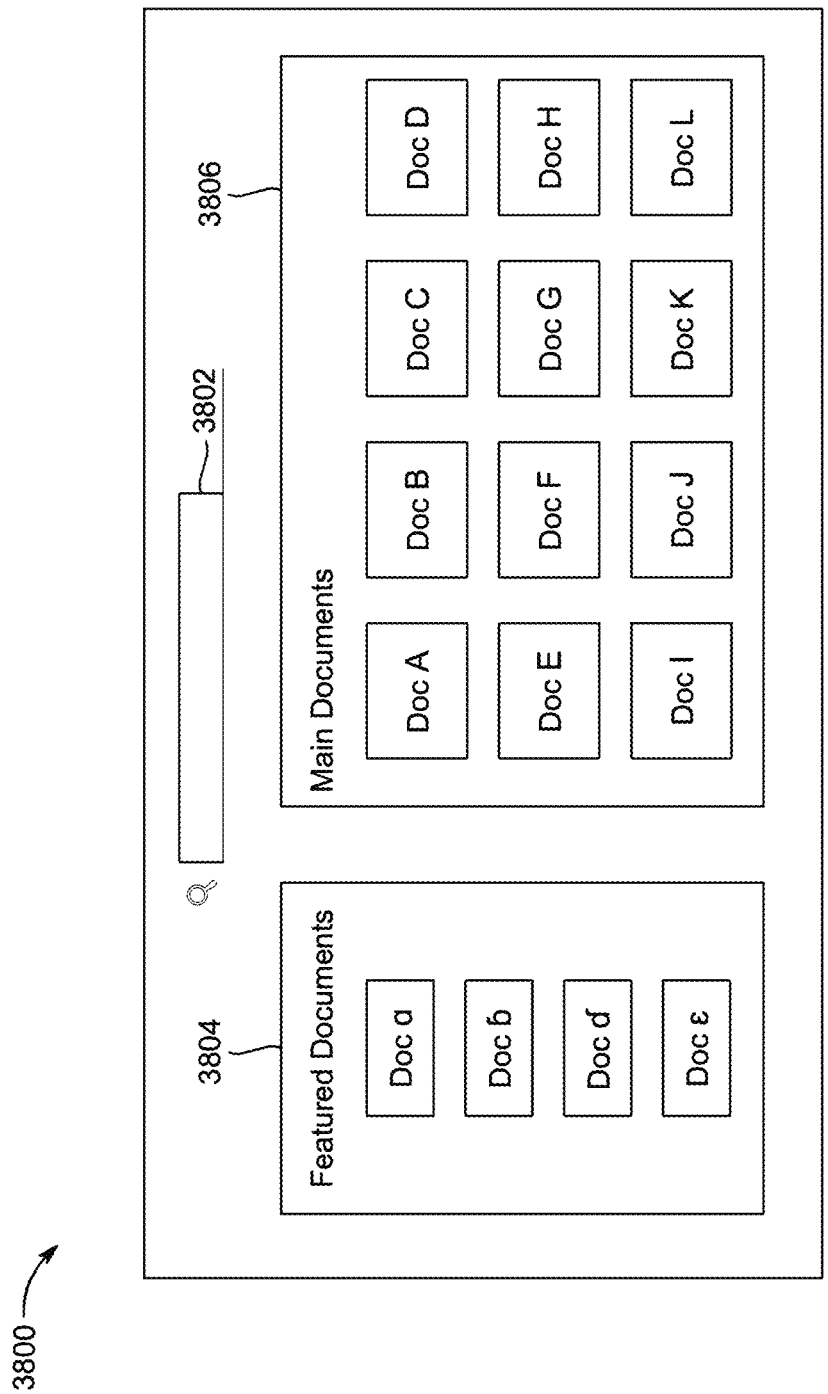
FIG. 38 is a schematic depiction of an example document list.

Referencing FIG. 38, an example document gallery 3800, for example for display on the document utilization interface 3104, is schematically depicted. The example document gallery 3800 depicts a featured document section 3804, for example depicting doclets that are highly relevant (e.g., a very close or perfect match to one or more criteria, such as a word search term), top trending doclets within a selected scope (e.g., doclets of a certain category tag, doclets within a workspace, and/or doclets within the entire scope of the UDS platform), top all-time doclets within a selected scope (e.g., based on user accesses, ratings, revenue, editing events, formula operations, or the like), and/or doclets having a highly significant match with user preference values. The example document gallery 3800 further includes a main documents section depicting selected doclets from the document list 3102, for example sorted and ordered according to operations described in relation to FIG. 31. The example documents gallery 3800 includes a user search interface 3802, for example allowing the user to enter search values. The example documents gallery 3800 is a schematic depiction illustrating certain aspects of the present disclosure. The depicted aspects may be omitted or replaced, and/or may include additional elements such as a category tag selection interface, a building blocks selection interface, a user preference value interface, or the like. In certain embodiments, one or more of these interfaces may be available within the user search interface as depicted, for example as previews, lists, or autocompletion options presented in response to the user focus being positioned at the user search interface 3802. In certain embodiments, the doclets on the documents gallery 3800 may be depicted with a document description card as set forth throughout the present disclosure, including as depicted in FIG. 39 and the related description. In certain embodiments, doclets in distinct sections, for example the feature documents section 3804 relative to the main document section 3806, may utilize distinct document description cards. In certain embodiments, doclets within a section may utilize distinct document description cards, for example where doclets listed earlier, and/or having a higher scoring value or the like, may have a more complete version of a document description card relative to doclets listed later and/or having a lower scoring value.

In certain embodiments, operations to filter the document list 3102, to select the at least a portion of the document list 3102, to determine document score value(s), to sort and/or order doclets on the documents gallery 3800, may be performed utilizing any of the information described in relation to the document description card(s). Additionally or alternatively, user preference values may be received in relation to any of the information described in relation to the document description card(s), and/or utilized in filtering, scoring, sorting, and/or ordering operations.

In certain embodiments, an example client serving circuit 2208 performs operations to filter the documents list 3102, to select the portion of the documents list 3102, and/or to display a doclet on the documents gallery 3800 in response to an administrative permissions value corresponding to the user and/or one or more of the published doclets. For example, an administrative permissions value may include a cost permissions value (e.g., limiting the user to access only doclets meeting the cost permissions value), a building block value (e.g., preventing the user from accessing documents having certain building blocks, such as certain packs, formulas, external data utilization, and/or external service utilization), a document inclusion value (e.g., the administrative permissions value indicates certain doclets as approved, regardless of other criteria), a document exclusion value (e.g., the administrative permissions value indicates certain doclets as unavailable, regardless of the other criteria), and/or a document certification value (e.g., the administrative permissions value requires a certification, for example by a caretaker of the UDS platform, by an entity associated with the user and/or administrator providing the administrative permissions value, and/or by a third party service, where the certification can relate to any aspect, including for example whether documents utilize acceptable language and/or formatting, are secure and/or free from malicious code, etc.). In certain embodiments, the client serving circuit 2208 provides an administrator notification in response to the user interactions with the document utilization interface 3104 (e.g., an operation to request access to a doclet), and to provide the selected access to the selected doclet in response to an administrator response authorizing access to the selected doclet. For example, an administrator associated with the user may mark one or more doclets (or all doclets) as requiring approval, where the administrator notification is provided in response to a relevant user requesting and/or attempting access to one of the marked doclets.

An example document serving circuit 2206 accesses a document data 2402 corresponding to the selected doclet (e.g., selected in response to user interactions with the document utilization interface 3104), and to provide at least a portion of the document data 2402 to the client serving circuit 2208. The example client serving circuit 2208 implements the UDS interface 2222 in response to the provided portion of the document data 2402, thereby providing selected access to the selected doclet. In certain embodiments, selected access is according to relevant permissions of the user for the doclet (e.g., read-only, play, and/or edit permissions, applicable to portions of the document, and otherwise as described throughout the present disclosure).

Without limitation to any other aspect of the present disclosure, operations described in relation to publication and/or access to doclets, for example as set forth in FIGS. 22, 28, 31, 38, 39, the related descriptions, and otherwise as set forth herein, and including at least doclet filtering, selection, sorting, ordering, gallery display, user preference implementation, and/or permissions implementation, are also applicable to operations herein in relation to packs and extensions, for example as set forth in FIGS. 11-21 and the related descriptions.

Figure 32:
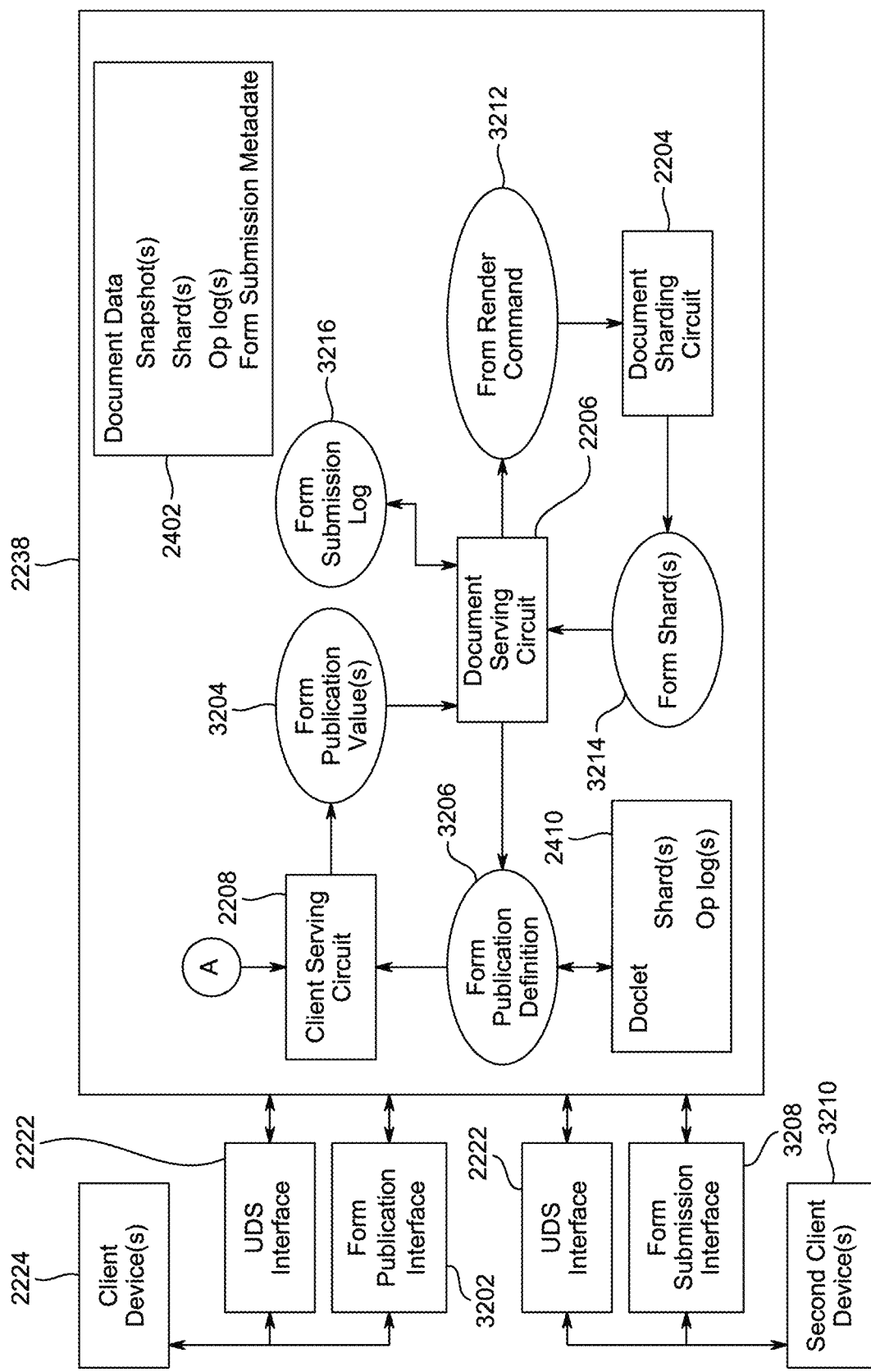
FIG. 32 is a schematic diagram of aspects of an example unified document surface platform.

Referencing FIG. 32, an example controller 2238 is depicted supporting operations for a user to create, publish, and/or submit forms related to a document on a UDS platform. The example controller 2238 includes a document serving circuit 2206 that accesses a document data 2402, the document data 2402 comprising data for a unified document surface, and to provide at least a portion of the document data 2402 to a client serving circuit 2208. The example client serving circuit 2208 implements a UDS interface 2222 in response to the at least a portion of the document data 2402, for example allowing the user to create and/or edit a document from which other operations of the controller 2238 allow the creation and publication of a form. The example client serving circuit 2208 implements a form publication interface 3202, and provides a form publication value 3204 in response to interactions of a first user with the form publication interface 3202. The example document serving circuit 2206 further determines a form publication definition 3206 in response to the form publication value 3204, the form publication definition 3206 defining a form determined in response to the document data 2402 and the form publication value 3204, where the form publication definition 3206 includes an accessing address for the form (e.g., a unique URL that accesses the form). The example client serving circuit 2208 further implements a form submission interface 3208 in response to the form, and to interactions of a second user (e.g., using a second client device 3210) with the form submission interface 3208. The example document serving circuit 2206 further updates the document data 2402 in response to the interactions of the second user with the form submission interface 3208. An example operation of the controller 2238 includes the first user creating the form using the form publication interface 3202, and the second user submitting the form using a submission interface 3208, where the information submitted from the form is placed into the document, for example by adding a row to a table of the document with the submitted information, and/or including metadata related to the form submission (e.g., an identification of the submitting user, etc.).

An example client serving circuit 2208 implements the form submission interface 3208 in response to determining the second user is an authorized user. For example, operations of the first user with the form publication interface 3202 can define authorized users for the form, for example limiting extraneous submissions by users that get access to the unique address for the form. In certain embodiments, defined authorized users may be a selected list of users (e.g., authorized users are on the list), a selected list of not authorized users (e.g., users on the list are not authorized), user criteria for authorization (e.g., users associated with a particular entity, users associated with a particular workspace, users having a specified criteria such as subscribers to a particular doclet, to a particular pack, or the like).

An example form publication value 3204 includes a submission state allowing implementation of the form submission interface 3208, or a second hidden state that does not allow implementation of the form submission interface 3208. For example, the submission state of the form publication value 3204 provides for "publication" of the form. The submission state of the form publication value 3204 may be implemented in any manner, for example as a toggle switch indicating the form is active for accepting submissions or inactive preventing submissions.

An example client serving circuit 2208 implements the form publication interface 3202 to selectively provide, or hide, hidden lookup data to a client device operating the form submission interface (e.g., the second client device 3210). For example, data within a form and/or in the document that is a parent to the form may utilize lookup data (e.g., to sort information on the form, to provide a relevant value to the user on the form, to group information for the form, and/or to utilize in a validation formula for the form, or the like). Because the form is provided to the client device without the full document data 2402, implementation of the form may rely upon other data in the document that is not intended for display on the form. However, if the hidden lookup data is provided with the form data (e.g., the form shard 3214), then a sophisticated user may pull the hidden data, for example from implementing source code for rendering the form, and/or from a memory cache of the second client device 3210. In certain instances, the hidden lookup data is merely not interesting for the form, and access to the hidden lookup data by the submitting user is not detrimental. In certain embodiments, the hidden lookup data may be data that should not be accessible, for example with personally identifiable information (e.g., age, contact numbers, address, etc.), and/or otherwise sensitive data (e.g., employment status, salary, etc.). In certain embodiments, the form publication interface 3202 is implemented to make it convenient for the user creating the form to prevent transfer of such data to the second client device 3210, for example with a simple toggle switch or other highly visible selection to prevent transfer of the data, and/or where the selection to hide such data is implemented by default, requiring active input from the form creation user to allow such data to pass to the second client device 3210. In certain embodiments, the form submission interface 3208 is capable to operate properly without such data, for example by constructing a form shard 3214 for the second user at the time of requesting access to the form, populating the dependent information for the form from the document data 2402 at the time of the access. In certain embodiments, hidden lookup data may be avoided by creating an indexed table having the information of interest, for example by pre-sorting the table using the hidden fields, which may be appended to the document data 2402 and/or deleted after the publication of the form.

An example client serving circuit 2208 implements the form publication interface 3202 to selectively provide, or hide, sensitive information from the second client device 3210 or inclusion on the form at build time in the form publication interface 3202. For example, a selection available to the user creating the form may be made available that prevents the includes of sensitive information within the form. Sensitive information can be defined by the user, by an administrator associated with the user, and/or by a caretaker of the UDS platform. In certain embodiments, sensitive information can be auto detected by the client serving circuit 2208 implementing the form publication interface 3202, for example information that is often personally identifiable information (e.g., names, contact information, birth dates, addresses, health information, etc.). In certain embodiments, the selection to allow or disallow sensitive information is provided to disallow such information by default, reducing the chance that a user inadvertently includes such information on the form or within hidden data that may be accessible to a sophisticated user accessing the form submission interface 3208.

Figure 36:
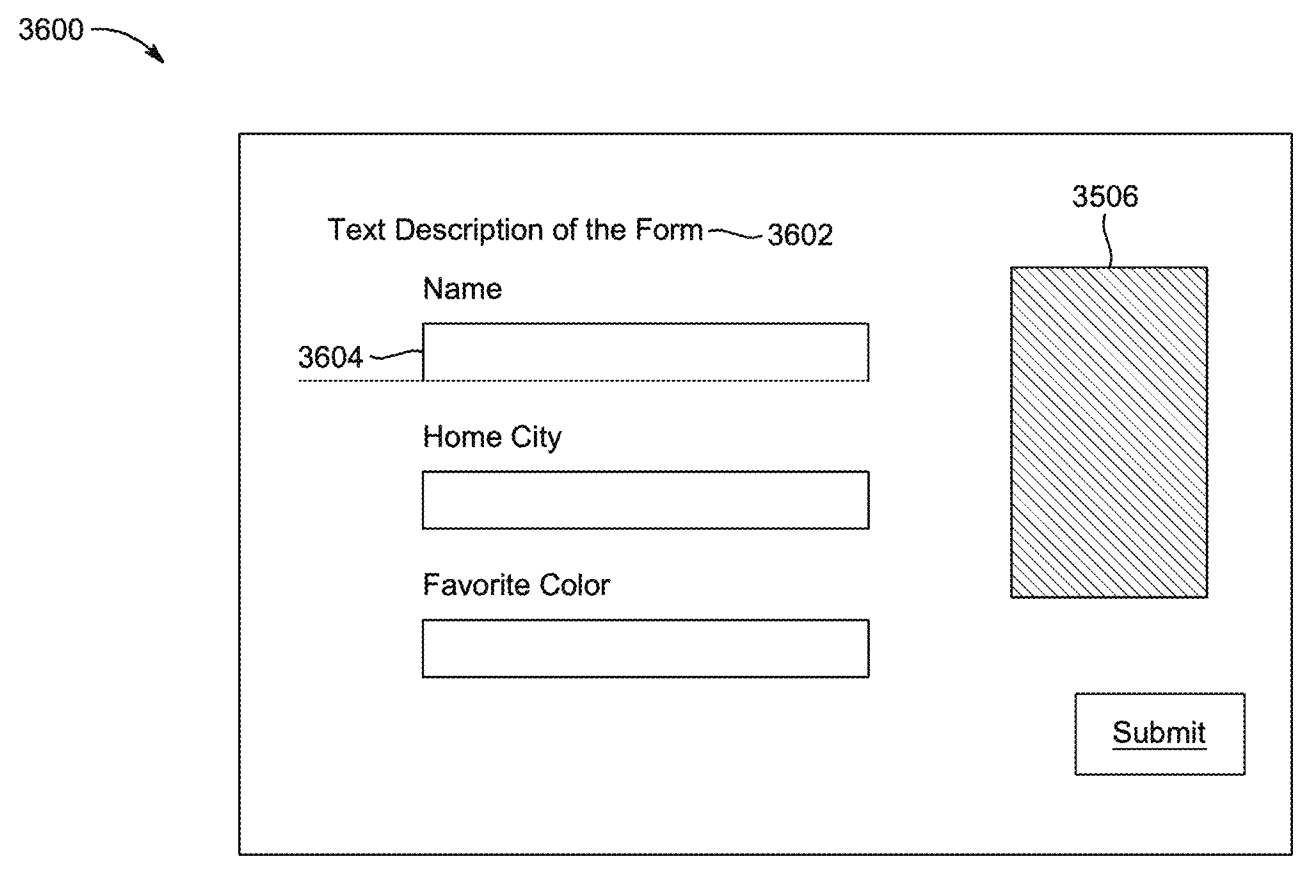

Referencing FIG. 36, an example form 3600 is depicted to illustrate certain aspects of the present disclosure. The example form 3600 includes a text description 3602, for example providing instructions for completing the form 3600, information about how the form 3600 will be used, and/or any other information desired by the form creator. The text description 3602 may be linked to and/or associated with a text flow or text field in the main document, and/or may be created specifically for the form 3600 with interactions of the form publication interface 3202. The utilization of linked text from the main document allows for the form 3600 language to be updated live, while the utilization of dedicated text for the form 3600 reduces connections between the form 3600 and the main document, with attendant risks (e.g., inadvertently changing or deleting the form text). In certain embodiments, the UDS interface 2222 operating on the main document provides a warning and/or notification to the user that edited text is associated with a form 3600.

An example client serving circuit 2208 implements a validation formula associated with data field(s) 3604 of the form 3600. For example, the validation formula may include a verification that the data is within specified ranges, that a date provided is sensible (e.g., before the day of submitting the form for past dates, after the day of submitting the form for future looking dates, etc.). In certain embodiments, the form publication interface 3202 supports the full formula engine for the UDS platform 3000, allowing for highly complex validation formulas, and/or formulas with multiple logical criteria for verification. In certain embodiments, the form submission interface 3208 provides a valid data notification in response to the validation formula and further in response to a data entry interaction (e.g., the submitting user entering data into a text field 3604) and/or in response to the form submission action (e.g., the second user hitting the SUBMIT button as in FIG. 36, or whatever action from the submitting user is supported to request the form submission). In certain embodiments, the valid data notification may be provided in a support text flow 3606, as a tooltip, and/or in a pop-up window. The valid data notification may include an indication that the text field 3604 data is not valid, a description of why the data is not valid, and/or a description of the validation criteria for the field. In certain embodiments, the validation check is performed when the data is entered (e.g., once the user focus leaves the respective text field) and/or when the form submission is requested. In certain embodiments, the support text flow 3606 may be updated with validation information for the user when the user focus is on the text field 3604, for example providing validation support before the user tries to submit invalid data.

An example document serving circuit 2206 provides a form render command 3212 to a document sharding circuit 2204, for example in response to a creation event for the form, and/or in response to a publication event for the form. The example document sharding circuit 2204 generates at least one form shard 3214 capturing a state of the form, and where the client serving circuit 2208 implements the form submission interface 3208 by providing the form shard(s) 3214 to the second client device 3210 operating the form submission interface 3208.

An example document serving circuit 2206 updates the document data 2402 in response to the form submission, placing text (or other information) from the data field(s) 3604 into a table of the document data 2402, and/or storing form submission metadata. Example and non-limiting form submission metadata may be any data of interest related to the form submission, including at least one or more data elements such as: a second user identifier, a form access time stamp, or a form submission time stamp. In certain embodiments, the second user identifier may be an anonymous submission (e.g., a random key, IP address, or other identifier is utilized that does not identify the submitter, and/or no identifier is utilized), a pseudonymous submission (e.g., allowing the second user to enter a nickname, and/or applying a random name to the submission), and/or a identifier (e.g., a username for the second user that is unique, related to the login of the second user with the UDS platform, and/or another unique identifier for the second user such as an email address). In certain embodiments, the form creation user can specify whether submissions are allowed to be anonymous, pseudonymous, or require unique identification. An example form publication value 3204 includes a user identification scheme, for example specifying the identification to be utilized with form submissions.

An example document serving circuit 2206 determines a form submission log 3216 in response to submission activity related to the form, and/or operations of users accessing the form. Example and non-limiting form submission log information includes log information elements such as: a number of form submission events, a data description of submitted data fields of the form (e.g., a listing of values, highest values, lowest values, averages, etc.), an error description for error events occurring during the implementing of the form publication interface (e.g., errors or suspect values that occur during the creation of the form), and/or an error description for error events occurring during the implementing of the form submission interface (e.g., invocations of validation data notifications, submissions with blank data, submission attempts that are not successful and/or a determination of why they failed, etc.). An example document serving circuit 2206 exposes at least a portion of the submission log to the user creating the form, for example allowing the creating user to track analytics related to the form, to determine improvements for the form, etc. In certain embodiments, the document serving circuit 2206 exposes at least a portion of the submission log to other users, for example to an administrator associated with the user creating the form, a caretaker for the UDS platform, or the like. The error log to other users, such as the caretaker for the UDS platform, allows for improvement to the form publication interface 3202, and/or improves support functions for users creating forms.

Figure 33:
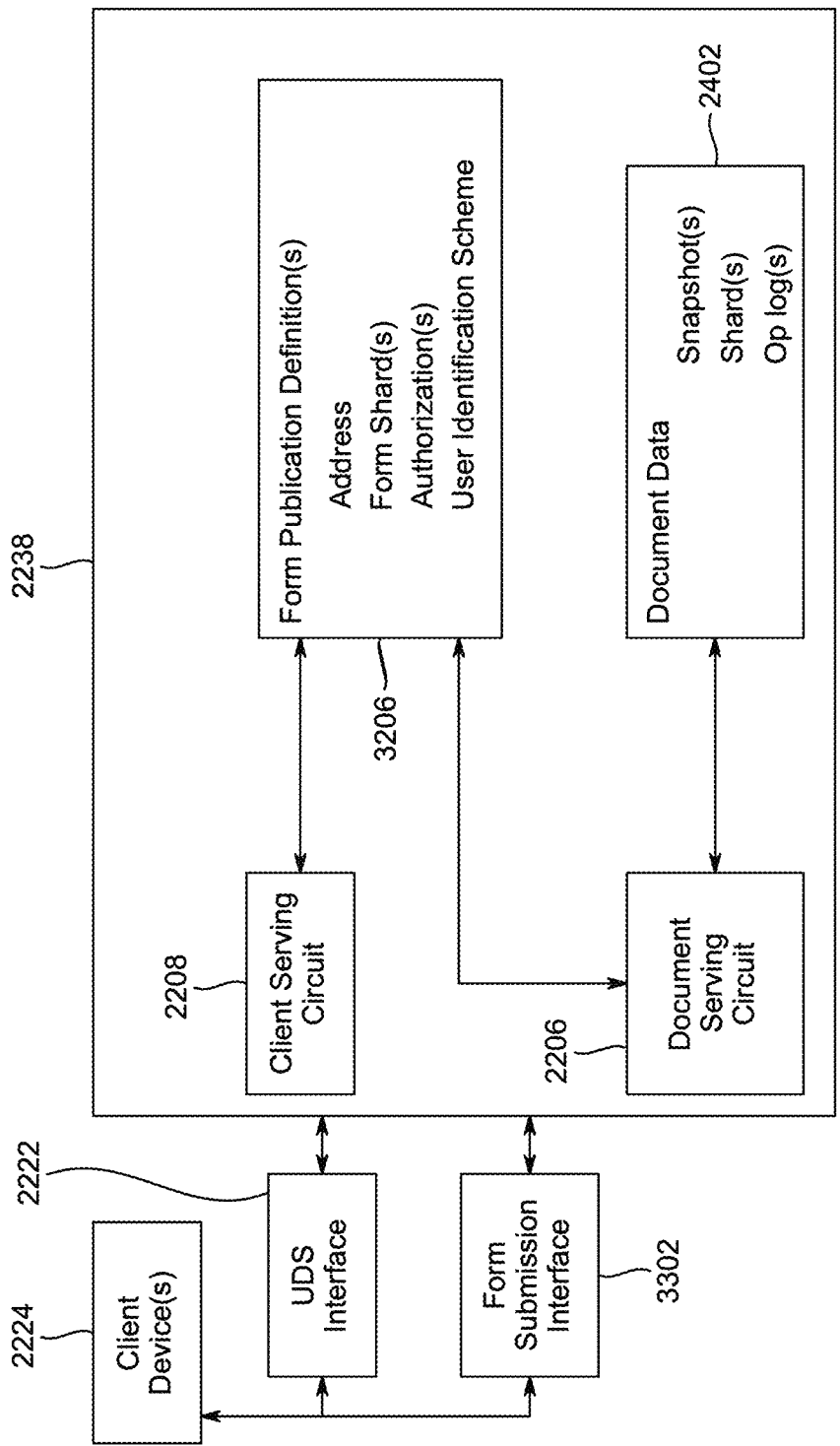
FIG. 33 is a schematic diagram of aspects of an example unified document surface platform.

Referencing FIG. 33, an example controller 2238 includes a client serving circuit 2208 that interprets a submitting user access to a form address (e.g., accessing a unique URL for a form 3600), interprets a form shard(s) (e.g., form shard 3214 and/or as a part of the form publication definition 3206) in response to the submitting user access, implements a form submission interface 3302 in response to the at least one form shard (e.g., providing the form shard(s) to the client device 2224, thereby creating the form submission interface 3302 accessible to the user), and interprets a submission event of the form in response to interactions of the submitting user with the form submission interface 3302. The example controller 2238 includes a document serving circuit 2206 that updates a document data 2402 for a UDS in response to the submission event—for example appending data from the form submission to a table of a main document for the form. An example client serving circuit 2208 further interprets a form publication value 3204 associated with the form, and implements the form submission interface 3302 further in response to the form publication value 3204—for example determining that a creating user has instructed that the form be published. An example client serving circuit 2208 further interprets a user authorization value associated with the submitting user, and implements the form submission interface further in response to the user authorization value—for example determining that the second user is an authorized submitter for the form, and/or determining that the second user is not a prohibited submitter for the form.

Figure 34:
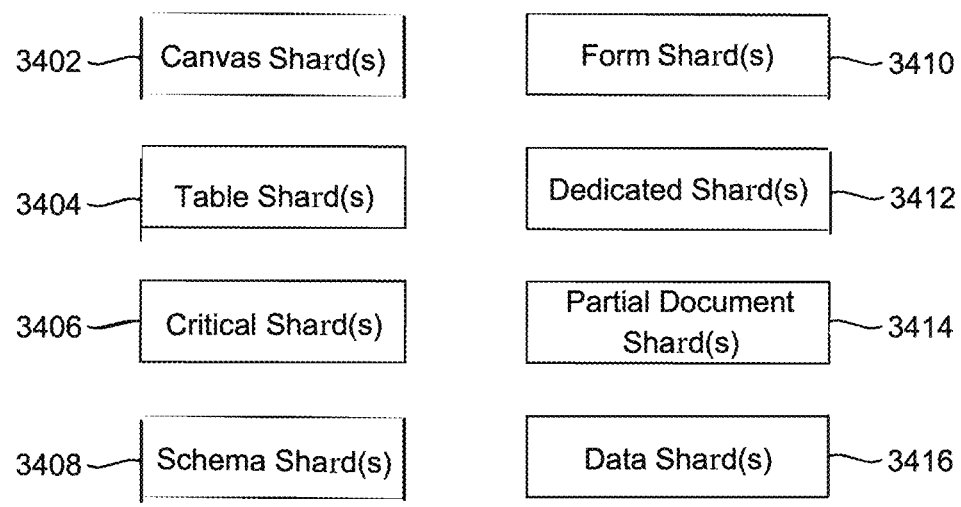
FIG. 34 is a schematic depiction of a number of shards.

Referencing FIG. 34, an example depiction of a number of shards is provided. The shards depicted in FIG. 34 provide illustrative examples of shards that may be created to support a shard group 2216, and/or to support various shard strategies and/or shard recipes. The example of FIG. 34 includes a canvas shard 3402, which may capture a canvas schema and/or canvas data. In certain embodiments, a canvas shard 3402 is generated for each canvas of a document. The example of FIG. 34 includes a table shard 3404, which may capture a table schema and/or table data. In certain embodiments, a table shard 3404 is generated for each table of the document. The example of FIG. 34 includes a critical shard 3406, which may capture essential data to support rapid rendering of the document upon access by a user. The example of FIG. 34 includes a schema shard 3408, which may capture schema elements for objects of interest in the document, for objects related to an initial document position for the user (e.g., a page one position, a linked position, a commonly experienced initial position for users, etc.), for all objects of a selected type in the document (e.g., canvases, tables, etc.), and/or for all objects in the document. The example of FIG. 34 includes a form shard 3410, which may include at least one form shard for each form associated with (e.g., for segregated forms) and/or included within (e.g., for inline forms) of the document. The example of FIG. 34 includes a dedicated shard 3412, which may be a shard dedicated to any aspect of the document to support a selected shard strategy, for example a shard dedicated to support certain frequently used portions of the document, to support specific objects of interest (e.g., a table, a visualization element, a chart, etc.). The example of FIG. 34 includes a partial document shard 3414, which may be a shard configured to support an embodiment of the document as a partial document, for example a partial document related to a published portion of the document, a partial document related to permitted access to a portion of the document for selected users, an abbreviated version of the document created for particular circumstances or users (e.g., a frequently presented portion of the document, a portion of the document created for limited capability devices such as mobile devices, documents to be used as local copies when connectivity is not available for a client device, etc.). The example of FIG. 34 includes a data shard 3416, which may be a shard configured to store data for the document, including for example table data, text flow data, or the like. The utilization of a data shard 3416 alleviates some of the burden on other shards, supporting rapid rendering of the document upon user access to the document. In certain embodiments, a data shard 3416 may be created for a particular object, such as a single table, a text flow, a canvas, or the like. In certain embodiments, multiple data shards 3416 may be utilized to support a large data element, such as a very large table, and/or a data shard 3416 may be utilized to support a number of data elements, such as a number of tables, canvases, or the like.

Referencing FIG. 35, a number of shard strategy descriptions 3502 are schematically depicted. In the example of FIG. 35, a single shard strategy 3504 includes a shard strategy identifier (e.g., for tracking, storing, and/or manipulating individual shard strategies), the shards 2218 in a shard group 2216 associated with the shard strategy, a shard delivery scheme associated with the shard strategy, and/or shard implementation criteria associated with the shard strategy. In the example of FIG. 35, the shard delivery scheme defines which shards are to be passed to a client device accessing the document, including an order and/or a priority among the shards. In certain embodiments, shard delivery may be adjusted in response to operations on the document, for example where the user accesses a portion of the document earlier than expected and/or that is out of phase with the purpose of the shard strategy. For example, if the shard strategy is configured around a prediction that the user accesses the document initially at location A within the document, and the user immediately accesses the document at location B after accessing the document, the client serving circuit 2208 may adjust the actual shard delivery relative to the specified shard delivery scheme. In the example of FIG. 35, the strategy implementation criteria defines parameters to determine the circumstances under which the shard strategy is to be implemented. For example, the strategy implementation data may define client device information, user characteristics (e.g., permissions related to the document, document usage history values, etc.).

Referencing FIG. 37, an example table 3700 to support a form 3600 is schematically depicted. The example table 3700 may be present within a main document associated with the form 3600, and additionally or alternatively may be utilized to create the form 3600. The example table 3700 of FIG. 37 is consistent with the form 3600 of FIG. 36, where the USERID, Access Time, Submit time, Error log, and IP Address columns capture metadata related to submission events of the form 3600, and where the NAME, HOME, and COLOR columns capture the submitted data from the fields 3604 of the form 3600.

Figure 40:
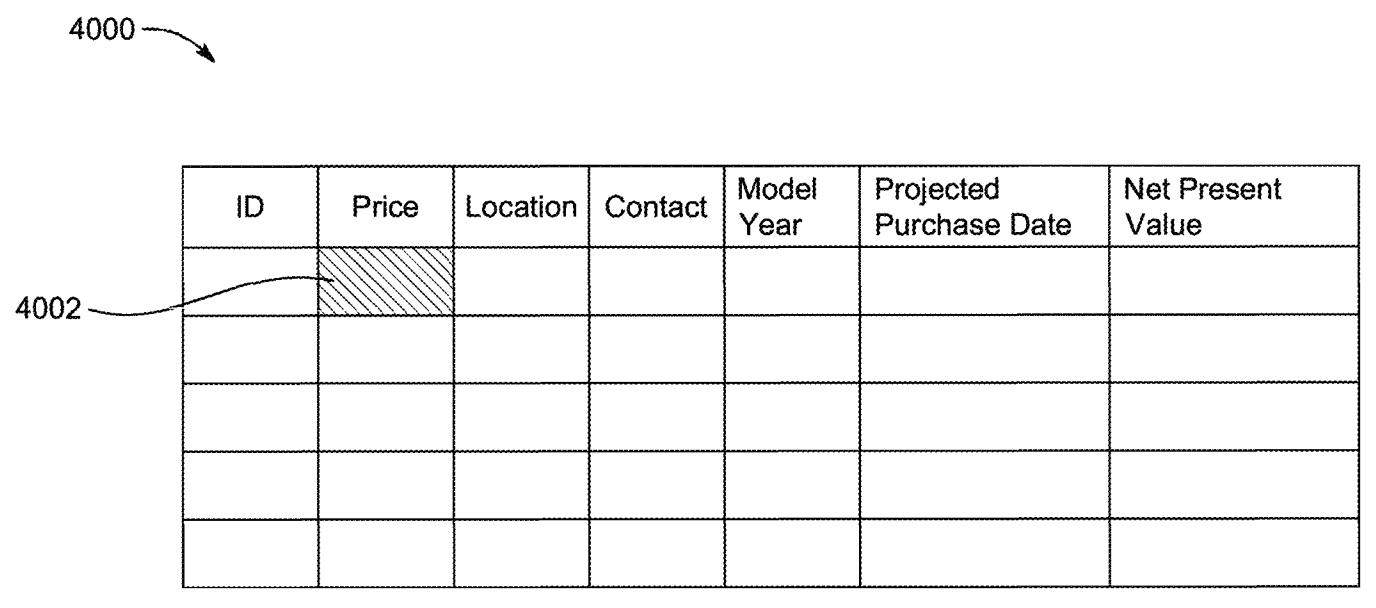

Referencing FIG. 40, an example table 4000 is schematically depicted having a canvas 4002 embedded within a table 4000 of a document. In certain embodiments, any object may be embedded within a table 4000, allowing for nested depictions of data within a table 4000, convenient organization of data within the document, and illustrating the flexibility of the unified document surface implementation of documents of the UDS platform. In certain embodiments, objects such as charts, visualizations, text flows, or the like may be embedded within a table, allowing for associations between those embedded object and data within other columns of the table by row. Additionally, a canvas can support a full rendering of multiple document elements, such as text flows, tables, visualization elements, charts, and the like, providing for a contained universe of document elements within a cell of a table. In certain embodiments, a column formula can be implemented for a column of the table 4000, which may be applied to the canvas 4002 within the document. For example, a column formula can operate on every row within a column of the table, without having to be repeated and/or have cell references to each row. In the example, a column formula applied to the canvas can make global changes to the entire canvas with a single formula entry—for example applying conditional formatting to the entire canvas and/or selected elements of the canvas (e.g., to a table within the canvas, to a text flow, or the like). In certain embodiments, a column formula applied to the canvas can make changes to a single object or element of the canvas—for example each canvas may represent a large data element such as a report (e.g., where the column of the canvases represents instances of the report over a period of time, across a number of departments, etc.), an invoice, a parts list, recipes, etc. In the example, a column formula can reconfigure a single element of every canvas with a single formula entry, for example updating invoices to reflect exchange rate changes, adjust recipes from English units to metric units, change map coordinate systems, etc.

Referencing FIG. 41, an example canvas 4102 is embedded in a table 4100, where the canvas 4102 embodies a column of the table 4100. The example of FIG. 41 additionally includes a second canvas 4104 that embodies two columns of the table, and is a vertically split canvas. The examples of FIGS. 40 and 41 are non-limiting examples, and illustrate aspects of the present disclosure such as embedded objects in a table, including a canvas, and embodiments where a canvas is vertically split allowing for side-by-side construction of extensive document elements, each of which may be a complex document surface having a number of objects therein, with a mixed variety of object elements. In certain embodiments, a document sharding circuit 2204 may generate shards to support the table 4000 and/or embedded canvases within the table 4000, which may include a schema shard for the table, a schema shard for the embedded canvas, and/or data shards for the table and/or embedded canvas.

Figure 42:
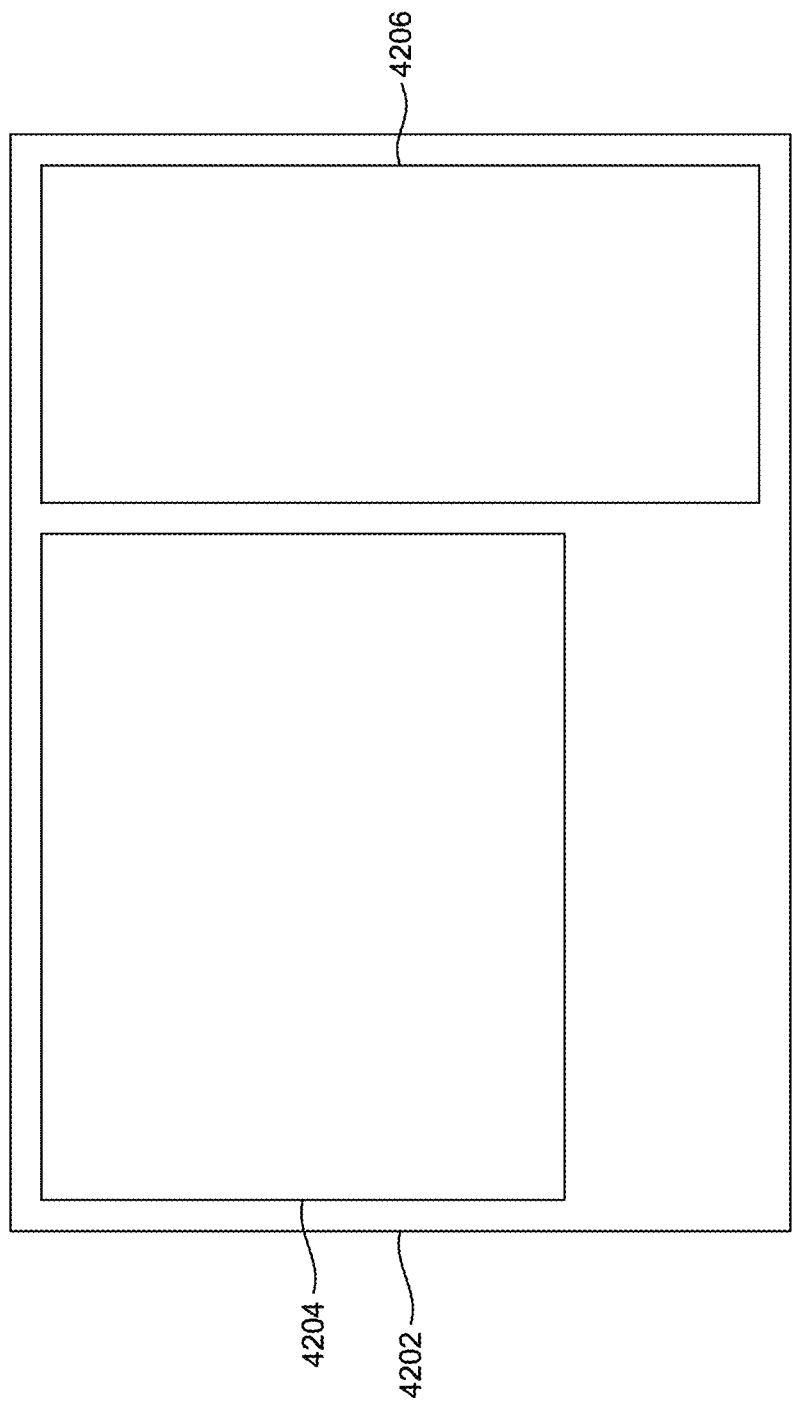
FIG. 42 is a schematic depiction of an example document surface.

Referencing FIG. 42, an example document surface 4202 includes a first canvas 4204 and a second canvas 4206, where the canvases 4204, 4206 share a vertical extent—for example, the canvases 4204, 4206 are positioned at least partially side-by-side, or the canvases 4204, 4206 are vertically split. The provision for canvas arrangement such as those presented with regard to FIG. 42 allow for ease of creation of documents configured for rendering on selected devices, and for creation of complex arrangements of visual elements, text flows, or the like while remaining readily accessible to casual users of the UDS platform. In certain embodiments, for example with reference to FIGS. 40-42, operations of the client serving circuit 2208 implementing the UDS interface 2222 allow for user selection across multiple sections of the document in a single selection operation. For example, a mouse drag operation in a document represented by FIG. 42 allows for selection of a text flow between both canvases 4204, 4206 in a single operation, allowing the user to perform simple operations to edit the document, even while complex arrangements of the document are implemented. In another example, referencing FIG. 41, a selection operation, such as a mouse drag operation, can select multiple embedded canvases in a single operation. Additionally or alternatively, a selection operation on a surface such as that depicted in FIG. 40 can select text or objects within multiple canvases in a single operation—for example where the "Price" column is a column of canvases (in the example, only a single embedded canvas is depicted), a single selection operation (e.g., a mouse drag) can select multiple canvases, select text and or objects within a canvas, which selection can flow out to the table and/or to adjacent canvases (e.g., a mouse drag with another indicator, such as holding a particular key, and/or toggling a selection setting on the UDS interface 2222), and/or a single selection operation (e.g., a mouse drag with another indicator, such as holding a distinct key, and/or adjusting the selection setting on the UDS interface 2222) can select parallel information among a number of canvases—for example selection of a first paragraph of the first embedded canvas can simultaneously select a first paragraph of each embedded canvas, and/or a first paragraph of each embedded canvas that is engaged by the user focus during the single selection operation. The described examples are illustrative and non-limiting.

In certain embodiments, selection operations that cross document sections or zones include operations that cross canvas boundaries, text flow boundaries, table boundaries, visualization element boundaries, chart boundaries, graph boundaries, linked external data boundaries, and/or preview text boundaries.

Referencing FIG. 43, an example document surface is depicted, having a collapse interface (e.g., triangle in the upper left corner) provided thereon. An example client serving circuit 2208 hides a document section (e.g., the table of FIG. 43) in response to a user interaction with the collapse interface. In certain embodiments, a collapse interface may be provided on the UDS interface 2222 for each selected feature (e.g., each canvas, each table, each chart, each image, etc.), where the collapse interface is utilized to show or hide the associated section. In certain embodiments, the user can insert a collapse interface for any selected object, and/or associated with any selection by the user, including for selections that cross section boundaries of the document. In certain embodiments, the collapse interface includes a permissions value associated therewith, allowing the user to hide document objects, selections, and/or sections, while optionally preventing other users from exercising the collapse interface to show (or hide) the objects, selections, and/or sections. In certain embodiments, the document sharding circuit 2204 creates one or more shards 2216 associated with the collapsed section, for example allowing the client serving circuit 2208 to display or hide the section of the document associated with the collapse interface, and prevent data of the section of the document associated with the collapse interface from being passed to a client device (e.g., which may allow a sophisticated user to obtain the related data, for example from a memory cache). In certain embodiments, the collapse interface may be shown or omitted for other users and/or in published doclets—for example allowing the document author to collapse sections without another user seeing that the collapse has occurred. In certain embodiments, the collapsed section may be completely hidden, the collapse interface may continue to be shown, perhaps modified such as depicted in FIG. 44, and/or the collapsed section may be replaced with selected data, such as a title, line of text from the collapsed section, summary information for the collapsed section, etc. In the example of FIG. 44, the collapse interface is depicted in a collapsed position (e.g., the collapse interface is turned), and the table of FIG. 43 has been replaced by a title line, combined with some table schema information and a sum of a column of the table. The depicted information for the collapsed section, the visibility of the collapse interface to other uses, and/or the securement of the collapse interface for non-author users are all selectable or configurable by the user, and may be distinct for each collapse interface, document object, and/or document selection. In certain embodiments, the client serving circuit 2208 provides a tool tip on the document surface, for example in response to a user focus positioned at the collapse interface. Example tool tip content includes one or more of: a descriptive line item for the collapsed section, a preview of the collapsed section, a representative data value for the collapsed section (e.g., a first value, last value, sum, average, highest value, lowest value, etc.), and/or an administrative notification value (e.g., an indication that the user does not have permission to exercise the collapsed section, a description of the collapsed section such as a schema, building blocks used in the collapsed section, a word count of the collapsed section, etc.). In certain embodiments, the collapse interface exists in the document model for formula access, with example properties such as display type, permissions associated, the state of the collapse interface (e.g., collapsed or expanded), an associated object reference and/or selection reference, display information (e.g., when collapsed and/or in a tooltip), and/or a persistence value (e.g., allowing the collapse interface to maintain its position after the user exits the document). In certain embodiments, the client serving circuit 2208 stores user interactions with the collapse interface as user operations with the UDS interface 2222 (e.g., to store the collapse state in an operations log, snapshot, and/or a shard, allowing for persistent interaction).

An example document serving circuit 2206 accesses a document data 2402, the document data 2402 including data for a UDS, and provides at least a portion of the document data to a client serving circuit 2208. The example client serving circuit 2208 implements a UDS interface 2222 in response to the at least a portion of the document data 2402, the client serving circuit 2208 further interpreting a user operation including a table creation operation and/or a table linking operation (e.g., creating a linked table to another table in the document, another table in a different document associated with the UDS platform 3000, and/or a table linked to an external table and/or external data), and interprets an access configuration value corresponding to a user performing the user operation. The example document serving circuit 2206 further configures rendering of a created table on the UDS in response to the access configuration value, and where the created table is created in response to the user operation. An example access configuration value include a client device description and/or a platform for the UDS interface 2222 (e.g., a UDS interface version, a browser type and/or version, a UDS platform subscription level, etc.). Example operations of the document serving circuit 2206 to configure the rendering of the created table include one or more of: selecting column width values; selecting column name values; selecting a schema for the table; selecting table navigation control options; selecting a text and/or background color scheme for the table; selected cell delineation elements for the table; selecting row height values for the table; selecting a number of columns to be visible; and/or selecting a number of rows to be visible. In certain embodiments, the document serving circuit 2206 fetches schema information and/or building block information about the linked table to configure the rendering, for example before populating the linked table with data. An example document serving circuit 2206 configures the rendering of the created table based on one or more of: an estimated readability for the access configuration value; an estimated performance response for the access configuration value; an estimated navigability for the access configuration value; and/or a compatibility determined in response to the access configuration value.

An example document serving circuit 2206 configures rendering of a UDS in response to an access configuration value, for example rendering the UDS as one of a centered view (e.g., displayed content is centered horizontally on the UDS) and/or a wide view (e.g., displayed content is rendered to fill the horizontal space of the UDS, for example including provision for margins and/or variability for text, table, and/or images thereon). In certain embodiments, the document serving circuit 2206 configures the rendering of the UDS in response to a display width indicated by the access configuration value, a mapped relationship between an aspect of the access configuration value and a selected rendering scheme (e.g., converting views to be compatible with a browser, adjusting objects to supported objects, etc.), and/or in response to an aesthetic index value. Example and non-limiting aesthetic index values may be determined from one or more of: a white space value resulting from each rendering configuration (e.g., ensuring that white space is provided within selected ranges); a text flow spatial ratio resulting from each rendering value (e.g., a ratio between a width and height of displayed text, for example for a paragraph, text flow, etc.); a table aspect ratio resulting from each rendering value (e.g., a table width to height ratio); a text kerning result corresponding to each rendering value (e.g., considering the spacing between letters resulting from the rendering scheme, for example to avoid stretched letter spacing); and/or a selection history of users having a related access configuration value and related geometric document data to the unified document surface (e.g., determining common operations for display schemes, including spacing, margins, justification values, etc., for documents having a similar geometric appearance such as text flow lengths, table sizes, picture sizes, etc.). In certain embodiments, the rendering may be updated, for example as the user edits the document, adding or removing text, tables, table rows or columns, or edits to other objects. In certain embodiments, the configured rendering may be applied to canvases, tables, text flows, or the like. In certain embodiments, the rendering scheme selected may be determined independently for distinct document objects, document sections, or the like.

An example document serving circuit 2206 provides a number of rendering options to a user performing an operation including a link insertion. In certain embodiments, the rendering options are provided without interrupting the operations of the user. For example, a user may be entering a formula that links to a table, text flow, or other object, where the rendering options are provided as a floating tool tip in the proximity of the user focus, without blocking the data being entered by the user, and/or data immediately preceding the data being entered by the user. In certain embodiments, options may be presented with a thumbnail or other brief depiction of the resulting look of the linked object based on each rendering scheme. In certain embodiments, the document serving circuit 2206 configures the rendering scheme for the linked object in response to a user selection of one of the options, which may include setting schema information for the linked object, seamlessly adjusting the formula and/or related code for the linked object based on the rendering scheme, or the like. Example and non-limiting rendering options include one or more of: a table insertion option, a visual element insertion option, or a link description option. An example client serving circuit 2208 interprets an access configuration value corresponding to the user, and the document serving circuit 2206 provides the rendering options in response to the access configuration value. Example and non-limiting rendering options include one or more of: a table schema option, a table insertion option, a visual element insertion option, a link description option, a centered view option, and/or a wide view option.

An example client serving circuit 2208 interprets a location value for a user associated with the UDS, and the document serving circuit 2206 performs a location based operation in response to the location value for the user. Example and non-limiting location based operations include one or more of: selecting a shard strategy description in response to the location value (e.g., selecting a shard strategy based on performance indicators for the location, for example where the location may indicate that the user has limited and/or intermediate connectivity, and/or where the location indicates that certain type of information, such as sensitive information, confidential information, health information, etc. should be not available to the client device); utilizing the location value as an input parameter to a formula of the UDS, and/or commanding execution of a formula using the location value; determining a snapshot time marker in response to the location value (e.g., performing an opportunistic snapshot when the user location indicates that the user may not be interacting significantly with the document for a period, performing a snapshot in response to a location indicator indicating that the user is potentially going to be traveling, etc.); sending a notification to the user in response to the location value, and further in response to a second user accessing a published document associated with one of the UDS (e.g., a document) and/or the user (e.g., notifying the user that a second user is accessing the document, for example where the location value indicates that the user may not have access to the UDS platform); and/or sending a notification to the user in response to the location value and further in response to a second user submitting a form associated with the UDS. The notification value may include a factual notification (e.g., user XYZ has edited the document), and/or a content notification (e.g., user XYZ has added three rows to table PDQ; and/or user XYZ has submitted a form, and 13 users have now submitted the form). The content notification can include user counts, document edit locations, updated formula information (e.g., sums, averages, model output values, etc.). An example location based operation includes an operation to select and automated rendering operation for an object of the UDS in response to the location value (e.g., where the location value indicates the user may have limited connectivity, a limited capability device, be positioned in a low light environment, be positioned in a bright light environment, etc.).

FIGS. 45A-65 are schematic flow diagrams of procedures according to embodiments.

Figure 45:
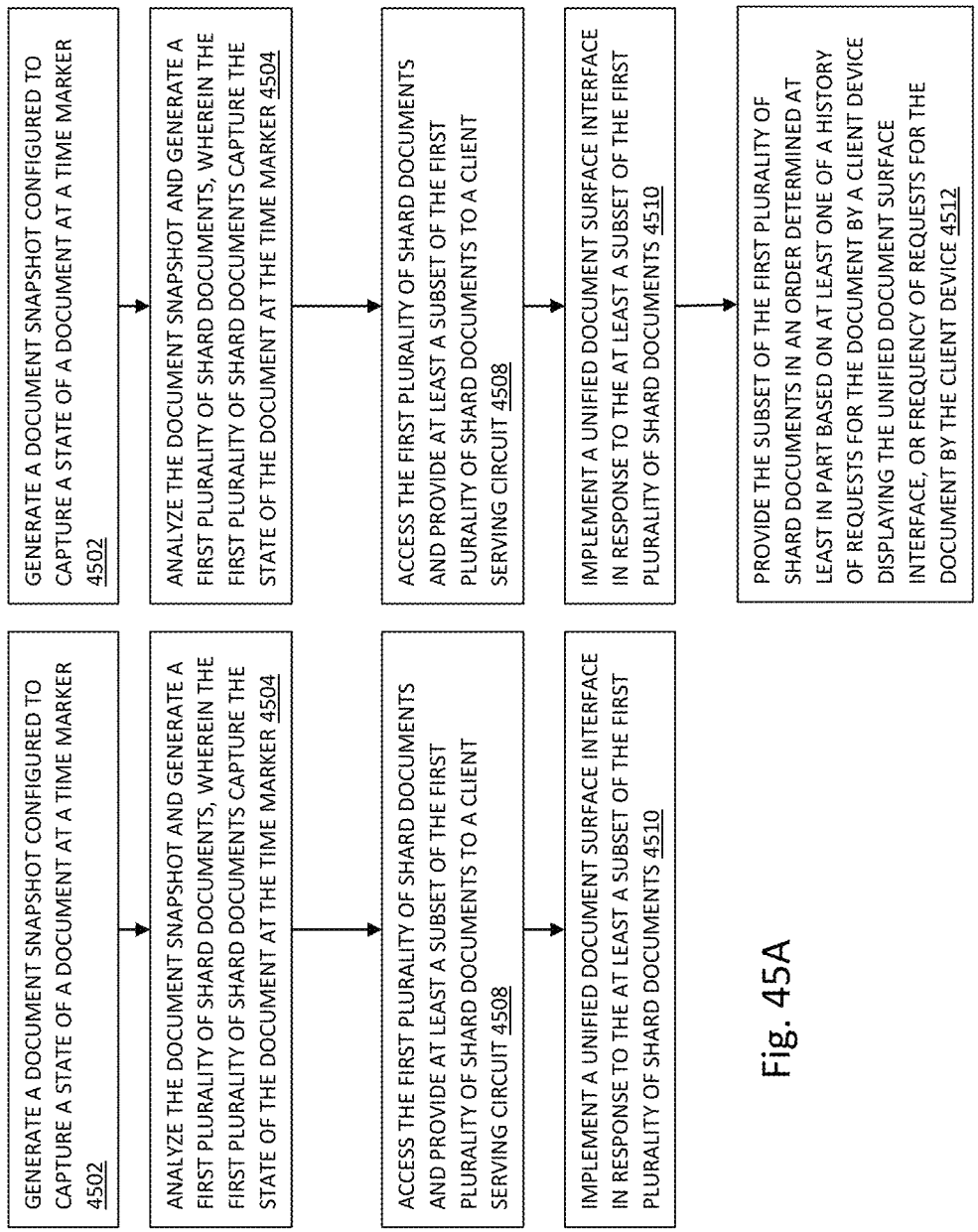
FIG. 45A is a schematic flow diagram of a procedure for document sharding.
FIG. 45B is a schematic flow diagram of a procedure for document sharding.
Figure 46:
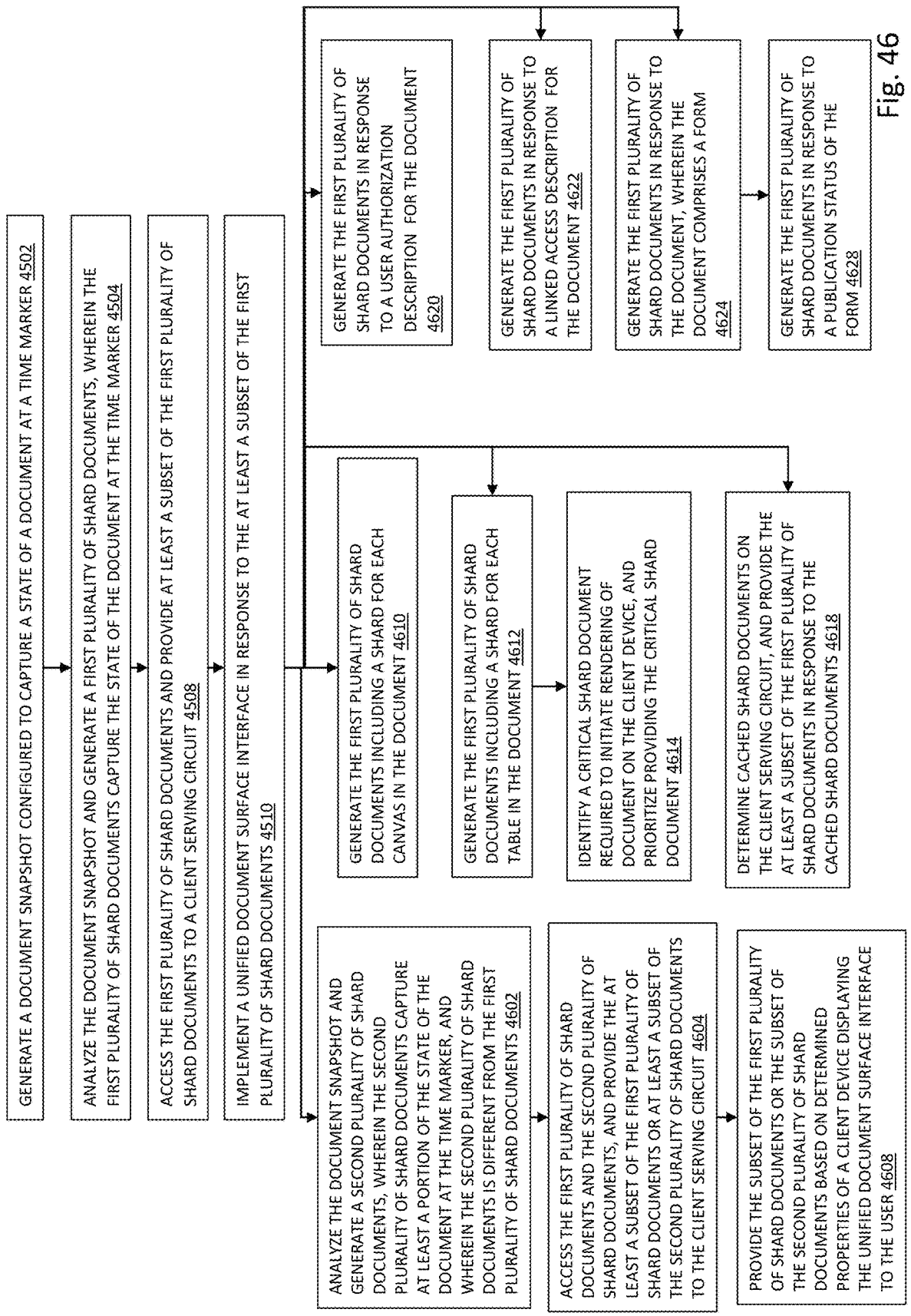
FIG. 46 is a schematic flow diagram of a procedure for document sharding.

An example method shown in FIGS. 45A-46 may include generating a document snapshot configured to capture a state of a document at a time marker 4502; analyzing the document snapshot and generating a first plurality of shard documents, wherein the first plurality of shard documents capture the state of the document at the time marker 4504; accessing the first plurality of shard documents and providing at least a subset of the first plurality of shard documents 4508; and implementing a unified document surface interface in response to the at least a subset of the first plurality of shard documents 4510.

Certain further aspects of the example method are described following, any one or more of which may be present in certain embodiments. The subset of the first plurality of shard documents may be selected based on at least one of properties of the document, properties of a client device displaying the unified document surface interface to a user, or properties of a communication network between the client device and a document serving circuit. The subset of the first plurality of shard documents may be selected based on at least one of a history of requests for the document by a user interacting with the unified document surface interface, or a frequency of requests for the document by the user interacting with the unified document surface interface. The method may further include providing the subset of the first plurality of shard documents in an order determined at least in part based on at least one of a history of requests for the document by a client device displaying the unified document surface interface, or frequency of requests for the document by the client device (FIG. 45B, 4512). The order may be determined to prioritize shards related to a last accessed location of the document. The order may be determined to prioritize smaller shards. The method may further include identifying a critical shard document required to initiate rendering of document on the client device, and prioritizing providing the critical shard document 4614. The first plurality of shard documents include at least one of a schema shard, a critical shard, or a data shard. The number of shard documents generated may be based on a size of the document. The method may further include analyzing the document snapshot and generate a second plurality of shard documents, wherein the second plurality of shard documents capture at least a portion of the state of the document at the time marker, and wherein the second plurality of shard documents may be different from the first plurality of shard documents 4602. The method may further include accessing the first plurality of shard documents and the second plurality of shard documents, and providing the at least a subset of the first plurality of shard documents or at least a subset of the second plurality of shard documents 4604. The method may further include providing the subset of the first plurality of shard documents or the subset of the second plurality of shard documents based on determined properties of a client device displaying the unified document surface interface to the user 4608. The first plurality of shard documents include redundant information in at least a subset of the shard documents. The method may further include generating the first plurality of shard documents including a shard for each canvas in the document 4610. The method may further include generating the first plurality of shard documents including a shard for each table in the document 4612. The method may further include determining cached shard documents, and providing the at least a subset of the first plurality of shard documents in response to the cached shard documents 4618. The method may further include generating the first plurality of shard documents in response to a user authorization description for the document 4620. The method may further include generating the first plurality of shard documents in response to a linked access description for the document 4622. The document may include a form, and wherein the method may further include generating the first plurality of shard documents in response to the form 4624. The form may include one of an inline form or a segregated form. The method may further include generating the first plurality of shard documents in response to a publication status of the form 4628.

Figure 47:
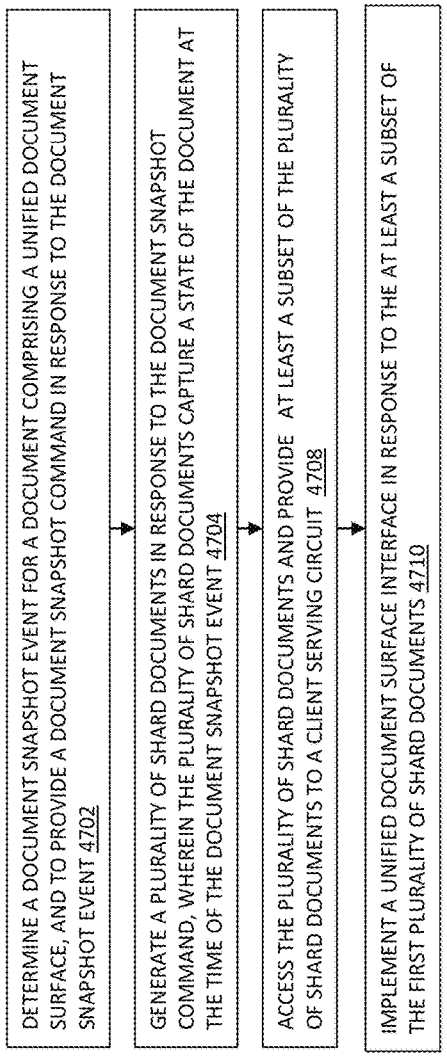
FIG. 47 is a schematic flow diagram of a procedure for implementing a document surface interface with shards.
Figure 48:
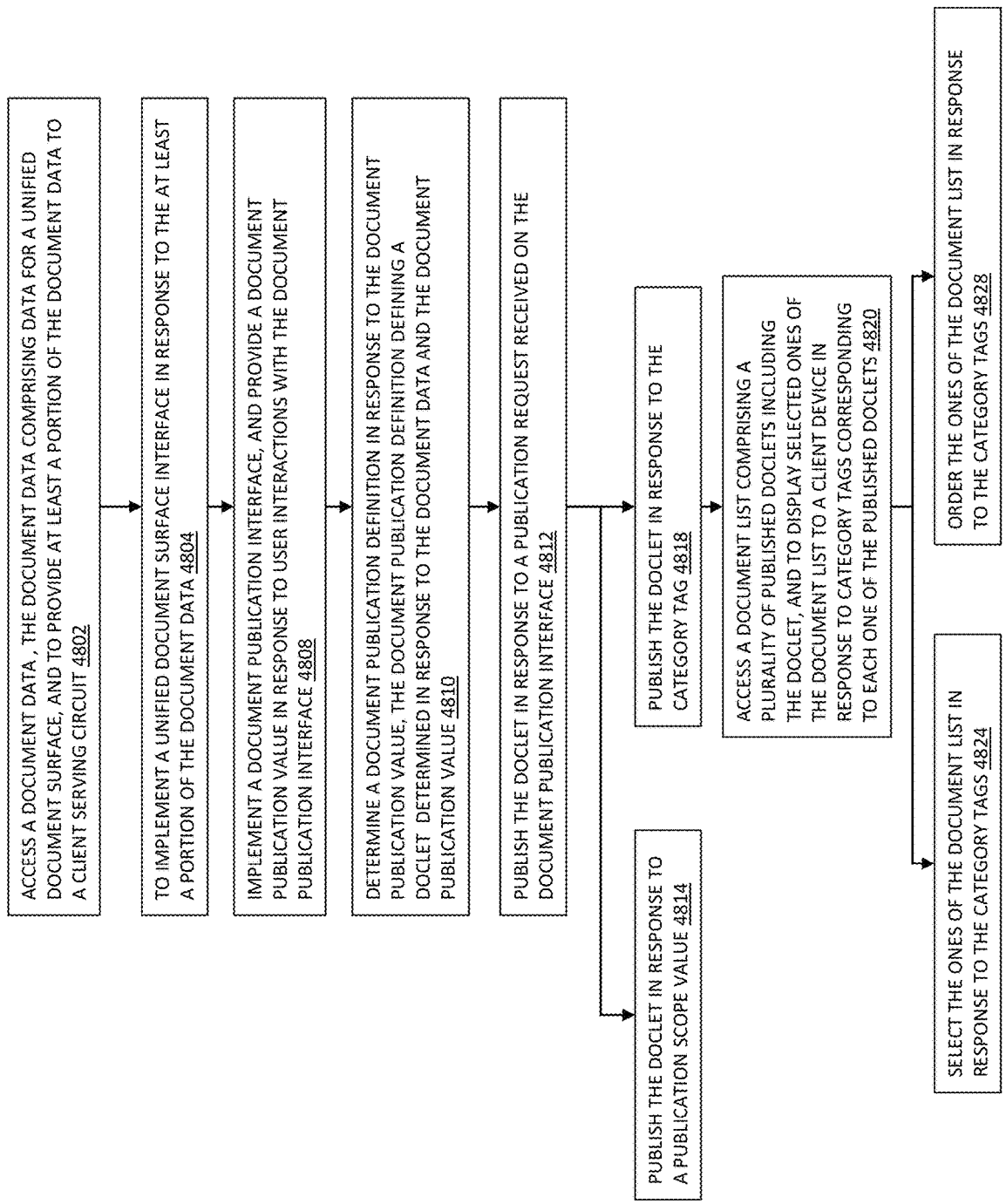
FIG. 48 is a schematic flow diagram of a procedure for publishing documents.
Figure 49:
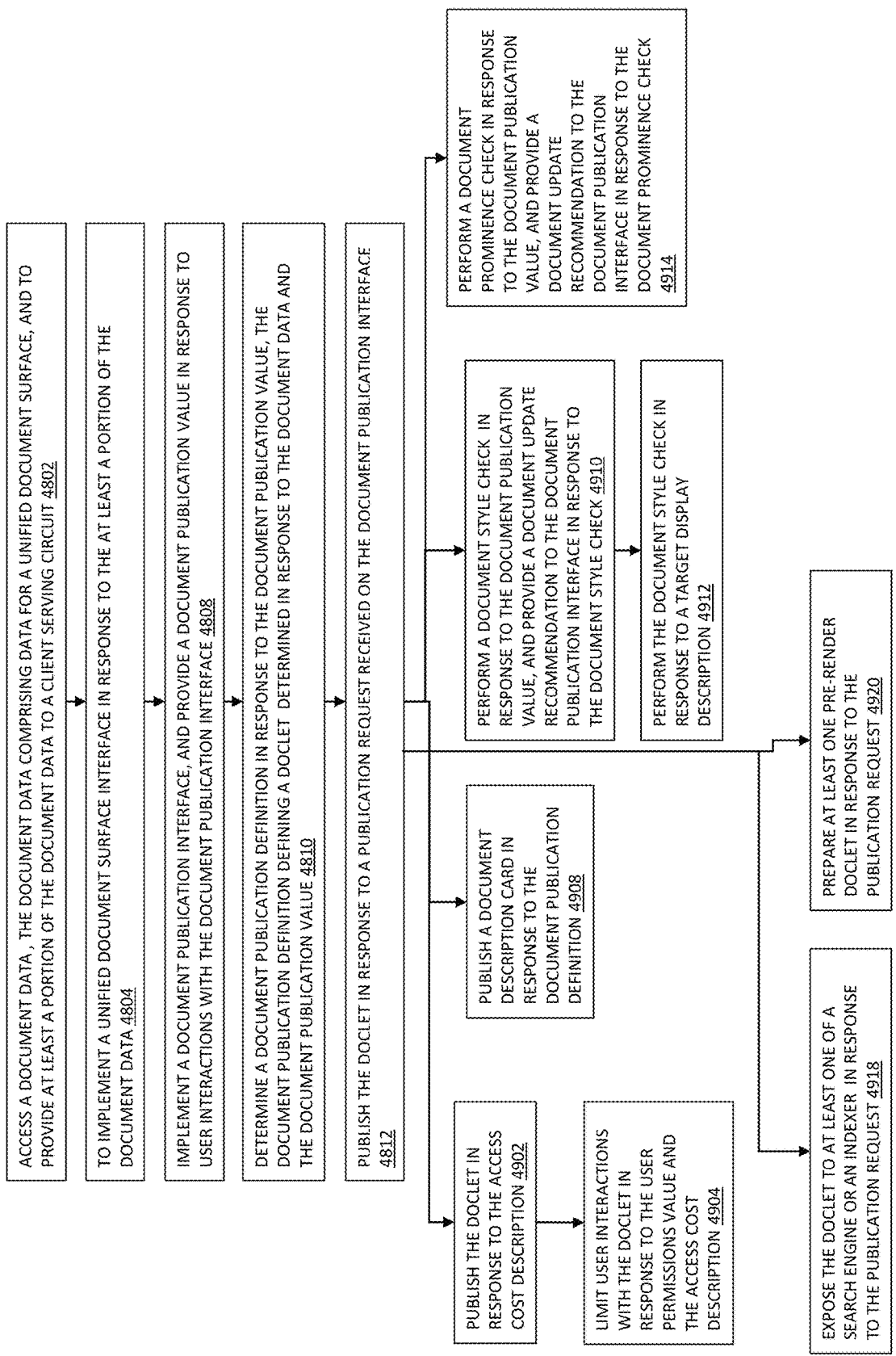
FIG. 49 is a schematic flow diagram of a procedure for publishing documents.
Figure 50:
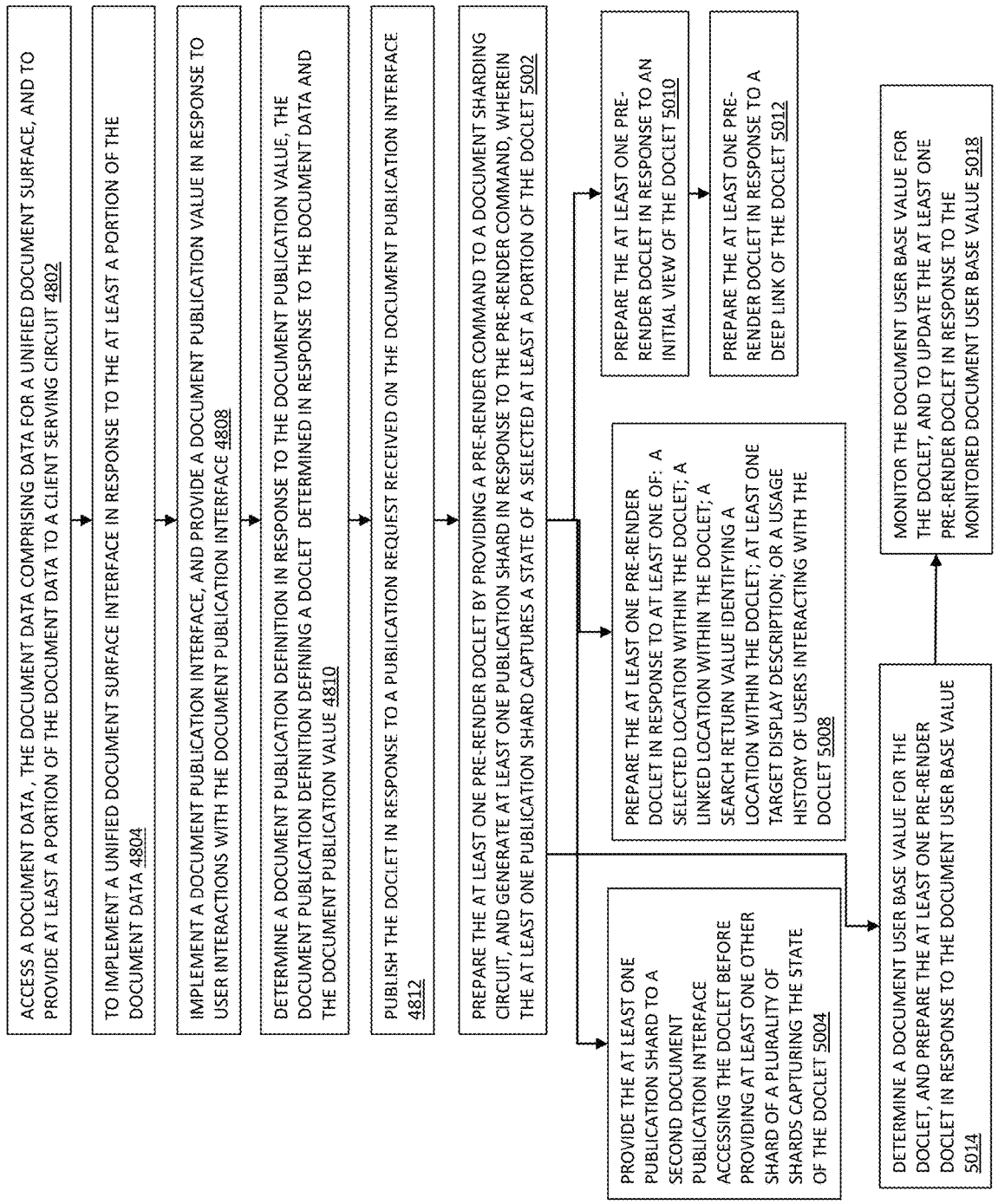
FIG. 50 is a schematic flow diagram of a procedure for publishing documents.
Figure 51:
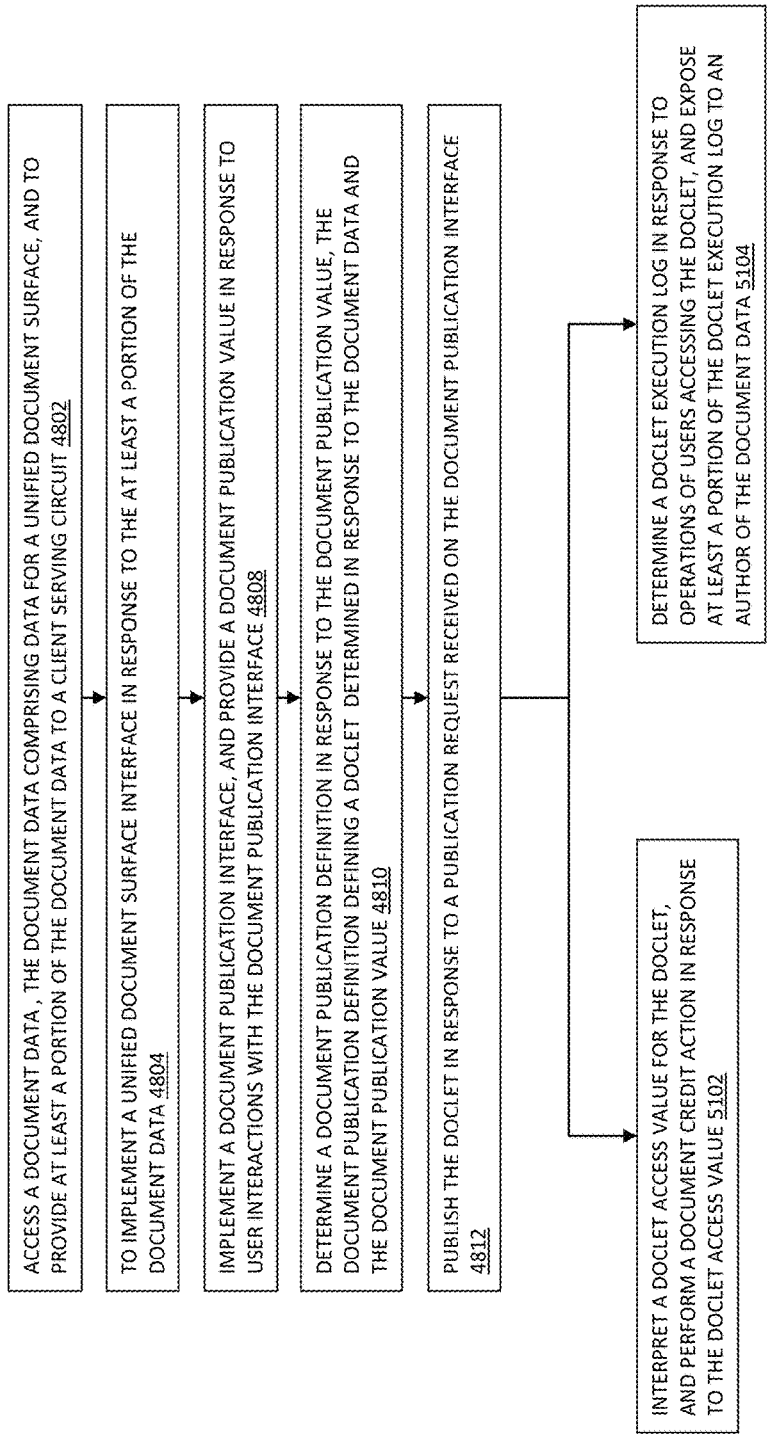
FIG. 51 is a schematic flow diagram of a procedure for publishing documents.

An example method shown in FIG. 47 may include determining a document snapshot event for a document including a unified document surface, and providing a document snapshot command in response to the document snapshot event 4702; generating a plurality of shard documents in response to the document snapshot command, wherein the plurality of shard documents capture a state of the document at the time of the document snapshot event 4704; accessing the plurality of shard documents and provide at least a subset of the plurality of shard documents 4708; and implementing a unified document surface interface in response to the at least a subset of the first plurality of shard documents 4710.

Certain further aspects of the example method are described following, any one or more of which may be present in certain embodiments. The method may further include using a plurality of shard strategy descriptions, each shard strategy description including at least a subset of the plurality of shard documents. The method may further include providing the at least a subset of the plurality of shard documents in response to a selected one of the plurality of shard strategy descriptions. The method may further include generating the plurality of shard documents in response to a selected one of the plurality of shard strategy descriptions. The method may further include generating the plurality of shard documents in response to each of the plurality of shard strategy descriptions. The method may further include determining supported ones of the plurality of shard strategy descriptions, and generating the plurality of shard documents in response to the supported ones of the plurality of shard strategy descriptions. The method may further include selecting one of the plurality of shard strategy descriptions in response to a size of the document. The method may further include selecting one of the plurality of shard strategy descriptions in response to a last accessed location of the document. The method may further include selecting one of the plurality of shard strategy descriptions in response to a selected location of the document. The method may further include selecting one of the plurality of shard strategy descriptions in response to a characteristic of a client device displaying the unified document surface interface to a user. The method may further include selecting one of the plurality of shard strategy descriptions in response to a user authorization description for the document. The method may further include selecting one of the plurality of shard strategy descriptions in response to a linked access description for the document. The method may further include selecting one of the plurality of shard strategy descriptions in response to a publication status for the document. The plurality of shard documents may include a canvas shard document for each canvas of the document. Each canvas shard document may include a schema corresponding to each canvas. The plurality of shard documents may include a table shard document for each table of the document. Each table shard document may include a schema corresponding to each table. The plurality of shard documents include a form shard document for each form of the document. The plurality of shard documents include a form shard document for each published form of the document.

An example method shown in FIGS. 48-51 may include accessing a document data, the document data including data for a unified document surface, and providing at least a portion of the document data 4802; implementing a unified document surface interface in response to the at least a portion of the document data 4804; implementing a document publication interface, and providing a document publication value in response to user interactions with the document publication interface 4808; wherein the method may further include: determining a document publication definition in response to the document publication value, the document publication definition defining a doclet determined in response to the document data and the document publication value 4810; and publishing the doclet in response to a publication request received on the document publication interface 4812.

Certain further aspects of the example method are described following, any one or more of which may be present in certain embodiments. The document publication definition may include a unique address to access the doclet. The document publication value may include at least a portion of the document data to be included in the doclet. The document publication value may include a user permissions value, and wherein the method may further include limiting user interactions with the doclet in response to the user permissions value. The user permissions value selectively limits user interaction with the doclet to read-only access. The user permissions value selectively limits user interaction with the doclet to play access, wherein play access may include non-persistent editing access. The user permissions value selectively limits user interaction with the doclet to edit access, wherein edit access may include persistent editing access. Edit access limits user interaction for selected editing operations. The user permissions value selectively limits user interaction with the doclet to author access, wherein author access may include persistent and unlimited editing access. The user permissions value selectively limits user interaction with the doclet in response to a user characteristic. The user permissions value selectively limits user interaction with the doclet in response to a location within a document defined by the document data. The document publication definition may include a publication scope value, and wherein the method may further include publishing the doclet in response to the publication scope value 4814. The publication scope value may include at least one value selected from the values consisting of: a public scope; a workspace scope; a user inclusion scope; or a user exclusion scope. The document publication definition may include a category tag, and wherein the method may further include publishing the doclet in response to the category tag 4818. The method may further include accessing a document list including a plurality of published doclets including the doclet, and displaying selected ones of the document list to a client device in response to category tags corresponding to each one of the published doclets 4820. The method may further include selecting the ones of the document list in response to the category tags 4824. The method may further include ordering the ones of the document list in response to the category tags 4828. The document publication definition may include an access cost description, and wherein the method may further include publishing the doclet in response to the access cost description 4902. The access cost description may include at least one of: a subscription cost value; a document access cost value; a trial period value; a document usage example value; or a usage based cost value. The method may further include: wherein the document publication value may include a user permissions value; and limiting user interactions with the doclet in response to the user permissions value and the access cost description 4904. The method may further include publishing a document description card in response to the document publication definition 4908. The document description card may include at least one value selected from the values consisting of: a document icon; a document picture; a document text description; a document title; a document author name; a document author entity; a document author contact; a utilizing documents list; a utilizing packs list; a document building block description; or a document dependency description. The method may further include performing a document style check in response to the document publication value, and providing a document update recommendation to the document publication interface in response to the document style check 4910. The method may further include performing the document style check in response to a target display description 4912. The target display description may include at least one of: computing resources available for a target client device; connectivity resources available for a target client device; display settings available for a target client device; or accessing tools for a target client device. The method may further include performing a document prominence check in response to the document publication value, and providing a document update recommendation to the document publication interface in response to the document prominence check 4914. The method may further include exposing the doclet to at least one of a search engine or an indexer in response to the publication request 4918. The method may further include preparing at least one pre-render doclet in response to the publication request 4920. The method may further include preparing the at least one pre-render doclet by providing a pre-render command, and generating at least one publication shard in response to the pre-render command, wherein the at least one publication shard captures a state of a selected at least a portion of the doclet 5002. The method may further include providing the at least one publication shard to a second document publication interface accessing the doclet before providing at least one other shard of a plurality of shards capturing the state of the doclet 5004. The method may further include preparing the at least one pre-render doclet in response to at least one of: a selected location within the doclet; a linked location within the doclet; a search return value identifying a location within the doclet; at least one target display description; or a usage history of users interacting with the doclet 5008. The method may further include preparing the at least one pre-render doclet in response to an initial view of the doclet 5010. The method may further include preparing the at least one pre-render doclet in response to a deep link of the doclet 5012. The method may further include determining a document user base value for the doclet, and preparing the at least one pre-render doclet in response to the document user base value 5014. The document user base value may include at least one value selected from the values consisting of: a number of users having access to the doclet; a number of users having a selected access type to the doclet; a number of user access configurations for users having access to the doclet; or a distribution of user access configurations for users having access to the doclet. The method may further include monitoring the document user base value for the doclet, and updating the at least one pre-render doclet in response to the monitored document user base value 5018. The method may further include interpreting a doclet access value for the doclet, and performing a document credit action in response to the doclet access value 5102. The method may further include determining a doclet execution log in response to operations of users accessing the doclet, and exposing at least a portion of the doclet execution log to an author of the document data 5104. The doclet execution log may include at least one log information element selected from: a number of documents referencing the doclet; a number of execution events of components of the doclet; an execution time of execution events of components of the doclet; a number of service or data access events of components of the doclet; a number of users accessing the doclet; a number of users editing the doclet; a number of users performing non-persistent editing of the doclet; a user description of users accessing the doclet; an accessing source of users accessing the doclet; or a display description of users accessing the doclet.

Figure 52:
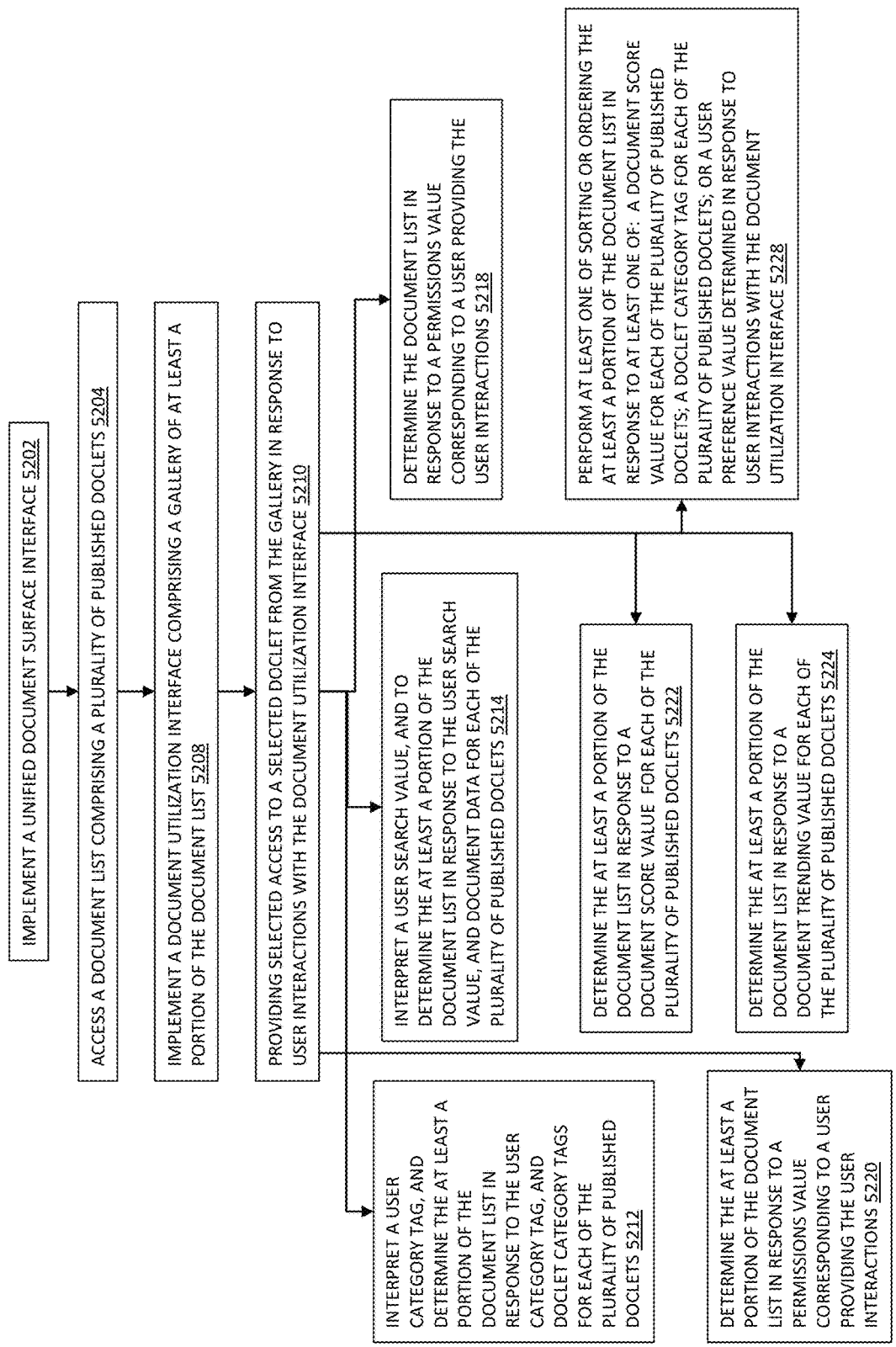
FIG. 52 is a schematic flow diagram of a procedure for determining a document list.
Figure 53:
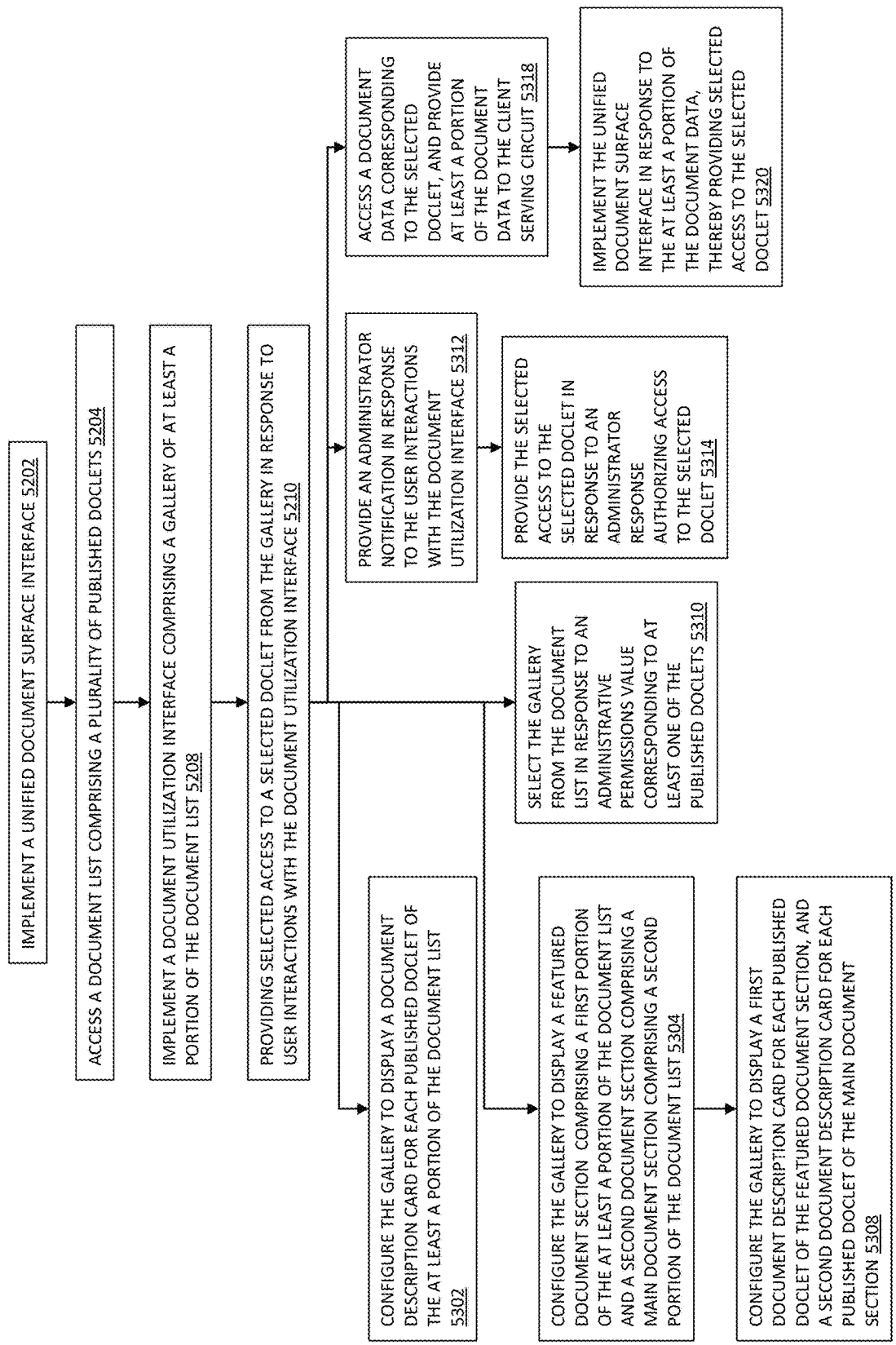
FIG. 53 is a schematic flow diagram of a procedure for providing a gallery.

An example method shown in FIGS. 52-53 may include implementing a unified document surface interface 5202; accessing a document list including a plurality of published doclets 5204; implementing a document utilization interface including a gallery of at least a portion of the document list 5208; and providing selected access to a selected doclet from the gallery in response to user interactions with the document utilization interface 5210.

Certain further aspects of the example method are described following, any one or more of which may be present in certain embodiments. The method may further include interpreting a user category tag, and determining the at least a portion of the document list in response to the user category tag, and doclet category tags for each of the plurality of published doclets 5212. The method may further include interpreting a user search value, and determining the at least a portion of the document list in response to the user search value, and document data for each of the plurality of published doclets 5214. The method may further include determining the document list in response to a permissions value corresponding to a user providing the user interactions 5218. The method may further include determining the at least a portion of the document list in response to a permissions value corresponding to a user providing the user interactions 5220. The method may further include determining the at least a portion of the document list in response to a document score value for each of the plurality of published doclets 5222. The method may further include determining the at least a portion of the document list in response to a document trending value for each of the plurality of published doclets 5224. The method may further include performing at least one of sorting or ordering the at least a portion of the document list in response to at least one of: a document score value for each of the plurality of published doclets; a doclet category tag for each of the plurality of published doclets; or a user preference value determined in response to user interactions with the document utilization interface 5228. The method may further include configuring the gallery to display a document description card for each published doclet of the at least a portion of the document list 5302. Each document description card may include at least one value selected from the values consisting of: a document icon; a document picture; a document text description; a document title; a document author name; a document author entity; a document author contact; a utilizing documents list; a utilizing packs list; a document building block description; or a document dependency description. The method may further include configuring the gallery to display a featured document section including a first portion of the at least a portion of the document list and a second document section including a main document section including a second portion of the document list 5304. The method may further include configuring the gallery to display a first document description card for each published doclet of the featured document section, and a second document description card for each published doclet of the main document section 5308. The document utilization interface may include a search interface portion and a document results portion. The method may further include selecting the gallery from the document list in response to an administrative permissions value corresponding to at least one of the published doclets 5310. The administrative permissions value may include at least one value selected from the values consisting of: a cost permissions value; a building block value; a document inclusion value; a document exclusion value; or a document certification value. The method may further include: providing an administrator notification in response to the user interactions with the document utilization interface 5312; and providing the selected access to the selected doclet in response to an administrator response authorizing access to the selected doclet 5314. The method may further include accessing a document data corresponding to the selected doclet, and providing at least a portion of the document data 5318; and implementing the unified document surface interface in response to the at least a portion of the document data, thereby providing selected access to the selected doclet 5320. The at least a portion of the document data may include a plurality of document shards, including at least one publication shard, wherein the plurality of document shards capture a state of the selected doclet, and wherein the at least one publication shard captures a state of a selected at least a portion of the selected doclet. The method may further include providing the at least one publication shard to a client device accessing the doclet before providing at least one other shard of the plurality of document shards. The selected access to the selected doclet may include read-only access to at least a portion of the selected doclet. The selected access to the selected doclet may include play access to at least a portion of the selected doclet, wherein play access may include non-persistent editing access. The selected access to the selected doclet may include edit access, wherein edit access may include persistent editing access. The selected access to the selected doclet may include author access, wherein author access may include persistent and unlimited editing access.

Figure 54:
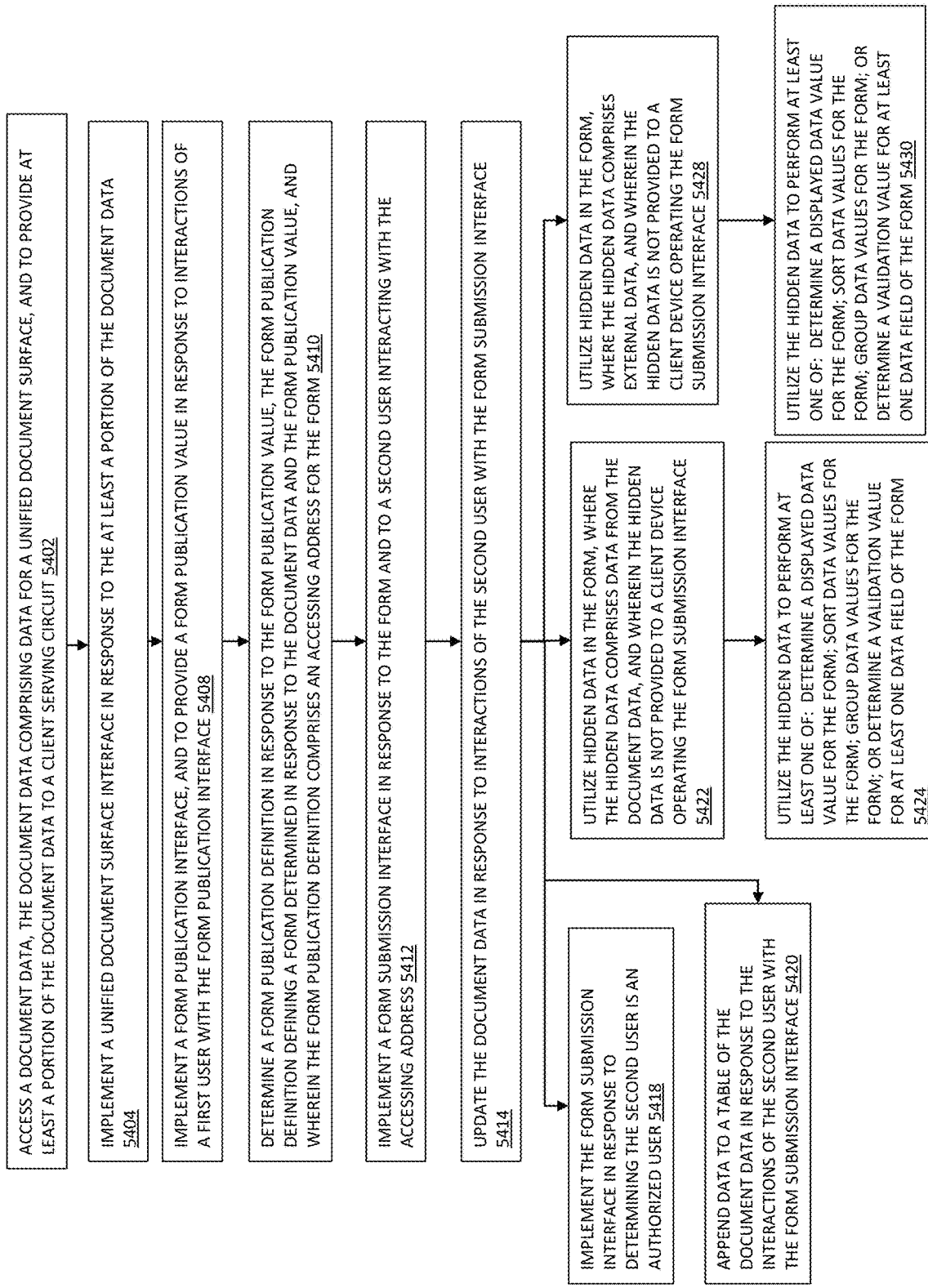
FIG. 54 is a schematic flow diagram of a procedure for providing forms.
Figure 55:
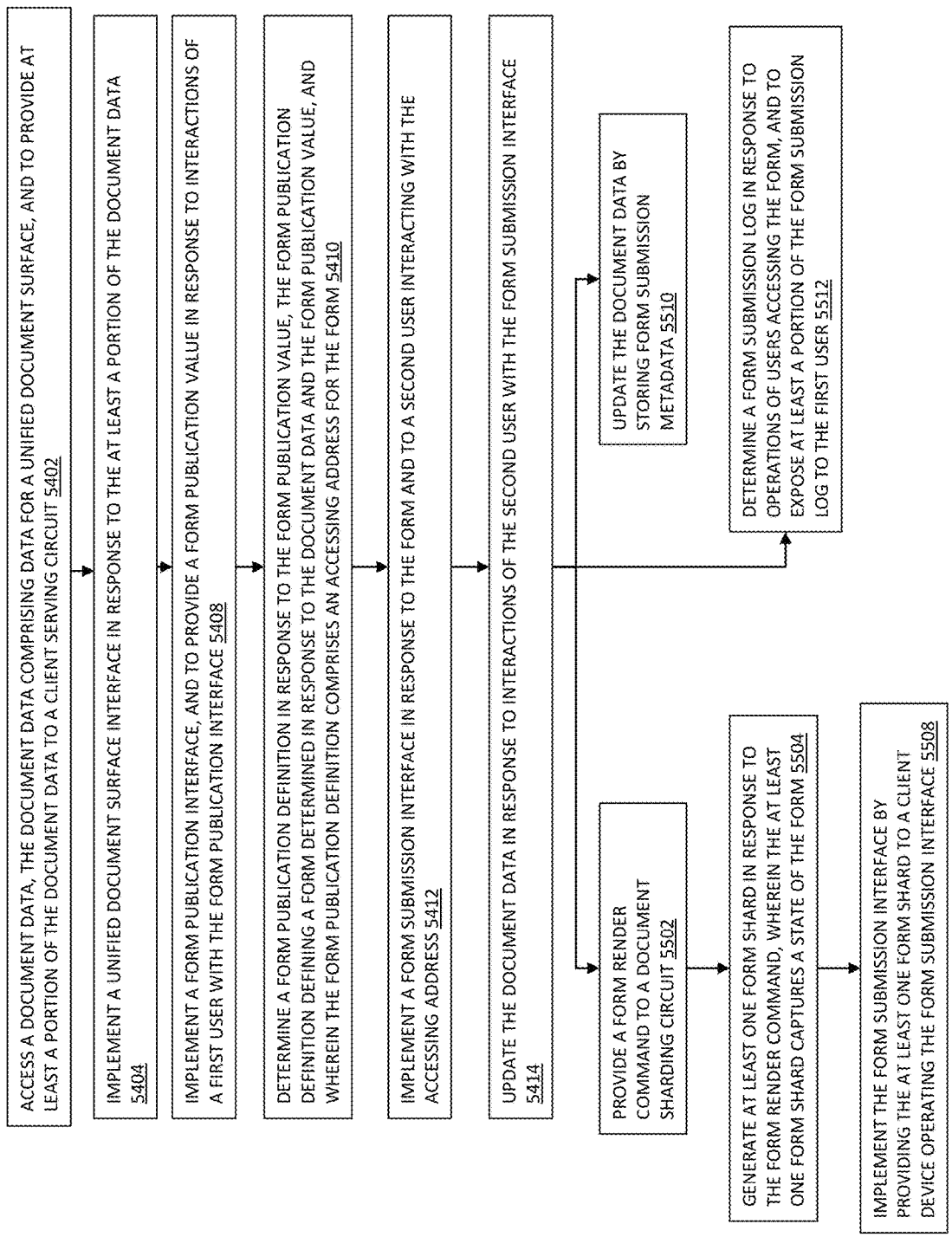
FIG. 55 is a schematic flow diagram of a procedure for providing forms.

An example method shown in FIGS. 54-55 may include accessing a document data, the document data including data for a unified document surface, and providing at least a portion of the document data 5402; implementing a unified document surface interface in response to the at least a portion of the document data 5404; implementing a form publication interface, and providing a form publication value in response to interactions of a first user with the form publication interface 5408; determining a form publication definition in response to the form publication value, the form publication definition defining a form determined in response to the document data and the form publication value, wherein the form publication definition may include an accessing address for the form 5410; implementing a form submission interface in response to the form and to a second user interacting with the accessing address 5412; and updating the document data in response to interactions of the second user with the form submission interface 5414.

Certain further aspects of the example method are described following, any one or more of which may be present in certain embodiments. The method may further include implementing the form submission interface in response to determining the second user is an authorized user 5418. The form publication value may include one of a submission state allowing implementation of the form submission interface, or a second hidden state that does not allow implementation of the form submission interface. The form publication interface allows the first user to selectively provide hidden lookup data to a client device operating the form submission interface. The form publication interface allows the first user to selectively provide sensitive information to a client device operating the form submission interface. The method may further include appending data to a table of the document data in response to the interactions of the second user with the form submission interface 5420. The form may include a text description and at least one data field. The form may further include a validation formula associated with the at least one data field. The form submission interface provides a valid data notification in response to the validation formula, and further in response to at least one of a data entry interaction with the at least one data field, or a form submission action. The method may further include utilizing hidden data in the form, where the hidden data may include data from the document data, and wherein the hidden data may be not provided to a client device operating the form submission interface 5422. The method may further include utilizing the hidden data to perform at least one of: determine a displayed data value for the form; sort data values for the form; group data values for the form; or determine a validation value for at least one data field of the form 5424. The method may further include utilizing the hidden data to perform at least one of: determine a displayed data value for the form; sort data values for the form; group data values for the form; or determine a validation value for at least one data field of the form 5430. The method may further include utilizing hidden data in the form, where the hidden data may include external data, and wherein the hidden data may be not provided to a client device operating the form submission interface 5428. The method may further include providing a form render command 5502; generating at least one form shard in response to the form render command, wherein the at least one form shard captures a state of the form 5504; and implementing the form submission interface by providing the at least one form shard to a client device operating the form submission interface 5508. The method may further include updating the document data by storing form submission metadata 5510. The form submission metadata may further include at least one data element selected from the data elements consisting of a second user identifier; a form access time stamp; or a form submission time stamp. The method may further include determining a form submission log in response to operations of users accessing the form, and exposing at least a portion of the form submission log to the first user 5512. The form submission log may include at least one log information element selected from: a number of form submission events; a data description of submitted data fields of the form; a user listing of users that have submitted the form; an error description for error events occurring during the implementing of the form publication interface; or an error description for error events occurring during the implementing of the form submission interface. The form publication definition may include a user identification scheme.

Figure 56:
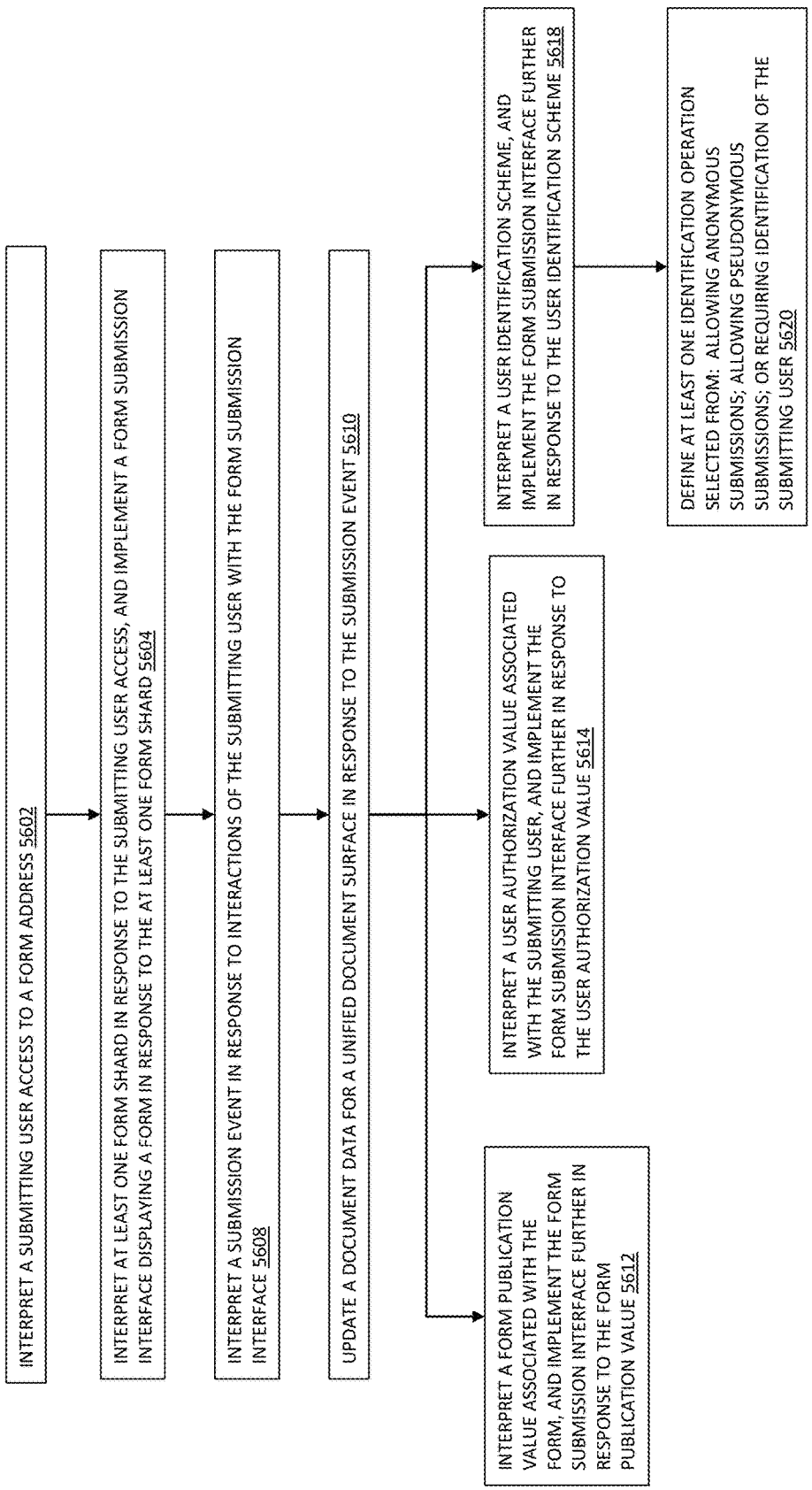
FIG. 56 is a schematic flow diagram of a procedure for using forms.

An example method shown in FIG. 56 may include interpreting a submitting user access to a form address 5602; interpreting at least one form shard in response to the submitting user access, and implementing a form submission interface displaying a form in response to the at least one form shard 5604; interpreting a submission event in response to interactions of the submitting user with the form submission interface 5608; and updating a document data for a unified document surface in response to the submission event 5610.

Certain further aspects of the example method are described following, any one or more of which may be present in certain embodiments. The method may further include interpreting a form publication value associated with the form, and implementing the form submission interface further in response to the form publication value 5612. The method may further include interpreting a user authorization value associated with the submitting user, and implementing the form submission interface further in response to the user authorization value 5614. The form may include a text description and at least one data field. The form may further include a validation formula associated with the at least one data field. The form submission interface provides a valid data notification in response to the validation formula, and further in response to at least one of a data entry interaction with the at least one data field, or the form submission event. The method may further include interpreting a user identification scheme, and implementing the form submission interface further in response to the user identification scheme 5618. The user identification scheme may define at least one identification operation selected from: allowing anonymous submissions; allowing pseudonymous submissions; or requiring identification of the submitting user 5620.

Figure 57:
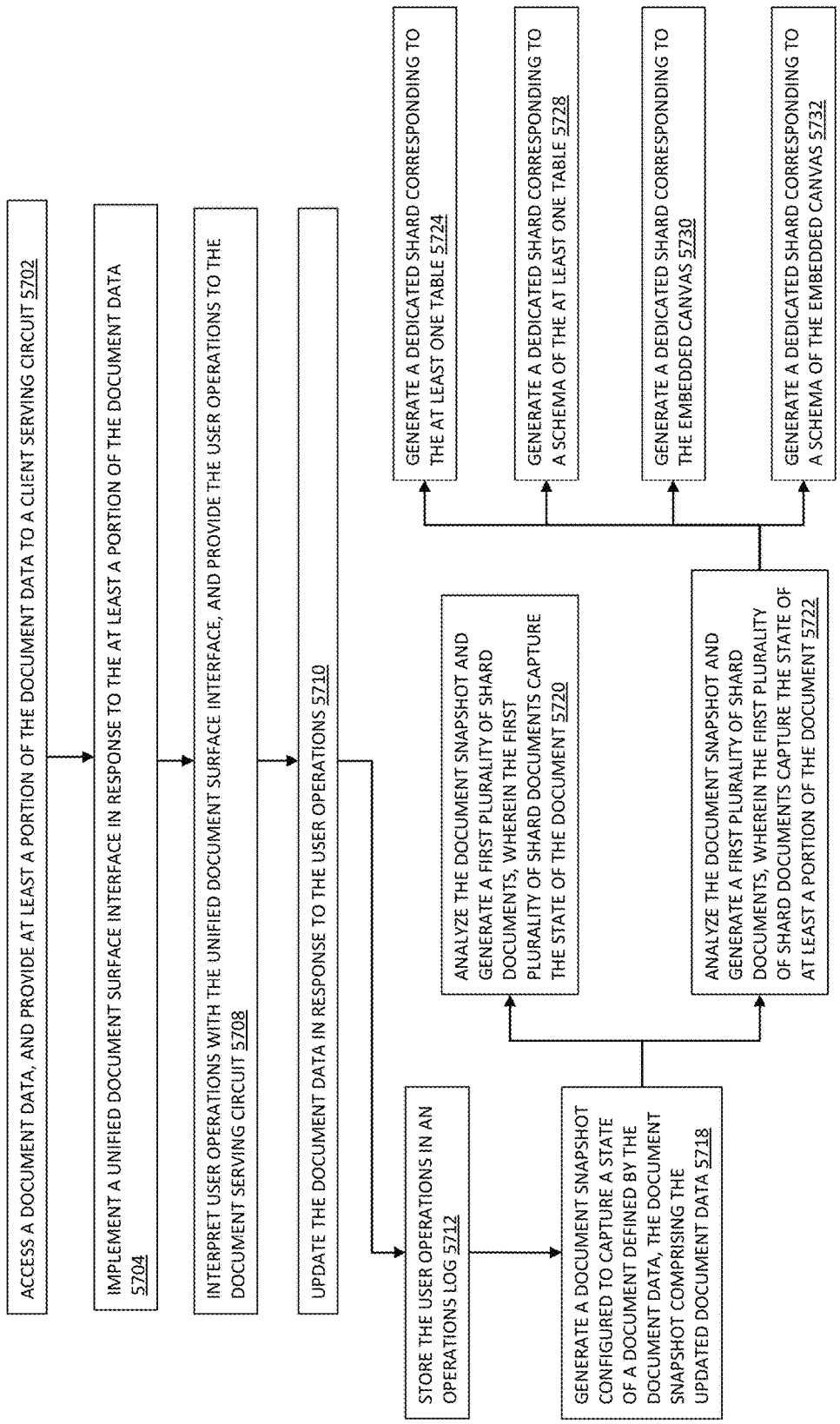
FIG. 57 is a schematic flow diagram of a procedure for generating shards.
Figure 58:
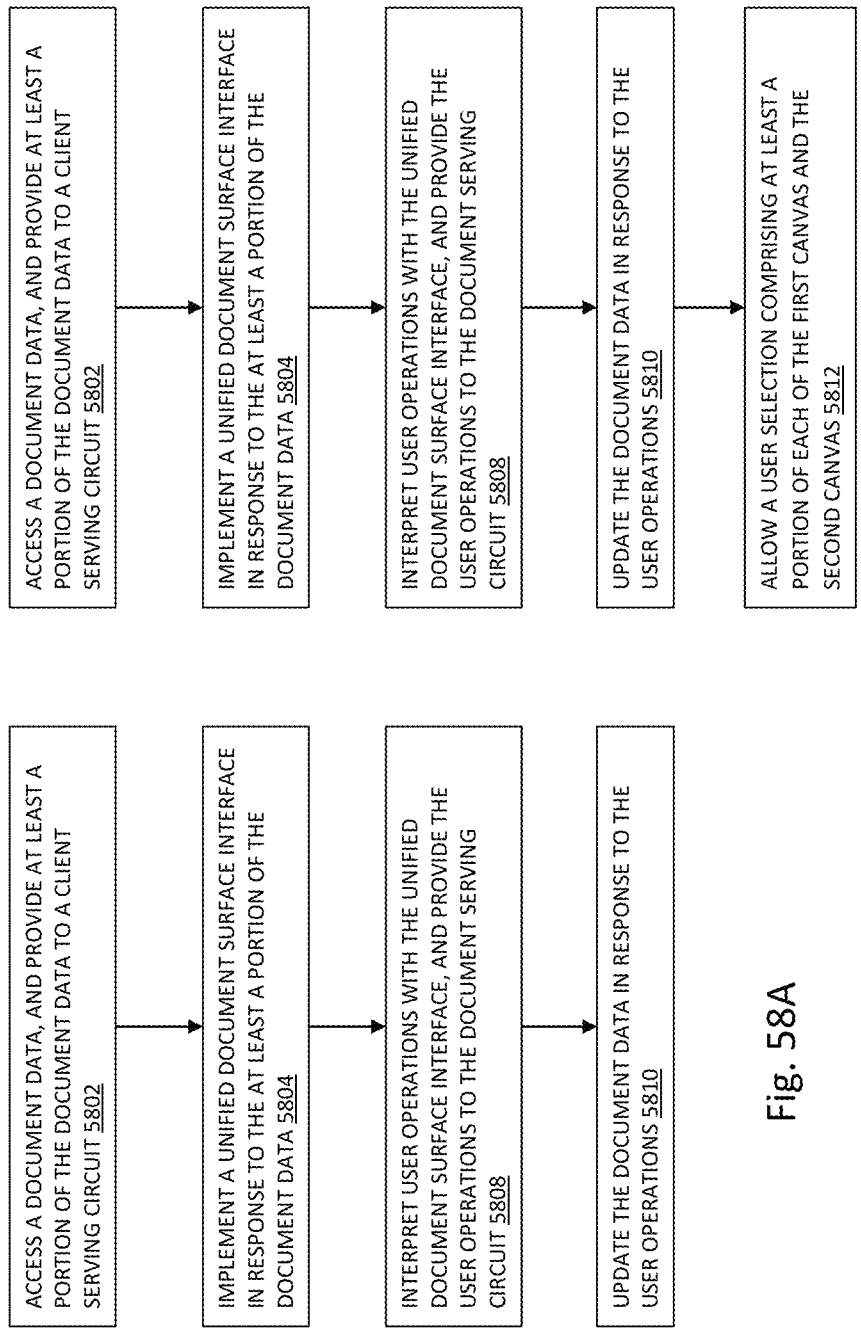
FIG. 58A is a schematic flow diagram of a procedure for updating document data.
FIG. 58B is a schematic flow diagram of a procedure for updating document data.

An example method shown in FIG. 57 may include accessing a document data, the document data including data for a unified document surface, and providing at least a portion of the document data 5702; wherein the document data may further include at least one table having an embedded canvas; implementing a unified document surface interface in response to the at least a portion of the document data 5704; interpreting user operations with the unified document surface interface, and providing the user operations 5708; and updating the document data in response to the user operations 5710.

Certain further aspects of the example method are described following, any one or more of which may be present in certain embodiments. The method may further include storing the user operations in an operations log 5712. The method may further include generating a document snapshot configured to capture a state of a document defined by the document data, the document snapshot including the updated document data 5718. The method may further include analyzing the document snapshot and generating a first plurality of shard documents, wherein the first plurality of shard documents capture the state of the document 5720. The method may further include analyzing the document snapshot and generating a first plurality of shard documents, wherein the first plurality of shard documents capture the state of at least a portion of the document 5722. The method may further include generating a dedicated shard corresponding to the at least one table 5724. The method may further include generating a dedicated shard corresponding to a schema of the at least one table 5728. The method may further include generating a dedicated shard corresponding to the embedded canvas 5730. The method may further include generating a dedicated shard corresponding to a schema of the embedded canvas 5732. The embedded canvas may include a column of the at least one table. The embedded canvas may include a plurality of columns of the at least one table. The embedded canvas may include at least two objects selected from the objects consisting of: a text flow, a table, a visualization element, a chart, a graph, linked external data, or a preview.

An example method shown in FIGS. 58A-58B may include accessing a document data, the document data including data for a unified document surface, and providing at least a portion of the document data 5802; wherein the document data may further include at least one canvas defining a document section, and having at least two objects selected from the object consisting of: a text flow, a table, a visualization element, a chart, a graph, linked external data, or a preview; implementing a unified document surface interface in response to the at least a portion of the document data 5804; interpreting user operations with the unified document surface interface, and providing the user operations 5808; and updating the document data in response to the user operations 5810.

Certain further aspects of the example method are described following, any one or more of which may be present in certain embodiments. The method may further include the canvas having a vertical split. The canvas may include a first vertical extent, the document data further including a second canvas having a second vertical extent, and wherein the first vertical extent at least partially overlaps the second vertical extent. The method may further include providing a second canvas, and allowing a user selection including at least a portion of each of the first canvas and the second canvas 5812.

Figure 59:
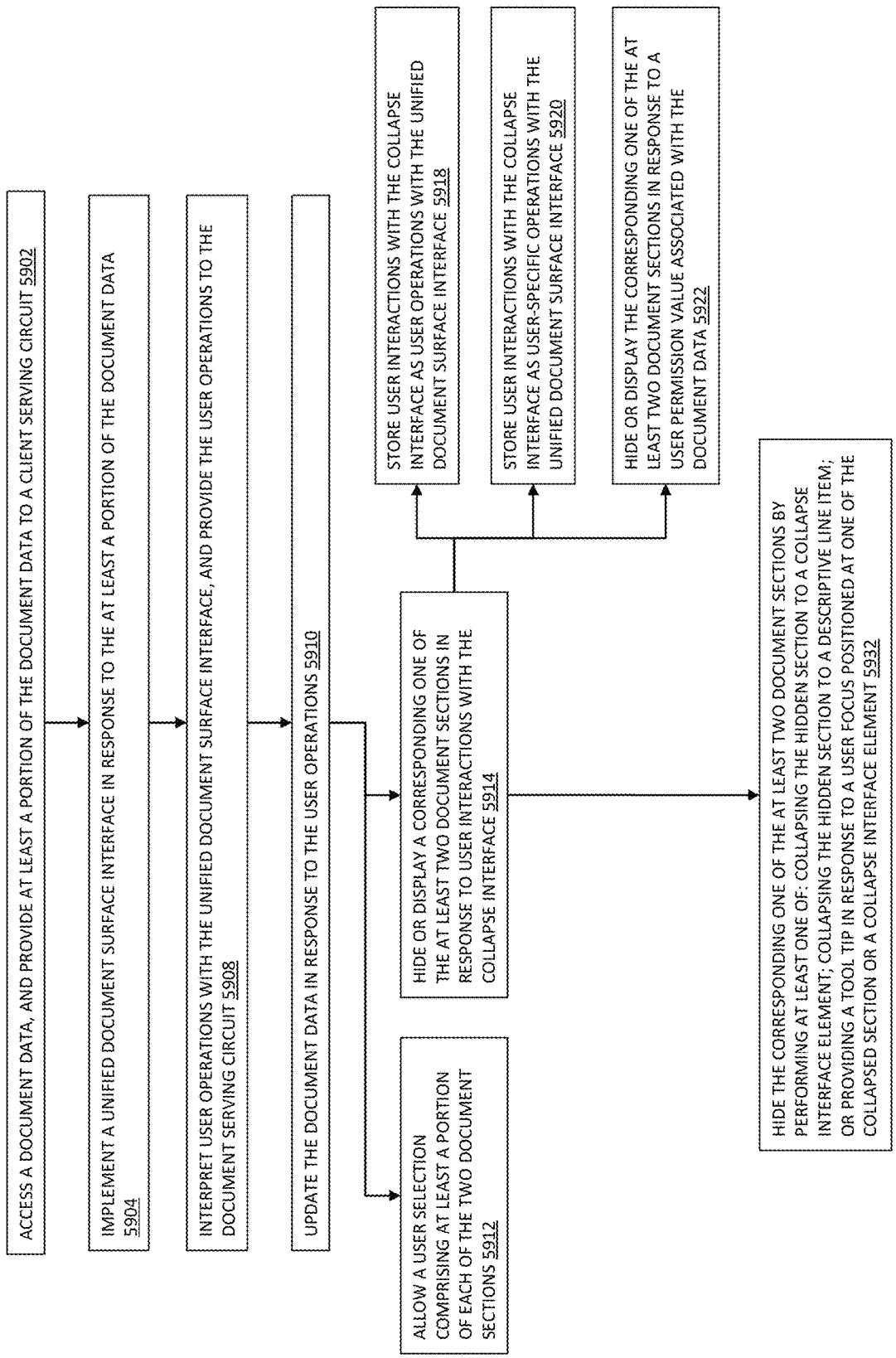
FIG. 59 is a schematic flow diagram of a procedure for document display.
Figure 60:
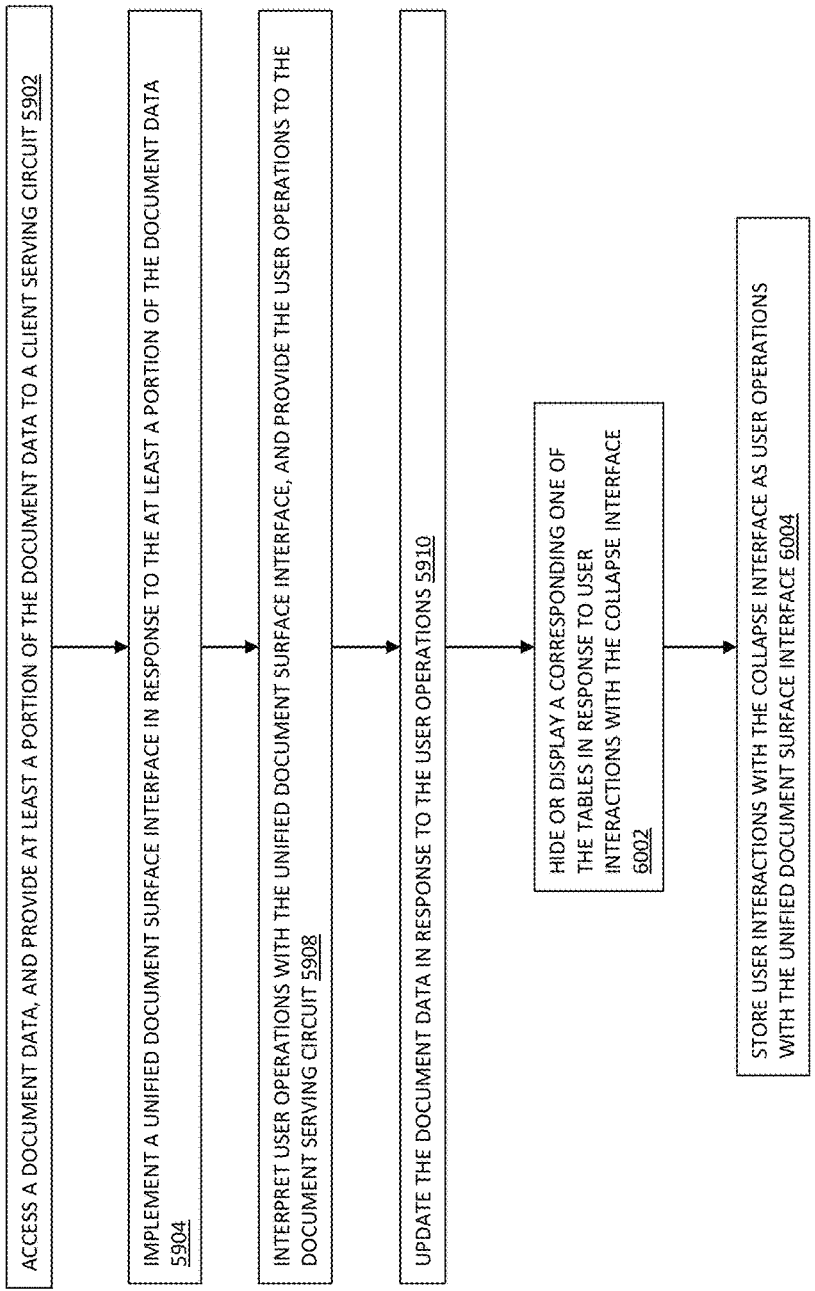
FIG. 60 is a schematic flow diagram of a procedure for document display.

An example method shown in FIGS. 59-60 may include accessing a document data, the document data including data for a unified document surface, and providing at least a portion of the document data 5902; wherein the document data may further include at least two document sections, each document section having at least one object selected from the object consisting of: a canvas, a text flow, a table, a visualization element, a chart, a graph, linked external data, or a preview; implementing a unified document surface interface in response to the at least a portion of the document data 5904; interpreting user operations with the unified document surface interface, and providing the user operations 5908; and updating the document data in response to the user operations 5910.

Certain further aspects of the example method are described following, any one or more of which may be present in certain embodiments. The method may further include allowing a user selection including at least a portion of each of the two document sections 5912. The user selection may include at least a portion of a text flow and at least a portion of a table. The user selection may include at least a portion of a text flow, and at least a portion of at least one of: a text flow, a table, a visualization element, a chart, a graph, linked external data, or a preview. Each of the at least two document sections may include a collapse interface, wherein the method may further include hiding or displaying a corresponding one of the at least two document sections in response to user interactions with the collapse interface 5914. The method may further include storing user interactions with the collapse interface as user operations with the unified document surface interface 5918. The method may further include storing user interactions with the collapse interface as user-specific operations with the unified document surface interface 5920. The method may further include hiding or displaying the corresponding one of the at least two document sections in response to a user permission value associated with the document data 5922. The method may further include hiding the corresponding one of the at least two document sections by performing at least one of: collapsing the hidden section to a collapse interface element; collapsing the hidden section to a descriptive line item; or providing a tool tip in response to a user focus positioned at one of the collapsed section or a collapse interface element 5932, wherein the tool tip may include at least one of: a descriptive line item for the collapsed section, a preview of the collapsed section, a representative data value for the collapsed section, or an administrative notification value. Each of the at least two document sections include a table having a collapse interface, wherein the method may further include hiding or display a corresponding one of the tables in response to user interactions with the collapse interface 6002. The method may further include storing user interactions with the collapse interface as user operations with the unified document surface interface 6004.

Figure 61:
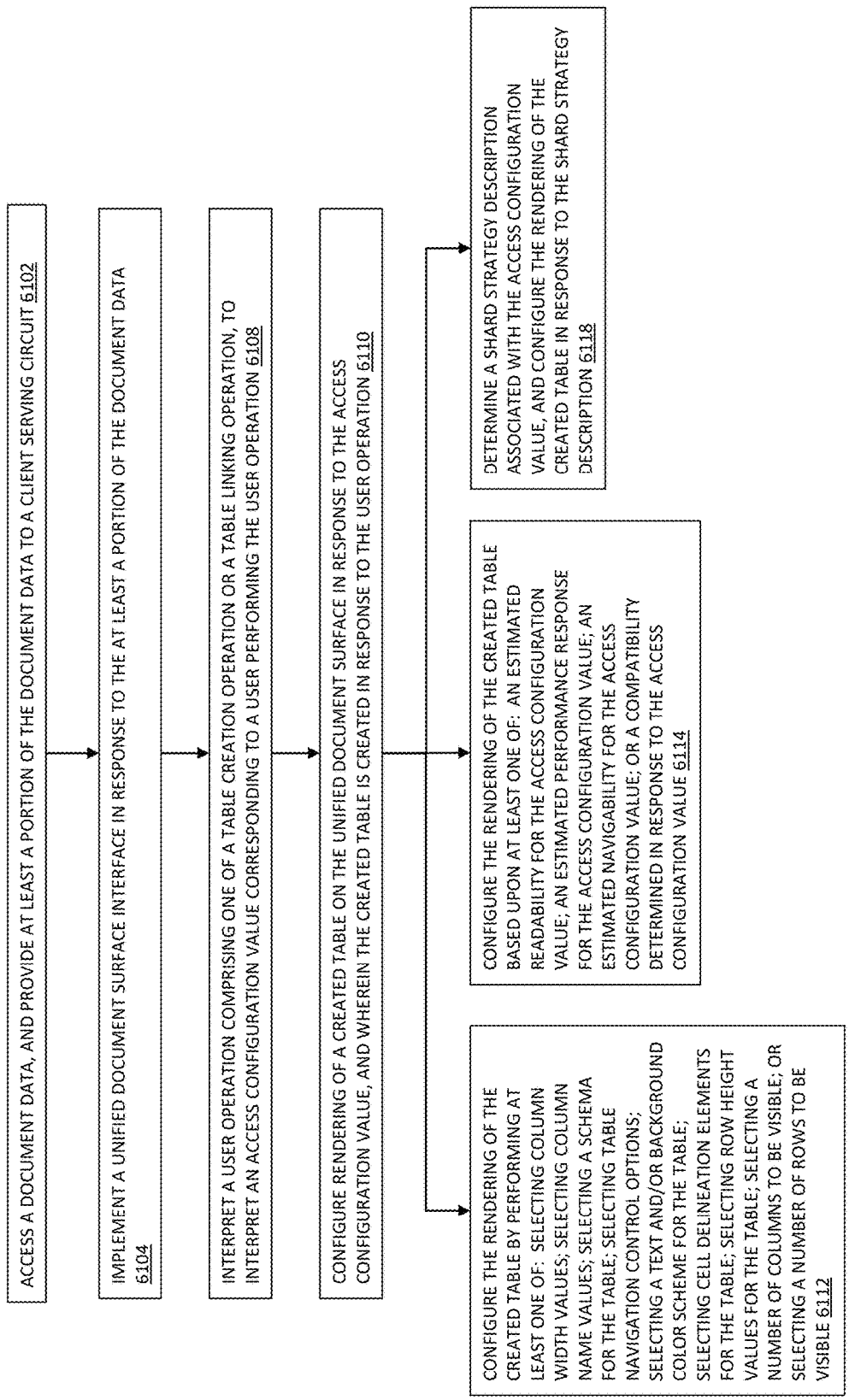
FIG. 61 is a schematic flow diagram of a procedure for configuring rendering.

An example method shown in FIG. 61 may include accessing a document data, the document data including data for a unified document surface, and providing at least a portion of the document data 6102; implementing a unified document surface interface in response to the at least a portion of the document data 6104; interpreting a user operation including one of a table creation operation or a table linking operation, to interpret an access configuration value corresponding to a user performing the user operation 6108; and configuring rendering of a created table on the unified document surface in response to the access configuration value, wherein the created table may be created in response to the user operation 6110.

Certain further aspects of the example method are described following, any one or more of which may be present in certain embodiments. The access configuration value may include a client device description. The access configuration value may include a platform for the unified document surface interface. The method may further include configuring the rendering of the created table by performing at least one of: selecting column width values; selecting column name values; selecting a schema for the table; selecting table navigation control options; selecting a text and/or background color scheme for the table; selecting cell delineation elements for the table; selecting row height values for the table; selecting a number of columns to be visible; or selecting a number of rows to be visible 6112. The method may further include configuring the rendering of the created table based upon at least one of: an estimated readability for the access configuration value; an estimated performance response for the access configuration value; an estimated navigability for the access configuration value; or a compatibility determined in response to the access configuration value 6114. The method may further include determining a shard strategy description associated with the access configuration value, and configuring the rendering of the created table in response to the shard strategy description 6118.

Figure 62:
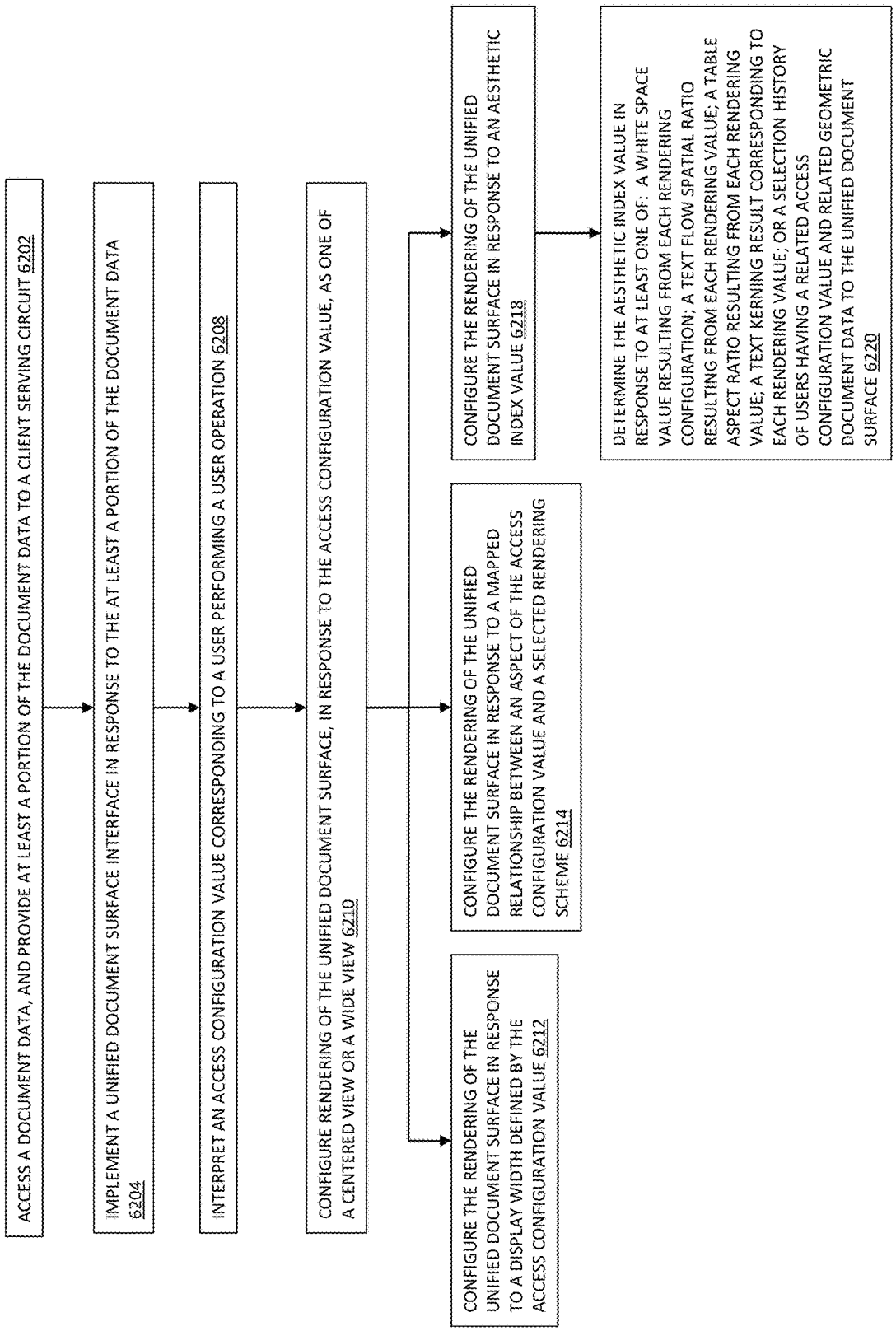
FIG. 62 is a schematic flow diagram of a procedure for configuring rendering.
Figure 63:
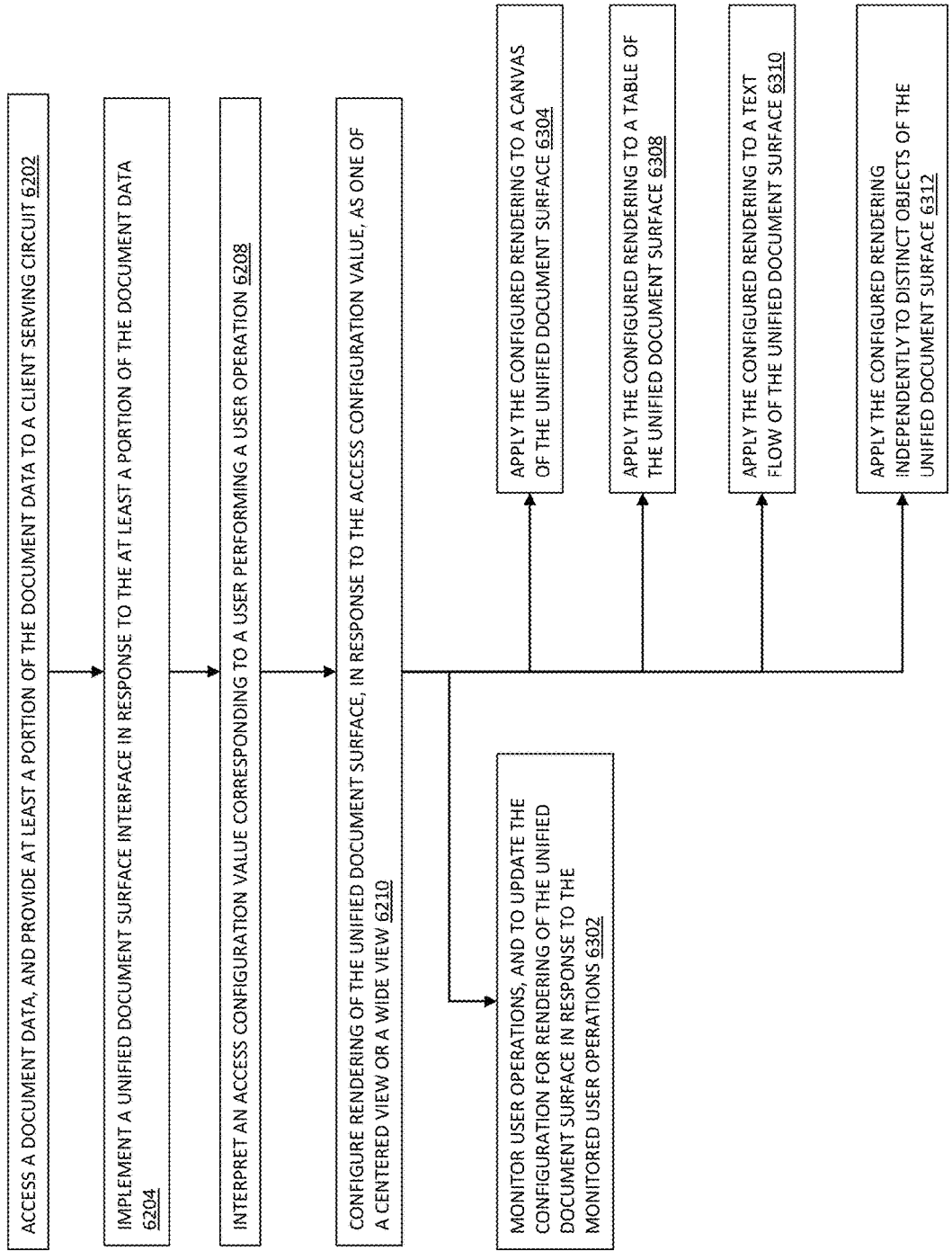
FIG. 63 is a schematic flow diagram of a procedure for document rendering.
Figure 64:
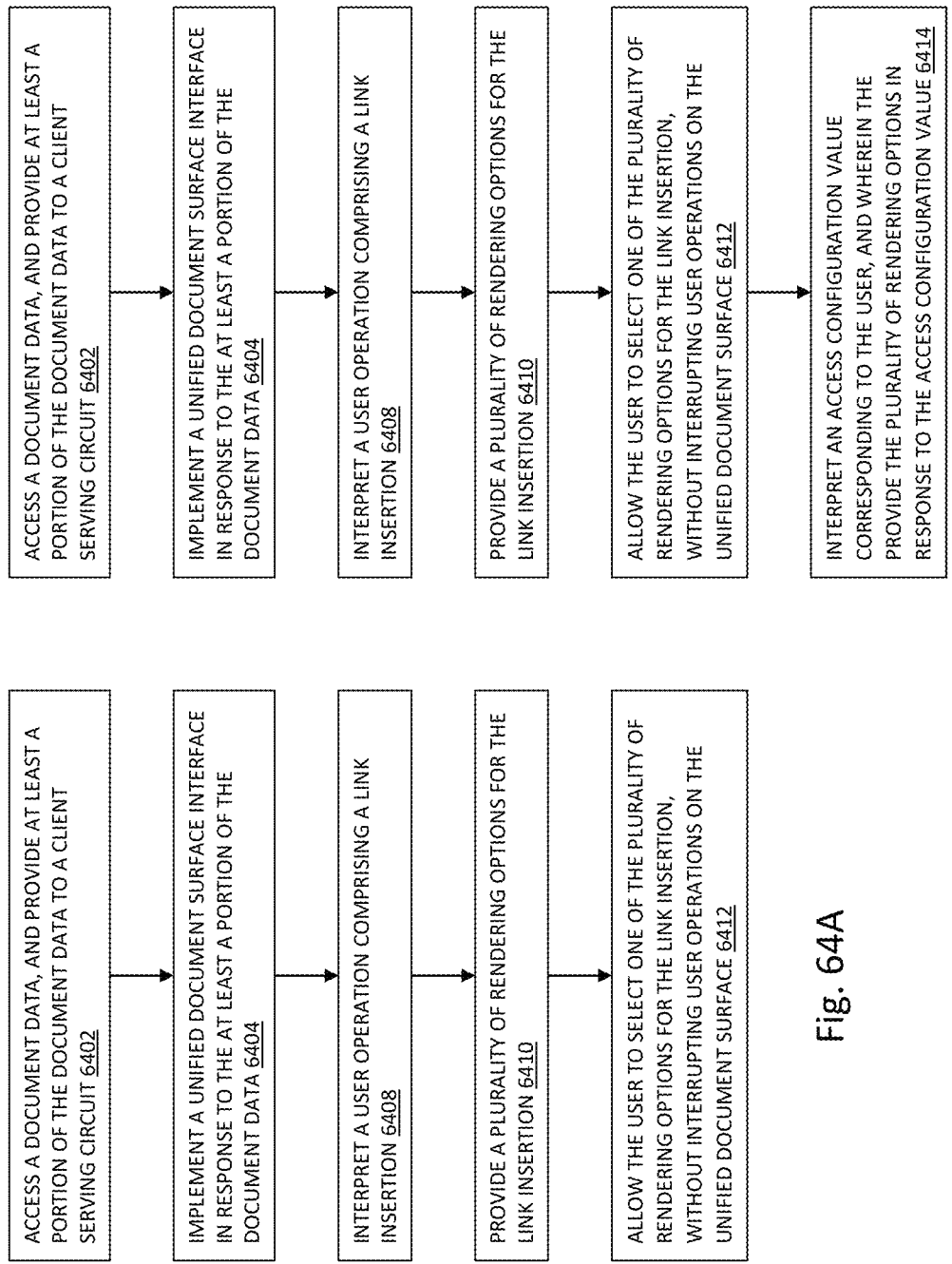
FIG. 64A is a schematic flow diagram of a procedure for document rendering.
FIG. 64B is a schematic flow diagram of a procedure for document rendering

An example method shown in FIGS. 62-63 may include accessing a document data, the document data including data for a unified document surface, and providing at least a portion of the document data 6202; implementing a unified document surface interface in response to the at least a portion of the document data 6204; interpreting an access configuration value corresponding to a user performing a user operation 6208; and configuring rendering of the unified document surface, in response to the access configuration value, as one of a centered view or a wide view 6210.

Certain further aspects of the example method are described following, any one or more of which may be present in certain embodiments. The method may further include configuring the rendering of the unified document surface in response to a display width defined by the access configuration value 6212. The method may further include configuring the rendering of the unified document surface in response to a mapped relationship between an aspect of the access configuration value and a selected rendering scheme 6214. The method may further include configuring the rendering of the unified document surface in response to an aesthetic index value 6218. The aesthetic index value may be determined in response to at least one of: a white space value resulting from each rendering configuration; a text flow spatial ratio resulting from each rendering value; a table aspect ratio resulting from each rendering value; a text kerning result corresponding to each rendering value; or a selection history of users having a related access configuration value and related geometric document data to the unified document surface 6220. The method may further include monitoring user operations, and updating the configuration for rendering of the unified document surface in response to the monitored user operations 6302. The configured rendering may be applied to a canvas of the unified document surface 6304. The configured rendering may be applied to a table of the unified document surface 6308. The configured rendering may be applied to a text flow of the unified document surface 6310. The configured rendering may be applied independently to distinct objects of the unified document surface 6312.

An example method shown in FIGS. 64A-64B may include accessing a document data, the document data including data for a unified document surface, and providing at least a portion of the document data 6402; implementing a unified document surface interface in response to the at least a portion of the document data 6404; interpreting a user operation including a link insertion 6408; providing a plurality of rendering options for the link insertion 6410; and allowing the user to select one of the plurality of rendering options for the link insertion, without interrupting user operations on the unified document surface 6412.

Certain further aspects of the example method are described following, any one or more of which may be present in certain embodiments. The plurality of rendering options include at least one option selected from the options consisting of: a table insertion option, a visual element insertion option, or a link description option. The method may further include interpreting an access configuration value corresponding to the user, and providing the plurality of rendering options in response to the access configuration value 6414. The plurality of rendering options include at least one option selected from the options consisting of: a table schema option, a table insertion option, a visual element insertion option, a link description option, a centered view option, or a wide view option.

Figure 65:
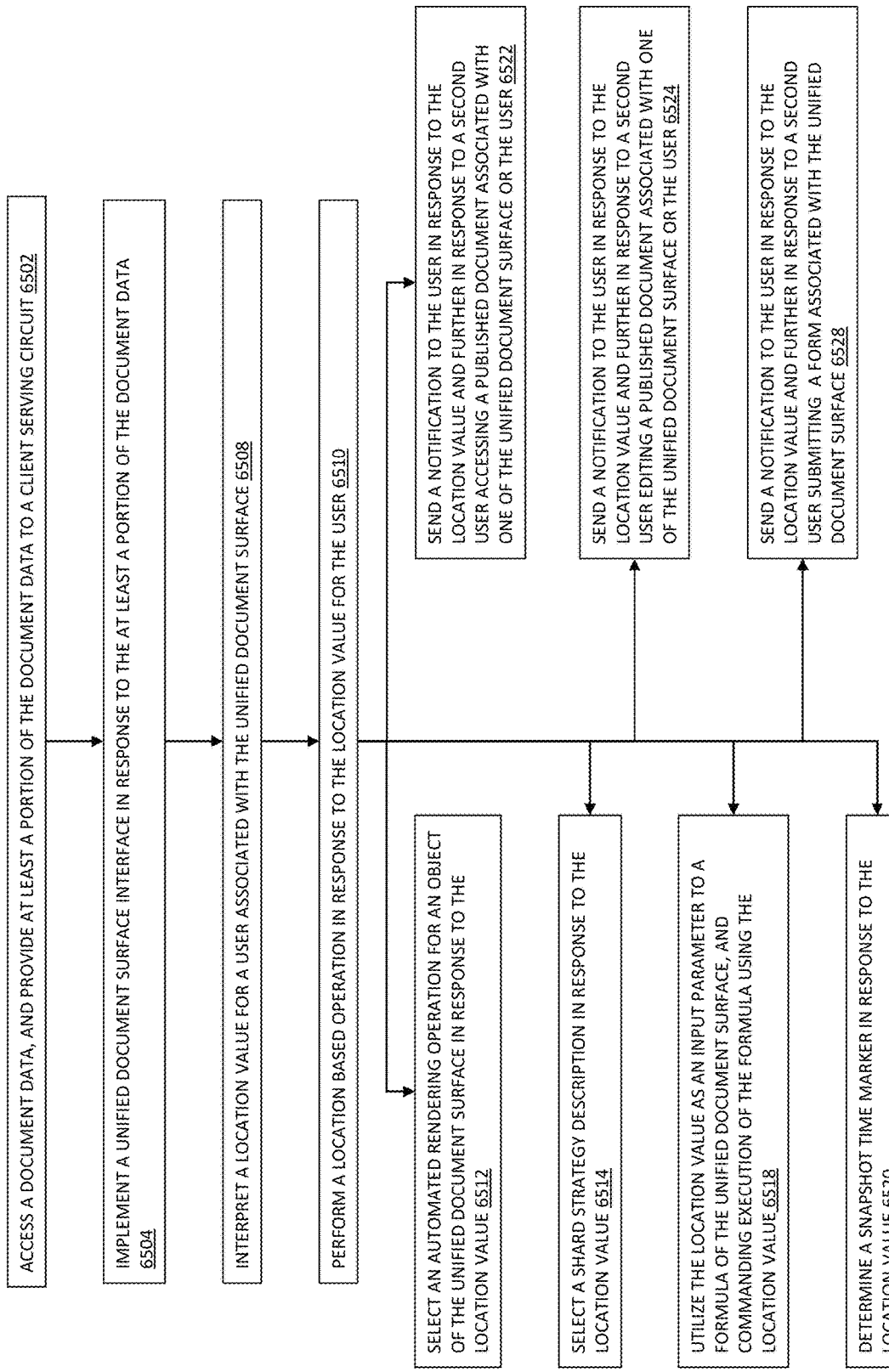
FIG. 65 is a schematic flow diagram of a procedure for document rendering.

An example method shown in FIG. 65 may include accessing a document data, the document data including data for a unified document surface, and providing at least a portion of the document data 6502; implementing a unified document surface interface in response to the at least a portion of the document data 6504; interpreting a location value for a user associated with the unified document surface 6508; and performing a location based operation in response to the location value for the user 6510.

Certain further aspects of the example method are described following, any one or more of which may be present in certain embodiments. The location based operation may include selecting an automated rendering operation for an object of the unified document surface in response to the location value 6512. The location based operation may include selecting a shard strategy description in response to the location value 6514. The location based operation may include utilizing the location value as an input parameter to a formula of the unified document surface, and commanding execution of the formula using the location value 6518. The location based operation may include determining a snapshot time marker in response to the location value 6520. The location based operation may include sending a notification to the user in response to the location value and further in response to a second user accessing a published document associated with one of the unified document surface or the user 6522. The location based operation may include sending a notification to the user in response to the location value and further in response to a second user editing a published document associated with one of the unified document surface or the user 6524. The location based operation may include sending a notification to the user in response to the location value and further in response to a second user submitting a form associated with the unified document surface 6528.

While only a few embodiments of the present disclosure have been shown and described, it will be obvious to those skilled in the art that many changes and modifications may be made thereunto without departing from the conceptual framework and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions, and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions, or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client, and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of a program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code, and/or instructions. A central repository may provide program instructions to be executed on different devices. In this implementation, the remote repository may act as a storage medium for program code, instructions, and programs.

In embodiments, one or more of the controllers, circuits, systems, data collectors, storage systems, network elements, or the like as described throughout this disclosure may be embodied in or on an integrated circuit, such as an analog, digital, or mixed signal circuit, such as a microprocessor, a programmable logic controller, an application-specific integrated circuit, a field programmable gate array, or other circuit, such as embodied on one or more chips disposed on one or more circuit boards, such as to provide in hardware (with potentially accelerated speed, energy performance, input-output performance, or the like) one or more of the functions described herein. This may include setting up circuits with up to billions of logic gates, flip-flops, multiplexers, and other circuits in a small space, facilitating high speed processing, low power dissipation, and reduced manufacturing cost compared with board-level integration. In embodiments, a digital IC, typically a microprocessor, digital signal processor, microcontroller, or the like may use Boolean algebra to process digital signals to embody complex logic, such as involved in the circuits, controllers, and other systems described herein. In embodiments, a data collector, an expert system, a storage system, or the like may be embodied as a digital integrated circuit ("IC"), such as a logic IC, memory chip, interface IC (e.g., a level shifter, a serializer, a deserializer, and the like), a power management IC and/or a programmable device; an analog integrated circuit, such as a linear IC, RF IC, or the like, or a mixed signal IC, such as a data acquisition IC (including A/D converters, D/A converter, digital potentiometers) and/or a clock/timing IC.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be configured for use with any kind of private, community, or hybrid cloud computing network or cloud computing environment, including those which involve features of software as a service ("SaaS"), platform as a service ("PaaS"), and/or infrastructure as a service ("IaaS").

The methods, program codes, and instructions described herein and elsewhere may be implemented on a cellular network having multiple cells. The cellular network may either be frequency division multiple access ("FDMA") network or code division multiple access ("CDMA") network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory ("RAM"); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the Figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A system, comprising:
a document serving circuit structured to:
  access a document data, the document data comprising data for a unified document surface; and
  provide at least a portion of the document data to a client serving circuit; and
the client serving circuit structured to:
  implement a unified document surface interface in response to the at least a portion of the document data;
  implement an extension creation interface;
  provide a pack implementation value to the document serving circuit in response to user interactions with the extension creation interface; and
  determine an executable object in response to the pack implementation value wherein the executable object comprises an access authorization description and the access authorization description comprises authorization information for access to at least one of: a service or an external data value; and
a second client serving circuit structured to:
  access a pack;
  implement an extension utilization interface; and
  incorporate at least a portion of the pack into a second document;
  determine the executable object in response to the pack implementation value and access at least one of the service or the external data value based on the access authorization description, wherein the document serving circuit is further structured to isolate the access authorization description from the second client serving circuit.

2. The system of claim 1, wherein:
the pack implementation value comprises an access authorization value.

3. The system of claim 2, wherein the document serving circuit is further structured to expose a pack to a workspace in response to the executable object.

4. The system of claim 3, wherein the access authorization description comprises an authorization type for each one of a service or an external data access of the pack.

5. The system of claim 4, wherein the document serving circuit is further structured to require authorization information for the service or the external data access from a second user of a second document utilizing the pack in response to the authorization type comprising a user authorization type.

6. The system of claim 5, wherein the document serving circuit is further structured to access the service or the external data access using separate credentials from the required authorization information.

7. The system of claim 4, wherein the document serving circuit is further structured to provide access to the service or the external data access to a second user of the second document utilizing the pack in response to the authorization type comprising a system authorization type.

8. The system of claim 1, wherein the document serving circuit is further structured to expose a pack to a workspace in response to the executable object.

9. The system of claim 1, wherein the executable object comprises at least one of: a button, a unified document surface interface object, a code-based object, a third-party object, or a column object.

10. The system of claim 1, wherein the extension creation interface comprises a software development kit (SDK) layer.

11. The system of claim 1, wherein the pack implementation value comprises an arbitrary code component.

12. The system of claim 11, wherein the document serving circuit is further structured to determine the executable object by isolating operations of the arbitrary code component from at least one of: the client serving circuit or the document serving circuit.

13. The system of claim 12, wherein the document serving circuit is further structured to determine the pack implementation value by operating a virtual machine to execute the arbitrary code component.

14. The system of claim 13, wherein the document serving circuit is further structured to determine the executable object by operating the virtual machine on a workflow serving circuit.

15. The system of claim 14, wherein the document serving circuit is further structured to create a dedicated instance of the virtual machine for the arbitrary code component.

16. The system of claim 1, wherein the document serving circuit is further structured to perform, in response to determining that an update to the pack implementation value comprises an incompatibility risk, at least one operation among:
providing an incompatibility warning value to a client device;
providing an update option value to a second client serving circuit accessing a document utilizing a pack exposed to a workspace in response to the executable object; or
providing an update delay value to the second client serving circuit accessing the document utilizing the pack exposed to the workspace in response to the executable object.

17. The system of claim 1, wherein the document serving circuit is further structured to:
implement a sandbox interface as a part of the extension creation interface; and
provide a calculated output value to a client device in response to user interactions with the sandbox interface.

18. The system of claim 17, wherein the document serving circuit is further structured to operate an external data access authorization in response an access credential supplied by the user to the sandbox interface.

19. The system of claim 18, wherein the document serving circuit is further structured to store the access credential in a local hidden file of the client device.

20. The system of claim 1, wherein the document serving circuit is further structured to:
perform a validation of the executable object; and
create a pack in response to the executable object and the validation.

21. The system of claim 1, wherein the document serving circuit is further structured to:
perform a validation of the executable object; and
provide a notification to the extension creation interface in response to the validation indicating a pack error.

22. The system of claim 21, wherein the pack error comprises at least one of: a formula error, an authorization error, or a code operation error.

23. The system of claim 1, wherein the extension creation interface further comprises an assistance interface.

24. The system of claim 23, wherein the assistance interface further comprises at least one of:
a tooltip associated with at least one of: a component of the extension creation interface, a formula command, or a text value;
a description value associated with the at least one of: the component of the extension creation interface, the formula command, or the text value; or
a code example associated with the at least one of: the component of the extension creation interface, the formula command, or the text value.

25. The system of claim 1, wherein the extension creation interface is configured to limit access to an external data access value to a defined external data component of the extension creation interface.

* * * * *